US012345084B2

(12) United States Patent
Leonard et al.

(10) Patent No.: US 12,345,084 B2
(45) Date of Patent: Jul. 1, 2025

(54) DISTRIBUTED CONTROL SYSTEM FOR SERVO CONTROLLED POWERED DOOR ACTUATOR

(71) Applicant: MAGNA CLOSURES INC., Newmarket (CA)

(72) Inventors: Jube Raymond Leonard, Barrie (CA); Saikat Bose, Richmond Hill (CA); Milos Pavlovic, Kleinburg (CA); John G. Zeabari, Highland, MI (US); Joshua M. Bernhardt, West Bloomfield, MI (US)

(73) Assignee: MAGNA CLOSURES INC., Newmarket (CA)

( * ) Notice: Subject to any disclaimer, the term of this patent is extended or adjusted under 35 U.S.C. 154(b) by 187 days.

(21) Appl. No.: 17/676,582

(22) Filed: Feb. 21, 2022

(65) Prior Publication Data

US 2022/0268074 A1 Aug. 25, 2022

Related U.S. Application Data

(60) Provisional application No. 63/272,853, filed on Oct. 28, 2021, provisional application No. 63/152,107, filed on Feb. 22, 2021.

(51) Int. Cl.
*E05F 15/41* (2015.01)
*E05F 15/622* (2015.01)

(52) U.S. Cl.
CPC ............ *E05F 15/41* (2015.01); *E05F 15/622* (2015.01); *E05Y 2900/531* (2013.01)

(58) Field of Classification Search
CPC ... E05F 15/622; E05F 15/41; E05Y 2900/531
See application file for complete search history.

(56) References Cited

U.S. PATENT DOCUMENTS 5,328,218 A 7/1994 Brusasco et al.
6,178,699 B1 1/2001 Kawanobe et al.
(Continued)

FOREIGN PATENT DOCUMENTS

CN 103132846 A 6/2013
CN 105008643 B 10/2015
(Continued)

OTHER PUBLICATIONS

Michelle Clifford & Leticia Gomez 'Measuring Tilt with Low-g Accelerometers'. Freescale, May 2005 [retrieved on Mar. 23, 2024]. Retrieved from the Internet: https://www.nxp.com/docs/en/application-note/AN3107.pdf.*

*Primary Examiner* — Rina I Duda
(74) *Attorney, Agent, or Firm* — Dickinson Wright PLLC

(57) ABSTRACT

An actuator assembly of an actuation system for a closure member of a vehicle is provided. The actuator assembly includes an actuator housing including a sensor housing. The actuator assembly also includes an electric motor disposed in the actuator housing and configured to rotate a driven shaft operably coupled to an extensible member that is coupled to one of a body or the closure member for opening or closing the closure member. The actuator assembly also includes an actuator controller disposed in the sensor housing of the actuator housing and coupled to electric motor and an accelerometer configured to sense movement of the closure member. The actuator controller is configured to detect the movement of the closure member using the accelerometer. The actuator controller then controls the opening or closing of the closure member based on the movement of the closure member using the electric motor.

19 Claims, 94 Drawing Sheets

(56) References Cited

U.S. PATENT DOCUMENTS

| | | | | |
|---|---|---|---|---|
| 6,903,473 | B2 | 6/2005 | Matsuyama et al. | |
| 7,175,228 | B2 | 2/2007 | Mrkovic et al. | |
| 7,294,986 | B2 | 11/2007 | Marentette | |
| 7,690,156 | B2 | 4/2010 | Imai et al. | |
| 7,726,722 | B2 | 6/2010 | Ray | |
| 7,812,492 | B2 | 10/2010 | Torres et al. | |
| 8,567,129 | B2 | 10/2013 | Suzuki et al. | |
| 8,836,784 | B2 * | 9/2014 | Erhardt | G07C 5/008 348/148 |
| 9,159,219 | B2 | 10/2015 | Magner et al. | |
| 9,174,517 | B2 | 11/2015 | Scheuring et al. | |
| 9,650,824 | B2 | 5/2017 | Sauerwein et al. | |
| 9,676,256 | B2 | 6/2017 | Elie et al. | |
| 9,708,845 | B2 | 7/2017 | Tehranchi | |
| 9,879,465 | B2 | 1/2018 | Elie et al. | |
| 10,000,961 | B2 | 6/2018 | Elie et al. | |
| 10,017,975 | B2 * | 7/2018 | Broadhead | E05F 5/00 |
| 10,145,165 | B2 | 12/2018 | Elie et al. | |
| 10,161,175 | B2 | 12/2018 | Elie et al. | |
| 10,180,025 | B2 | 1/2019 | Conner | |
| 10,329,807 | B2 | 6/2019 | Margheritti et al. | |
| 10,337,231 | B2 | 7/2019 | Wang et al. | |
| 10,384,519 | B1 * | 8/2019 | Brown | B60J 5/047 |
| 10,415,296 | B2 | 9/2019 | Mayr | |
| 10,443,289 | B2 * | 10/2019 | Rrumbullaku | E05F 15/75 |
| 2002/0180269 | A1 | 12/2002 | Dalakuras et al. | |
| 2005/0168010 | A1 | 8/2005 | Cleland et al. | |
| 2006/0242908 | A1 | 11/2006 | McKinney | |
| 2009/0217596 | A1 | 9/2009 | Neundorf et al. | |
| 2013/0144495 | A1 | 6/2013 | Yu | |
| 2014/0175813 | A1 | 6/2014 | Margheritti et al. | |
| 2016/0010379 | A1 * | 1/2016 | Sauerwein | E05F 15/70 49/350 |
| 2016/0348413 | A1 | 12/2016 | Broadhead et al. | |
| 2017/0009510 | A1 | 1/2017 | Fujimoto et al. | |
| 2017/0028966 | A1 | 2/2017 | Elie et al. | |
| 2017/0030737 | A1 | 2/2017 | Elie et al. | |
| 2017/0089115 | A1 * | 3/2017 | Wang | E05F 15/697 |
| 2017/0144516 | A1 | 5/2017 | Iacovoni et al. | |
| 2017/0247929 | A1 * | 8/2017 | Lombrozo | E05F 15/70 |
| 2017/0247933 | A1 * | 8/2017 | Elie | E05F 15/73 |
| 2017/0260790 | A1 | 9/2017 | Sauerwein et al. | |
| 2017/0341526 | A1 | 11/2017 | Marlia et al. | |
| 2017/0030118 | A1 | 12/2017 | Elie et al. | |
| 2018/0202212 | A1 | 7/2018 | Xiao et al. | |
| 2018/0245379 | A1 | 8/2018 | Taurasi et al. | |
| 2018/0283062 | A1 | 10/2018 | Miu et al. | |
| 2018/0328097 | A1 | 11/2018 | Holt et al. | |
| 2018/0363353 | A1 | 12/2018 | Ghannam | |
| 2020/0018111 | A1 * | 1/2020 | Akbarian | G01S 13/87 |
| 2020/0031207 | A1 * | 1/2020 | Henes | E05F 15/41 |
| 2020/0270913 | A1 | 8/2020 | Marlia | |
| 2020/0300020 | A1 * | 9/2020 | Molnar | E05F 15/70 |
| 2022/0290483 | A1 | 9/2022 | Kromer et al. | |

FOREIGN PATENT DOCUMENTS

| | | | |
|---|---|---|---|
| CN | 109138706 | A | 1/2019 |
| DE | 19927871 | A1 | 11/1999 |
| DE | 102008027087 | A1 | 12/2008 |
| DE | 102009020075 | B4 | 11/2009 |
| DE | 102010023398 | A1 | 12/2011 |
| DE | 102011121410 | A1 | 6/2013 |
| DE | 102013226128 | A1 | 6/2015 |
| FR | 2907924 | A1 | 5/2008 |
| GB | 2543386 | A | 4/2017 |
| IN | 1758KOL2008 | | 5/2009 |
| WO | 2013013313 | A1 | 1/2013 |
| WO | 2017029229 | A1 | 2/2017 |
| WO | 2017083706 | A1 | 5/2017 |
| WO | 2019056125 | A1 | 3/2019 |
| WO | 2020011307 | A1 | 1/2020 |
| WO | 2020232543 | A1 | 11/2020 |
| WO | 2020252601 | A1 | 12/2020 |
| WO | 2021037839 | A1 | 3/2021 |

* cited by examiner

DISTRIBUTED CONTROL SYSTEM FOR SERVO CONTROLLED POWERED DOOR ACTUATOR

CROSS REFERENCE TO RELATED APPLICATIONS

This utility application claims the benefit of U.S. Provisional Application No. 63/152,107 filed Feb. 22, 2021 and U.S. Provisional Application No. 63/272,853 filed Oct. 28, 2021. The entire disclosure of the above applications being considered part of the disclosure of this application and hereby incorporated by reference.

FIELD

The present disclosure relates to a power actuator for a vehicle closure. More specifically, the present disclosure relates to a distributed control system for a power actuator assembly for a vehicle side door.

BACKGROUND

This section provides background information related to the present disclosure which is not necessarily prior art.

Closure members of motor vehicles may be mounted by one or more hinges to the vehicle body. For example, passenger doors may be oriented and attached to the vehicle body by the one or more hinges for swinging movement about a generally vertical pivot axis. In such an arrangement, each door hinge typically includes a door hinge strap connected to the passenger door, a body hinge strap connected to the vehicle body, and a pivot pin arranged to pivotably connect the door hinge strap to the body hinge strap and define a pivot axis. Such swinging passenger doors ("swing doors") may be moveable by power closure member actuation systems. Specifically, the power closure member system can function to automatically swing the passenger door about its pivot axis between the open and closed positions, to assist the user as he or she moves the passenger door, and/or to automatically move the passenger door in between closed and open positions for the user.

Typically, power closure member actuation systems include a power-operated device such as, for example, an electric motor and a rotary-to-linear conversion device that are operable for converting the rotary output of the electric motor into translational movement of an extensible member. In many arrangements, the electric motor and the conversion device are mounted to the passenger door and the distal end of the extensible member is fixedly secured to the vehicle body. One example of a power closure member actuation system for a passenger door is shown in commonly-owned International Publication No. WO2013/013313 to Scheuring et al. which discloses use of a rotary-to-linear conversion device having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

A high-resolution position sensor, such as a magnet wheel and a Hall effect sensor, may be used to accurately measure a position in a power closure actuation sensor. However, such high-resolution sensors can be adversely affected by electromagnetic (EM) interference, such as may be generated by an EM brake.

In addition, packaging of power actuators of the power closure member actuation systems, especially those including an actuator controller, can introduce various complications relative to other structures and components within a cavity of the closure member. Specifically, due to rotation of the power actuator as the closure member moves, interference may arise between the power actuator and the other structures and components within the cavity.

In view of the above, there remains a need to develop power closure member actuation systems and power actuators which address and overcome limitations and drawbacks associated with known power closure member actuation systems and power actuators as well as to provide increased convenience and enhanced operational capabilities.

SUMMARY

This section provides a general summary of the disclosure, and is not a comprehensive disclosure of its full scope or all of its features.

It is an object of the present disclosure to provide an actuator assembly of a closure member of a vehicle. The actuator assembly includes an actuator housing including a sensor housing. The actuator assembly also includes an electric motor disposed in the actuator housing and configured to rotate a driven shaft operably coupled to an extensible member that is coupled to one of a body or the closure member for opening or closing the closure member. The actuator assembly also includes an actuator controller disposed in the sensor housing of the actuator housing and coupled to electric motor and an accelerometer configured to sense movement of the closure member. The actuator controller is configured to detect the movement of the closure member using the accelerometer. The actuator controller then controls the opening or closing of the closure member based on the movement of the closure member using the electric motor.

According to another aspect, a servo actuation system for a closure member of a vehicle is provided. The system includes an actuator assembly with an actuator housing. The actuator assembly includes an electric motor disposed in the actuator housing and configured to rotate a driven shaft operably coupled to an extensible member. The extensible member is coupled to one of a body or the closure member for opening or closing the closure member. The system also includes an accelerometer disposed remotely from the actuator assembly and configured to sense movement of the closure member. In addition, the system includes at least one servo controller coupled to the electric motor and the accelerometer. The at least one servo controller is configured to detect the movement of the closure member using the accelerometer. The at least one servo controller controls the opening or closing of the closure member based on the movement of the closure member using the electric motor.

According to yet another aspect, another servo actuation system for a closure member of a vehicle is provided. The system includes an actuator assembly including an actuator housing. The actuator assembly includes an electric motor disposed in the actuator housing and configured to rotate a driven shaft. The actuator assembly includes an actuator controller disposed in the actuator housing and coupled to electric motor. The system also includes an accelerometer disposed remotely from the actuator assembly and configured to detect movement of the closure member. In addition the system includes a latch assembly disposed remotely from the actuator assembly and configured to selectively secure the closure member to a vehicle body of the vehicle. The latch assembly includes a latch controller in communication with the accelerometer and the actuator controller. The latch controller is configured to detect the movement of the closure member using the accelerometer. The latch controller is also configured to command the actuator controller to control the opening or closing of the closure member based on the movement of the closure member using the electric motor.

According to yet another aspect, an actuator assembly of a closure member of a vehicle is provided. The actuator assembly includes a housing. The actuator assembly also includes an electric motor disposed in the housing and configured to rotate a driven shaft operably coupled to a moveable member coupled to one of a body or the closure member for opening or closing the closure member. In addition, the actuator assembly includes an actuator controller disposed in the housing and coupled to electric motor. The actuator controller is also coupled to a sensor configured to sense movement of the closure member. The actuator controller is configured to detect the movement of the closure member using the sensor and control the opening or closing of the closure member based on the movement of the closure member using the electric motor.

According to yet a further aspect, an actuator system of a closure member of a vehicle is provided. The actuator system includes an actuator assembly comprising an electric motor configured to rotate a driven shaft operably coupled to a moveable member coupled to one of a body or the closure member for opening or closing the closure member. The actuator system also includes a latch assembly configured to releasably latch the closure member to the vehicle body. The latch assembly comprising a housing and an actuator controller disposed in the housing, the actuator controller coupled to electric motor to control the opening or closing of the closure member.

According to another aspect, a system for opening or closing a closure member of a vehicle is provided. The system includes an actuator assembly comprising an electric motor configured to rotate a driven shaft operably coupled to a moveable member coupled to one of a body or the closure member for opening or closing the closure member. The system also includes an accelerometer positioned at or near the center of gravity of the closure member. The system additionally includes an actuator controller coupled to electric motor and to the accelerometer configured to sense movement of the closure member using the accelerometer and control the opening or closing of the closure member based on the movement of the closure member using the electric motor.

According to yet another aspect, a closure member of a vehicle is provided. The closure member includes an actuator assembly comprising an electric motor configured to rotate a driven shaft operably coupled to a moveable member coupled to one of a body or the closure member for opening or closing the closure member. The closure member also includes a door module having an accelerometer mounted to the door module. In addition, the closure member includes an actuator controller coupled to electric motor and to the accelerometer and configured to sense movement of the closure member using the accelerometer and control the opening or closing of the closure member based on the movement of the closure member using the electric motor.

It is an additional object of the present disclosure to provide a power actuator for a closure member of vehicle. The power actuator includes an actuator housing including a controller housing. The power actuator also includes an extensible member configured to be coupled to a body of the vehicle. In addition, the power actuator includes a gearbox disposed in a gearbox housing of the actuator housing and configured to apply a force to the extensible member for causing the extensible member to move linearly. An electric motor is disposed in the actuator housing and is configured to rotate a driven shaft operably coupled to the gearbox for opening or closing the closure member. The power actuator additionally includes an actuator controller coupled to electric motor and comprising at least one controller printed circuit board disposed in the controller housing and configured to control the electric motor. The actuator housing is configured to be pivotally coupled to the closure member about a pivot axis and swing during opening and closing of the closure member. The controller housing for the actuator controller is disposed adjacent the electric motor and does not extend further away from the pivot axis than does the electric motor.

In another aspect, the controller housing includes at least one reinforcement rib formed therein for reinforcing the controller housing.

In another aspect, the power actuator further includes a plurality of foam pads disposed in the controller housing configured to compress against the at least one controller printed circuit board and prevent the at least one controller printed circuit board from moving inside the controller housing.

In another aspect, the actuator housing defines no passage from the rear extensible bellows into the actuator housing and air from the rear extensible bellows remains trapped in the rear extensible bellows in response to the extensible member moving within the rear extensible bellows.

According to another aspect, a power actuator for a closure member of a vehicle is provided. The power actuator including an extensible member configured to be coupled to a body of the vehicle. The power actuator includes a gearbox configured to apply a force to the extensible member for causing the extensible member to move linearly. In addition, the power actuator includes an electric motor configured to rotate a driven shaft operably coupled to the gearbox for opening or closing the closure member. Additionally, the power actuator includes an actuator controller coupled to electric motor. The actuator controller comprises at least one controller printed circuit board including main controller board disposed in a controller housing and a daughter board configured to be coupled to the main controller board. The actuator controller is configured to control the electric motor. The daughter board includes a plurality of power supply connections for the electric motor and at least one closure member feedback sensor for detecting a position of the electric motor.

In another aspect, the daughter board is at least partially disposed in a gearbox housing board cavity of a gearbox housing of the gearbox. A daughter board cover secures the daughter board in gearbox housing board cavity along with a controller box to gearbox grommet. The main controller board is disposed remotely from the daughter board and the daughter board electrically couples to the main controller board through a main to daughter wiring harness.

According to yet another aspect, a power actuator for a closure member of a vehicle is provided. The power actuator includes an actuator housing including a controller housing. The power actuator also includes an extensible member configured to be coupled to a body of the vehicle and a gearbox configured to apply a force to the extensible member for causing the extensible member to move linearly. The power actuator additionally includes an electric motor disposed in the actuator housing and configured to rotate a driven shaft operably coupled to the gearbox for opening or closing the closure member. The power actuator also includes an actuator controller coupled to electric motor and comprising at least one controller printed circuit board disposed in the controller housing and configured to control the electric motor. The actuator housing is configured to be pivotally coupled to the closure member about a pivot axis and swing during opening and closing of the closure member. The controller housing for the actuator controller is disposed adjacent the electric motor and does not extend further beyond outer extents of at least one of the electric motor and the gearbox.

In another aspect, the outer extents includes a lateral extent of the power actuator viewed from a front of the power actuator in line with an axis of the extensible member.

According to another aspect, there is provided a servo actuation system for a closure member of a vehicle including an actuator assembly having an actuator housing, the actuator assembly including an electric motor disposed in the actuator housing and configured to rotate a driven shaft operably coupled to an extensible member coupled to one of a body or the closure member for opening or closing the closure member, and an accelerometer configured to sense one of movement and inclination of the closure member, where the electric motor is adapted to control the opening or closing of the closure member based on the one of the movement and the inclination of the closure member sensed using the accelerometer.

According to another aspect, there is provided a servo actuation system for a closure member of a vehicle including an actuator assembly including an actuator housing, the actuator assembly including an electric motor disposed in the actuator housing and configured to rotate a driven shaft, an actuator controller coupled to the electric motor and disposed within the actuator housing, and an accelerometer disposed remotely from the actuator assembly and configured to detect one of the movement and the inclination of the closure member, where the actuator controller is configured to command the electric motor to control motion of the closure member based on the one of the movement and the inclination of the closure member of the closure member using the electric motor.

According to another aspect, there is provided a method of controlling an electric motor coupled to a closure member for the opening or closing of the closure member, the method including receiving, from an accelerometer positioned on the closure member substantially at a center of gravity of the closure, a signal indicative of at least one of an inclination and a movement of the closure member, calculating, using the signal, a force command for controlling the electric motor output force, and supplying the force command to the electric motor for the opening or closing of the closure member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 51:
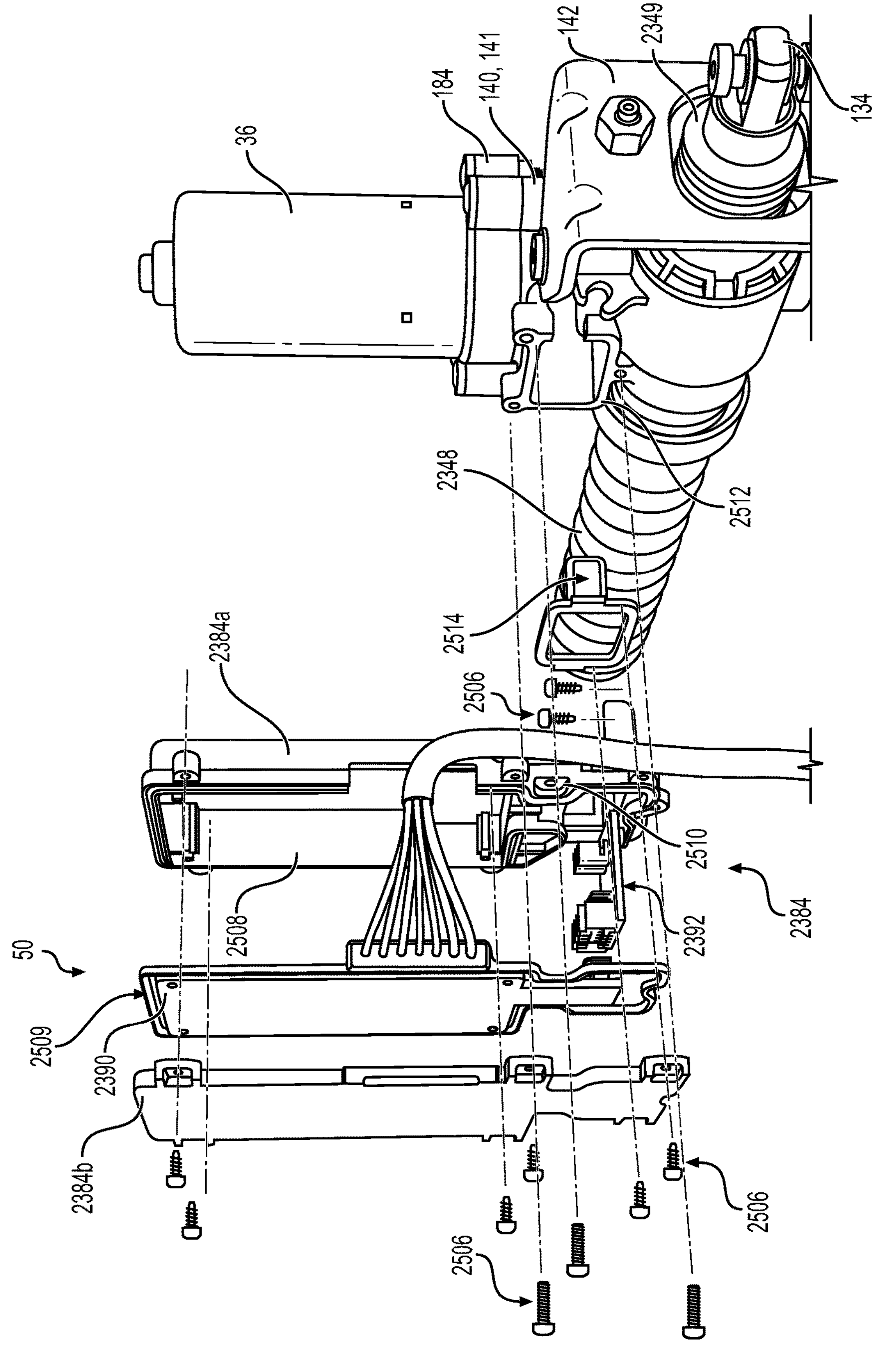
Figure 52:
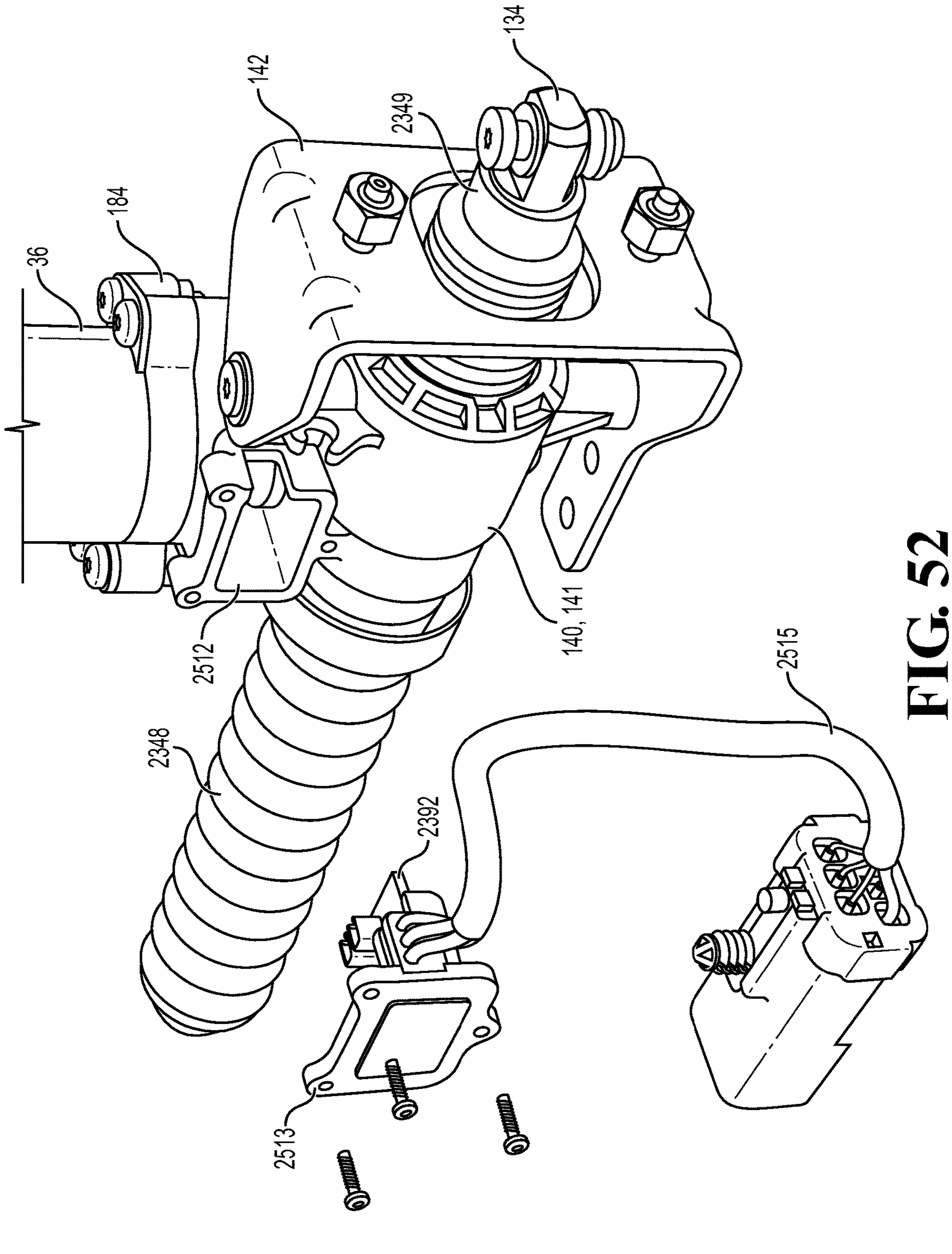
Figure 53:
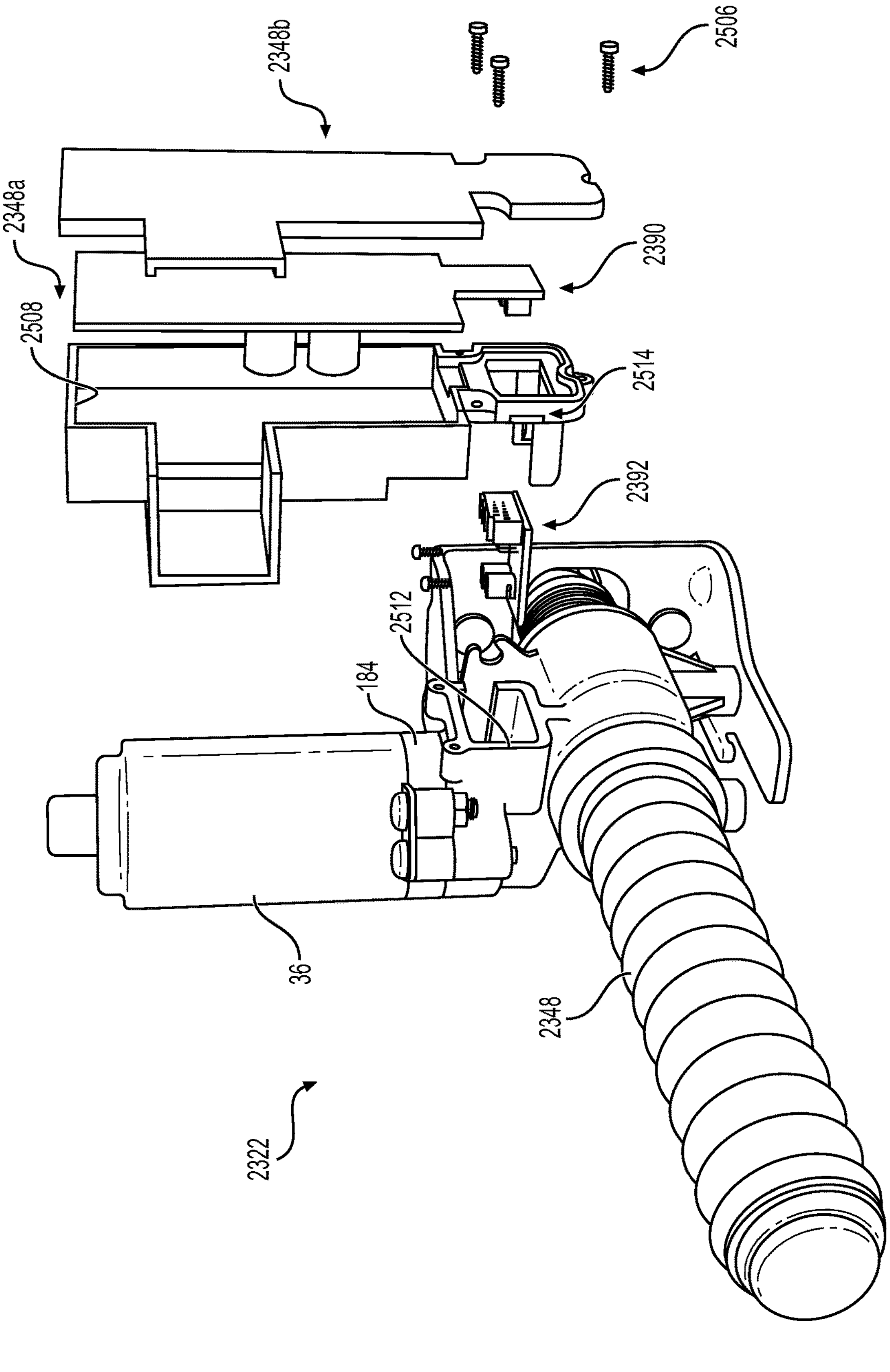
Figure 54B:
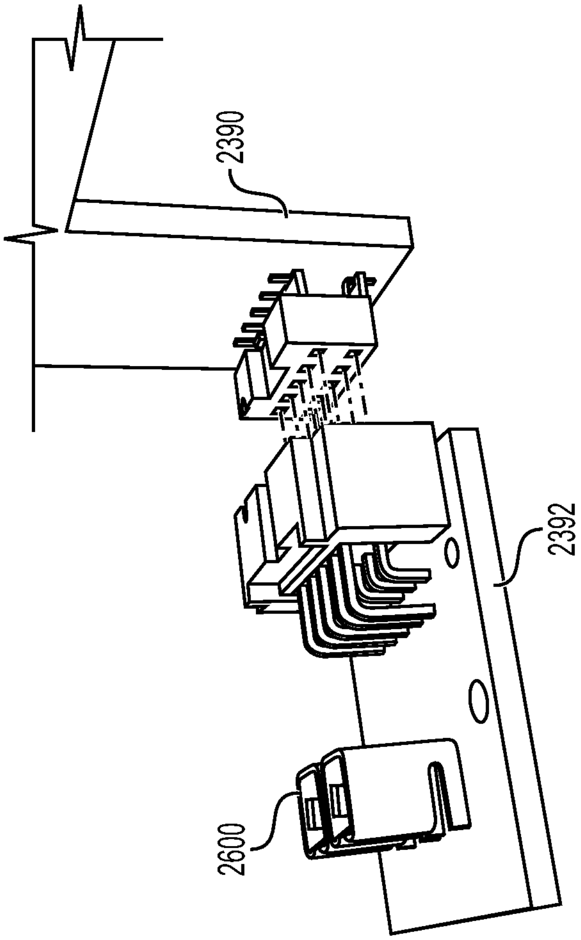
Figure 54A:
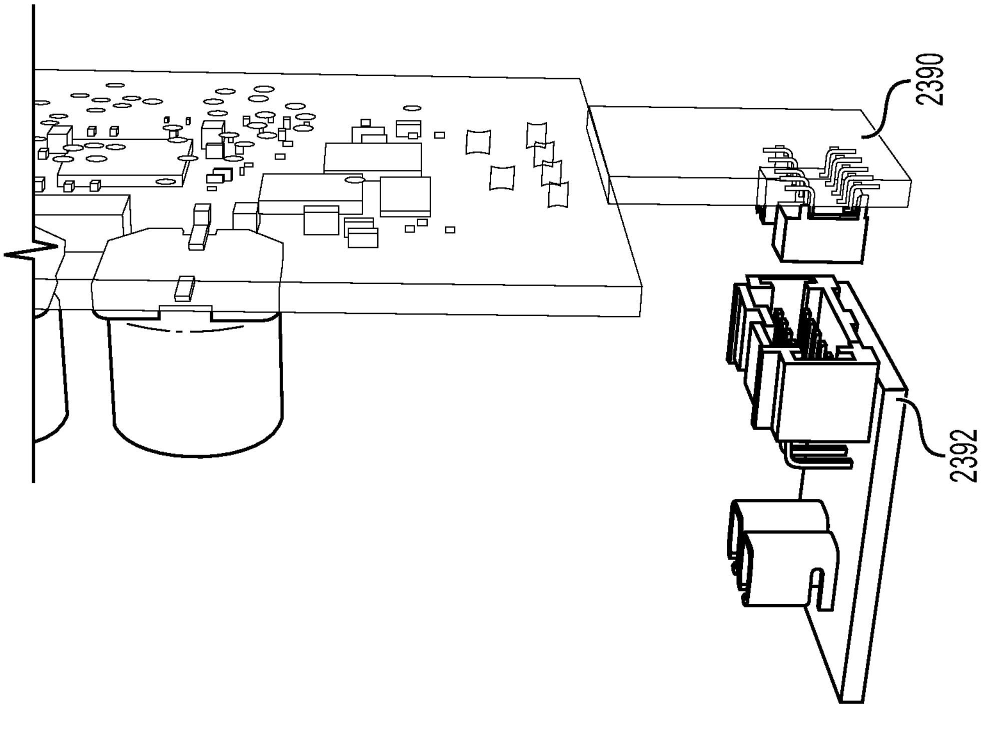
Figure 55:
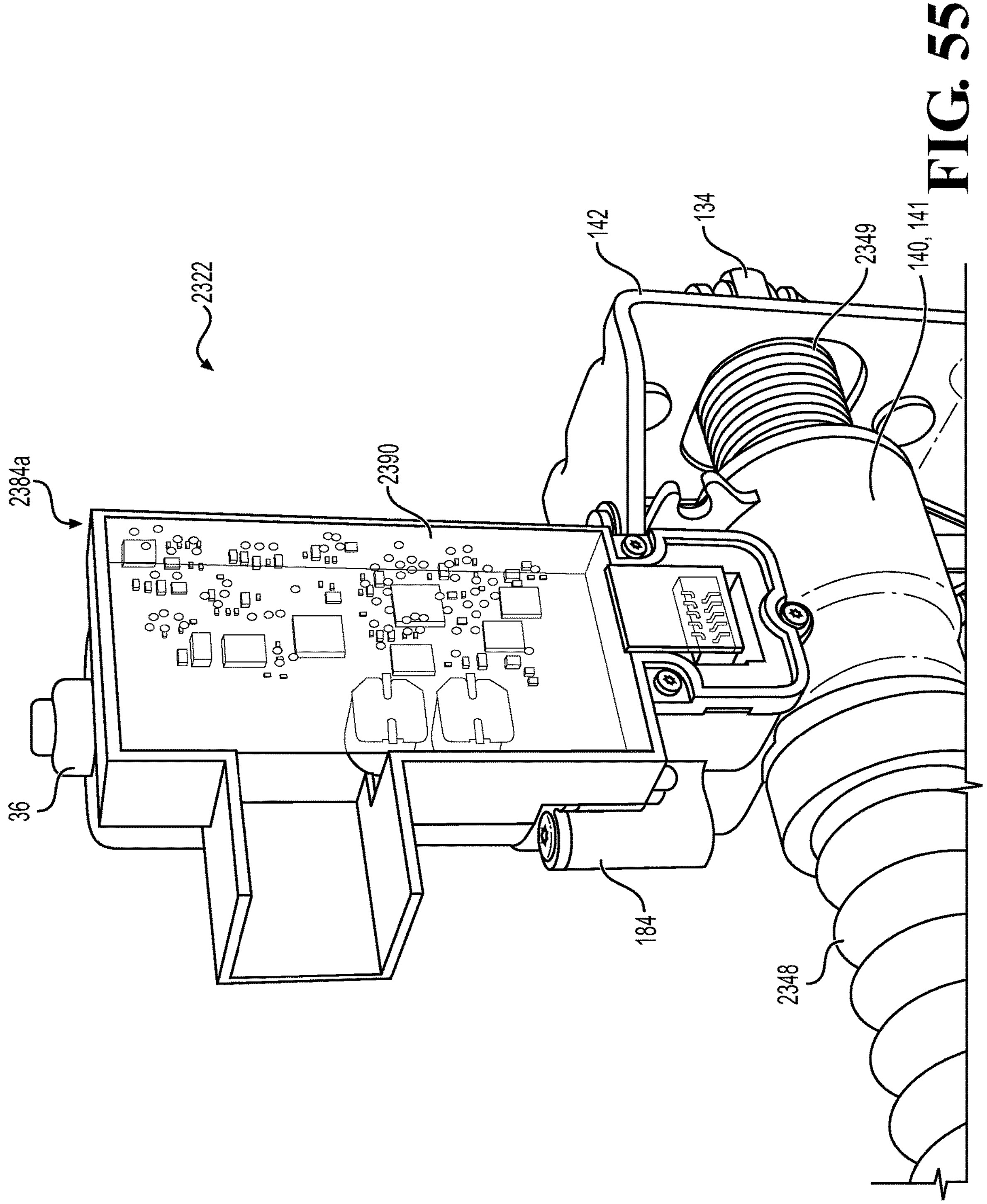
Figure 56B:
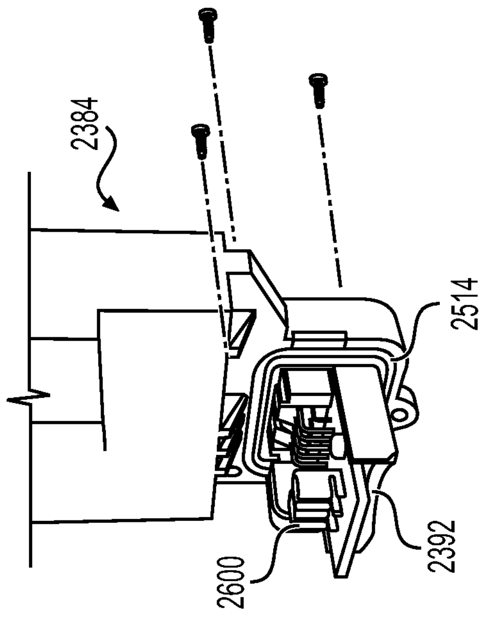
Figure 56A:
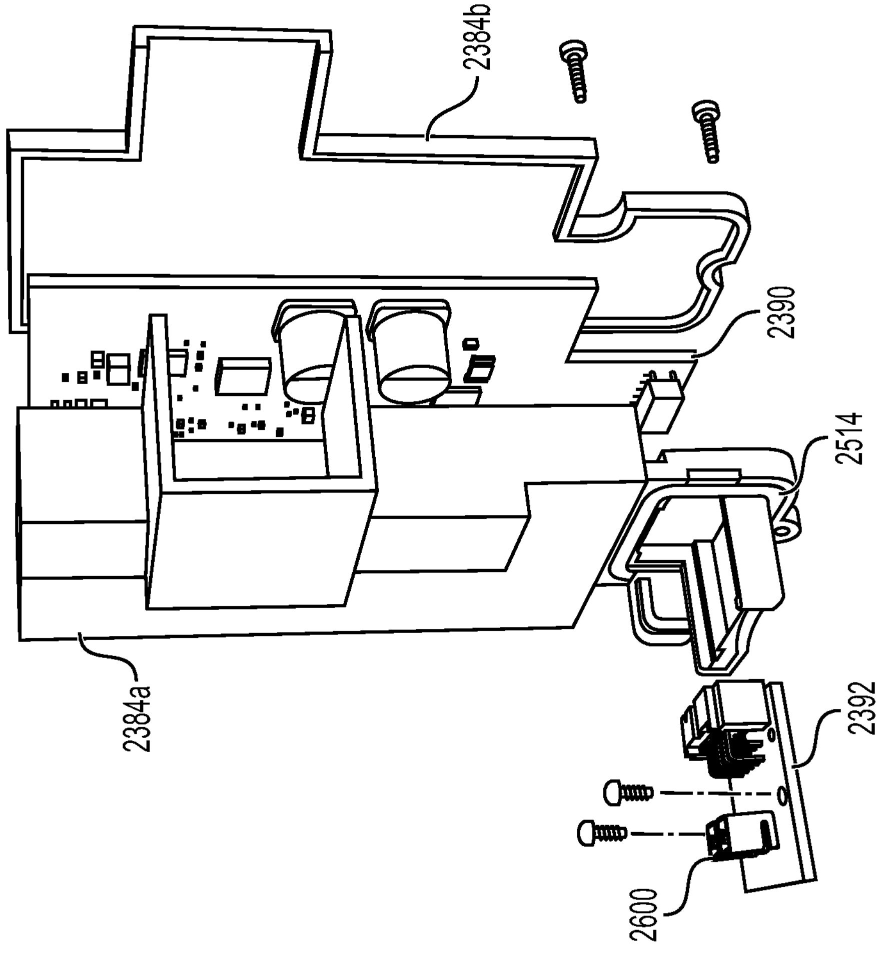
Figure 57B:
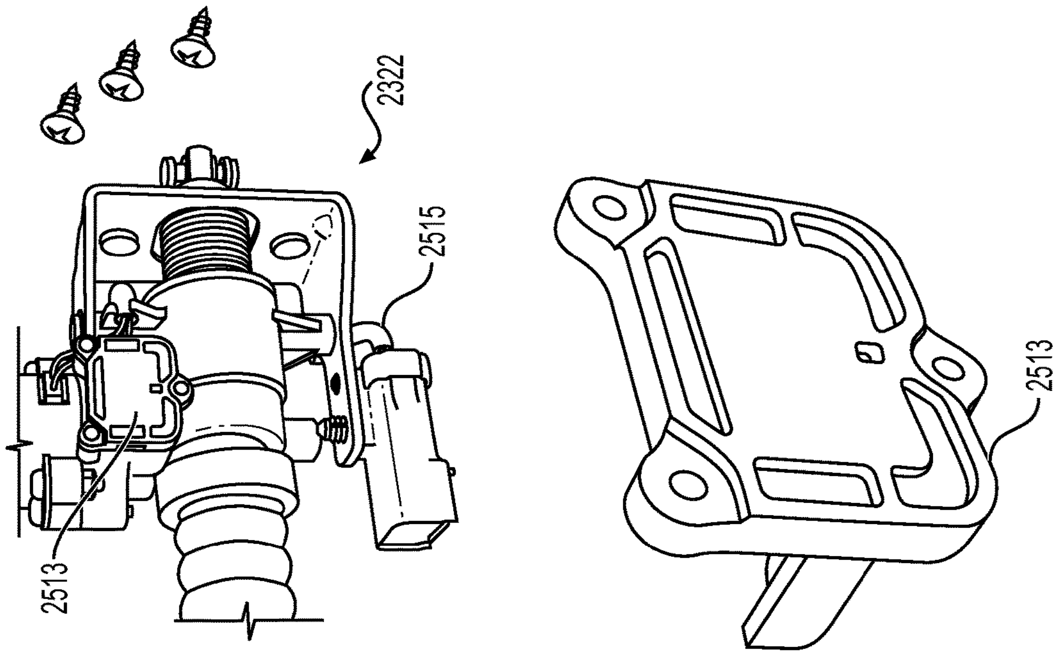
Figure 57A:
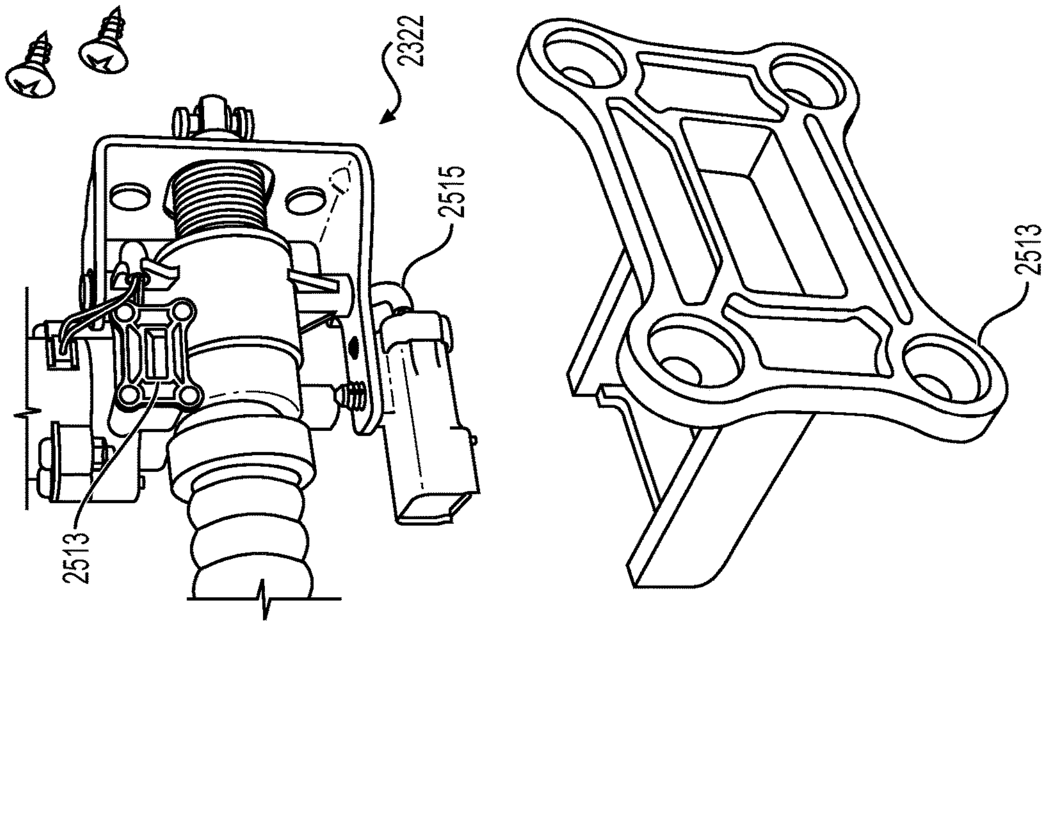
Figure 58B:
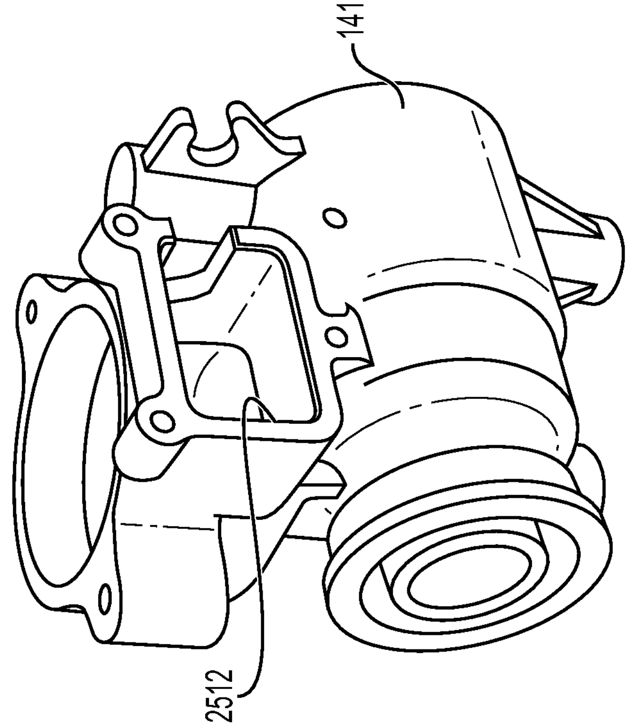
Figure 58A:
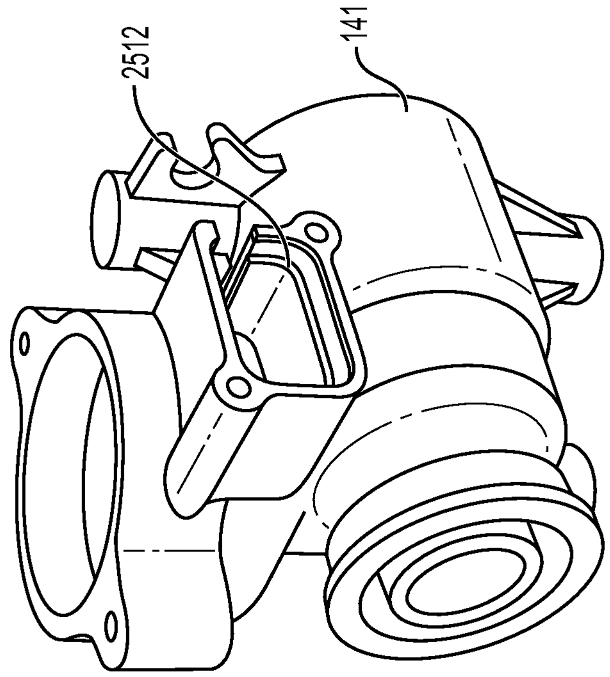
Figure 59A:
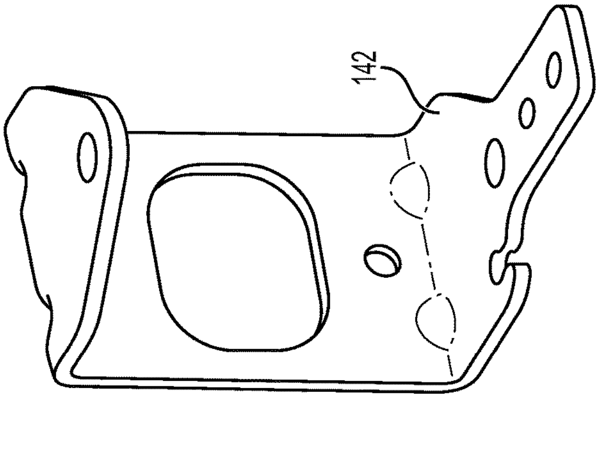
Figure 59B:
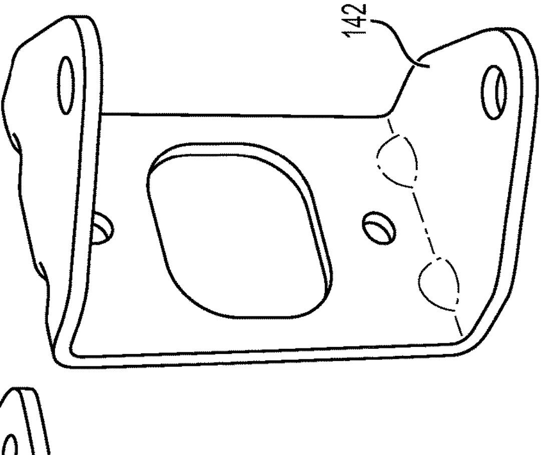
Figure 59C:
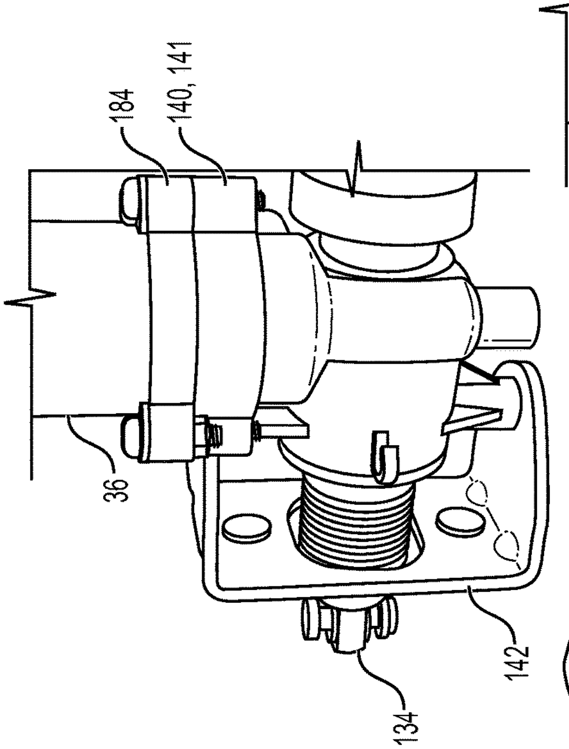
Figure 59D:
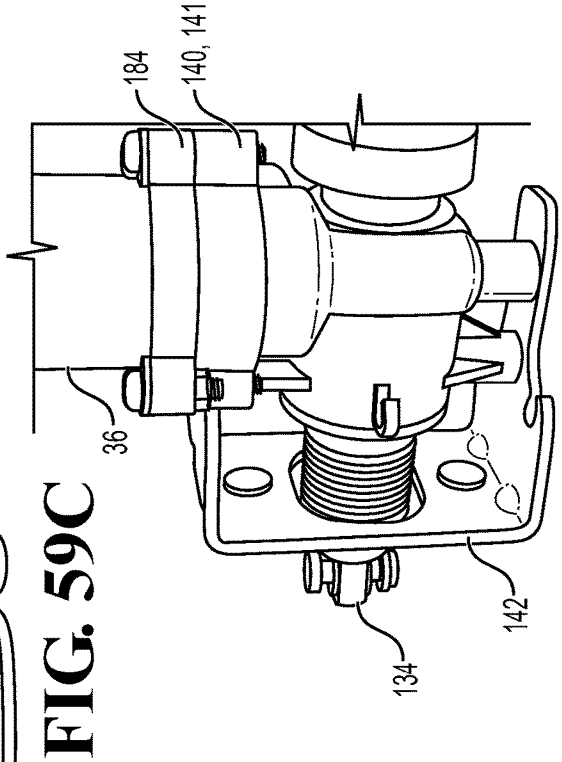
Figure 60B:
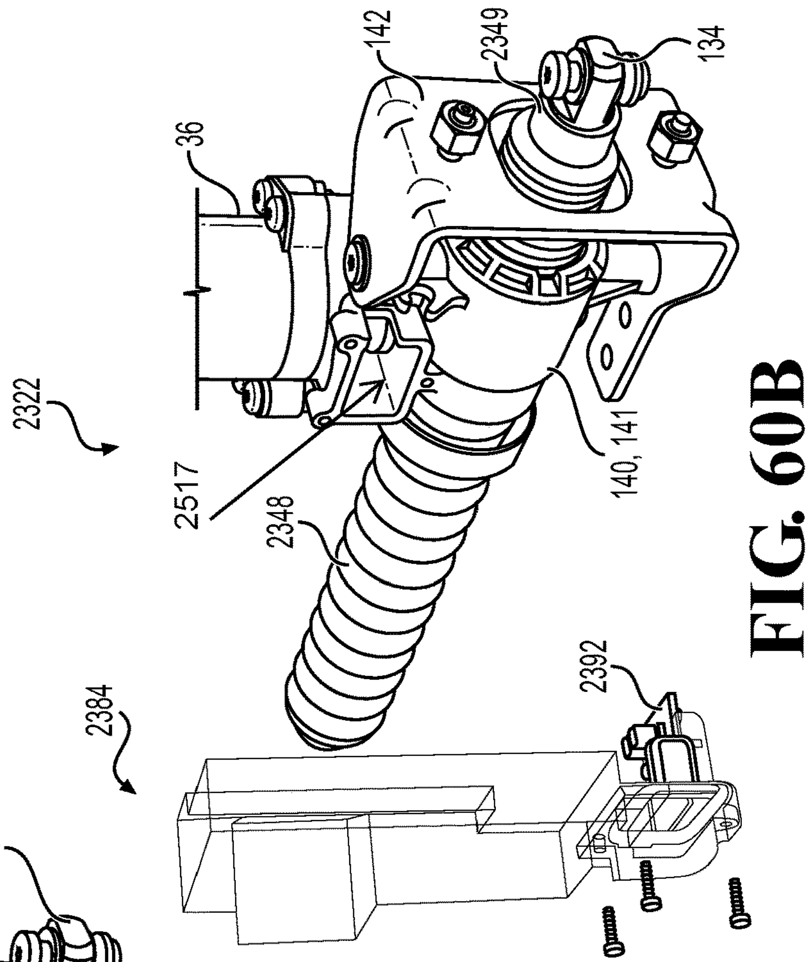
Figure 60A:
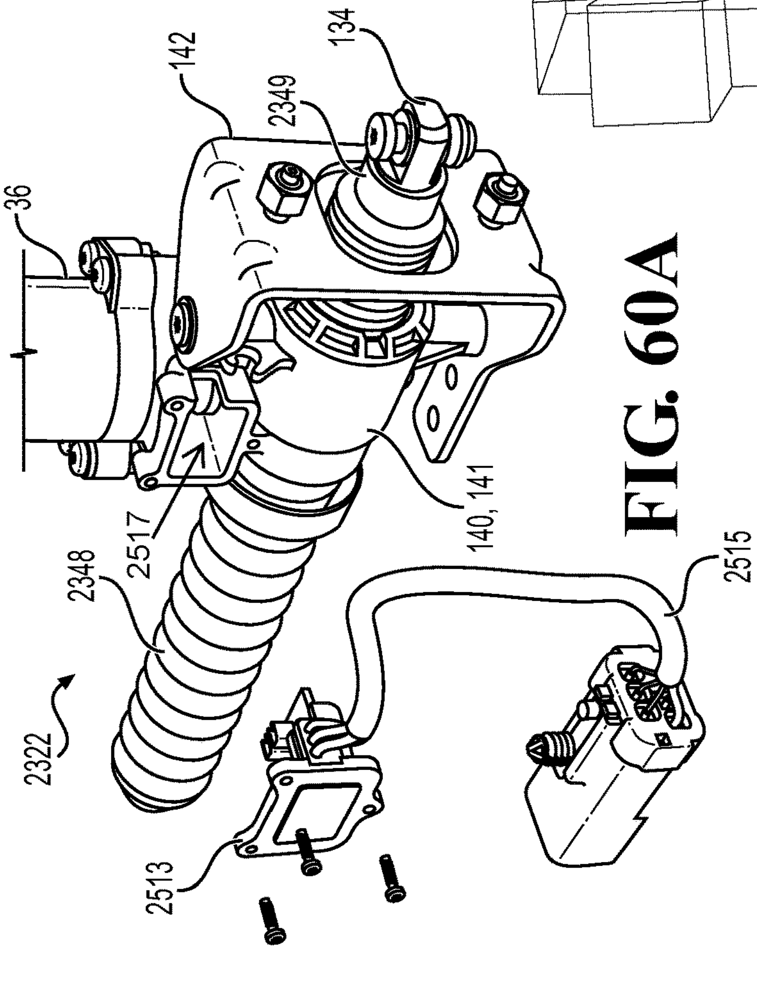
Figure 61A:
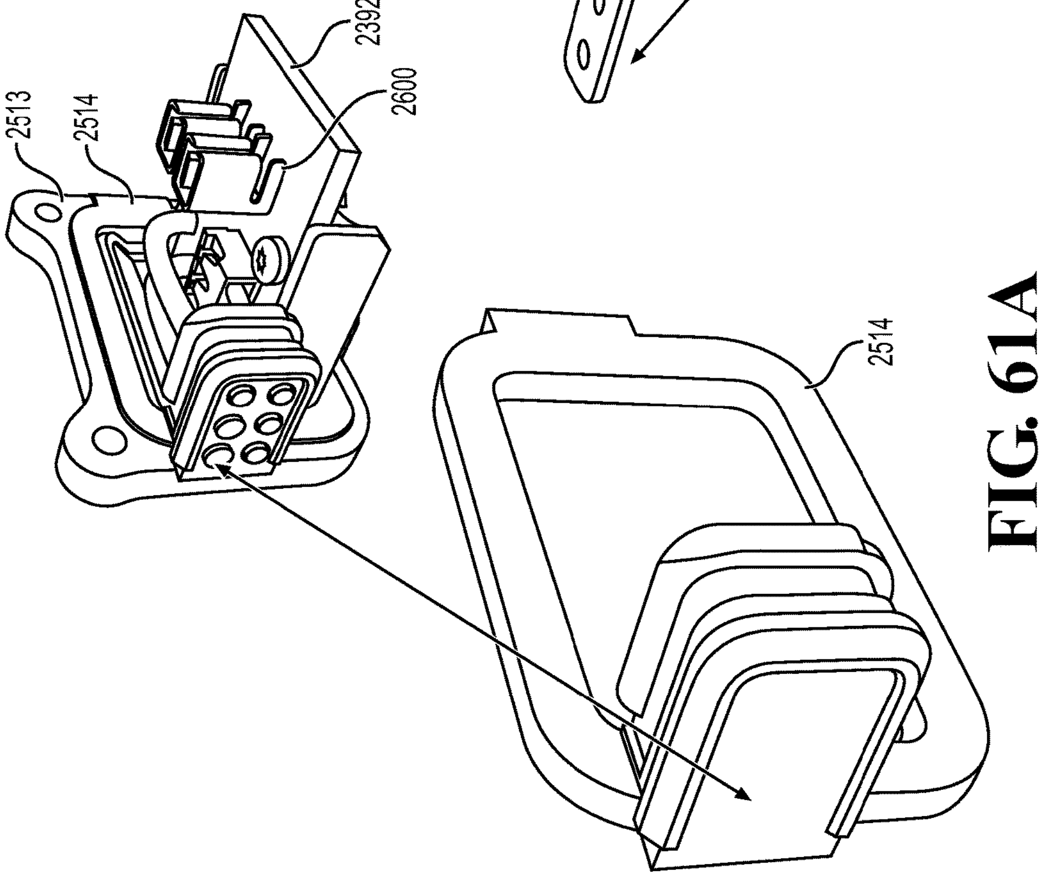
Figure 61B:
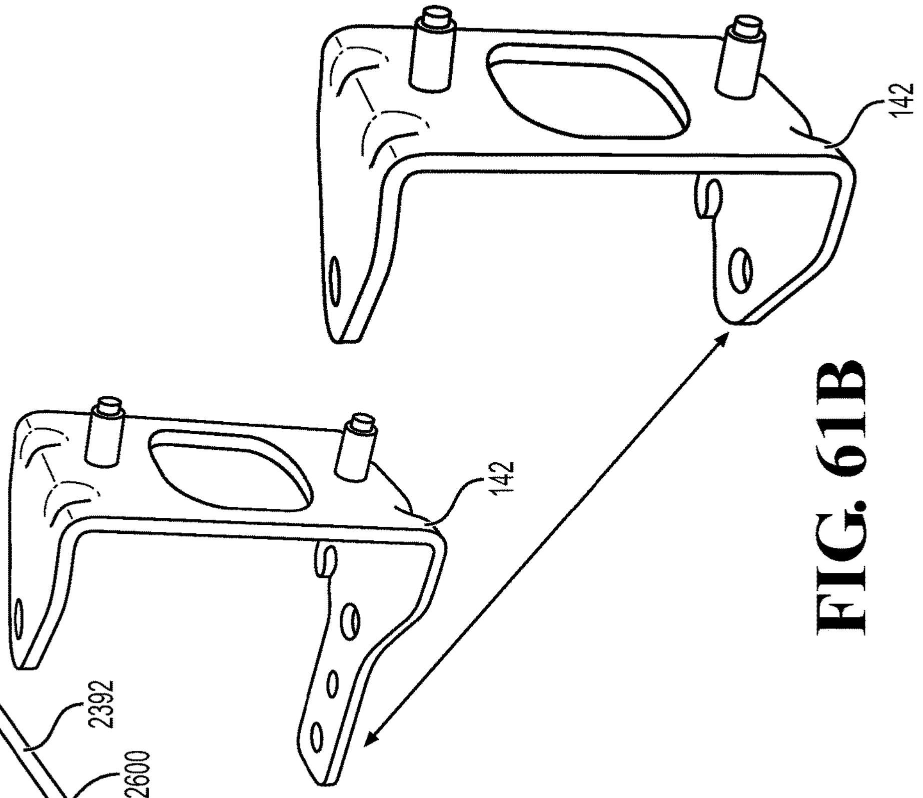
Figure 62B:
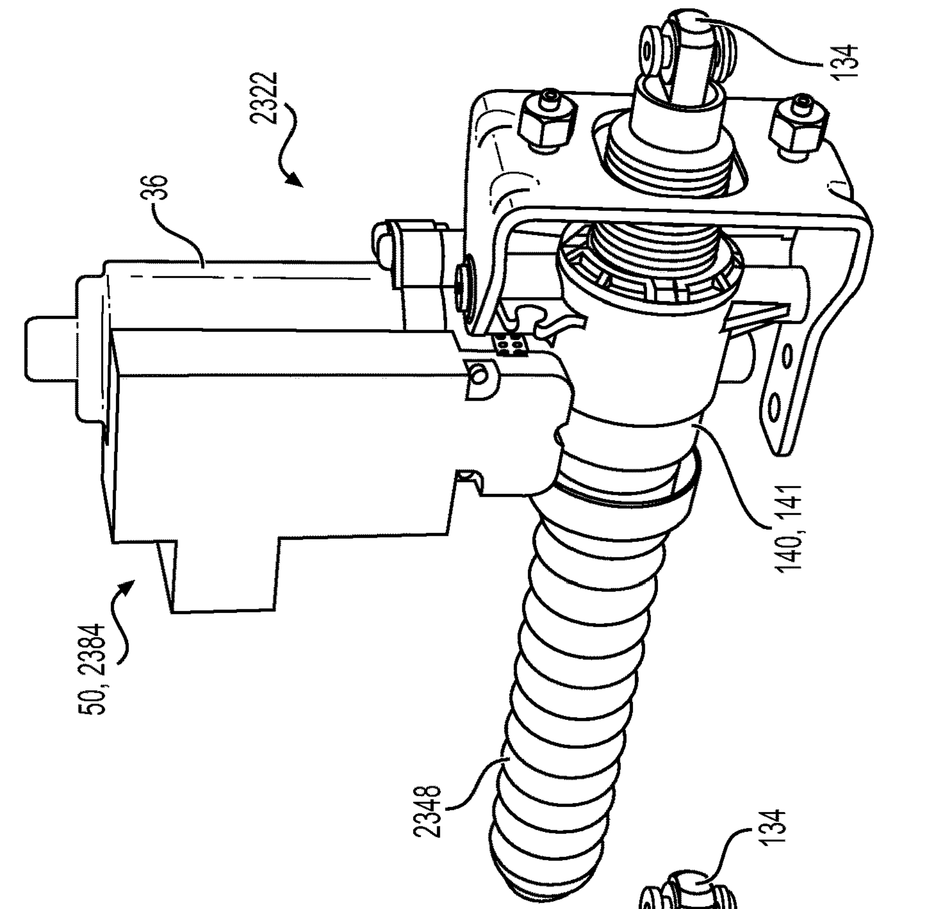
Figure 62A:
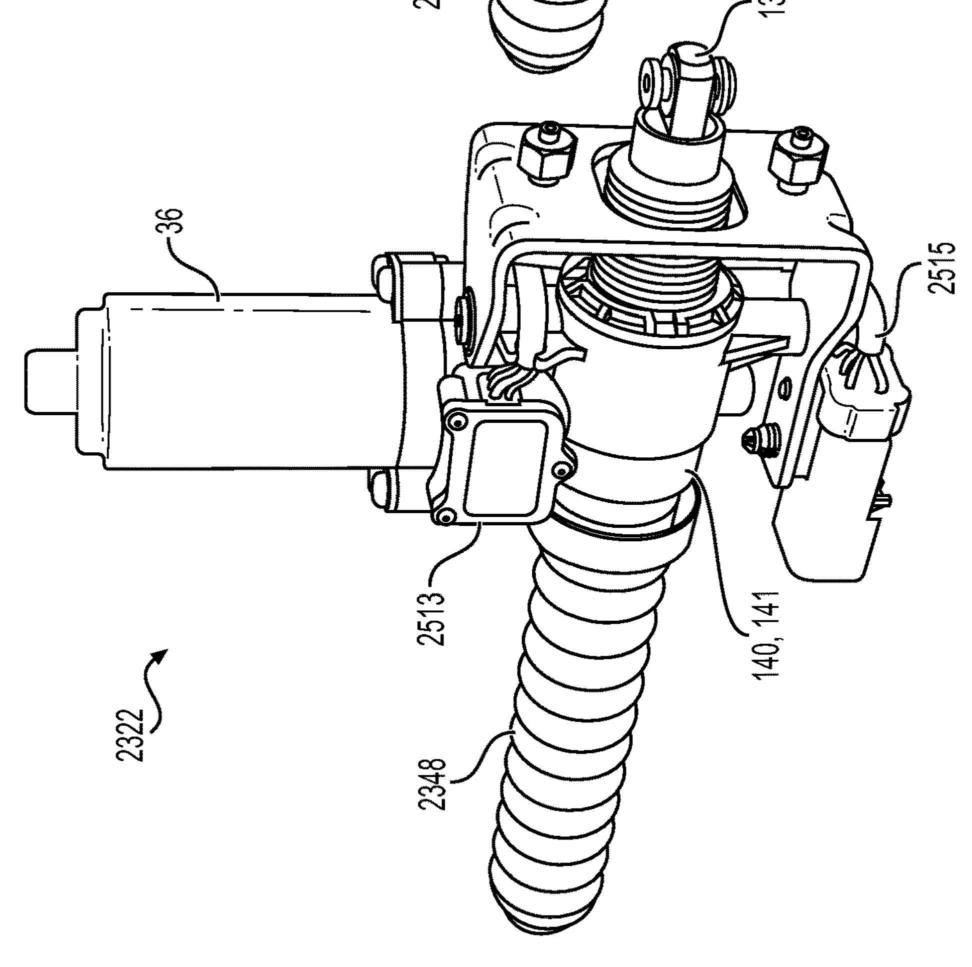
Figure 79:
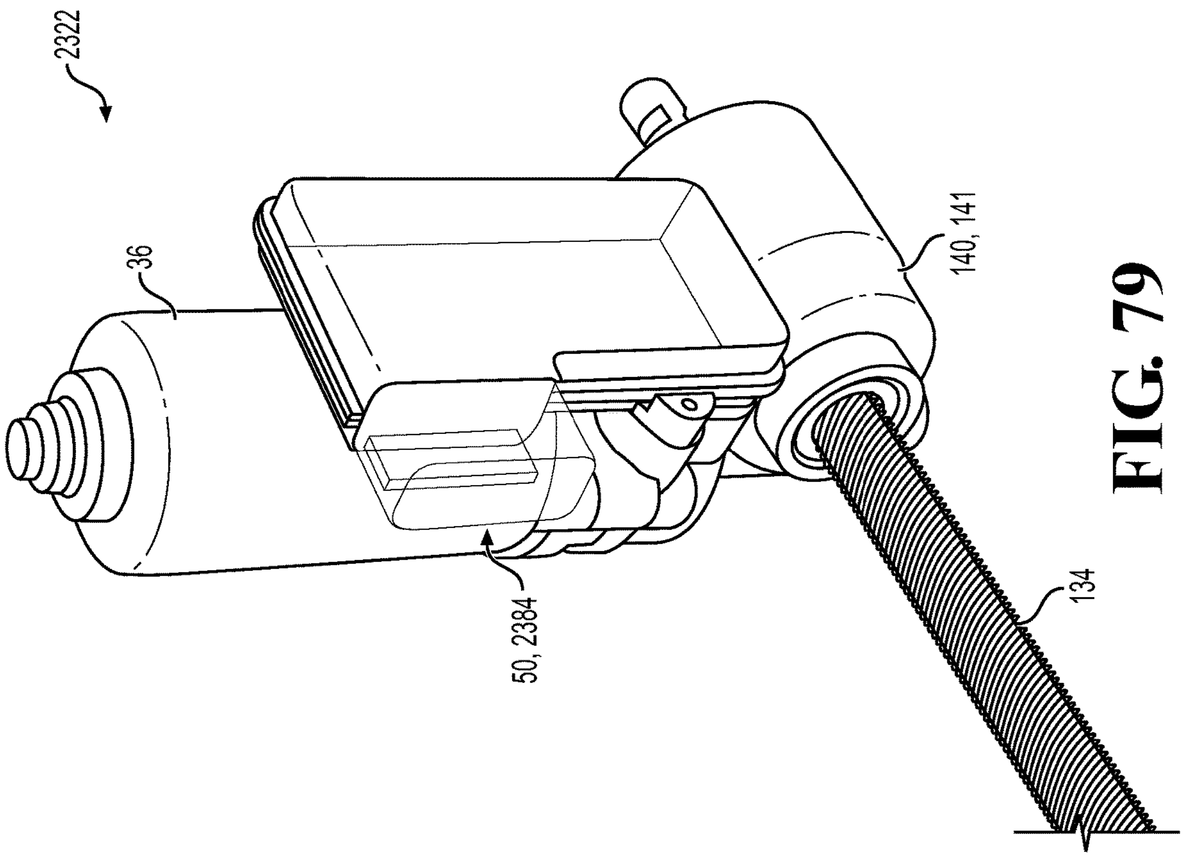
Figure 80B:
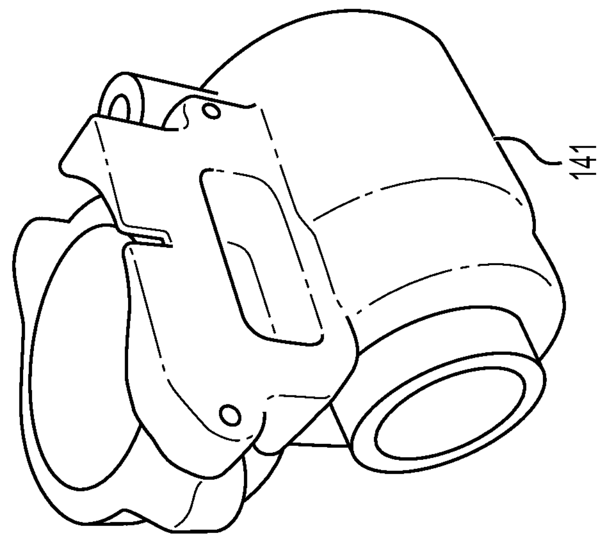
Figure 80A:
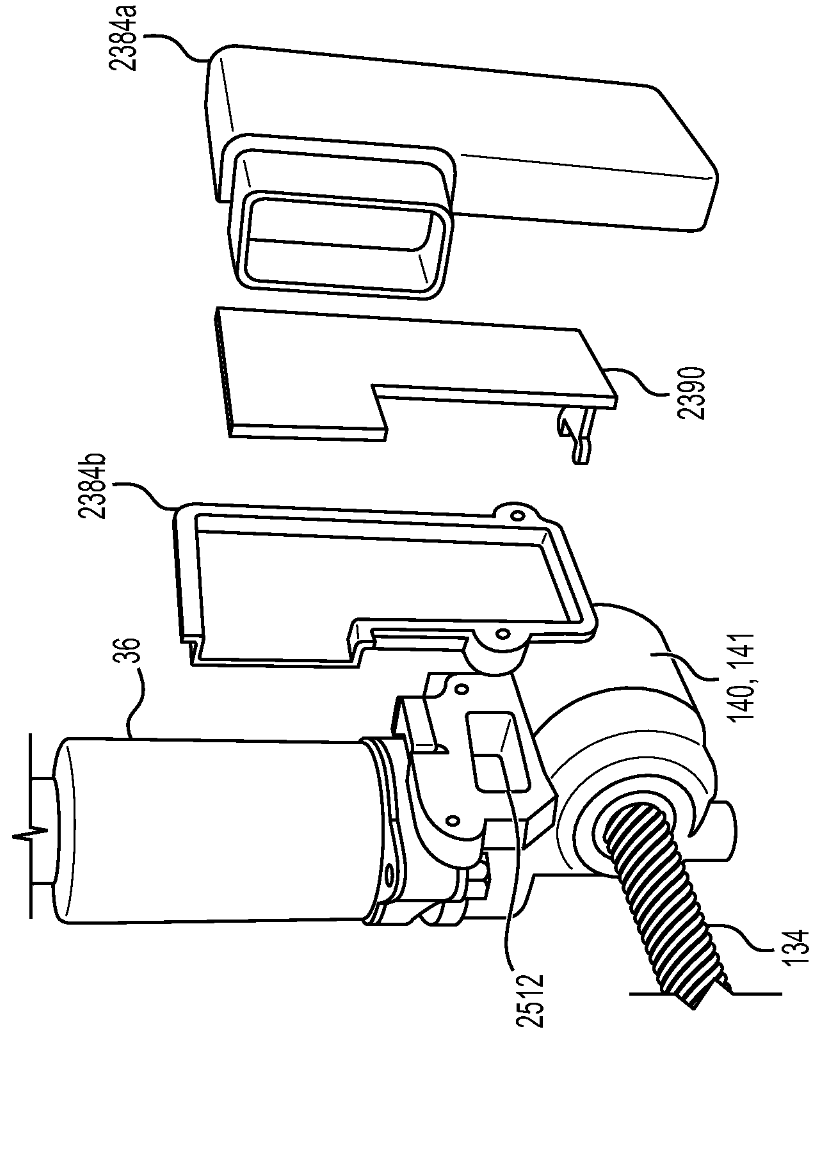
Figure 81:
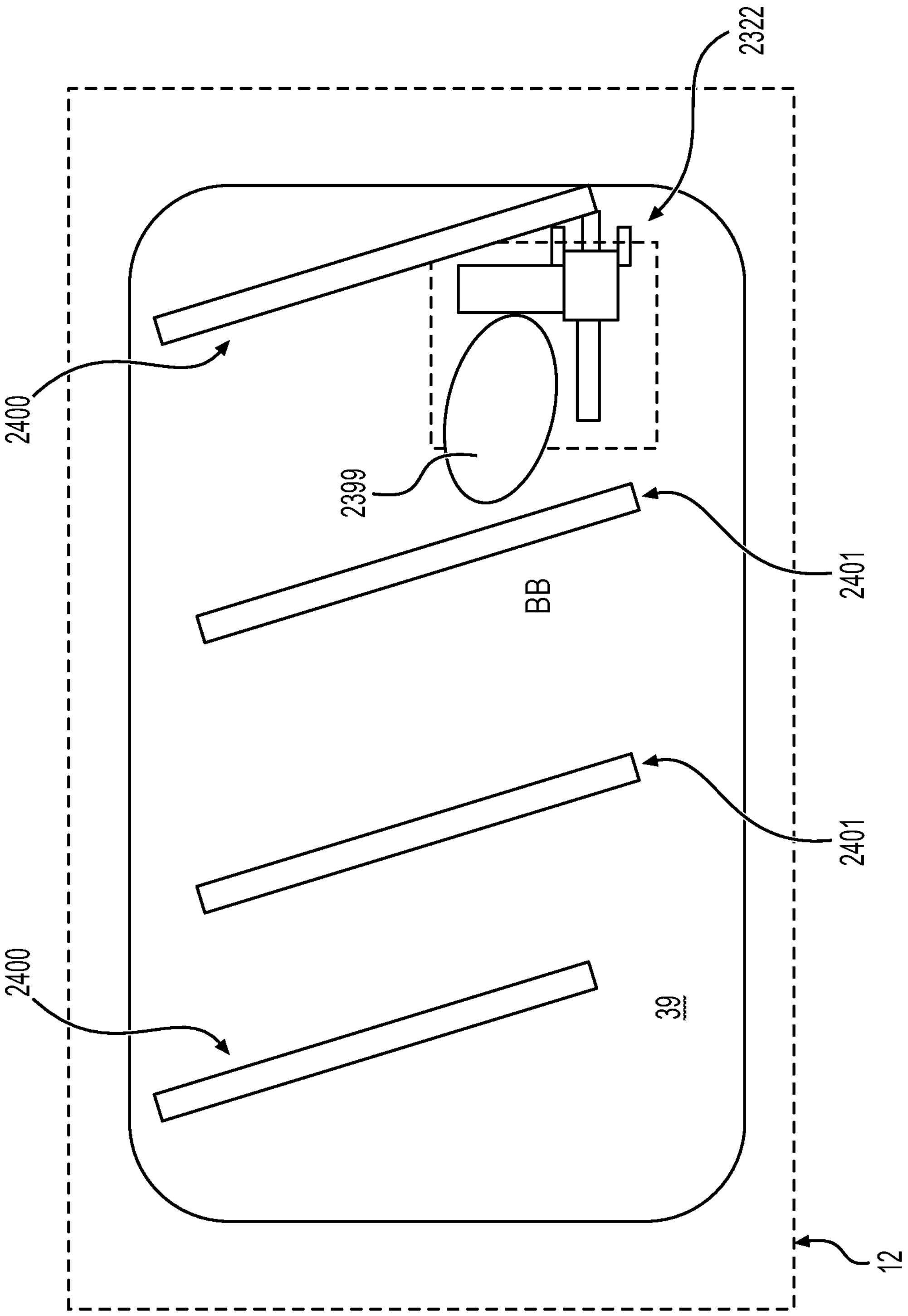
Figure 82:
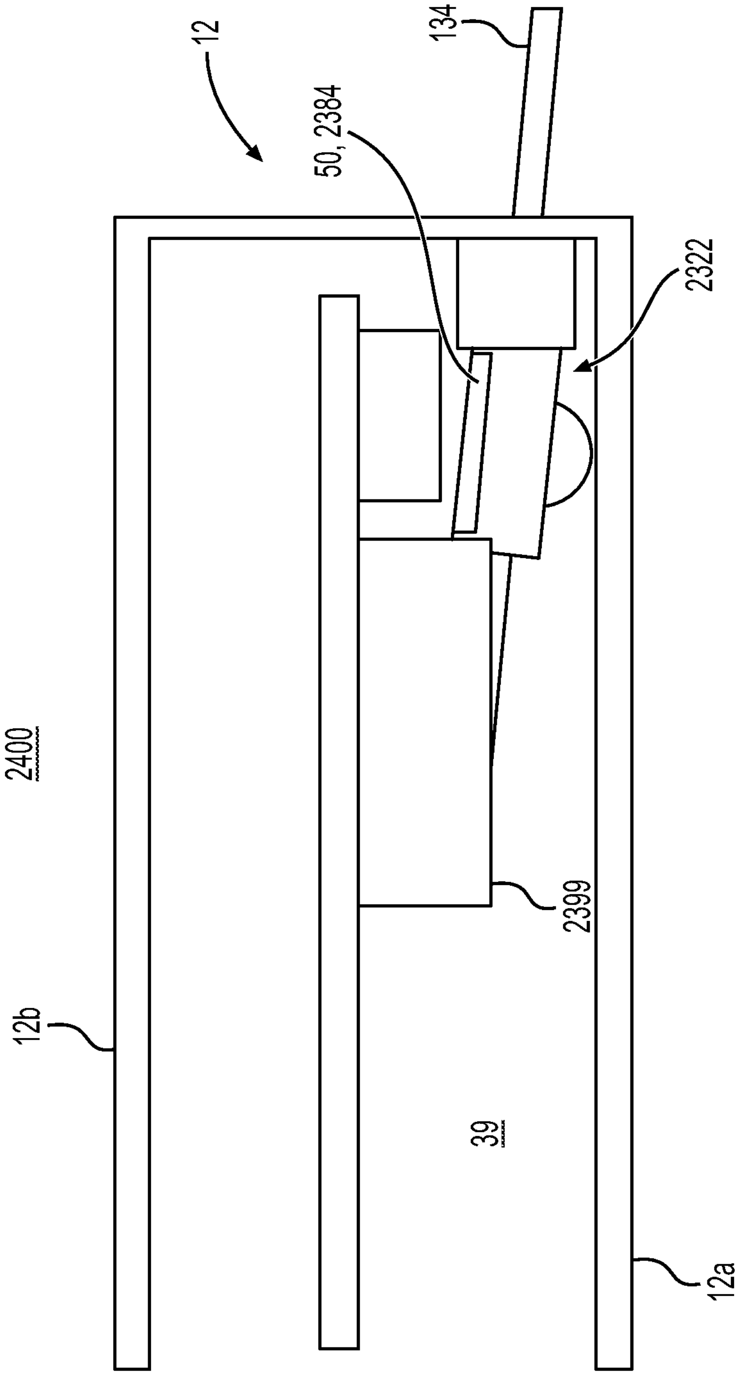
Figure 83:
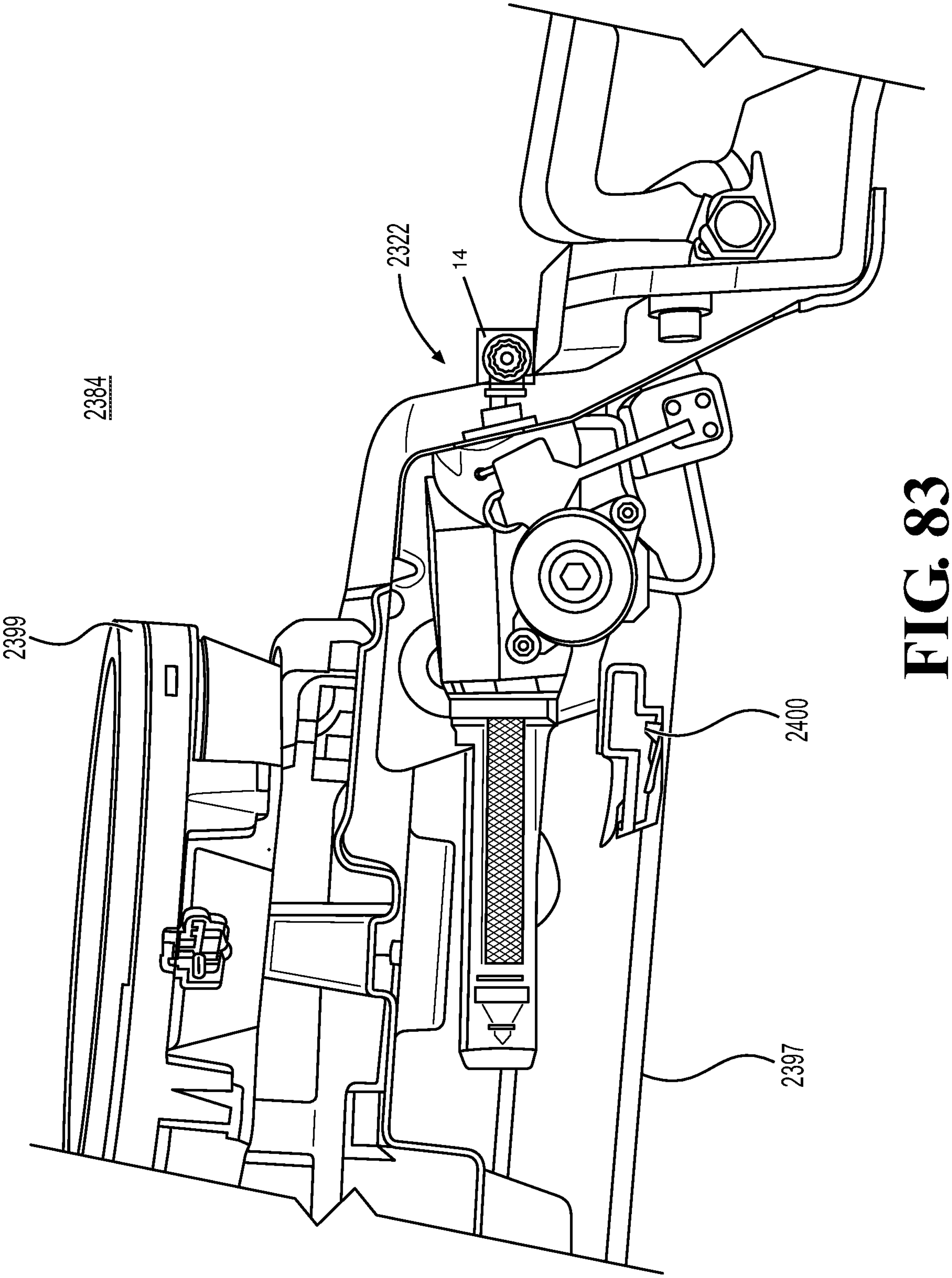
Figure 84:
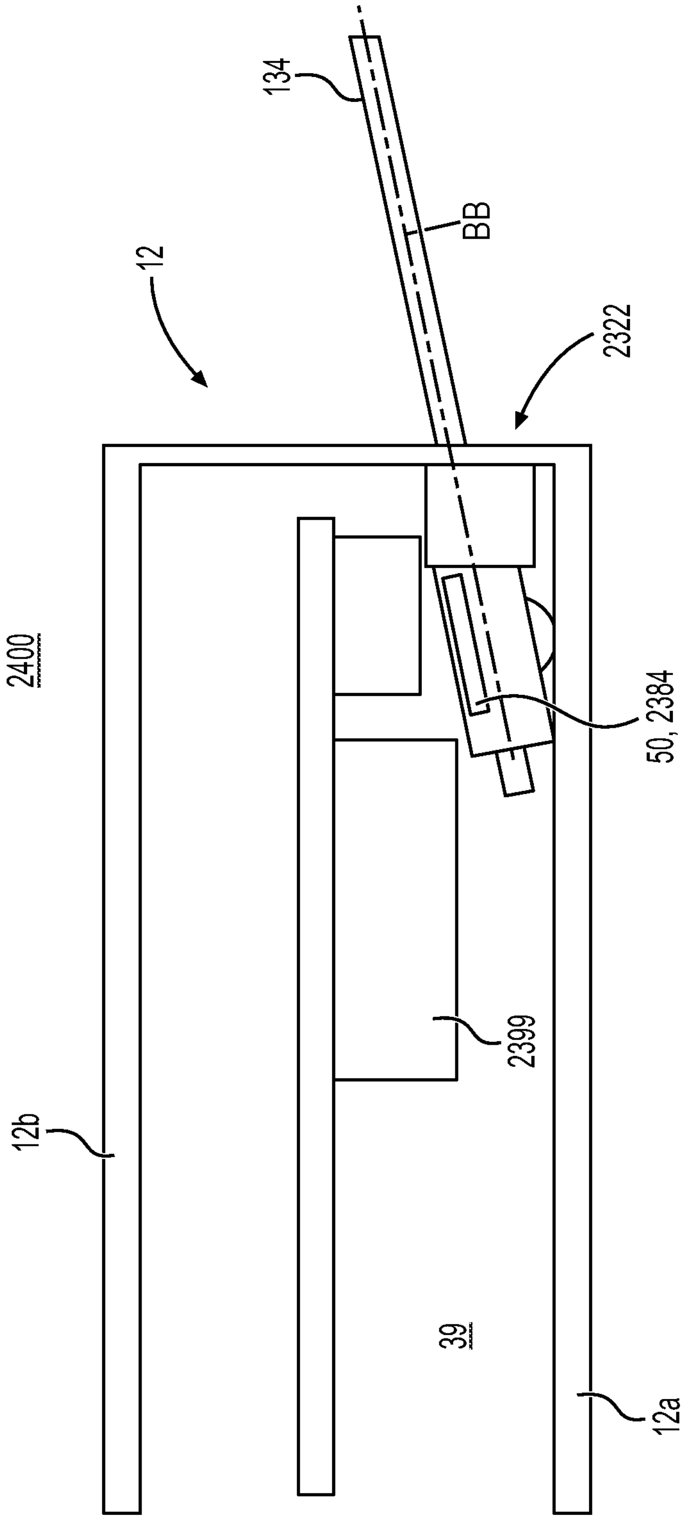
Figure 85:
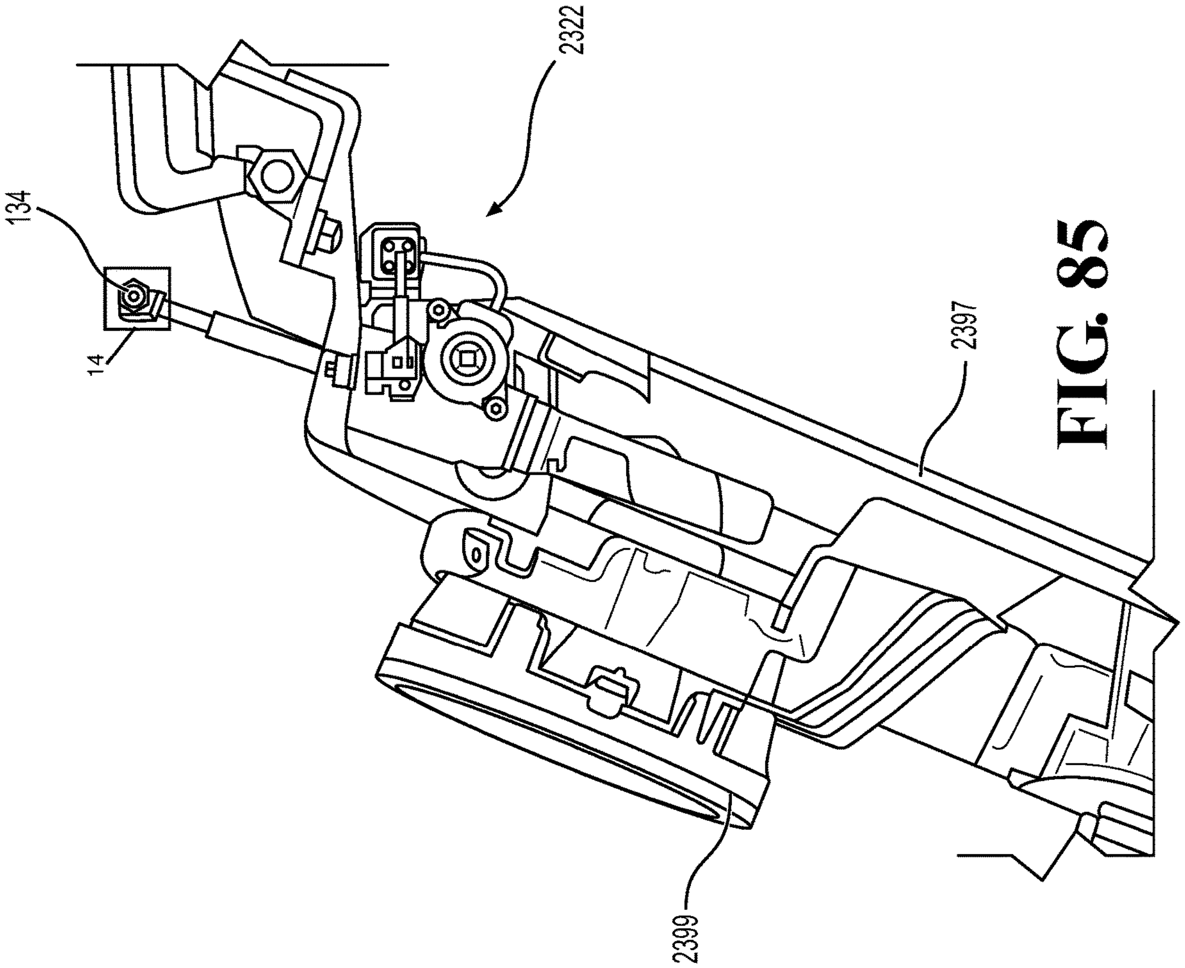
Figure 97:
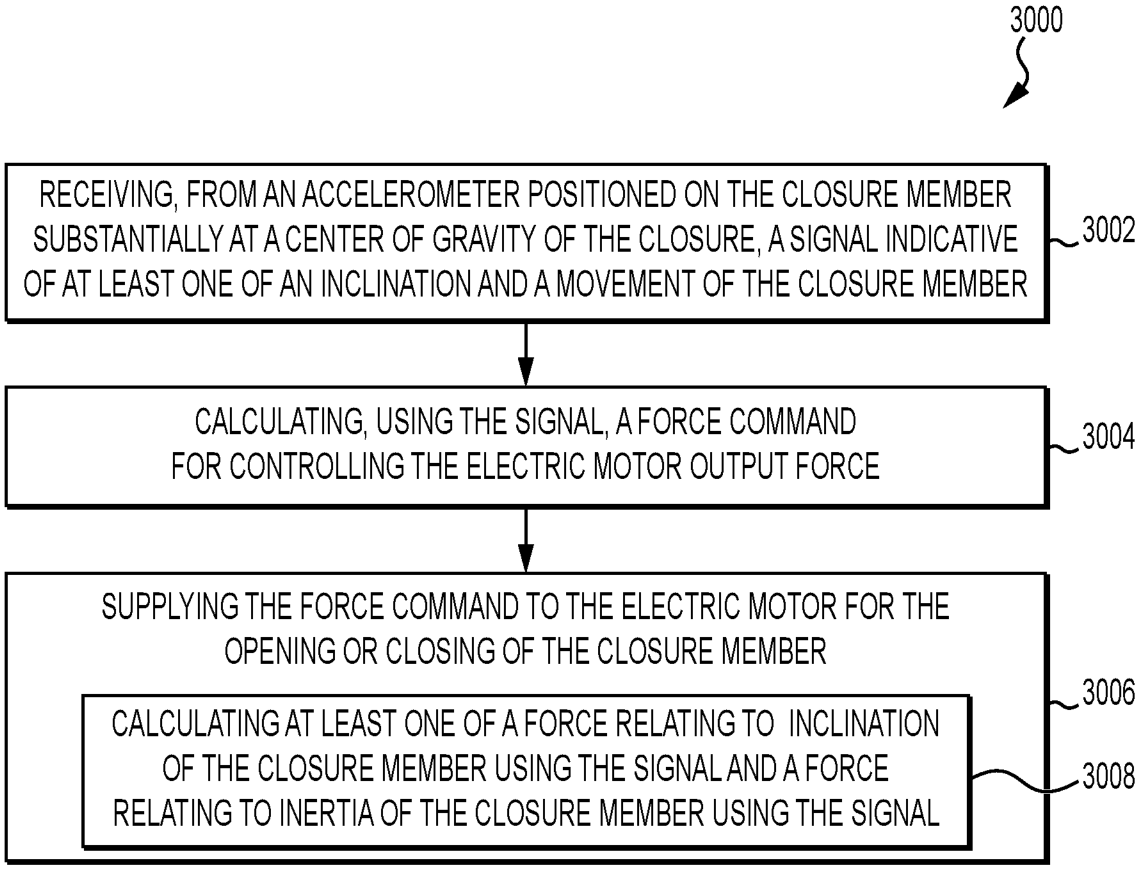

FIGS. 45A-B, 46, and 47A-B show another power actuator for the closure member of the vehicle with the controller housing, according to aspects of the disclosure;

FIGS. 48A-B, 49A-C, and 50A-B show additional details of the controller housing of the power actuator, according to aspects of the disclosure;

FIG. 51 shows an exploded view of the controller housing of the power actuator, according to aspects of the disclosure;

FIGS. 52, 53, 54A-B, 55, 56A-B, and 57A-B show details of a main controller board and a daughter board of the actuator controller, according to aspects of the disclosure;

FIGS. 58A-B show a proposed change to the gearbox housing, according to aspects of the disclosure;

FIGS. 59A-D show a modified bracket or adapter, according to aspects of the disclosure;

FIGS. 60A-B show that the main controller board and controller housing can be disposed remotely from an actuator housing (i.e., a remote ECU configuration) as an alternative to the main controller board and controller housing being attached to the actuator housing, according to aspects of the disclosure;

FIGS. 61A-B show a bracket extension of the adapter that may be utilized when the main controller board and controller housing are disposed remotely from the actuator housing along with the controller box to gearbox grommet with wiring extending therethrough for the remote ECU configuration, according to aspects of the disclosure;

FIGS. 62A-B show that both the remote ECU configuration and configuration in which the controller housing is attached to the actuator housing are within a cross car width requirement, according to aspects of the disclosure;

FIGS. 63A-B, 64A-B, and 65 show details of the daughter board and wiring for the remote ECU configuration, according to aspects of the disclosure;

FIGS. 66A-B, 67A-B, 68A-C, 69, 70, 71, and 72 illustrate details of a gearbox housing and a sensor housing of the power actuator, according to aspects of the disclosure;

FIGS. 73, 74A-C, 75, 76A-B, 77 and 78A-B show an interface between the electric motor and the daughter board, according to aspects of the disclosure;

FIGS. 79 and 80A-B show various design options usable for both the remote ECU configuration and when the controller housing is attached to the actuator housing, according to aspects of the disclosure;

FIGS. 81, 82, 83, 84, 85, 86, 87, 88A-B, 89A-B, 90A-B, and 91 show a location of the controller housing relative to other components within the cavity of the door, according to aspects of the disclosure;

FIGS. 92, 93, 94, 95A-D, and 96A-B illustrate pressure regulation in the actuator housing, according to aspects of the disclosure; and FIG. 97 is an illustrative method of controlling an electric motor for moving a closure member, in accordance with an illustrative embodiment.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
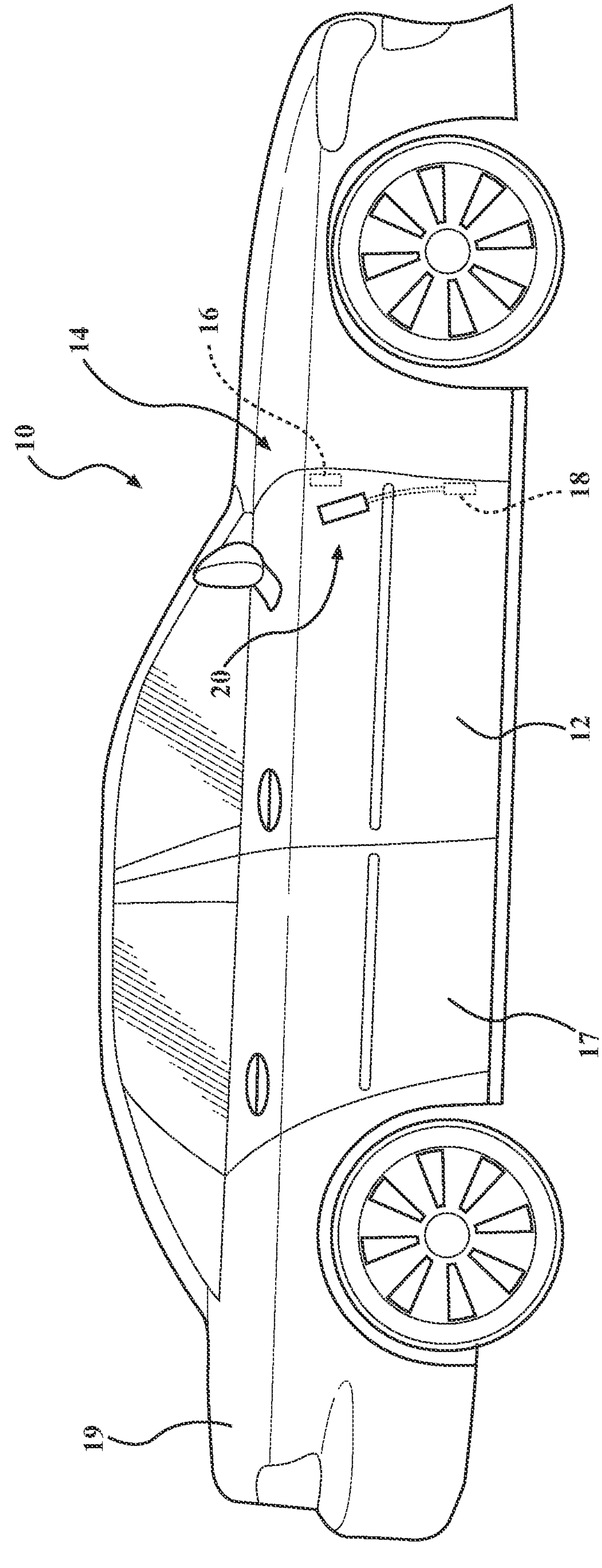
FIG. 1 is a perspective view of an example motor vehicle equipped with a power closure member actuation system situated between the front passenger swing door and a vehicle body, according to aspects of the disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power closure member actuation system 20 is integrated into the pivotal connection between first passenger door 12 and a vehicle body 14. In accordance with a preferred configuration, power closure member actuation system 20 generally includes a power-operated actuator mechanism or actuator 22 secured within an internal cavity of passenger door 12, and a rotary drive mechanism that is driven by the power-operated actuator mechanism 22 and is drivingly coupled to a hinge component associated with lower door hinge 18. Driven rotation of the rotary drive mechanism causes controlled pivotal movement of passenger door 12 relative to vehicle body 14. In accordance with this preferred configuration, the power-operated actuator mechanism 22 is rigidly coupled in close proximity to a door-mounted hinge component of upper door hinge 16 while the rotary drive mechanism is coupled to a vehicle-mounted hinge component of lower door hinge 18. However, those skilled in the art will recognize that alternative packaging configurations for power closure member actuation system 20 are available to accommodate available packaging space. One such alternative packaging configuration may include mounting the power-operated actuator mechanism to vehicle body 14 and drivingly interconnecting the rotary drive mechanism to a door-mounted hinge component associated with one of upper door hinge 16 and lower door hinge 18.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power closure member actuation system 20 is only shown in association with front passenger door 12, those skilled in the art will recognize that the power closure member actuation system can also be associated with any other closure member (e.g., door or liftgate) of vehicle 10 such as rear passenger doors 17 and decklid 19.

Figure 2:
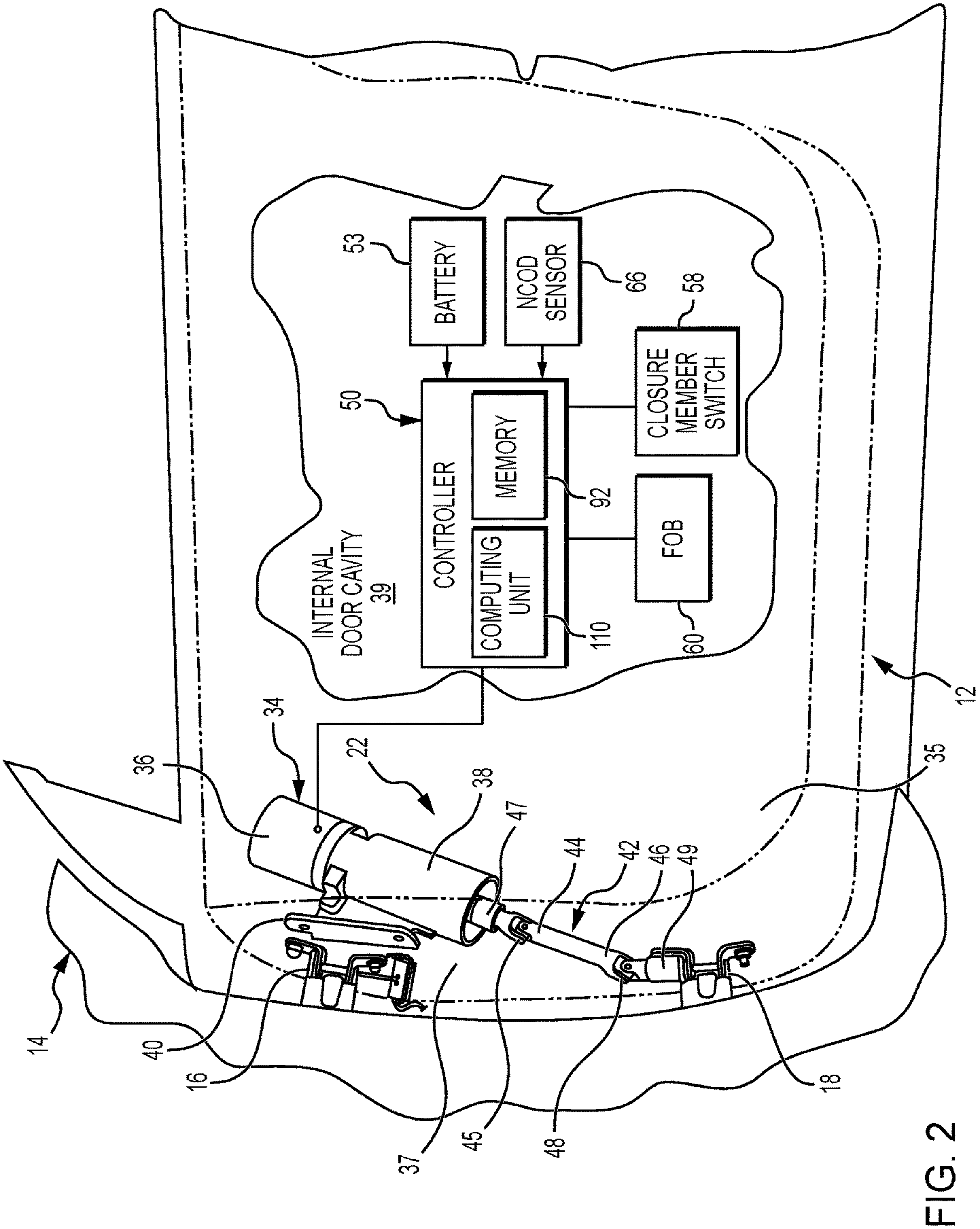
FIG. 2 is a perspective inner side view of a closure member shown in FIG. 1, with various components removed for clarity purposes only, in relation to a portion of the vehicle body and which is equipped with the power closure member actuation system, according to aspects of the disclosure.

Power closure member actuation system 20 is generally shown in FIG. 2 and, as mentioned, is operable for controllably pivoting vehicle door 12 relative to vehicle body 14 between an open position and a closed position. Lower hinge 18 of power closure member actuation system 20 includes a door hinge strap connected to vehicle door 12 and a body hinge strap connected to vehicle body 14. Door hinge strap and body hinge strap of lower door hinge 18 are interconnected along a generally vertically-aligned pivot axis via a hinge pin to establish the pivotable interconnection between door hinge strap and body hinge strap. However, any other mechanism or device can be used to establish the pivotable interconnection between door hinge strap and body hinge strap without departing from the scope of the subject disclosure.

As best shown in FIG. 2, power closure member actuation system 20 includes a power-operated actuator mechanism 22 having a motor and geartrain assembly 34 that is rigidly connectable to vehicle door 12. Motor and geartrain assembly 34 is configured to generate a rotational force. In the preferred embodiment, motor and geartrain assembly 34 includes an electric motor 36 that is operatively coupled to a speed reducing/torque multiplying assembly, such as a high gear ratio planetary gearbox 38. The high gear ratio planetary gearbox 38 may include multiple stages, thus allowing motor and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure.

Motor and geartrain assembly 34 includes a mounting bracket 40 for establishing the connectable relationship with vehicle door 12. Mounting bracket 40 is configured to be connectable to vehicle door 12 adjacent to the door-mounted door hinge strap associated with upper door hinge 16. As further shown in FIG. 2, this mounting of motor assembly 34 adjacent to upper door hinge 16 of vehicle door 12 disposes the power-operated actuator mechanism 22 of power closure member actuation system 20 in close proximity to the pivot axis of the door 12. The mounting of motor and geartrain assembly 34 adjacent to upper door hinge 16 of vehicle door 12 minimizes the effect that power closure member actuation system 20 may have on a mass moment of inertia (i.e., pivot axis) of vehicle door 12, thus improving or easing movement of vehicle door 12 between its open and closed positions. In addition, as also shown in FIG. 2, the mounting of motor and geartrain assembly 34 adjacent to upper door hinge 16 of vehicle door 12 allows power closure member actuation system 20 to be packaged in front of an A-pillar glass run channel 35 associated with vehicle door 12 and thus avoids any interference with a glass window function of vehicle door 12. Put another way, power closure member actuation system 20 can be packaged in a portion 37 of an internal door cavity 39 within vehicle door 12 that is not being used, and therefore reduces or eliminates impingement on existing hardware/mechanisms within vehicle door 12. Although power closure member actuation system 20 is illustrated as being mounted adjacent to upper door hinge 16 of vehicle door 12, power closure member actuation system 20 can, as an alternative, also be mounted elsewhere within vehicle door 12 or even on vehicle body 14 without departing from the scope of the subject disclosure.

Power closure member actuation system 20 further includes a rotary drive mechanism that is rotatively driven by the power-operated actuator mechanism 22. As shown in FIG. 2, the rotary drive mechanism includes a drive shaft 42 interconnected to an output member of gearbox 38 of motor and geartrain assembly 34 and which extends from a first end 44 disposed adjacent gearbox 38 to a second end 46. The rotary output component of motor and geartrain assembly 34 can include a first adapter 47, such as a square female socket or the like, for drivingly interconnecting first end 44 of drive shaft 42 directly to the rotary output of gearbox 38 In addition, although not expressly shown, a disconnect clutch can be disposed between the rotary output of gearbox 38 and first end 44 of drive shaft 42. In one configuration, the clutch would normally be engaged without power (i.e., power-off engagement) and could be selectively energized (i.e., power-on release) to disengage. Put another way, the optional clutch drivingly would couple drive shaft 42 to motor and geartrain assembly 34 without the application of electrical power while the clutch would require the application of electrical power to uncouple drive shaft 42 from driven connection with gearbox 38. As an alternative, the clutch could be configured in a power-on engagement and power-off release arrangement. The clutch may engage and disengage using any suitable type of clutching mechanism such as, for example, a set of sprags, rollers, a wrap-spring, friction plates, or any other suitable mechanism. The clutch is provided to permit door 12 to be manually moved by the user between its open and closed positions relative to vehicle body 14. Such a disconnect clutch could, for example, be located between the output of electric motor 36 and the input to gearbox 38. The location of this optional clutch may be dependent based on, among other things, whether or not gearbox 38 includes "back-drivable" gearing.

Second end 46 of drive shaft 42 is coupled to body hinge strap of lower door hinge 18 for directly transferring the rotational force from motor and geartrain assembly 34 to door 12 via body hinge strap. To accommodate angular motion due to swinging movement of door 12 relative to vehicle body 14, the rotary drive mechanism further includes a first universal joint or U-joint 45 disposed between first adapter 47 and first end 44 of drive shaft 42 and a second universal joint or U-joint 48 disposed between a second adapter 49 and second end 46 of drive shaft 42. Alternatively, constant velocity joints could be used in place of the U-joints 45, 48. The second adapter 49 may also be a square female socket or the like configured for rigid attachment to body hinge strap of lower door hinge 18. However, other means of establishing the drive attachment can be used without departing from the scope of the disclosure. Rotation of drive shaft 42 via operation of motor and geartrain assembly 34 functions to actuate lower door hinge 18 by rotating body hinge strap about its pivot axis to which drive shaft 42 is attached and relative to door hinge strap. As a result, power closure member actuation system 20 is able to effectuate movement of vehicle door 12 between its open and closed positions by "directly" transferring a rotational force directly to body hinge strap of lower door hinge 18. With motor and geartrain assembly 34 connected to vehicle door 12 adjacent to upper door hinge 16, second end 46 of drive shaft 42 is attached to body hinge strap of lower door hinge 18. Based on available space within door cavity 39, it may be possible to mount motor and geartrain assembly 34 adjacent to the door-mounted hinge component of lower door hinge 18 and directly connect second end 46 of drive shaft 42 to the vehicle-mounted hinge component of upper door hinge 16. In the alternative, if motor and geartrain assembly 34 is connected to vehicle body 14, second end 46 of drive shaft 42 would be attached to door hinge strap.

Figure 3:
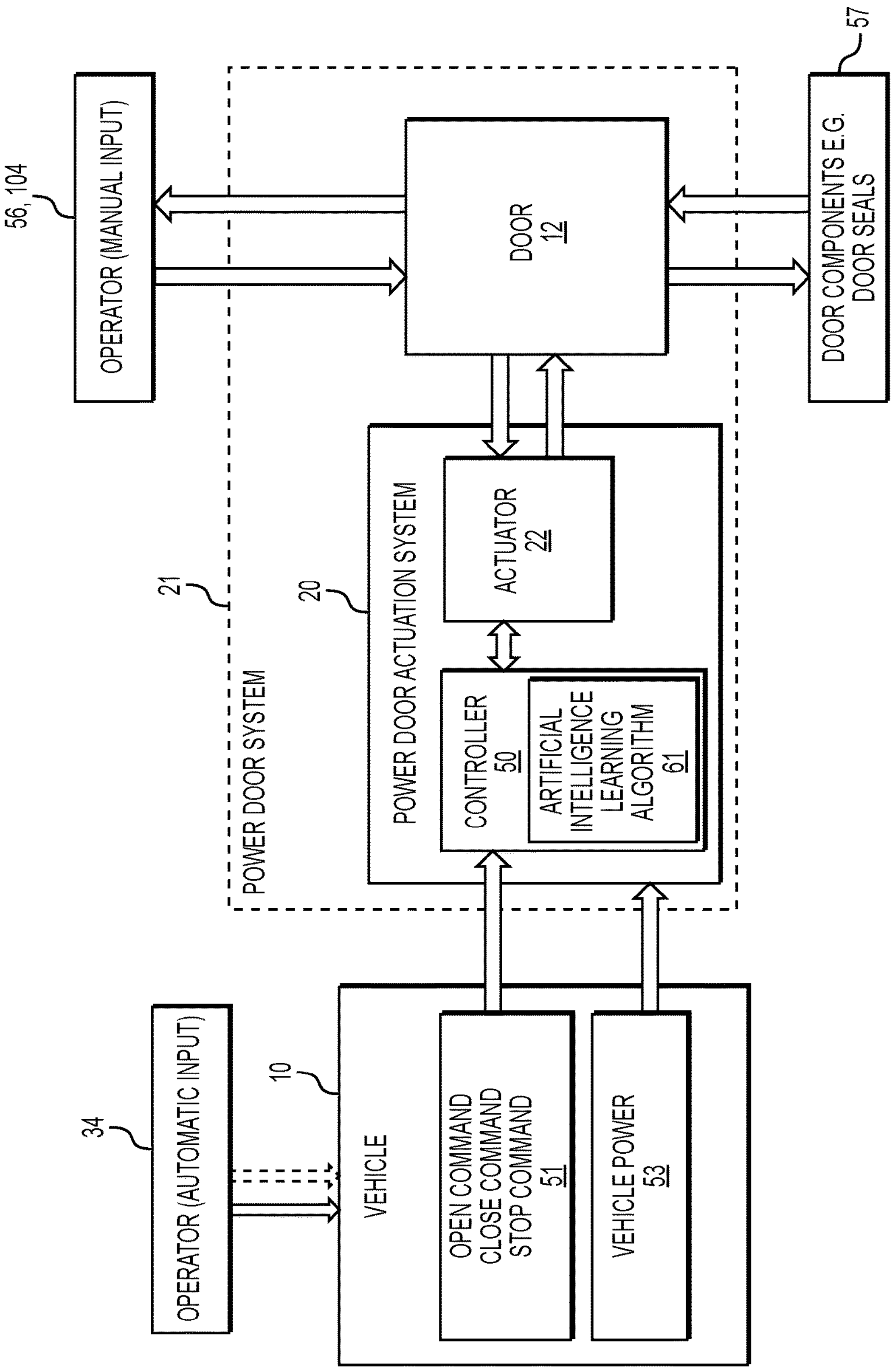
FIG. 3 illustrates a block diagram of the power closure member actuation system, according to aspects of the disclosure.

FIG. 3 illustrates a block diagram of the power closure member actuation system 20 of a power door system 21 for moving the closure member (e.g., vehicle door 12) of the vehicle 10 between open and closed positions relative to the vehicle body 14. As discussed above, the power closure member actuation system 20 includes the actuator 22 that is coupled to the closure member (e.g., vehicle door 12) and the vehicle body 14. The actuator 22 is configured to move the closure member 12 relative to the vehicle body 14. The power closure member actuation system 20 also includes an actuator controller 50 that is coupled to the actuator 22 and in communication with other vehicle systems (e.g., a door node control module 52 or a body control module (BCM)) and also receives vehicle power from the vehicle 10 (e.g., from a vehicle battery 53).

The actuator controller 50 is operable in at least one of an automatic mode (in response to an automatic mode initiation input 54) and a powered assist mode (in response to a motion input 56). In the automatic mode, the actuator controller 50 commands movement of the closure member through a predetermined motion profile (e.g., to open the closure member). The powered assist mode is different than the automatic mode in that the motion input 56 from the user 75 may be continuous to move the closure member, as opposed to a singular input by the user 75 in automatic mode. Actuator controller 50 may therefore be configured as a servo controller which may for example receive electrical signals indicative of the position of the door from the closure member actuation system 20, such as a high position count sensor as will be described in more details herein below as an illustrative example, and in response send electrical signals to the actuator 22 based on the received high position count signals to move the door closure member 12. No separate button or switch activations by a user are needed to move the closure member 12, the user only requires to directly move the closure member 12. Commands 51 from the vehicle systems may, for example, include instructions the actuator controller 50 to open the closure member, close the closure member, or stop motion of the closure member. Such control inputs, such as inputs 54, 56 may also include other types of inputs 55, such as an input from a body control module, which may receive a wireless command to control the door opening based on a signal such as a wireless signal received from the key fob 60, or other wireless device such as a cellular smart phone, or from a sensor assembly provided on the vehicle, such as a radar or optical sensor assembly detecting an approach of a user, such as a gesture or gait e.g. walk of the user 75 upon approach of the user 75 to the vehicle. Also shown are other components that may have an impact on the operation of the power closure member actuation system 20, such as door seals 57 of the vehicle door 12, for example. In addition, environmental conditions 59 (rain, cold, heat, etc.) may be monitored by the vehicle 10 (e.g., by the body control module 52) and/or the actuator controller 50. The actuator controller 50 also includes an artificial intelligence learning algorithm 61 (e.g., series of nodes forming a neural network model), discussed in more detail below.

Figure 4:
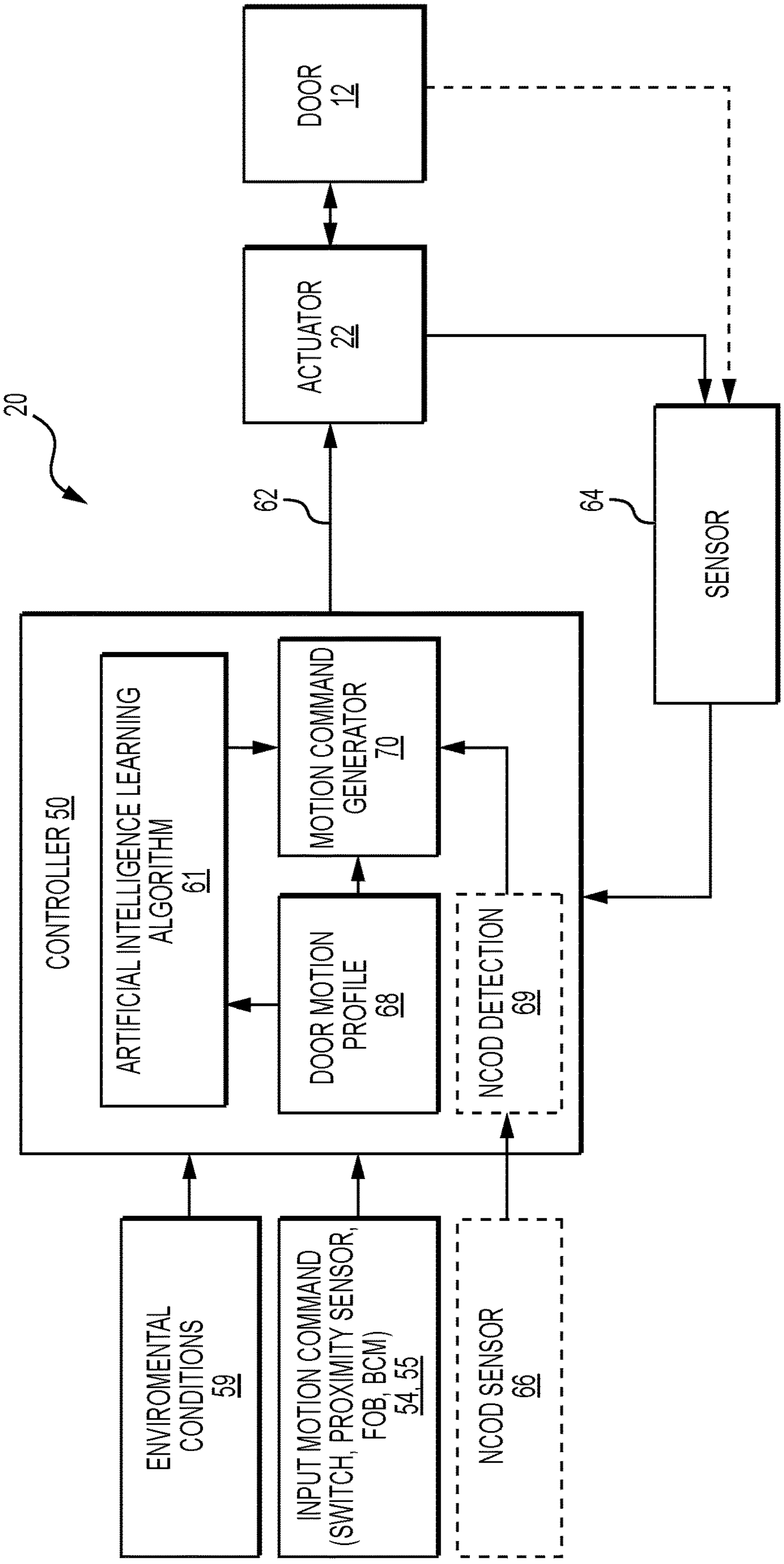
FIG. 4 illustrates another block diagram of the power closure member actuation system for moving the closure member in an automatic mode, according to aspects of the disclosure.

Referring now to FIG. 4, the actuator controller 50 is configured to receive the automatic mode initiation input 54 and enter the automatic mode to output a motion command 62 in response to receiving the automatic mode initiation input 54 or input motion command 62. The automatic mode initiation input 54 can be a manual input on the closure member itself or an indirect input to the vehicle (e.g., closure member switch 58 on the closure member, switch on a key fob 60, etc.). So, the automatic mode initiation input 54 may, for example, be a result of a user or operator operating a switch (e.g., the closure member switch 58), making a gesture near the vehicle 10, or possessing a key fob 60 near the vehicle 10, for example. It should also be appreciated that other automatic mode initiation inputs 54 are contemplated, such as, but not limited to a proximity of the user 75 detected by a proximity sensor.

In addition, the power closure member actuation system 20 includes at least one closure member feedback sensor 64 for determining at least one of a position and a speed and an attitude of the closure member. Thus, the at least one closure member feedback sensor 64 detects signals from either the actuator 22 by counting revolutions of the electric motor 36, absolute position of an extensible member (not shown), or from the door 12 (e.g., an absolute position sensor on a door check as an example) can provide position information to the actuator controller 50. Feedback sensor 64 in communication with actuator controller 50 is illustrative of part of a feedback system or motion sensing system for detecting motion of the door directly or indirectly, such as by detecting changes in speed and position of the closure member, or components coupled thereto. For example, the motion sensing system may be hardware based (e.g. a hall sensor unit an related circuitry) for detecting movement of a target on the closure member (e.g. on the hinge) or actuator 22 (e.g. on a motor shaft) as examples, and/or may also be software based (e.g. using code and logic for executing a ripple counting algorithm) executed by the actuator controller 50 for example. Other types of position, speed, and/or orientation detectors such as accelerometers and induction based sensors may be employed without limitation.

The power closure member actuation system 20 additionally includes at least one non-contact obstacle detection sensor 66 which may form part of a non-contact obstacle detection system coupled, such as electrically coupled, to the actuator controller 50. The actuator controller 50 is configured to determine whether an obstacle is detected using the at least one non-contact obstacle detection sensor 66 (e.g., using a non-contact obstacle detection algorithm 69) and may, for example, cease movement of the closure member in response to determining that the obstacle is detected. The non-contact obstacle detection system may also be configured to calculate distance from the closure member to the object or obstacle, or to a user as the object or obstacle, to the door 12. For example non-contact obstacle detection system may be configured to perform time of flight calculations to determine distance using a radar based sensor 66 or to characterize the object as a user or human as compared to an non-human object for example based on determining the reflectivity of the object using a radar based sensor 66 and system. The non-contact obstacle detection system may also be configured determine when an obstacle is detected, for example by detecting reflected waves of the object or obstacle or user of radar transmitted from the obstacle sensor 66. The non-contact obstacle detection system may also be configured determine when an obstacle is not detected, for example by not detecting reflected waves of the object or obstacle or user of radar transmitted from the obstacle sensor 66. The operation and example of the at least one non-contact obstacle detection sensor 66 and system are discussed in U.S. Patent Application No. 2018/0238099, incorporated herein by reference.

In the automatic mode, the actuator controller 50 can include one or more closure member motion profiles 68 that are utilized by the actuator controller 50 when generating the motion command 62 (e.g., using a motion command generator 70 of the actuator controller 50) in view of the obstacle detection by the at least one non-contact obstacle detection sensor 66. So, in the automatic mode, the motion command 62 has a specified motion profile 68 (e.g., acceleration curve, velocity curve, deceleration curve, and finally stops at an open position) and is continually optimized per user feedback (e.g., automatic mode initiation input 54).

Figure 5:
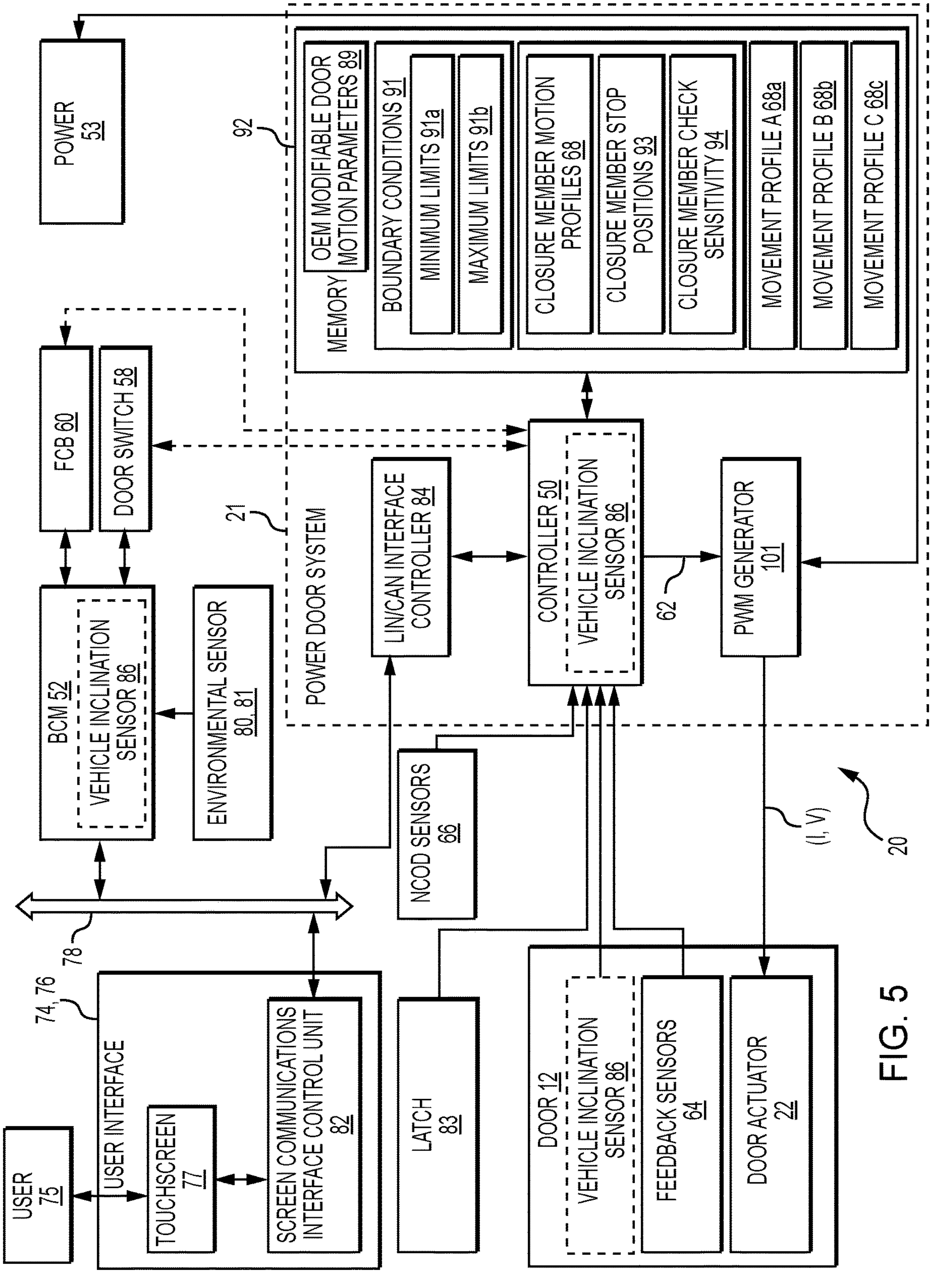
FIGS. 5 and 5A illustrates the power closure member actuation system shown as part of a vehicle system architecture, according to aspects of the disclosure.

In FIG. 5, the power closure member actuation system 20 is shown as part of a vehicle system architecture 72 corresponding to operation in the automatic mode. The power closure member actuation system 20 includes a user interface 74, 76 that is configured to detect a user interface input from a user 75 via an interface 77 (e.g., touchscreen) to modify at least one stored motion control parameter associated with the movement of the closure member. Thus, the actuator controller 50 of the power closure member actuation system 20 or user modifiable system is configured to present the at least one stored motion control parameter on the user interface 74, 76.

The body control module 52 is in communication with the actuator controller 50 via a vehicle bus 78 (e.g., a Local Interconnect Network or LIN bus). The body control module 52 can also be in communication with the key fob 60 (e.g., wirelessly) and a closure member switch 58 configured to output a closure member trigger signal through the body control module 52. Alternatively, the closure member switch 58 could be connected directly to the actuator controller 50 or otherwise communicated to the actuator controller 50. The body control module 52 may also be in communication with an environmental sensor (e.g., temperature sensor 80). The actuator controller 50 is also configured to modify the at least one stored motion control parameter in response to detecting the user interface input. A screen communications interface control unit 82 associated with the user interface 74, 76 can, for example, communicate with a closure communications interface control unit 84 associated with the actuator controller 50 via the vehicle bus 78. In other words, the closure communication interface control unit 84 is coupled to the vehicle bus 78 and to the actuator controller 50 to facilitate communication between the actuator controller 50 and the vehicle bus 78. Thus, the user interface input can be communicated from the user interface 74, 76 to the actuator controller 50.

A vehicle inclination sensor 86 (such as an accelerometer) is also coupled to the actuator controller 50 for detecting an inclination of the vehicle 10. The vehicle inclination sensor 86 outputs an inclination signal corresponding to the inclination or tilt of the vehicle 10, for example inclination or tilt relative to the direction of gravity, and the actuator controller 50 is further configured to receive the inclination signal and adjust the one of a force command 88 (FIG. 6) and the motion command 62 accordingly. While the vehicle inclination sensor 86 may be separate from the actuator controller 50, it should be understood that the vehicle inclination sensor 86 may also be integrated in the actuator controller 50 or in another control module, such as, but not limited to the body control module 52.

The actuator controller 50 is further configured to perform at least one of an initial boundary condition check prior to the generation of the command signal (e.g., the force command 88 or the motion command 62) and an in-process boundary check during the generation of the command signal. Such boundary checks prevent movement of the closure member and operation of the actuator 22 outside a plurality of predetermined operating limits or boundary conditions 91 and will be discussed in more detail below.

The actuator controller 50 can also be coupled to a vehicle latch 83. In addition, the actuator controller 50 is coupled to a memory device 92 having at least one memory location for storing at least one stored motion control parameter associated with controlling the movement of the closure member (e.g., door 12). The memory device 92 can also store one or more closure member motion profiles 68 (e.g., movement profile A 68*a*, movement profile B 68*b*, movement profile C 68*c*) and boundary conditions 91 (e.g., the plurality of predetermined operating limits such as minimum limits 91*a*, and maximum limits 91*b*). The memory device 92 also stores original equipment manufacturer (OEM) modifiable door motion parameters 89 (e.g., door check profiles and pop-out profiles).

The actuator controller 50 is configured to generate the motion command 62 using the at least one stored motion control parameter to control an actuator output force acting on the closure member to move the closure member. A pulse width modulation unit 101 is coupled to the actuator controller 50 and is configured to receive a pulse width control signal and output an actuator command signal corresponding to the pulse width control signal.

Figure 5A:
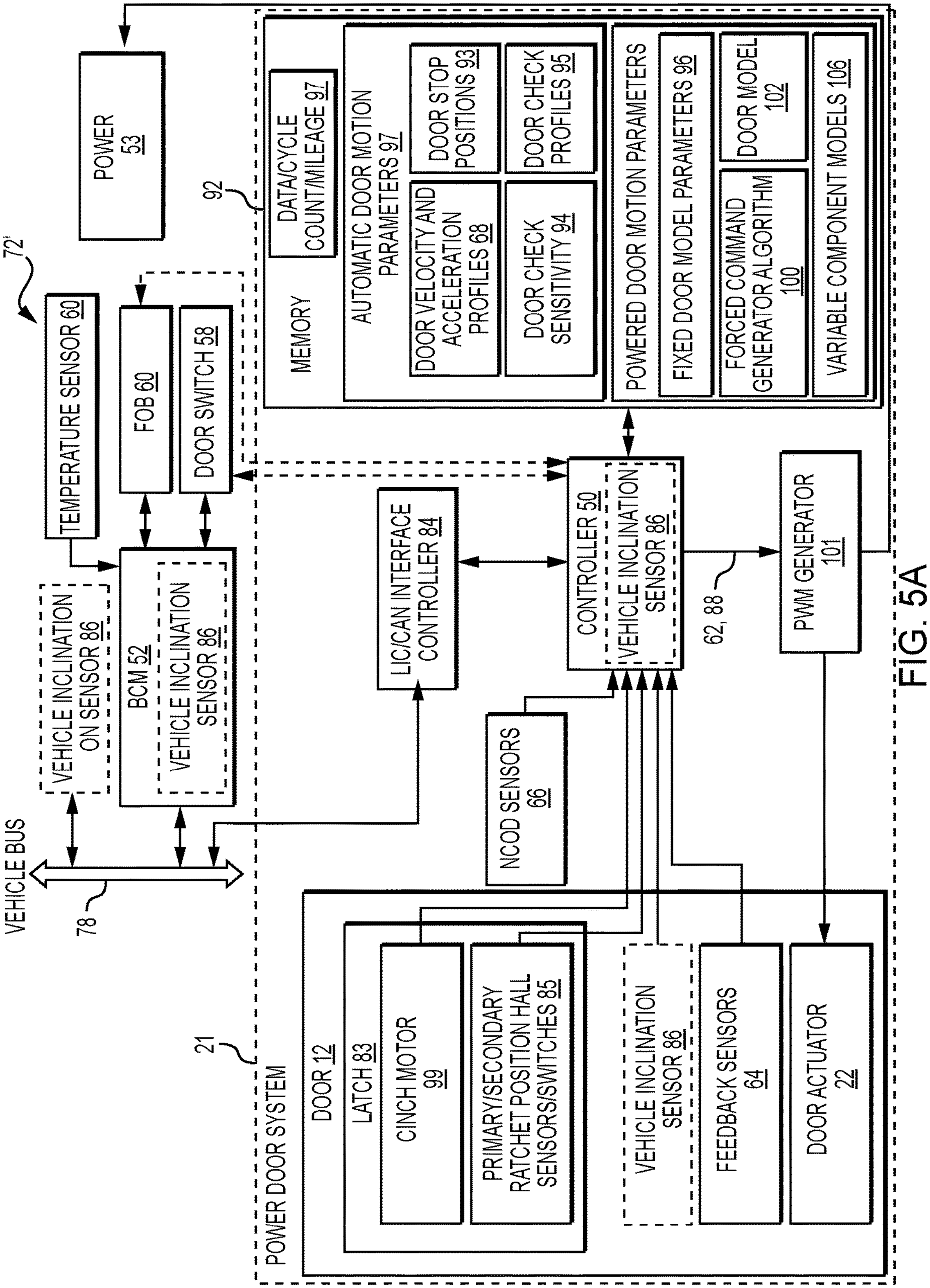

Similar to FIG. 5, FIG. 5A shows the power closure member actuation system 20 as part of another vehicle system architecture 72' operable in the automatic mode and the powered assist mode. The body control module 52 may also be in communication with at least one environmental sensor 80, 81 for sensing at least one environmental condition 59. Specifically, the at least one environmental sensor 80, 81 can be at least one of a temperature sensor 80 or a rain sensor 81. While the temperature sensor 80 and rain sensor 81 may be connected to the body control module 52, they may alternatively be integrated in the body control module 52 and/or integrated in another unit such as, but not limited to the actuator controller 50. In addition, other environmental sensors 80, 81 are contemplated.

The controller is also coupled with the latch 83 that includes a cinch motor 99 (for cinching the closure member 12 into the closed position). The latch 83 also includes a plurality of primary and secondary ratchet position sensors or switches 85 that provide feedback to the actuator controller 50 regarding whether the latch 83 is in a latch primary position or a latch secondary position, for example. Latch 83 may include a controller or and Electronic Control Unit (ECU), such as exemplary latch configurations described in US20170341526A1, WO2020232543A1, US20200270913A1, US20180245379A1, US20140175813A1, the entireties of which are incorporated by reference herein.

Again, the vehicle inclination sensor 86 (such as an accelerometer or inclinometer) is also coupled to the actuator controller 50 for detecting the inclination of the vehicle 10. The vehicle inclination sensor 86 outputs an inclination signal corresponding to the inclination of the vehicle 10 and the actuator controller 50 is further configured to receive the inclination signal and adjust the one of the force command 88 (FIG. 6) and the motion command 62 accordingly. Accordingly may be for example adjusting the motion command 62 such that door 12 moves at the same speed and motion profile as compared to the door 12 being moved by a motion command as if on a level terrain. As a result, the actuator 22 may move the door 12 such that the motion profile (e.g. speed versus door position) when on an incline is the same as or is tracking to the motion profile as if the vehicle was not on an incline. In other words the user detects no visual difference in the door motion appearance of speed versus position as when the vehicle 10 is on an incline or not. Or for example accordingly may be adjusting the force command 88 such that door 12 is moved applying the similar resistance force detected by a user as compared to the door being moved by a force command as if on level terrain. As a result, the actuator 22 may move the door such that the force required to move the door 12 by a user when on an incline is the same as the force required by a user to move the door as if the vehicle was not on an incline. In other words, the user experiences the same reactionary resistive force of the door acting against the input force of the user when the vehicle 10 is on an incline or not.

A pulse width modulation unit 101 is also coupled to the actuator controller 50 and is configured to receive a pulse width control signal and output an actuator command signal corresponding to the pulse width control signal. The actuator controller 50 includes a processor or other computing unit 110 in communication with the memory device 92. So, the actuator controller 50 is coupled to the memory device 92 for storing a plurality of automatic closure member motion parameters 68, 93, 94, 95 for the automatic mode and a plurality of powered closure member motion parameters 96, 100, 102, 106 for the powered assist mode and used by the actuator controller 50 for controlling the movement of the closure member (e.g., door 12 or 17). Specifically, the plurality of automatic closure member motion parameters 68, 93, 94, 95 includes at least one of closure member motion profiles 68 (e.g., plurality of closure member velocity and acceleration profiles), a plurality of closure member stop positions 93, a closure member check sensitivity 94, and a plurality of closure member check profiles 95. The plurality of powered closure member motion parameters 96, 100, 102, 106 includes at least one of a plurality of fixed closure member model parameters 96 and a force command generator algorithm 100 and a closure member model 102 and a plurality of closure member component profiles 106. In addition, the memory device 92 stores a date and mileage and cycle count 97. The memory device 92 may also store boundary conditions (e.g., plurality of predetermined operating limits) used for a boundary check to prevent movement of the closure member and operation of the actuator 22 outside a plurality of predetermined operating limits or boundary conditions.

Consequently, the actuator controller 50 is configured to receive one of the motion input 56 associated with the powered assist mode and the automatic mode initiation input 54 associated with the automatic mode. The actuator controller 50 is then configured to send the actuator 22 one of a motion command 62 based on the plurality of automatic closure member motion parameters 68, 93, 94, 95 in the automatic mode and the force command 88 based on the plurality of powered closure member motion parameters 96, 100, 102, 106 in the powered assist mode to vary the actuator output force acting on the closure member 12 to move the closure member 12. The actuator controller 50 additionally monitors and analyzes historical operation of the power closure member actuation system 20 using the artificial intelligence learning algorithm 61 and adjusts the plurality of automatic closure member motion parameters 68, 93, 94, 95 and the plurality of powered closure member motion parameters 96, 100, 102, 106 accordingly.

As discussed above, the power closure member actuation system 20 can include an environmental sensor 80, 81 in communication with the actuator controller 50 and configured to sense at least one environmental condition of the vehicle 10. Thus, the historical operation monitored and analyzed by the actuator controller 50 using the artificial intelligence learning algorithm 61 can include the at least one environmental condition of the vehicle 10. So, the controller is further configured to adjust the plurality of automatic closure member motion parameters 68, 93, 94, 95 and the plurality of powered closure member motion parameters 96, 100, 102, 106 based on the at least one environmental condition of the vehicle 10.

Figure 6:
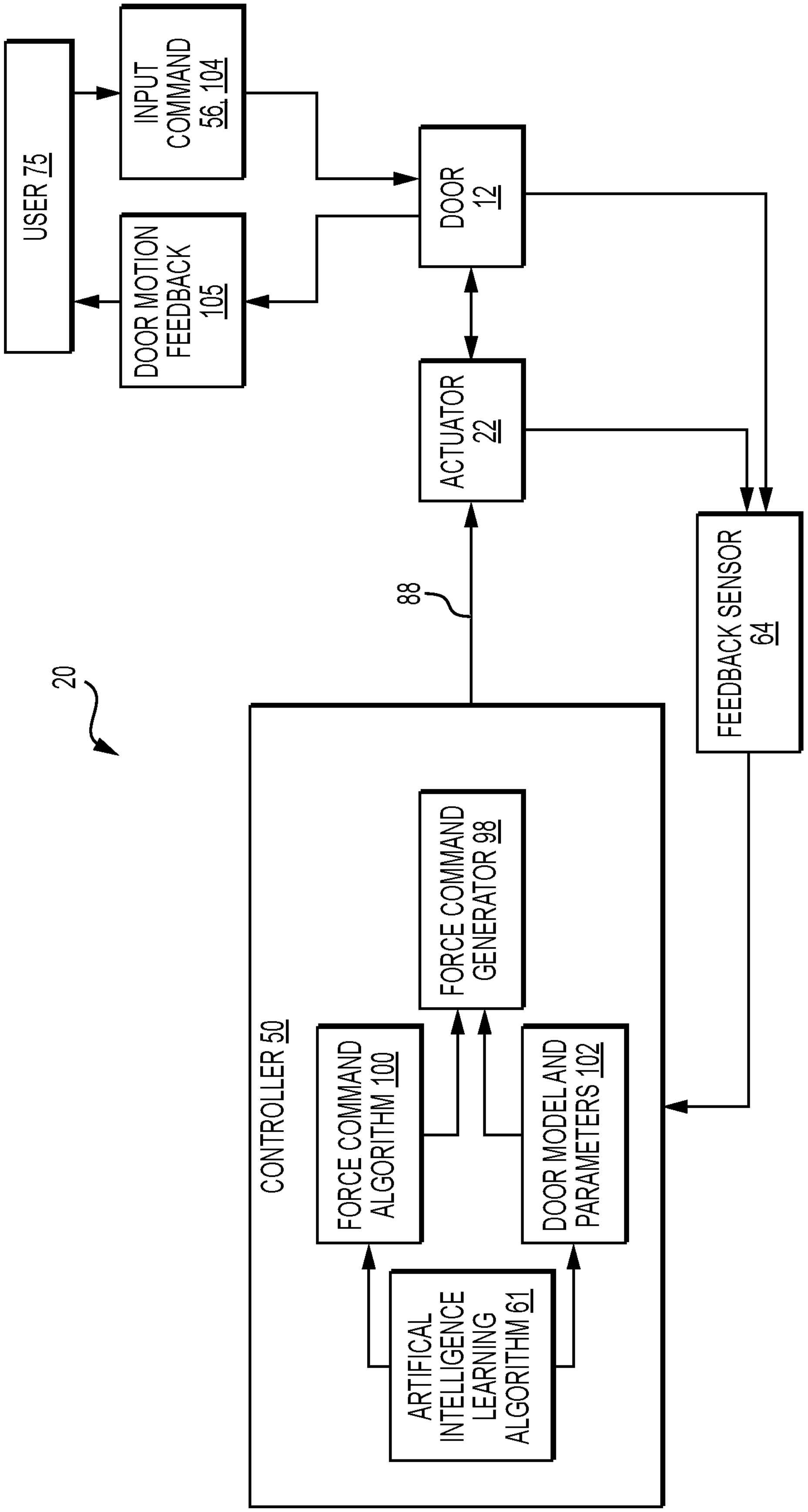
FIG. 6 illustrates another block diagram of the power closure member actuation system for moving the closure member in a powered assist mode, according to aspects of the disclosure.

As best shown in FIG. 6, the actuator controller 50 is also configured to receive the motion input 56 and enter the powered assist mode to output the force command 88 (e.g., using a force command generator 98 of the actuator controller 50 as a function of a force command algorithm 100, door model 102, boundary conditions 91, a plurality of closure member component profiles 106 as discussed in more detail below) as modified by the artificial intelligence learning algorithm 61. The actuator controller 50 is also configured to generate the force command 88 to control an actuator output force acting on the closure member to move the closure member. So, the actuator controller 50 varies an actuator output force acting on the closure member to move the closure member in response to receiving the motion input 56. In the powered assist mode, the force command 88 has a specified force profile (e.g., that may be altered to change the user experience with the closure member, such as by making it lighter or heavier, or based on changes in the environmental condition and modified by the artificial intelligence learning algorithm 61, such as by increasing or decreasing the force assist provided to the user 75). The force command 88 is continually optimized per current user feedback, for example. A user movement sensor 104 is coupled to the actuator controller 50 and is configured to sense the motion input 56 from the user 75 on the closure member to move the closure member. Door motion feedback 105 is also provided from the closure member (e.g., door 12) back to the user 75. Again, the power closure member actuation system 20 further includes at least one closure member feedback sensor 64 for determining at least one of a position and speed of the closure member. The at least one closure member feedback sensor 64 detects the position and/or speed of the closure member, as described above for the automatic mode, and can provide corresponding position/motion information or signals to the actuator controller 50 concerning how the user 75 is interacting with the closure member. For example, the at least one closure member feedback sensor 64 determine how fast the user 75 is moving the closure member (e.g., door 12). The attitude or inclination sensor 86 may also determine the angle or inclination of the closure member and the power closure member actuation system 20 may compensate for such an angle to assist the user 75 and negate any effects on the closure member motion that the change in angle causes (e.g., for example changes regarding how gravity may influence the closure member differently based on the angle of the closure member relative to a ground plane). One example of an actuator controller and door motion algorithms and methods are shown and described in WO2020252601A1, entitled "A power closure member actuation system", also referred to herein as the "'601 PCT Application", the entire contents of which is incorporated herein by reference. For example, actuator controller 50 may be configured to calculate a compensating force value and control the electric motor 36 to output the compensating force value to control the motion of the door 12 to assist with the input force of a user on the door, or to assist with compensating for door motion resistances, such as do to friction, inclination, momentum, and so forth.

Figure 7:
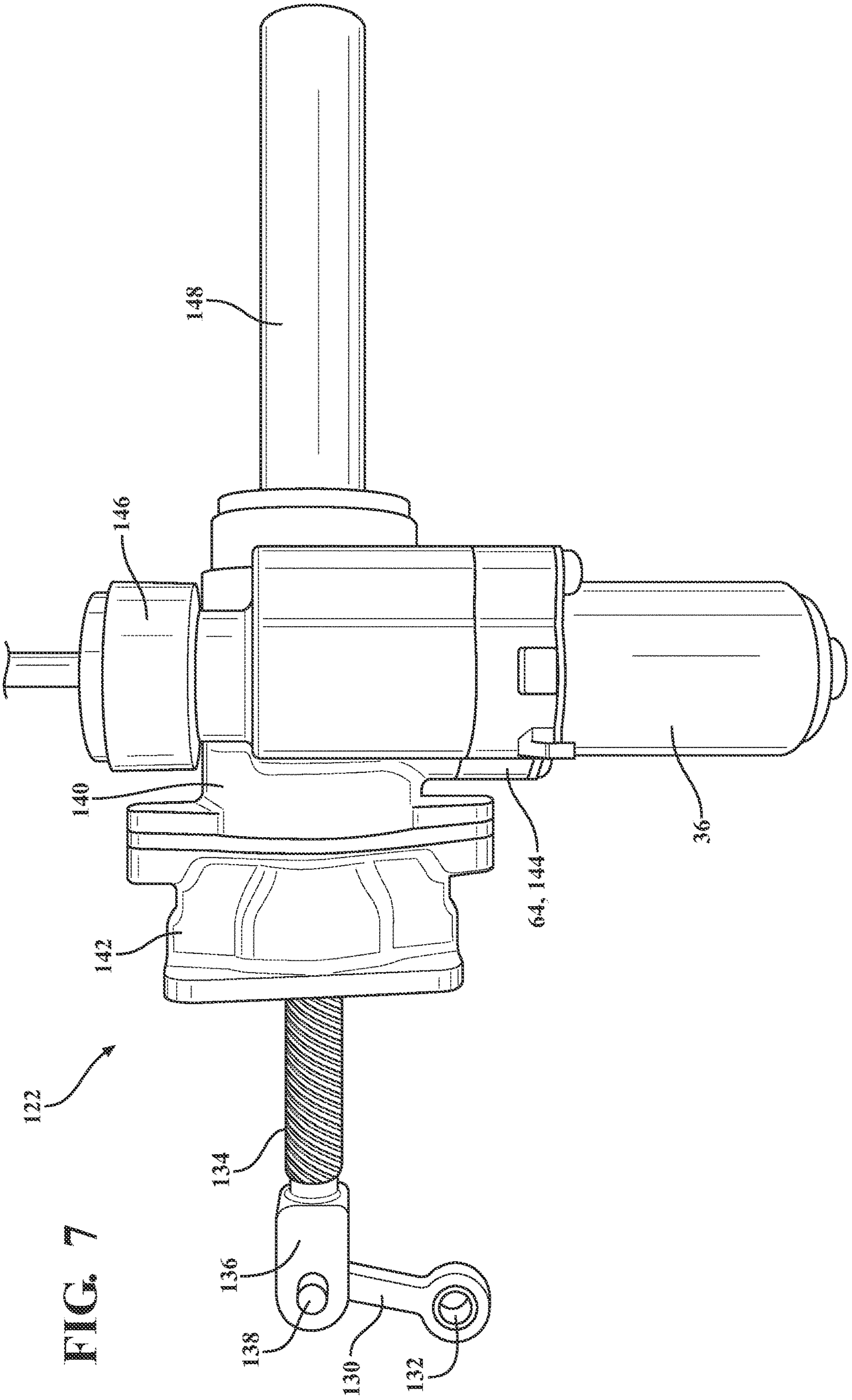
FIG. 7 illustrates a first powered actuator according to aspects of the disclosure.

Referring now to FIG. 7, a first powered actuator 122 is disclosed. The first powered actuator 122 includes a link bar 130 defining a distal hole 132. The distal hole 132 is configured to be connected to the vehicle body 14 in some embodiments where the first powered actuator 122 is disposed within the closure, for example as shown in FIG. 2. Alternatively, the distal hole 132 may be configured to be connected to the closure, such as a vehicle side door 12, 17 in embodiments where the first powered actuator is disposed outside of the closure, for example within a structure of the vehicle body 14. The link bar 130 is connected to an extensible member 134 via a linkage 136 having a pin 138 pivotably supporting the link bar 130. Thus, the extensible member 134 is configured to be coupled to the vehicle body 14 or the closure of the vehicle for opening or closing the closure. Linkage 136 may be directly pivotally coupled to vehicle body 14 for example, via the distal hole 132 provided rather on linkage 136 for facilitating connection of the linkage 136 to the vehicle body 14, without a link bar 130.

The first powered actuator 122 also includes a gearbox 140 configured to apply a force to the extensible member 134 for causing the extensible member 134 to move linearly. Extensible member 134 has an axis referred to using reference letters "BB". An adapter 142 is configured to mount the gearbox 140 to the closure or to the vehicle body 14. An electric motor 36 is coupled to the gearbox 140 for driving the first powered actuator 122. The electric motor 36 may be a standard DC motor such as a permanent magnet (e.g. ferrite) or a reluctance type motor. The electric motor 36 may be a brushless DC (BLDC) type motor such as a permanent magnet (e.g. ferrite) or a reluctance type motor. A closure member feedback sensor 64 in the form of a high-resolution position sensor 144 is disposed between the electric motor 36 and the gearbox 140. The high-resolution position sensor 144 may include a magnet wheel and a Hall effect sensor to provide speed, direction, and/or positional information regarding the extensible member 134 and the closure attached thereto. An electromagnetic (EM) brake 146 is coupled to the gearbox 140 on an opposite side from the electric motor 36. The EM brake 146 is optional and may not be included in all powered actuators. A cover 148 is attached to the gearbox 140 and is configured to enclose the extensible member 134. The cover 148 may help to prevent dust or dirt from fouling the extensible member 134 and/or to protect the extensible member 134 from contacting other components within the closure or the vehicle body 14. The cover 148 is formed as a hollow cylindrical tube, as shown on FIG. 7.

Figure 8:
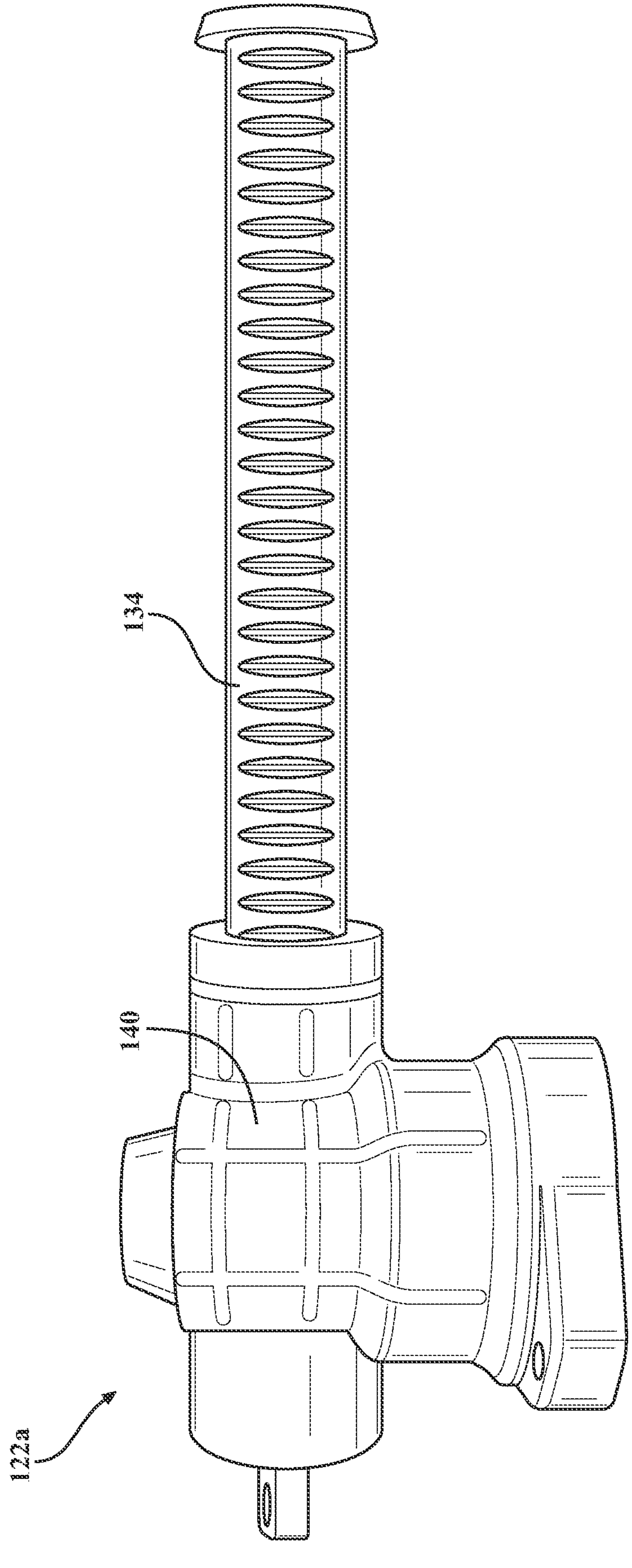
FIG. 8 illustrates a second powered actuator according to aspects of the disclosure.

In some embodiments, and as shown in the first powered actuator 122 of FIG. 7, the extensible member 134 includes a leadscrew having one or more helical threads extending thereabout. The extensible member 134 may have other configurations. For example, FIG. 8 shows a second powered actuator **122*a* in which the extensible member 134 is configured as a rack gear that is configured to be driven linearly by a corresponding gear, such as a pinion gear (not shown) in the gearbox 140. In some embodiments, the gearbox 140 of the second powered actuator 122*a*** may include a planetary gear drive with a rack and pinion output.

Figure 9:
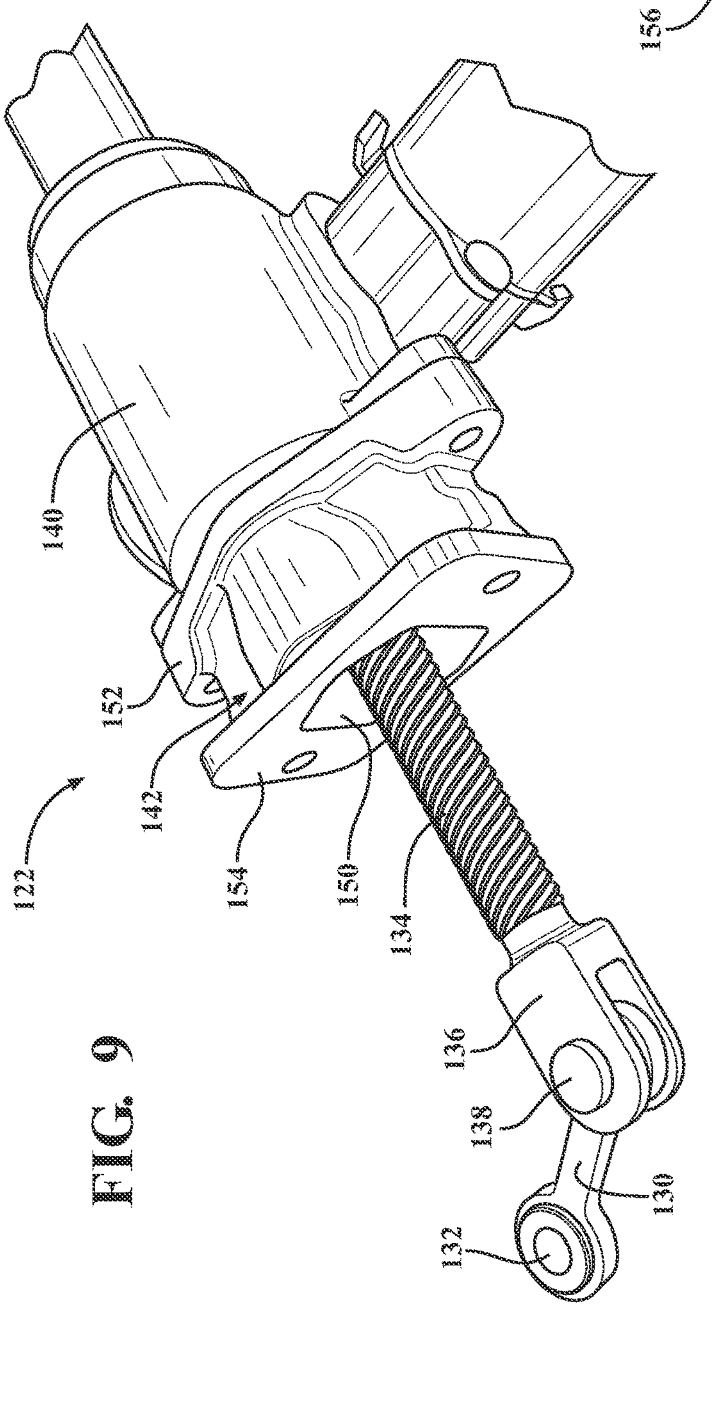
FIG. 9 illustrates the first powered actuator of FIG. 7, according to aspects of the disclosure.

FIG. 9 shows another view of the first powered actuator 122 showing details of the adapter 142. As shown in FIG. 9, the adapter 142 has a generally tubular shape defining a central bore 150 for the extensible member 134 pass through. The adapter 142 includes a first flange 152 that is configured to be fixed to the gearbox 140 using a pair of screws or bolts. The adapter 142 also includes a second flange 154 that is configured to be fixed to the closure. Different adapters 142 having different configurations may be used to adapt powered actuators of the present disclosure to different vehicular applications, such as for different vehicles or for different closures within a same vehicle.

Figure 10:
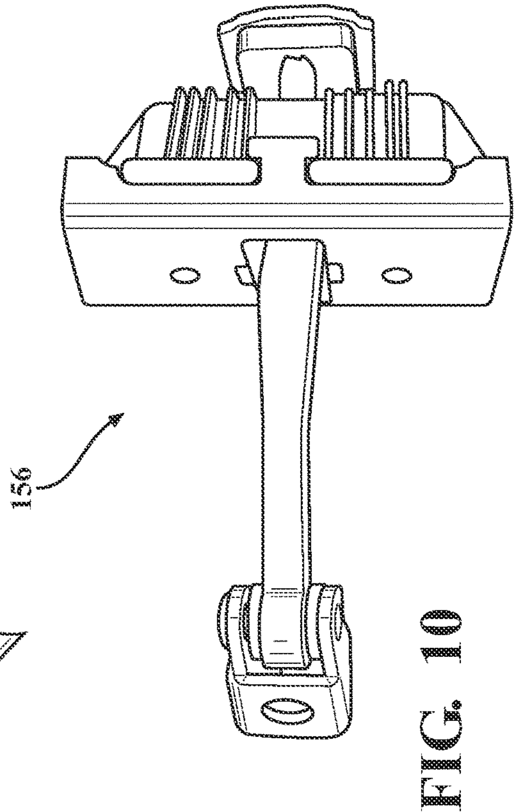
FIG. 10 illustrates a non-powered door check device.

In some embodiments, the adapter 142 is configured to allow the first powered actuator 122 to be a direct replacement for a non-powered door check device 156 for limiting rotational travel of the closure, such as the door check device 156 shown in FIG. 10.

Figure 11B:
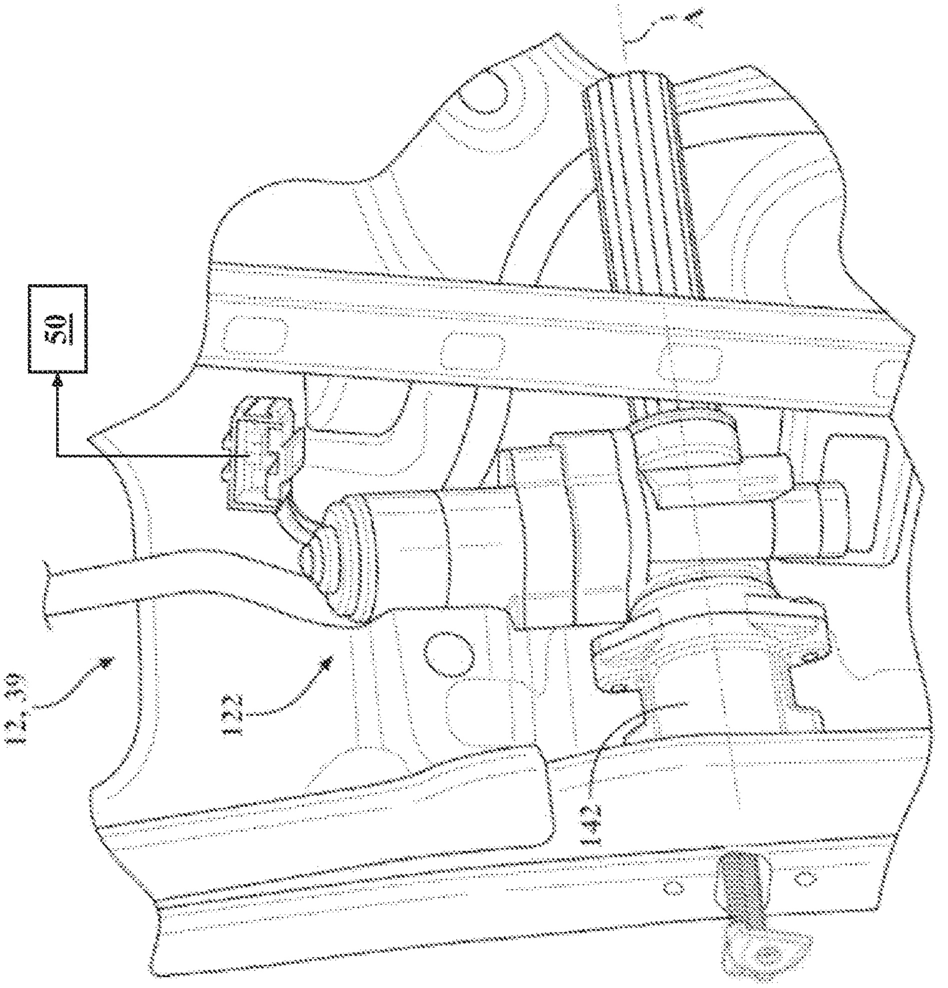
FIG. 11B illustrates the powered actuator of FIG. 11A disposed within the internal cavity of the passenger door.
Figure 11A:
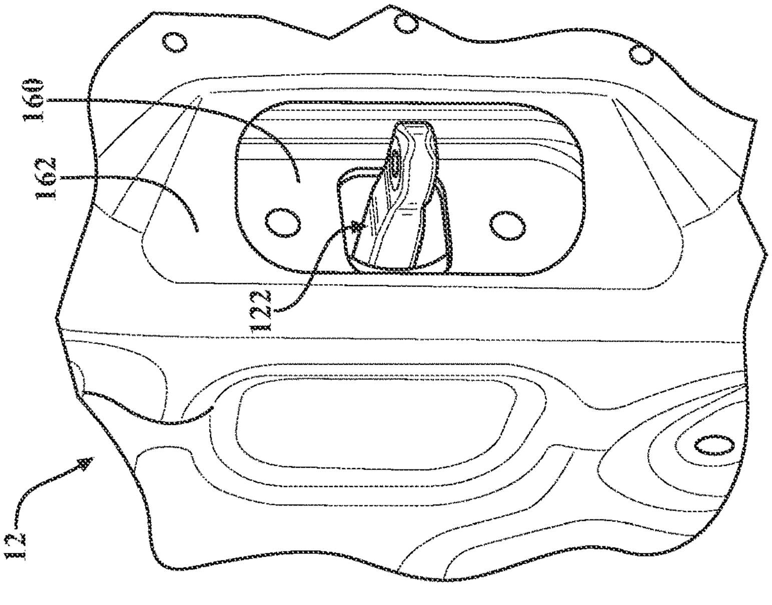
FIG. 11A illustrates a powered actuator protruding from an internal cavity of a passenger door according to aspects of the disclosure.

FIG. 11A illustrates the first powered actuator 122 protruding from an internal door cavity 39 of a front passenger door 12 according to aspects of the disclosure. The powered actuator 22, 122 of the present disclosure may be similarly within any vehicle closure, such as any swing door or a swing-type tailgate. Specifically, first powered actuator 122 is configured to mount to a preexisting mounting point 160 on the shut face 162 of the closure 12. The preexisting mounting point 160 is also configured to hold a door stopper, such as door check device 156 shown in FIG. 10.

FIG. 11B illustrates the powered actuator of FIG. 11A disposed within the internal cavity 39 of the passenger door 12. In some embodiments, the adapter 142 is configured to provide a rotational degree of freedom between the gearbox 140 and the shut face 162 of the closure for accommodating installation in a door cavity 39. For example, the powered actuator 122 may be rotated about a central axis A through the extensible member 134 and along which the extensible member 134 translates to open or close the door 12.

Figure 12B:
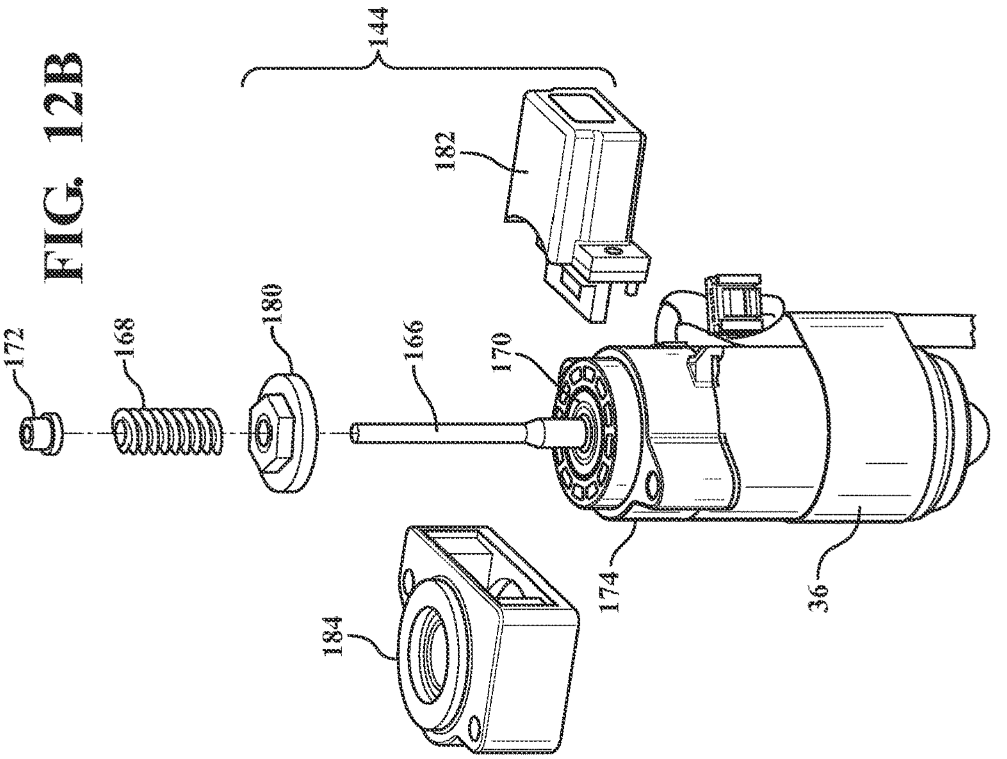
FIG. 12B illustrates an exploded view of components within the first powered actuator according to aspects of the disclosure.
Figure 12A:
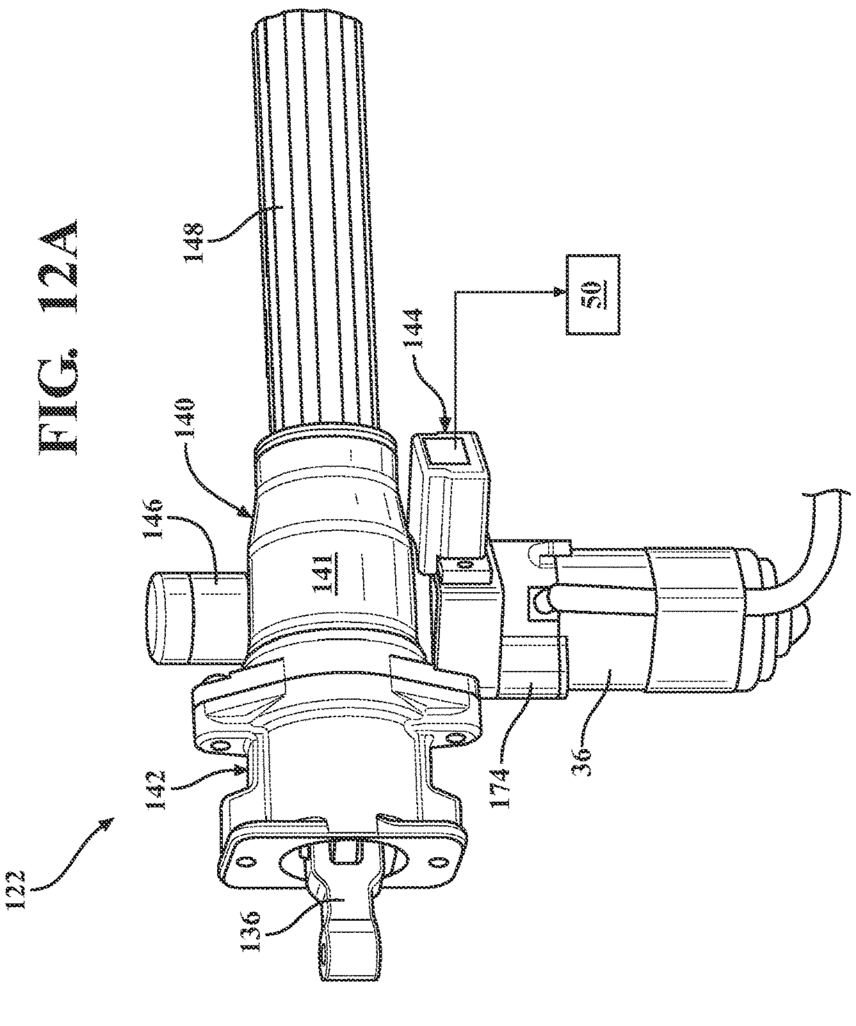
FIG. 12A illustrates the first powered actuator according to aspects of the disclosure.

FIGS. 12A-12B illustrate the first powered actuator 122 according to aspects of the disclosure. Specifically, FIG. 12B shows the electric motor 36 configured to rotate a driven shaft 166 for turning a worm gear 168. The driven shaft 166 is supported by a proximal bearing 170 and a distal bearing 172. The proximal bearing 170 is supported within a motor bracket 174 that is attached to an axial end of the electric motor 36. The proximal bearing 170 is shown as a ball bearing and the distal bearing 172 is shown as a plain bearing or a bushing. However, either of the bearings 170, 172 may be a different type of bearing, such as a plain bearing, a ball bearing, a roller bearing, or a needle bearing. FIG. 12B also shows internal components of the high-resolution position sensor 144, including a magnet wheel 180 that is coupled to rotate with the driven shaft 166 and which includes a plurality of permanent magnets. The magnet wheel 180 shown in FIG. 12B has six permanent magnets, but the magnet wheel 180 may include any number of magnets. The high-resolution position sensor 144 also includes a Hall-effect sensor 182 configured to detect a movement of the permanent magnets in the magnet wheel 180 thereby and to generate an electrical signal in response to rotary movement of the magnet wheel 180. The high-resolution position sensor 144 also includes a sensor housing 184 enclosing the magnet wheel 180 and all or part of the Hall-effect sensor 182.

Figure 13A:
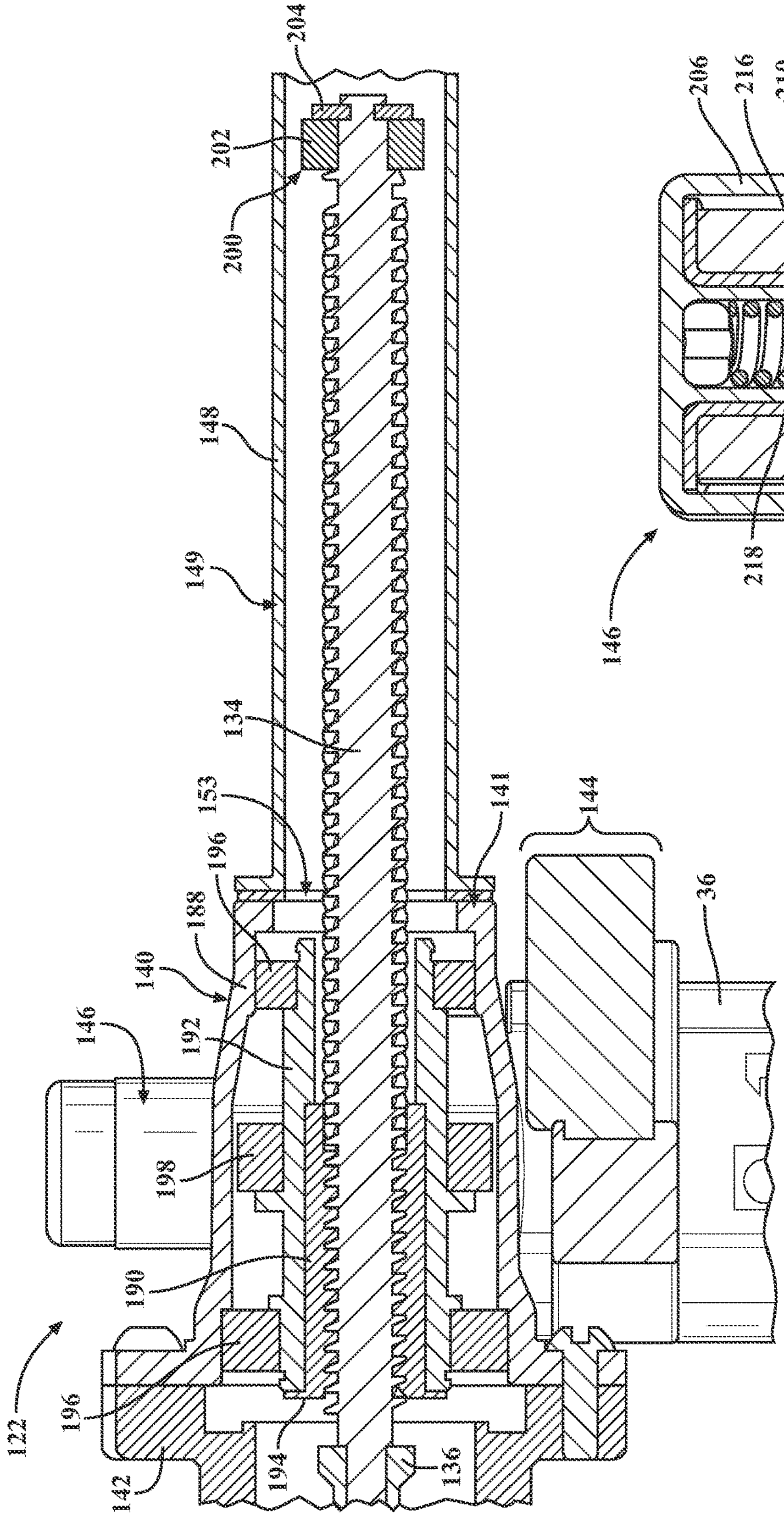
FIG. 13A illustrates a partial cut-away view of the first powered actuator according to aspects of the disclosure.

FIG. 13A illustrates a partial cut-away view of the first powered actuator 122 according to aspects of the disclosure. FIG. 13A shows the general arrangement of the gearbox 140, including a gearbox housing 141 extending between the adapter 142 and the cover 148 and between the electric motor 36 and the EM brake 146, with the electric motor 36 and the EM brake 146 being aligned with one another and disposed perpendicular to the extensible member 134.

FIG. 13A also shows the internal details of the gearbox 140, including a lead nut 190 disposed around in threaded engagement with the extensible member 134 that is formed as a leadscrew. The leadscrew and lead nut configuration shown in FIG. 13A may provide a relatively low amount of backlash, thereby improving correlation between the detected position by the high-resolution position sensor 144 and the actual position of the closure. Such high precision detection may improve servo control of the powered actuator 22, 122. For example, the high-resolution sensor 144 signal may be configured to output at least 41 Hall counts per motor revolution for use by the servo control system, for example as shown in the table below illustrating a 5000 minimum Hall count for a 100 mm leadscrew travel:

| Min Counts | Avg Travel (mm) | Lead (mm) | # of Turns | Counts/ turn | Gear Ratio | Counts/ Motor Rev |
|---|---|---|---|---|---|---|
| 5000 | 100 | 18 | 5.56 | 900 | 22 | 41 |

The high-resolution sensor 144 signal may be configured to output other Hall counts per motor revolution for use by the servo control system. For example, the Hall count output may be greater than 2 Hall counts per motor revolution.

The lead nut 190 is fixed within a torque tube 192 having a tubular shape. Specifically the lead nut 190 includes a flanged end 194 that protrudes radially outwardly and engages an axial end of the torque tube 192 at an end of the torque tube 192 adjacent to the adapter 142. The torque tube 192 is held within the gearbox housing 188 by a pair of tube supports 196, with each of the tube supports 196 disposed around the torque tube 192 at or near a corresponding axial end thereof. One or both of the tube supports 196 may include a bearing, such as a ball bearing or a roller bearing. A worm wheel gear 198 is disposed around the torque tube 192 between the tube supports 196 and is fixed to rotate with the torque tube 192. The worm wheel gear 198 is in meshing engagement with the worm gear 168 (shown on FIG. 12B), thus causing the torque tube 192 and the lead nut 190 to be rotated in response to the electric motor 36 driving the worm gear 168.

The first powered actuator 122 shown in FIG. 13A also includes a travel limiter 200 disposed on an axial end of the extensible member 134 opposite (i.e. farthest away from) the linkage 136. The travel limiter 200 is configured to engage a part of the gearbox 140, such as the torque tube 192, for limiting axial extension of the extensible member 134. Specifically, the travel limiter 200 includes a bumper 202 of resilient material, such as rubber, having a tubular shape extending around the extensible member 134 adjacent the axial end thereof. A retainer clip 204 holds the bumper 202 in place on the axial end of the extensible member 134. The retainer clip 204 may include any suitable hardware including, for example, a washer, a nut, a cotter pin, an E-Clip, or a C-clip such as a snap ring.

Figure 13B:
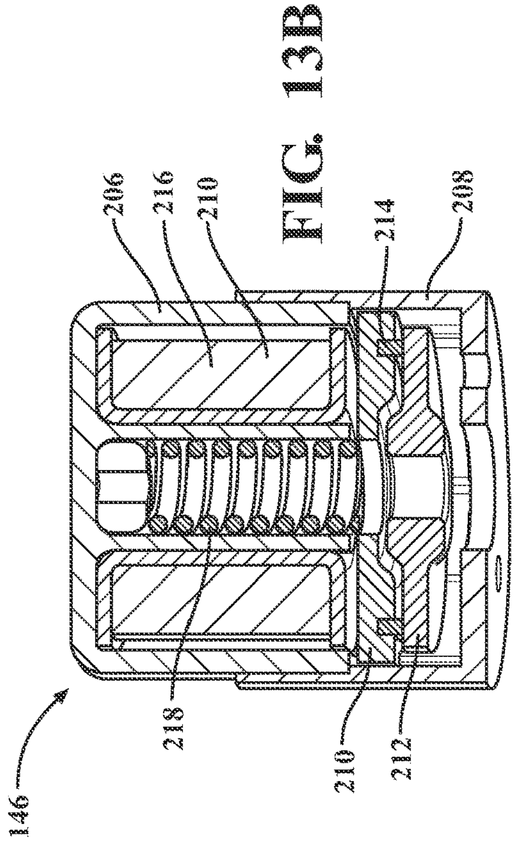
FIG. 13B illustrates cut-away view of an EM brake of the powered actuator according to aspects of the disclosure.

FIG. 13B illustrates cut-away view of the EM brake 146 of the powered actuator according to aspects of the disclosure. The EM brake 146 is coupled to the driven shaft 166 and configured to apply a braking force to oppose rotation of the driven shaft 166. Specifically, the EM brake 146 includes a cup-shaped inner housing 206 at least partially disposed within a cup-shaped outer housing 208. An armature plate 210 is fixed to rotate with the driven shaft 166, and a fixed plate 212 is fixed to the outer housing 208 and prevented from rotating. An annular band 214 of friction material is fixed to the armature plate 210 adjacent to the fixed plate 212. The EM brake 146 includes a solenoid coil 216 disposed within the inner housing 206 and configured to be energized by an electrical current for causing the armature plate 210 to move away from the fixed plate 212. A coil spring 218 extends through a central bore of the inner housing 206 and biases the armature plate 210 toward the fixed plate 212. A detailed description of the EM brake 146 and its operation are provided in applicant's U.S. Pat. No. 10,280,674, which is hereby incorporated by reference in its entirety.

Figure 14:
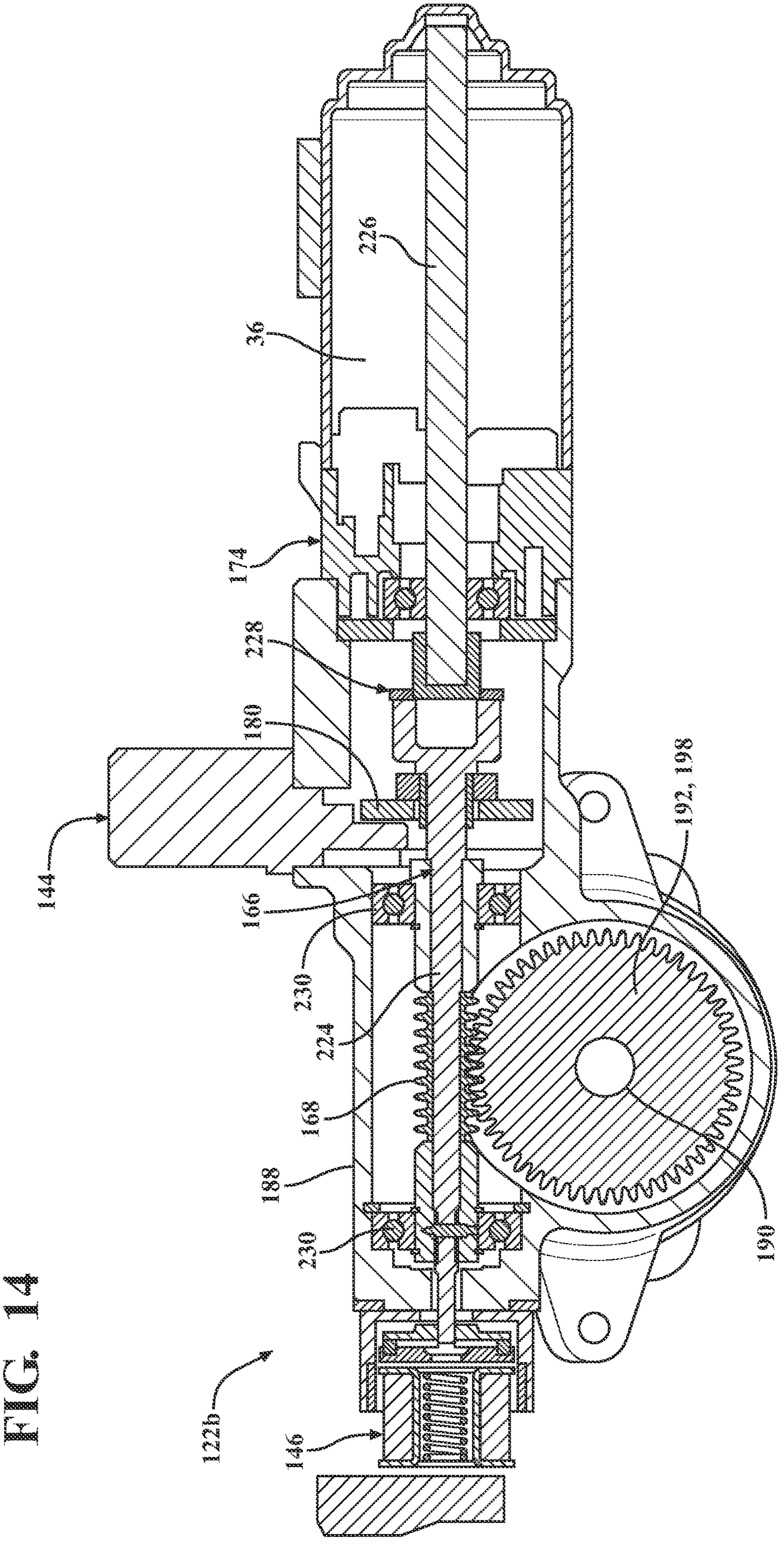
FIG. 14 illustrates a cut-away view of a third powered actuator according to aspects of the disclosure.

FIG. 14 illustrates a cut-away view of a third powered actuator 122*b* according to aspects of the disclosure. Specifically, the plane of the cut-away view shown in FIG. 14 extends through the driven shaft and a plane of the worm wheel 198. As shown in FIG. 14, the driven shaft 166 comprises a gearbox input shaft 224 that is coupled to a motor shaft 226 of the electric motor 36 via a coupling 228. The coupling 228 may be a fixed coupling, such as a splined connection, causing the gearbox input shaft 224 to rotate with the motor shaft 226. In some embodiments, the coupling 228 may be a flex coupling, allowing some degree of relative rotation between the gearbox input shaft 224 and the motor shaft 226. In some embodiments, the coupling 228 may include a clutch for selectively fixing the gearbox input shaft 224 to rotate with the motor shaft 226. A set of input bearings 230 holds the gearbox input shaft 224 on either side of the worm gear 168. Either or both of the input bearings 230 may be any type of bearing, such as a ball bearing, a roller bearing, etc.

In some embodiments, and as shown in FIG. 14, the torque tube 192 and the worm wheel 198 are formed as an integrated unit, with gear teeth formed on an outer perimeter, and with the lead nut 190 formed on an inner bore. In some embodiments, the torque tube 192 and the worm wheel 198 are formed as an integrated unit, and the lead nut 190 is a separate piece that is fixed to rotate therewith.

The third powered actuator 122*b* shown in FIG. 14 includes the EM brake 146 spaced away from the high-resolution position sensor 144, with the gearbox 140 disposed therebetween.

Figure 15:
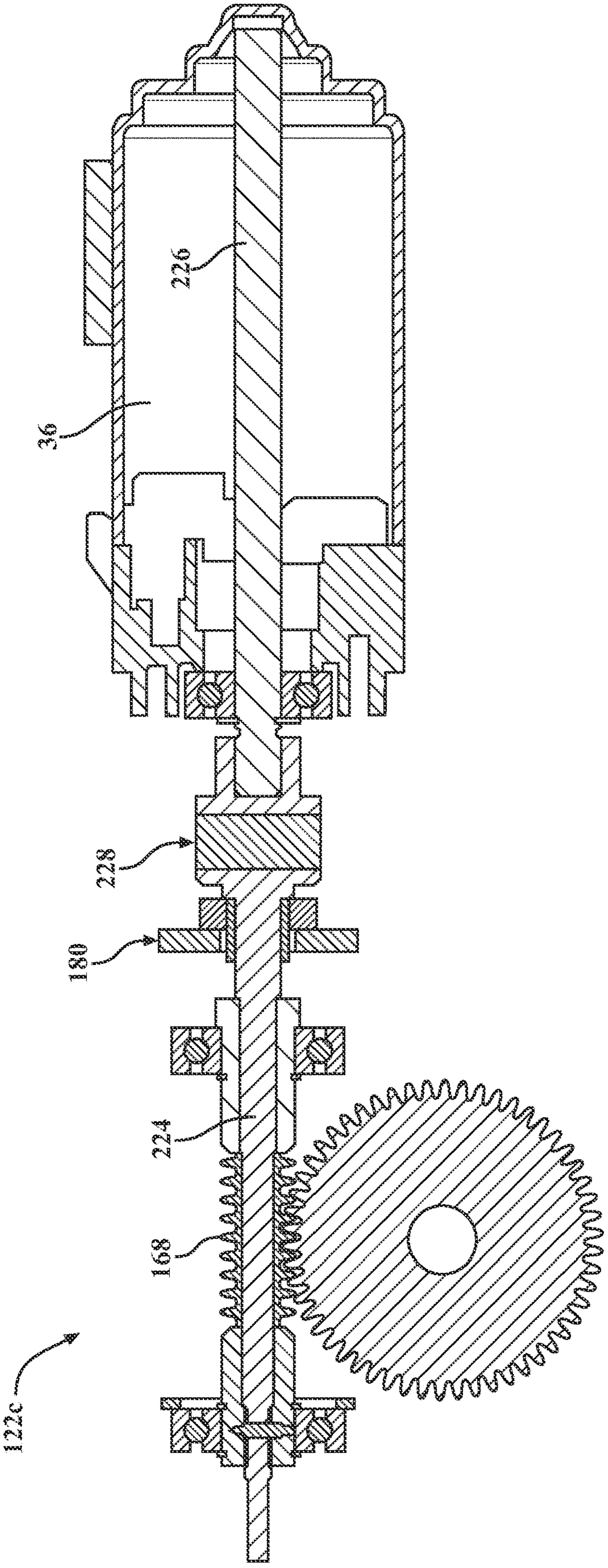
FIG. 15 illustrates a cut-away view of a fourth powered actuator according to aspects of the disclosure.

FIG. 15 illustrates a cut-away view of a fourth powered actuator 122*c* according to aspects of the disclosure. Specifically, the fourth powered actuator 122*c* is similar to the third powered actuator 122*b* shown in FIG. 14, in which the coupling 228 includes a clutch for selectively fixing the gearbox input shaft 224 to rotate with the motor shaft 226. In this case, the magnet wheel 180 is fixed to rotate with the gearbox input shaft 224, thus providing an indication of the extensible member 134 and the vehicle door coupled thereto. In all configurations of the powered actuator 122 described herein, the power actuator 122 may be configured without a clutch, having a permanent coupling between the motor 26 and the extensible member 134 connection with the vehicle body 14.

Figure 16A:
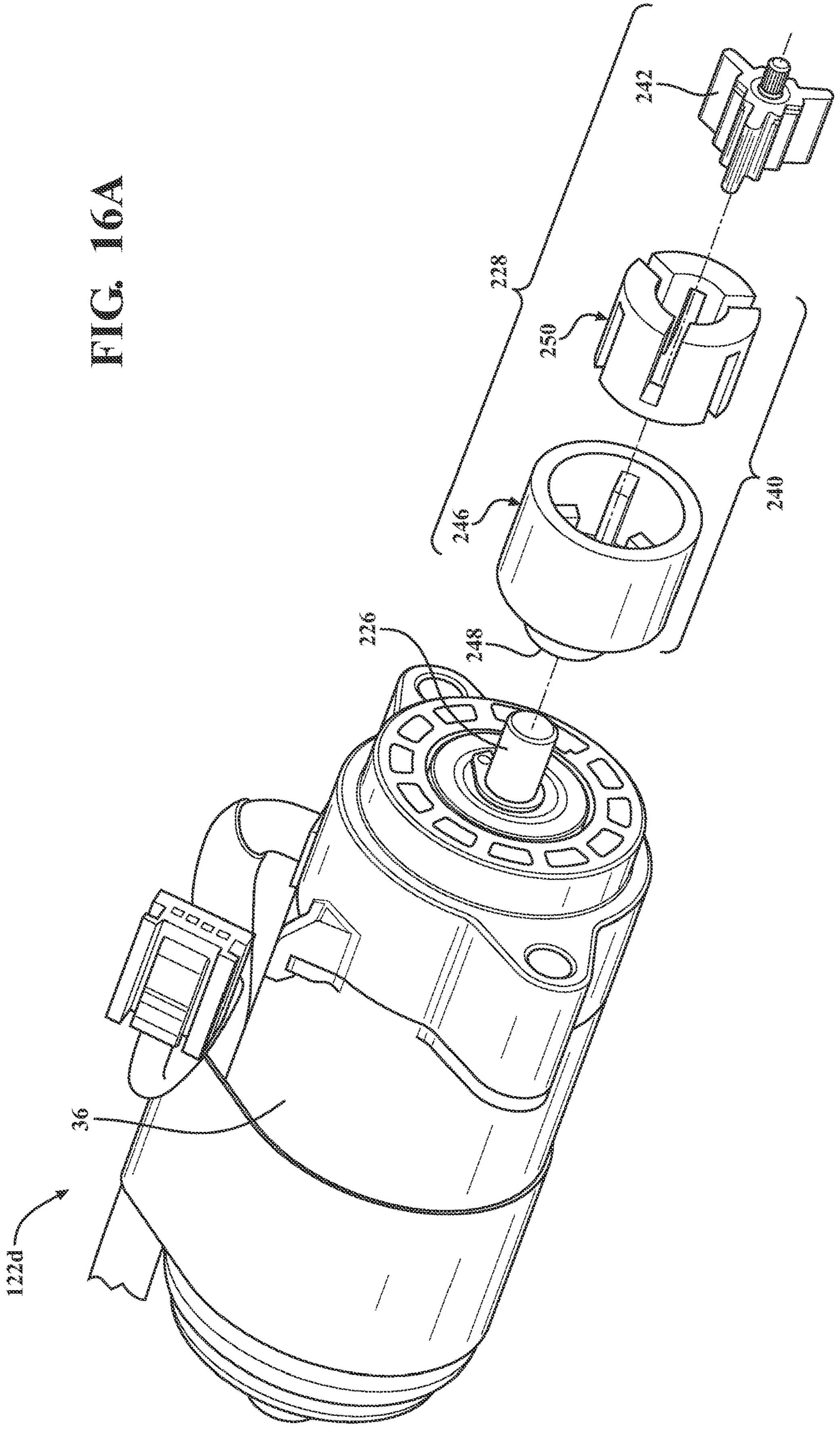
FIG. 16A illustrates an exploded perspective view of a motor and coupling of a fifth powered actuator according to aspects of the disclosure.
Figure 16B:
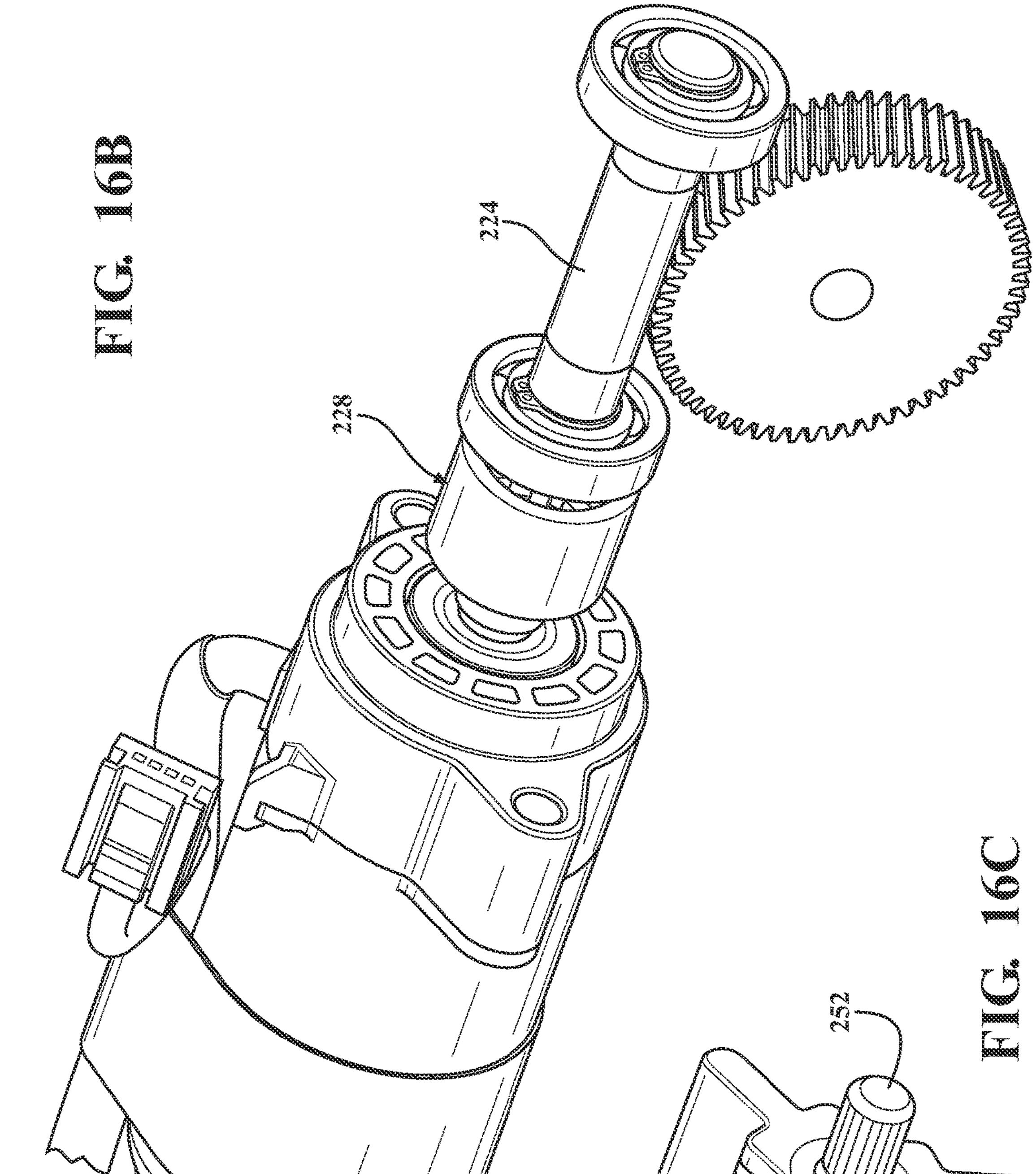
FIG. 16B illustrates a perspective view of the motor and a partial drive assembly within the fifth powered actuator according to aspects of the disclosure.
Figure 16C:
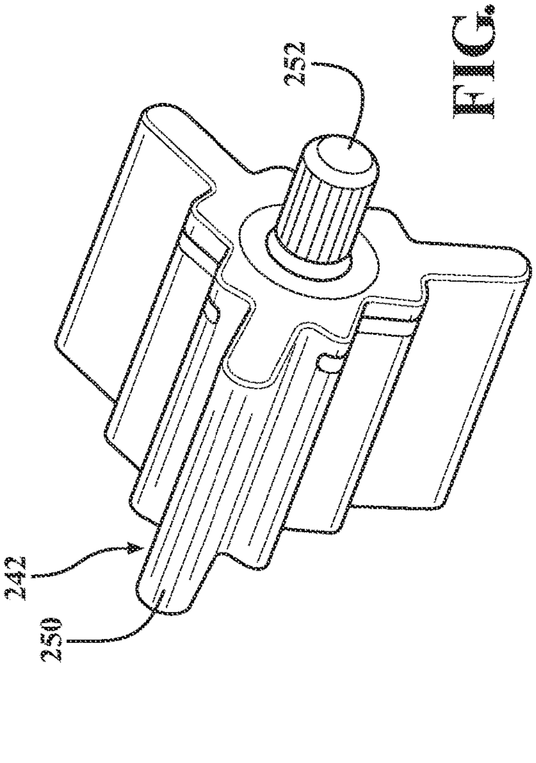
FIG. 16C illustrates a slip device of the coupling of the fifth powered actuator according to aspects of the disclosure.

FIGS. 16A-16B show an electric motor 36 and coupling 228 of a fifth powered actuator 122*d* according to aspects of the disclosure. Specifically, FIG. 16A shows an exploded view of the coupling 228 which includes a flex coupling 240 and a slip device 242. The flex coupling 240 couples the motor shaft 226 of the electric motor 36 to the slip device 242 and allows some limited rotation therebetween. The flex coupling 240 may, for example, transmit driving torque from the motor shaft 226 to the slip device 242 while limiting the transmission of vibration therebetween. The flex coupling 240 shown in FIG. 16A includes an input member 246 having a cup-shape extending from a base 248 that is configured to rotate with the motor shaft 226. The base 248 may be keyed or splined or otherwise fixed to rotate with the motor shaft 226. The input member 246 is configured to turn the slip device 242, with an output member 250 of resilient material, such as rubber, disposed between the input member 246 and the slip device 242 for allowing some degree of rotation therebetween. As shown in FIG. 16C, the slip device 242 includes a triangular body 250 surrounding a shaft stub 252 that is splined and coupled to turn the gearbox input shaft 224. The slip device 242 is configured to provide some slip, or relative rotation between the input member 246 and the gearbox input shaft 224 if a torque therebetween exceeds a predetermined value.

Figure 17:
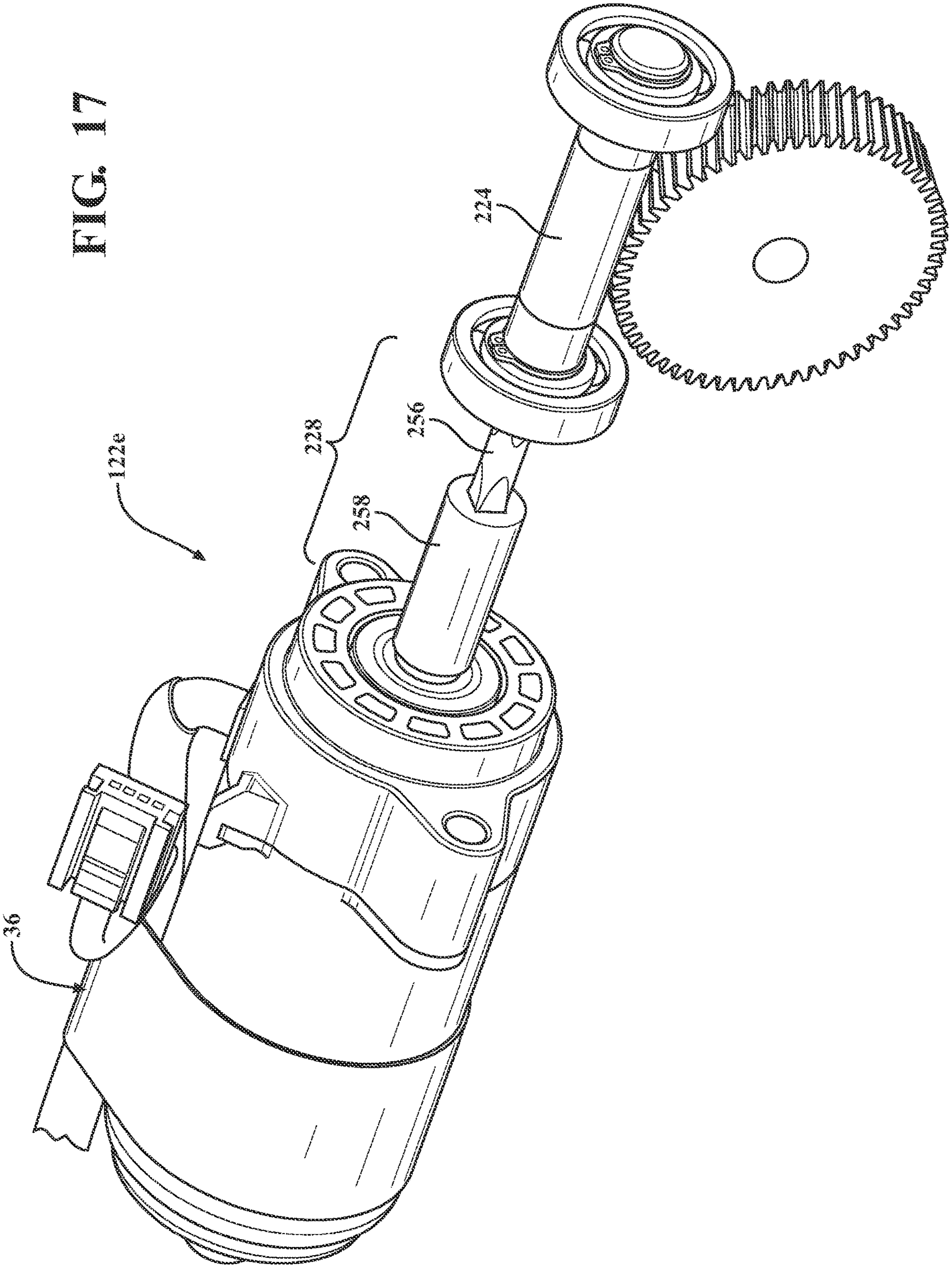
FIG. 17 illustrates a perspective view of a motor and a partial drive assembly within a sixth powered actuator according to aspects of the disclosure.

FIG. 17 shows an electric motor 36 and coupling 228 of a sixth powered actuator 122*e* according to aspects of the disclosure. Specifically, the coupling 228 shown in FIG. 17 includes a flex shaft 256 that is configured to twist by a predetermined amount in response to application of torque between two opposite ends thereof. One end of the flex shaft 256 is coupled to the gearbox input shaft 224, and the other end of the flex shaft 256 is coupled to the motor shaft 226 of the electric motor 36 via a shaft adapter 258. The shaft adapter 258 may be keyed or splined or otherwise fixed to rotate with the motor shaft 226. Thus, the flex shaft 256 provides for rotational flex between the motor shaft 226 and the gearbox input shaft 224.

Figure 18:
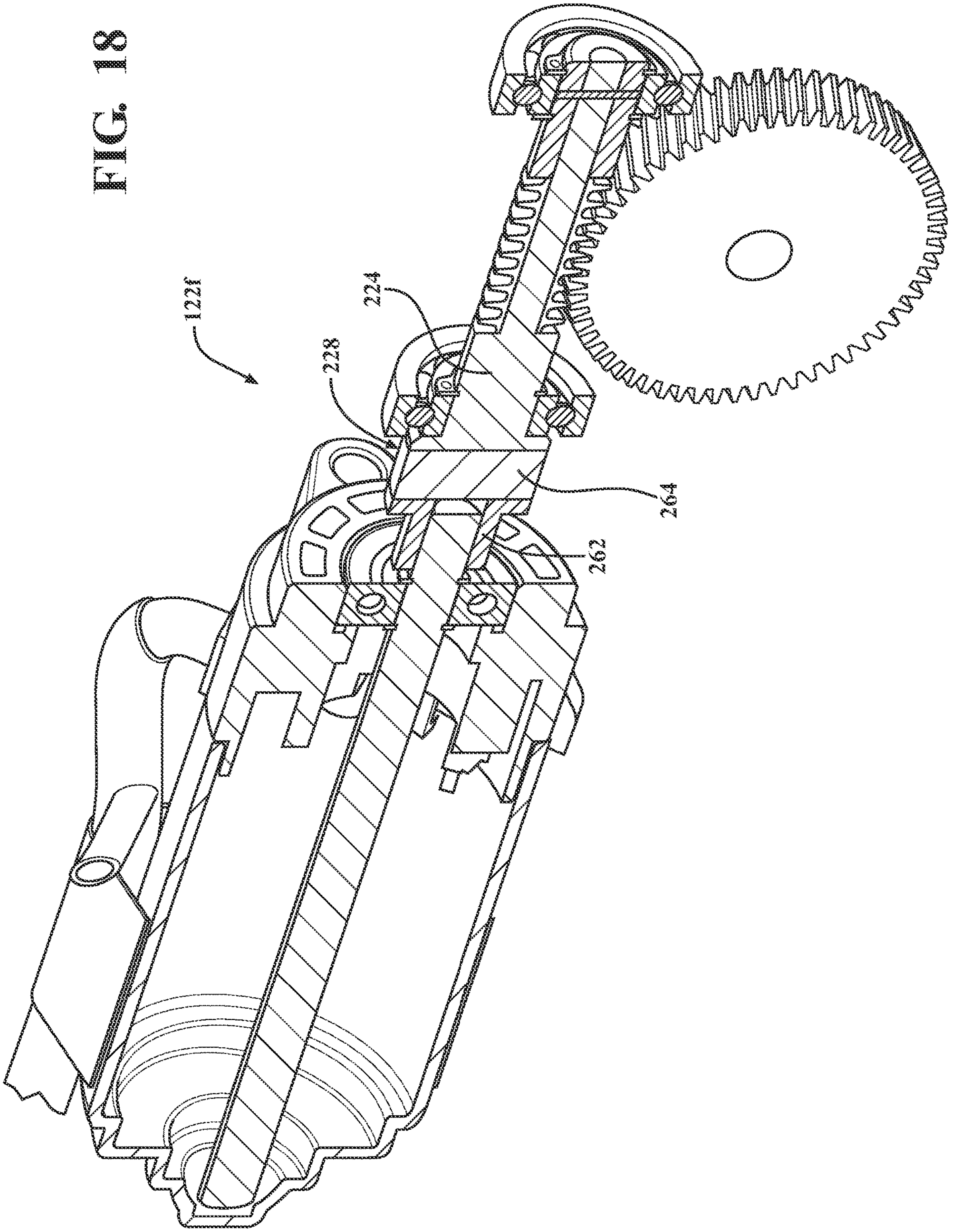
FIG. 18 illustrates a cut-away perspective view of a motor and a partial drive assembly within a seventh powered actuator according to aspects of the disclosure.

FIG. 18 shows an electric motor 36 and coupling 228 of a seventh powered actuator 122*f* according to aspects of the disclosure. Specifically, the coupling 228 shown in FIG. 18 is a flex coupling, which may be a high-speed flex coupling, which may be available off the shelf. The coupling 228 includes an input adapter 262 that is coupled to the motor shaft 226 of the electric motor 36. The input adapter 262 may be keyed or splined or otherwise fixed to rotate with the motor shaft 226. The coupling 228 also includes a resilient layer 264 of a resilient material, such as rubber, which is fixed to rotate with the input adapter 262 and which is also fixed to turn the gearbox input shaft 224. The coupling 228, thus functions as a flex coupling, allowing some limited relative rotation, less than one rotation, between the motor shaft 226 the gearbox input shaft 224. The seventh powered actuator 122*f* does not include any slip device and does not provide for any relative rotation between the motor shaft 226 the gearbox input shaft 224 beyond what is provided by the resilient layer 264 of the coupling 228.

Figure 19:
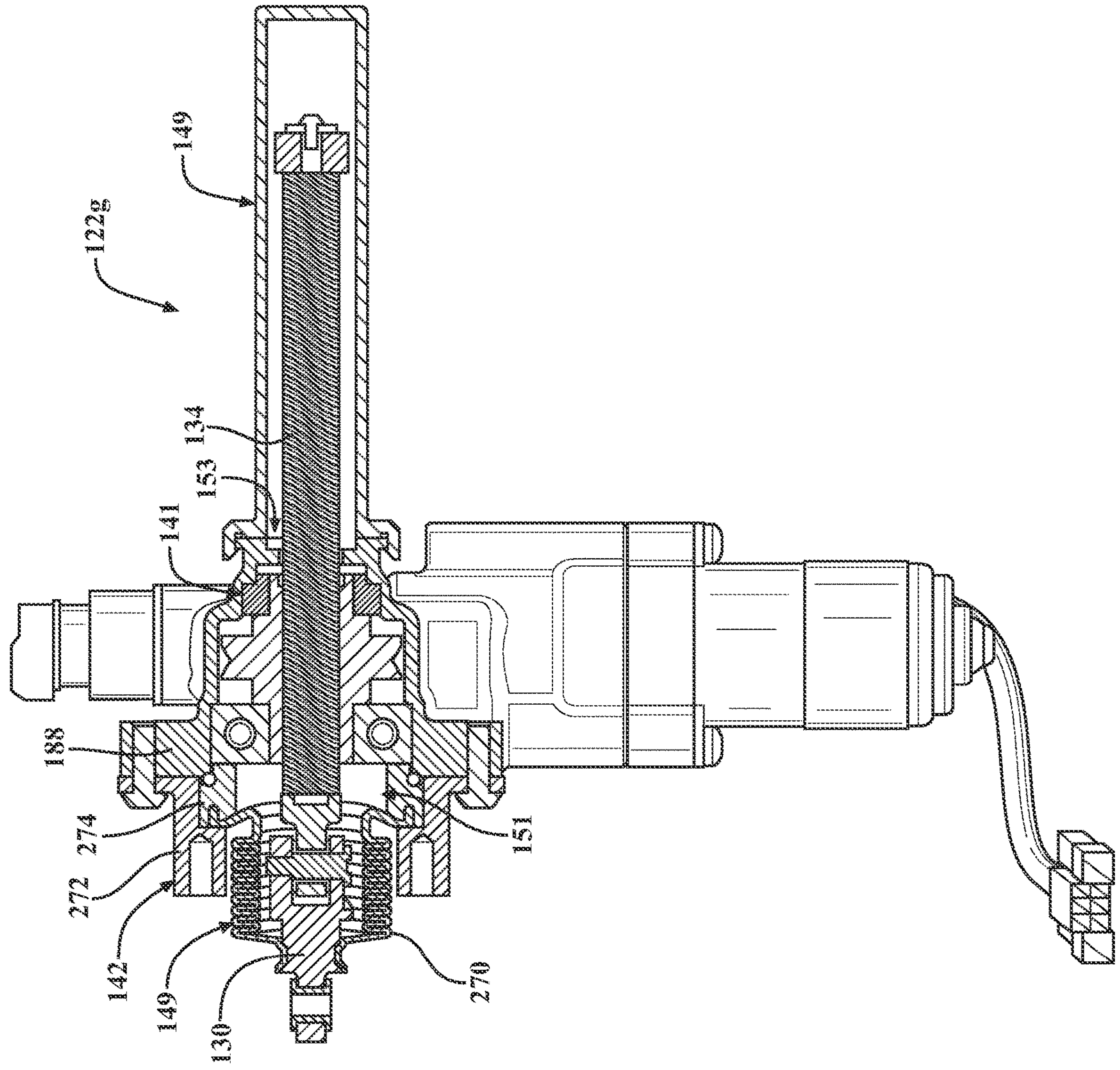
FIG. 19 illustrates a cut-away perspective view of an eighth powered actuator according to aspects of the disclosure.

FIG. 19 shows an eighth powered actuator 122*g* according to aspects of the disclosure. The eighth powered actuator 122*g* may be similar or identical to other powered actuators disclosed herein, but with some additional protective equipment. Specifically, a boot 270 is configured to cover the extensible member 134 and to move with the extensible member 134 as it extends out of the adapter 142. The boot 270 may have a tubular and ribbed construction, similar to a covering of a shock absorber, to prevent contaminants from contacting the extensible member 134. The boot 270 may also prevent wires or other items from being caught in the extensible member 134 as it extends or retracts from the adapter 142. One end of the boot 270 (for example an outer end) is fixed to the link bar 130, and the other end of the boot 270 (for example an inner end) is fixed to the adapter 142. In some embodiments, and as shown in FIG. 19, the adapter 142 is a two-piece design, including an outer member 272 receiving and surrounding an inner member 274, with the boot 270 (in particular the inner end) sandwiched therebetween. As the extensible member 134 extends outward from the adapter 142, the boot 270 will lengthen and extend away from the adapter 142. The inner and outer members 272, 274 may be held together by the screws or bolts that hold the adapter 142 to the gearbox housing 188.

Figure 20:
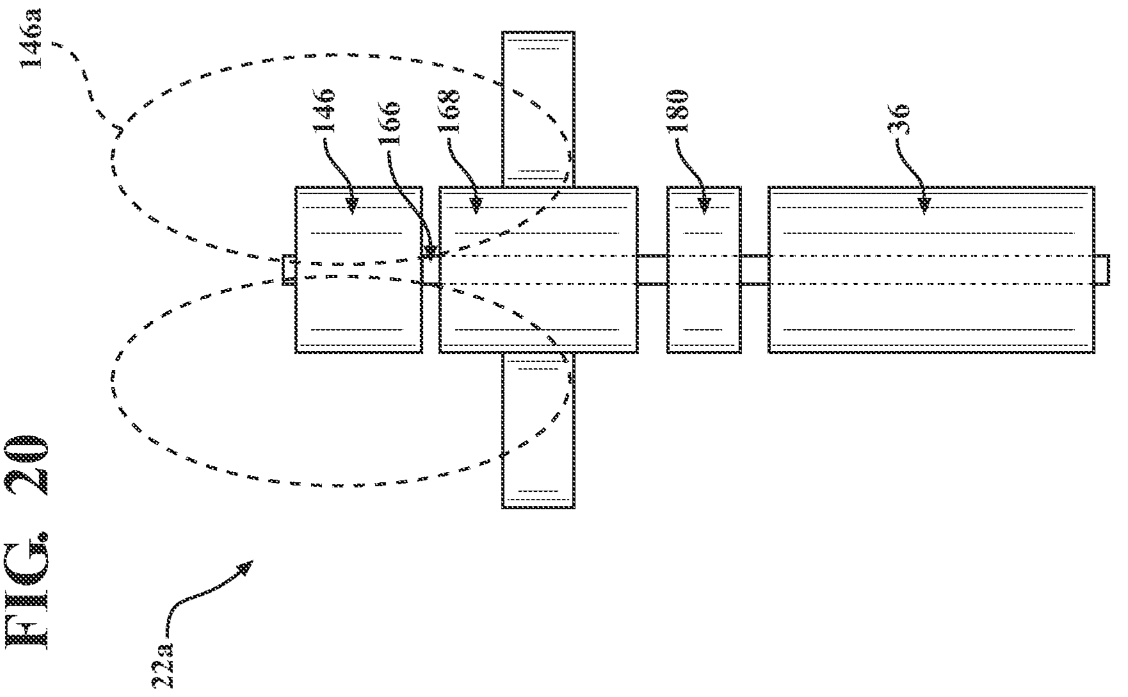
FIG. 20 illustrates a schematic diagram of components within a powered actuator in a first configuration according to aspects of the disclosure.

FIG. 20 illustrates a schematic block diagram of components within a powered actuator having a first configuration 22*a* according to aspects of the disclosure. Specifically, FIG. 20 shows the magnet wheel 180 being spaced apart from the EM brake 146 by a direct drive coupling (e.g. the worm gear 168), thus reducing or eliminating electromagnetic interference (i.e. the EM Brake Field 146*a*) from interfering with the high-resolution position sensor. More specifically, the first configuration 22*a* includes the EM brake 146, the direct drive coupling (168), the magnet wheel 180, and the electric motor 36 are all disposed along the driven shaft 166 in that given order.

Figure 21:
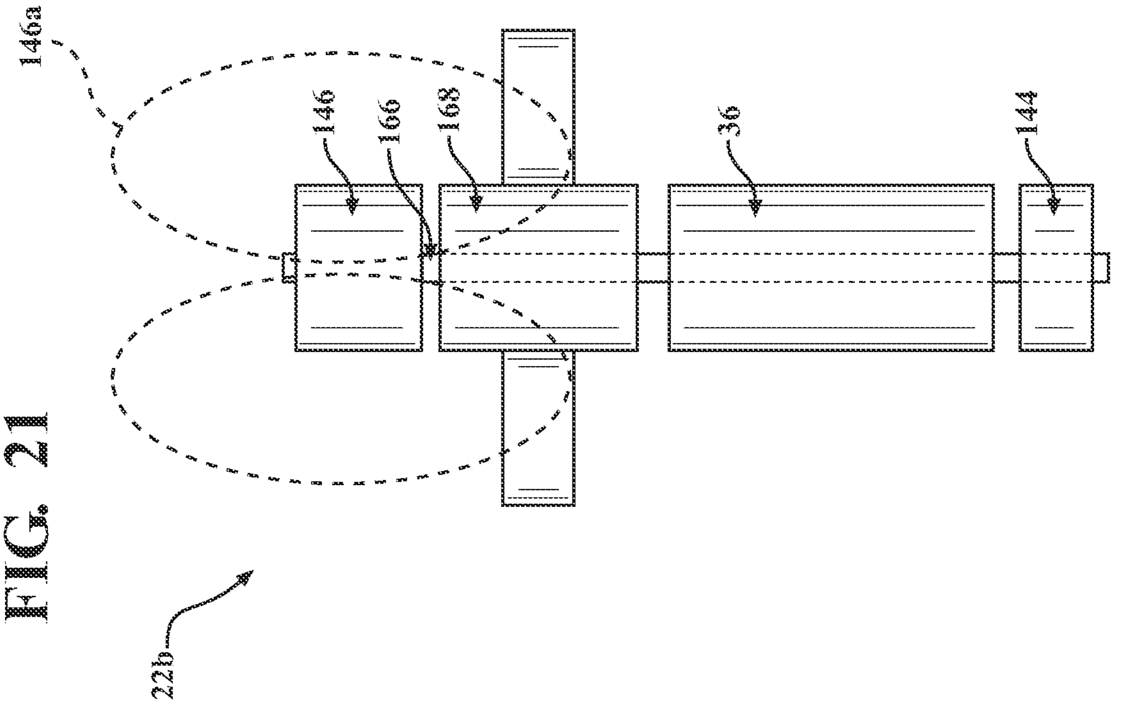
FIG. 21 illustrates a schematic diagram of components within a powered actuator in a second configuration according to aspects of the disclosure.

FIG. 21 illustrates a schematic block diagram of components within a powered actuator having a second configuration 22*b* according to aspects of the disclosure. Specifically, FIG. 21 shows the magnet wheel 180 being spaced apart from the EM brake 146 by the electric motor 36 and the direct drive coupling (e.g. the worm gear 168), thus reducing or eliminating electromagnetic interference from interfering with the high-resolution position sensor. More specifically, the second configuration 22*b* includes the EM brake 146, the direct drive coupling (worm gear 168), the electric motor 36, and the magnet wheel 180 all disposed along the driven shaft 166 in that given order.

In each of the above configurations 22*a* and 22*b*, the magnet wheel 180 is disposed outside of the electromagnetic field of the EM brake 146. In each of the above cases, the worm gear 168 is disposed adjacent the EM brake 146 and overlaps with the magnetic field of the EM brake 146. The worm gear 168 is generally not susceptible to interference caused by the EM brake 146.

Figure 22:
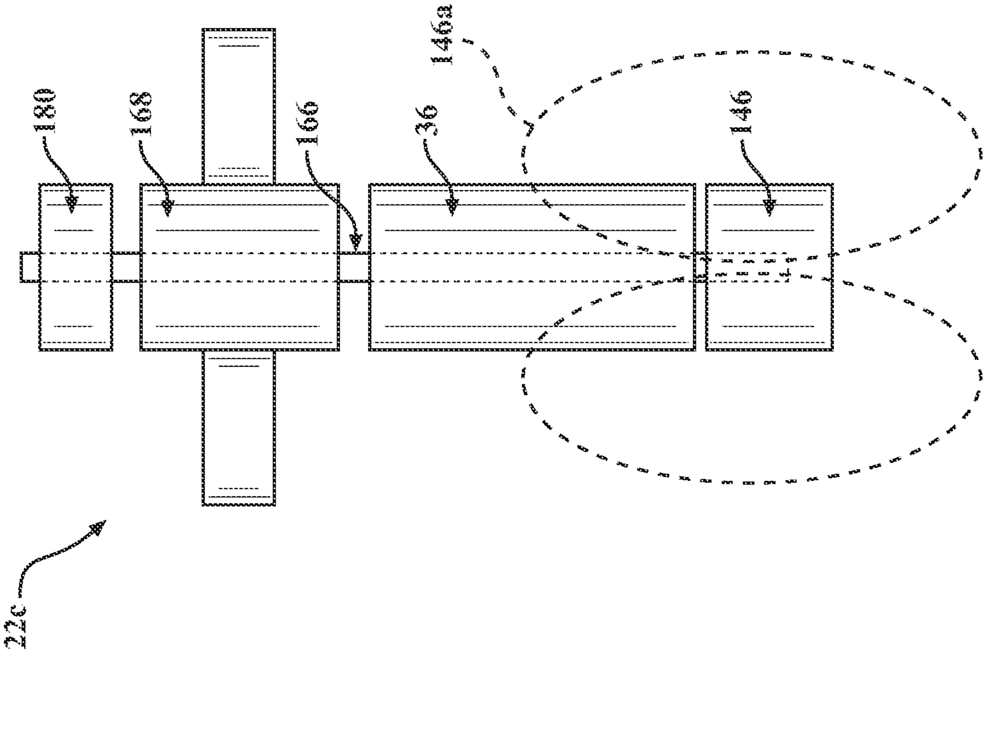
FIG. 22 illustrates a schematic diagram of components within a powered actuator in a third configuration according to aspects of the disclosure.

FIG. 22 illustrates a schematic block diagram of components within a powered actuator having a third configuration 22*c* according to aspects of the disclosure. Specifically, FIG. 22 shows the magnet wheel 180 being spaced apart from the EM brake 146 by the electric motor 36 and the direct drive coupling (e.g. the worm gear 168), thus reducing or eliminating electromagnetic interference from interfering with the high-resolution position sensor. More specifically, the third configuration 22*c* includes the magnet wheel 180, the direct drive coupling (168), the electric motor 36, and the EM brake 146 all disposed along the driven shaft 166 in that given order.

Figure 23:
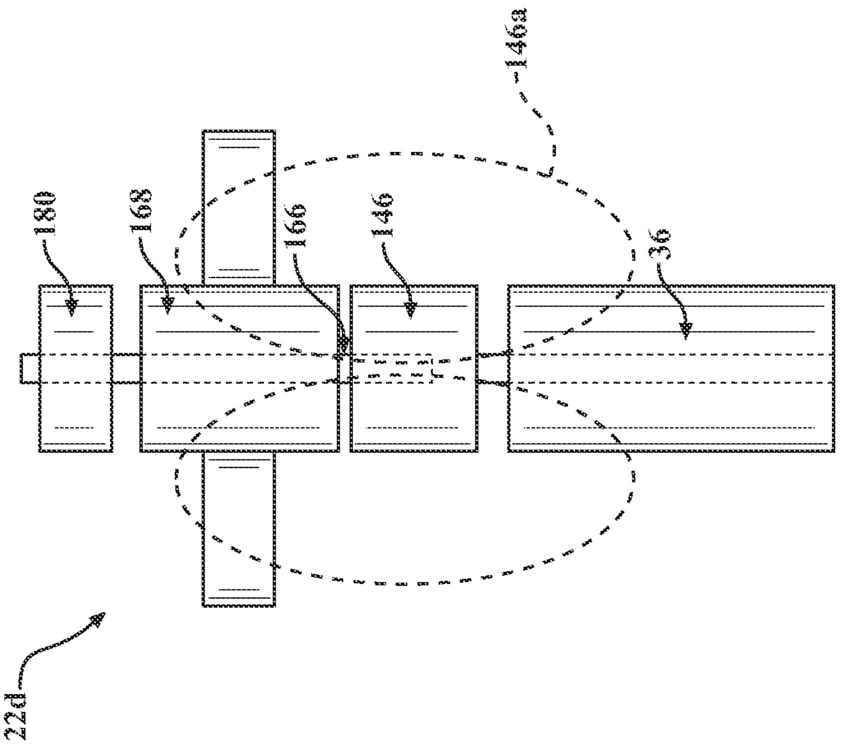
FIG. 23 illustrates a schematic diagram of components within a powered actuator in a fourth configuration according to aspects of the disclosure.

FIG. 23 illustrates a schematic block diagram of components within a powered actuator in a fourth configuration 22*d* according to aspects of the disclosure. Specifically, FIG. 23 shows the magnet wheel 180 being spaced apart from the EM brake 146 by the direct drive coupling (e.g. the worm gear 168), thus reducing or eliminating electromagnetic interference from interfering with the high-resolution position sensor. More specifically, the fourth configuration 22*d* includes the magnet wheel 180, the direct drive coupling (168), the EM brake 146, and the electric motor 36 all disposed along the driven shaft 166 in that given order.

In each of the above configurations 22*c* and 22*d*, the motor 36 is partially disposed within the magnetic field of the EM brake 146. The magnet wheel 180, similar to configurations 22*a* and 22*b*, is disposed outside of the magnetic field of the EM brake 146. In each of configurations 22*c* and 22*d*, the magnet wheel is shown adjacent the worm gear 168, and the EM brake 146 is adjacent the motor 36.

It will be appreciated that the configurations 22*a-d* include a variety of similarities and differences shared among two or more configurations. However, in each configuration, the magnet wheel 180 is positioned relative to the EM brake 146, based on the stackup of components, such that the magnet wheel 180 is outside of the magnetic field of the EM brake 146. The amount of spacing may vary depending on the stackup of components, as shown in FIGS. 20-23.

In another aspect, an electromagnetic shield, in the form of a cover or coating, may be applied between or on the magnet wheel 180 and the EM brake 146 to block the magnetic field of the EM brake 146 and reduce potential interference.

Figure 24:
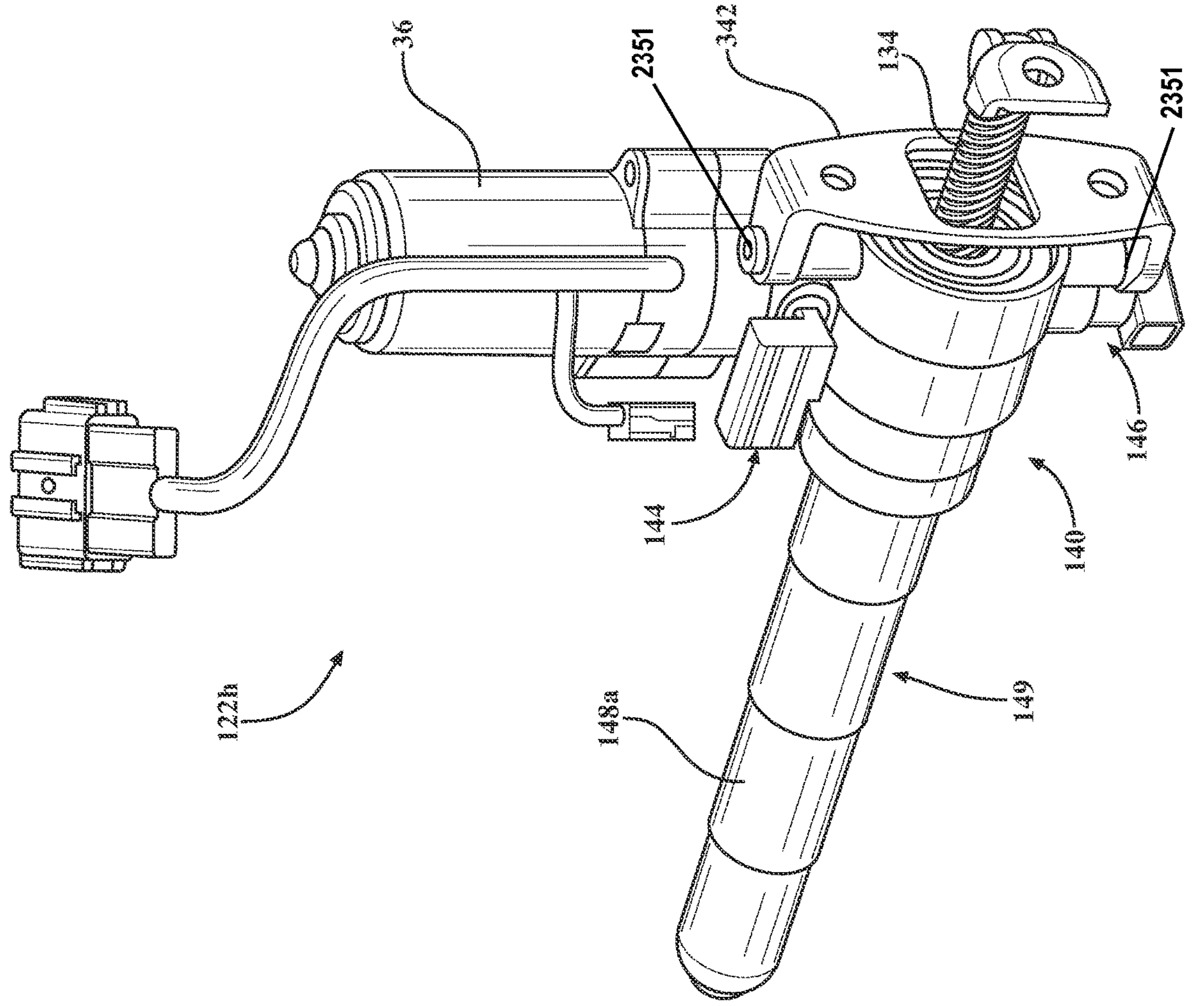
FIG. 24 illustrates a perspective view of a ninth powered actuator according to aspects of the disclosure.
Figure 25B:
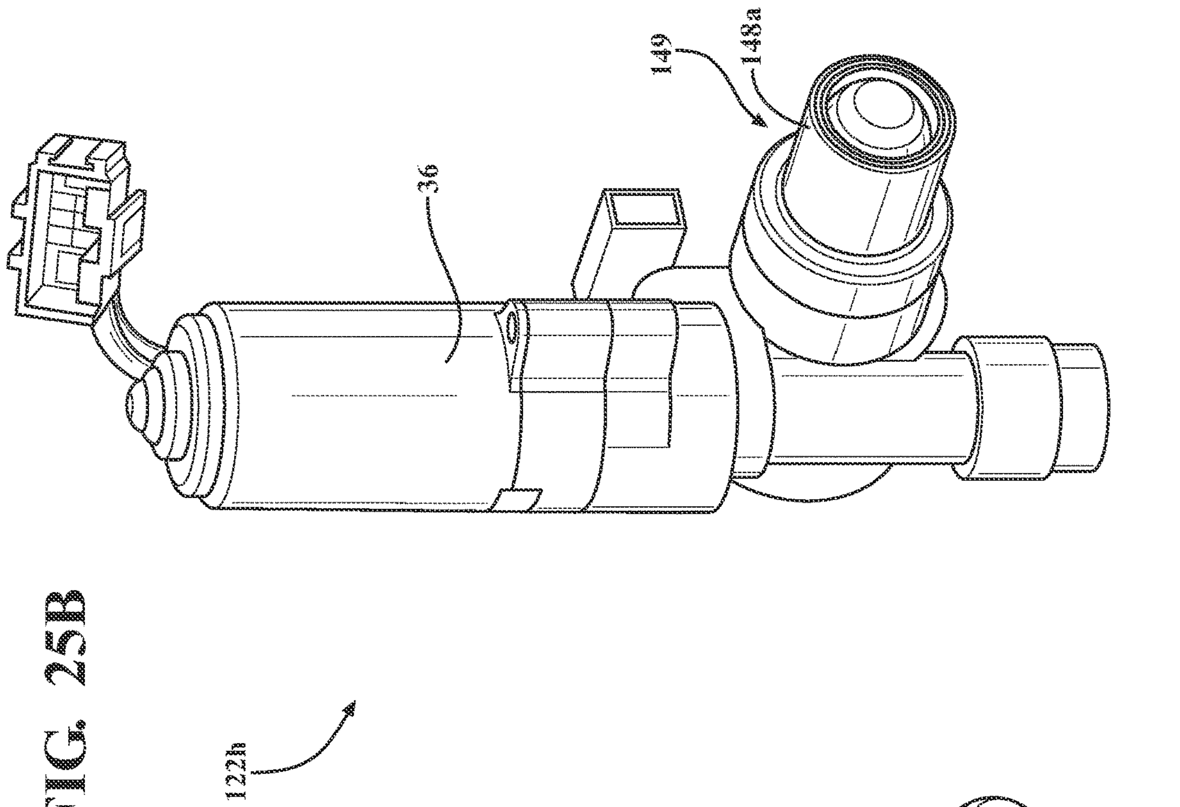
FIG. 25B illustrates a perspective view of the ninth powered actuator with the telescoping boot in a compressed state according to aspects of the disclosure.
Figure 25A:
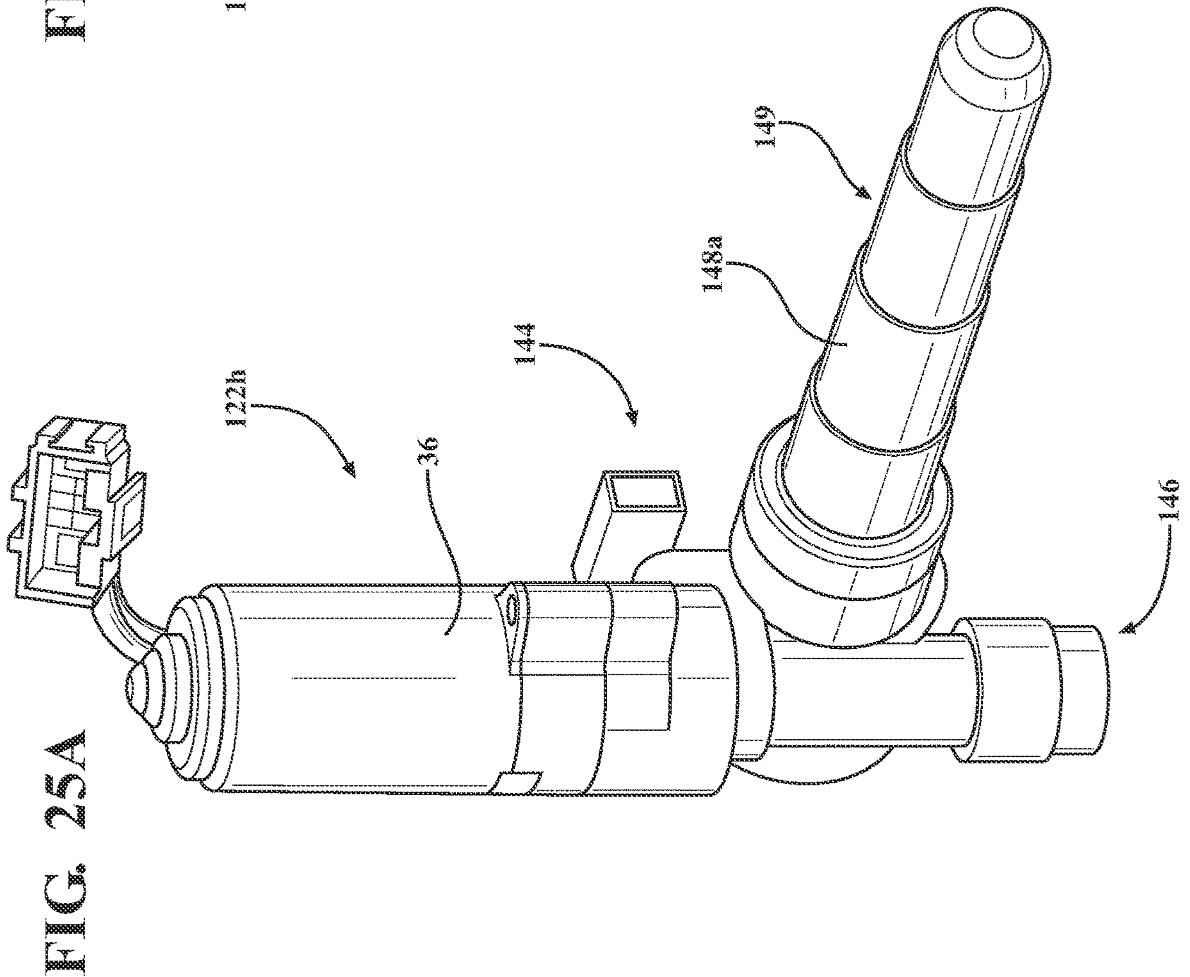
FIG. 25A illustrates a perspective view of the ninth powered actuator with a telescoping boot in an expanded state according to aspects of the disclosure.

FIGS. 24 and 25A-25B illustrate a ninth powered actuator 122*h* according to aspects of the disclosure. Specifically, the ninth powered actuator includes a retractable dust shield 148*a* enclosing the extensible member 134. The retractable dust shield 148*a* has a telescopic design including a plurality of tubular segments configured to move between an expanded state shown in FIG. 25A and a compressed state shown in FIG. 25B. FIG. 24 further illustrates motor 36, high resolution position sensor 144 for haptic control, EM brake 146, gearbox 140, etc.

FIG. 24 generally corresponds to FIG. 25A, wherein the extensible member 134 or leadscrew is in a retracted position in a door closed state, similar to the position shown in FIGS. 19, 12A, and 13A. FIG. 25B illustrates an extended position of the extensible member 134 in a door open state. Thus, the telescoping dust shield 148*a* is compressed retracted when the extensible member 134 is extended, and the dust shield 148*a* is extended when the extensible member is retracted. The overall length of the telescoping dust shield 148*a* changes in response to shifting of the extensible member 134.

FIG. 24 illustrates further aspects of the disclosure. FIG. 24 further illustrates a door adapter bracket 342 configured to allow for easy adaptation to various environments. The bracket 342 is operable to eliminate or substantially reduce moment variations due to a linkage between the vehicle body (or closure body) and the end of the extensible member 134 (for example a leadscrew). This arrangement provides enhanced haptic/servo control response. For example, the moment arm generally does not vary at different door positions. Accordingly, a linkage need not be accommodated, and the actuator 122*h* may be brought closer towards the shut face of the closure 12 (or vehicle body 14), thereby improving assembly requirements and reducing the space occupied within the door cavity (or vehicle body cavity). The motor 36, magnet ring 180, EM brake 145, etc. described above, as well as other components described above, may be used in the actuator 122*h*, similar to the previously described actuators.

Figure 26:
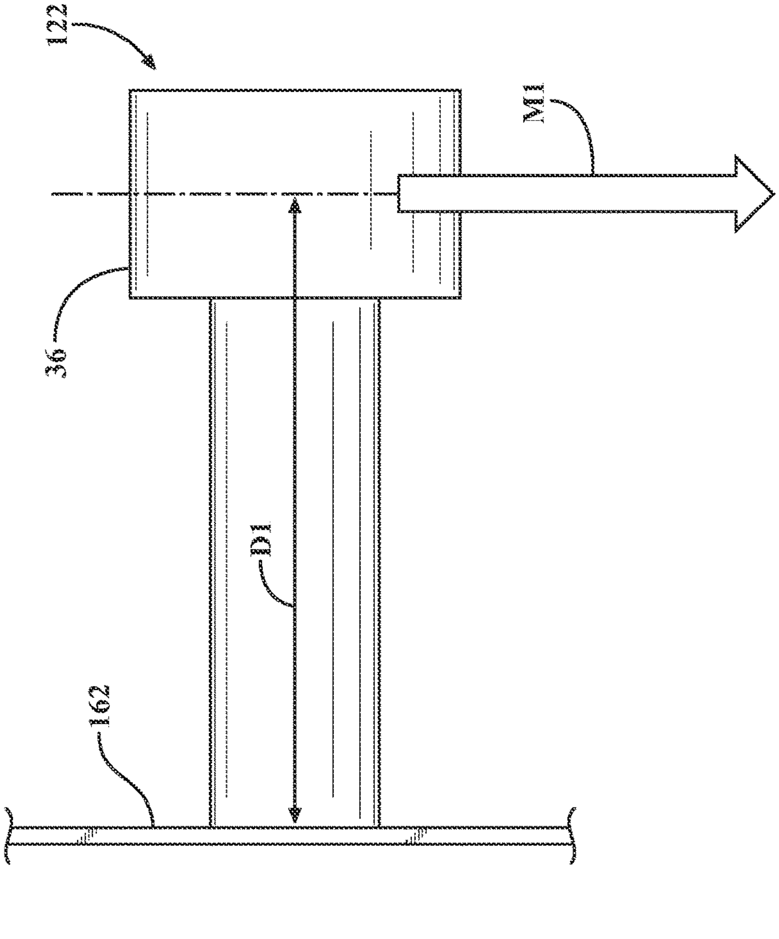
FIG. 26 illustrates a schematic diagram of components within a powered actuator of the prior art.

FIG. 26 illustrates a schematic diagram of components of a powered actuator 122, where the motor 36 is disposed further from the shut face 162 a distance D1, such as for actuators having a linkage. As illustrated in FIG. 26, there is distance D1 between the motor 36 and the shut face 162. Due to the distance, a relatively large amount of loading (M1) may arise on the sheet metal of the shut face 162 due to the weight of the actuator (in particular the center of mass) distal from the mounting point of the actuator 122 to the sheet metal of the shut face 162.

Figure 27:
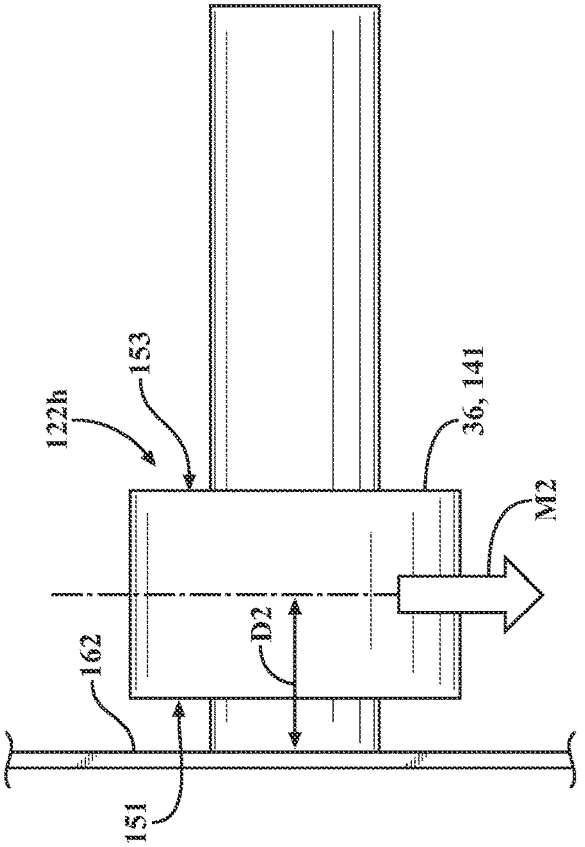
FIG. 27 illustrates a schematic diagram of components within a powered actuator according to aspects of the disclosure.

FIG. 27 illustrates a schematic diagram of components of an improved powered actuator according to aspects of the disclosure, such as actuator 122*h* described above. Specifically, FIG. 27 illustrates the powered actuator 122*h* of the present disclosure that moves weight, in particular the center of mass, (e.g. the motor 36 and other components attached thereto, such as gearbox housing 141) closer to the mounting point of the actuator 122*h* (distance D2) to the shut face 162. The powered actuator design according to an aspect of the present disclosure may, therefore, reduce loads on mounting points and surrounding sheet metal of the shut face. The actuator 122*h* may operate without a linkage, thereby allowing the motor 36 to be moved closer to the shut face 162 and reduce the load (M2) on the sheet metal.

Both FIGS. 26 and 27 combine to illustrate how aperture 151 and 153 on each side of gearbox housing 141 are closer to the shut face 162 in FIG. 27. The extensible member 134 shifts relative to gearbox housing in and out of apertures 151 and 153. It will be appreciated that the illustrations of FIGS. 26 and 27 are schematic and intended to illustrate the reduced spacing and loading resulting from the arrangement of FIG. 27.

Figure 28:
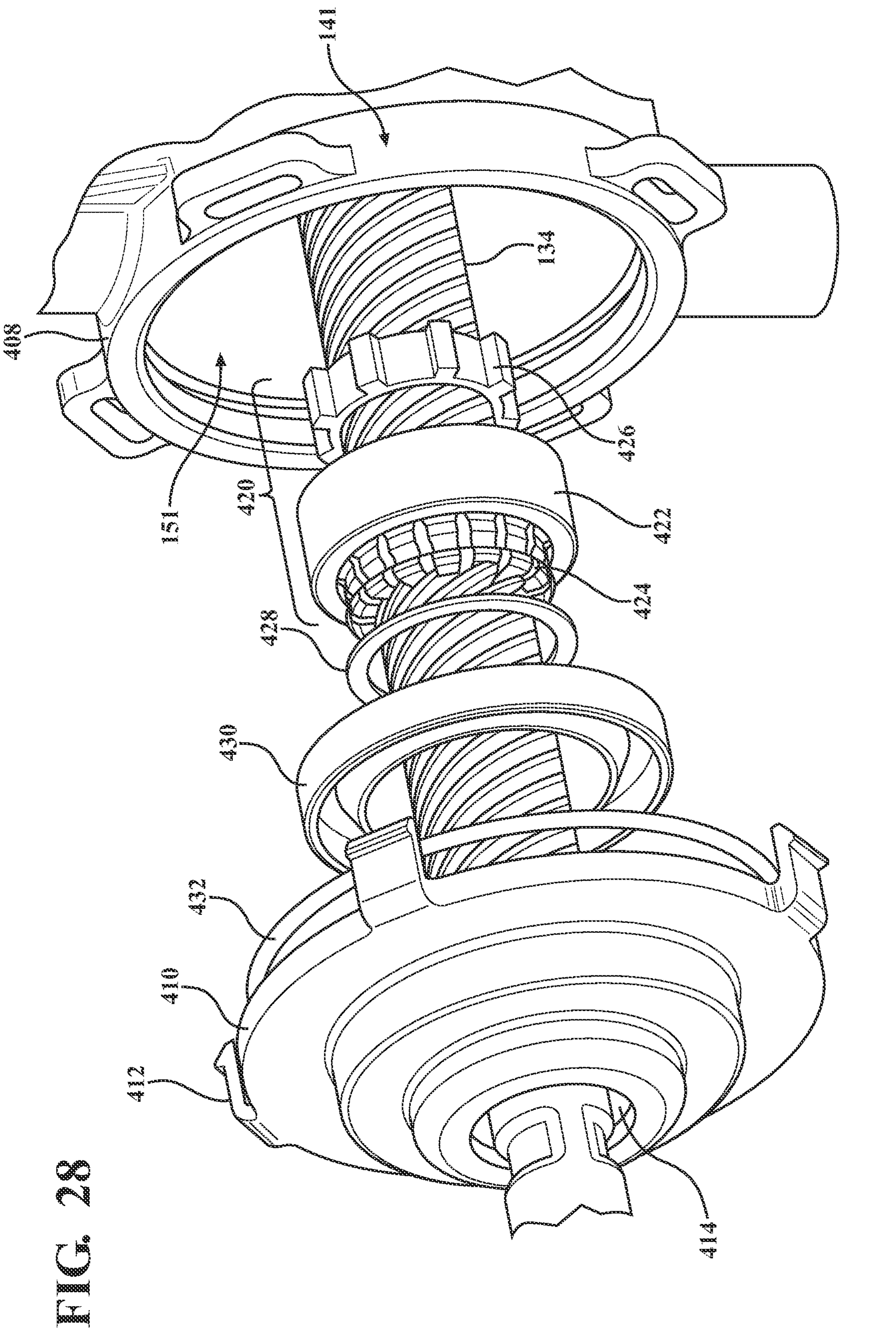
FIG. 28 illustrates an exploded perspective view of a scraper assembly and sealing arrangement for use with a powered actuator according to aspects of the disclosure.

FIG. 28 illustrates another power actuator 122*i* in accordance with an aspect of the disclosure. In this aspect, the side of the power actuator 122*i* that includes the exposed portion of the extensible member 134 (in the form of a leadscrew), for example when the extensible member 134 has been actuated and extended, may include a sealing arrangement to prevent fouling of the extensible member 134 due to debris, water, or the like.

As shown in the exploded perspective view of FIG. 28, power actuator 122*i* may include an outer housing 408 (which may be the adapter 142, gearbox 140, or other housing structure where the extensible member 134 extends from when actuated) and may further include a cover 410. The cover 410 is sized and arranged to selectively mount to and couple with an actuator housing 408. In one aspect, the cover 410 may include a plurality of projecting snap-fit tabs 412 sized and arranged to be received in corresponding receptacles formed on the housing 408. As shown, there are four tabs 412 equally spaced circumferentially around the circular shaped cover 410. It will be appreciated that other spacing and quantities may be used. Similarly, other securing arrangements may be used to secure the cover 410 to the adapter 142. The cover 410 may define an opening 414 through which the extensible member 134 may project when it moves axially.

Inside of the cover 410 are a plurality of sealing and scraping implements for blocking and/or removing debris, and for further limiting ingress of water, dust, or other microparticles.

Figure 31:
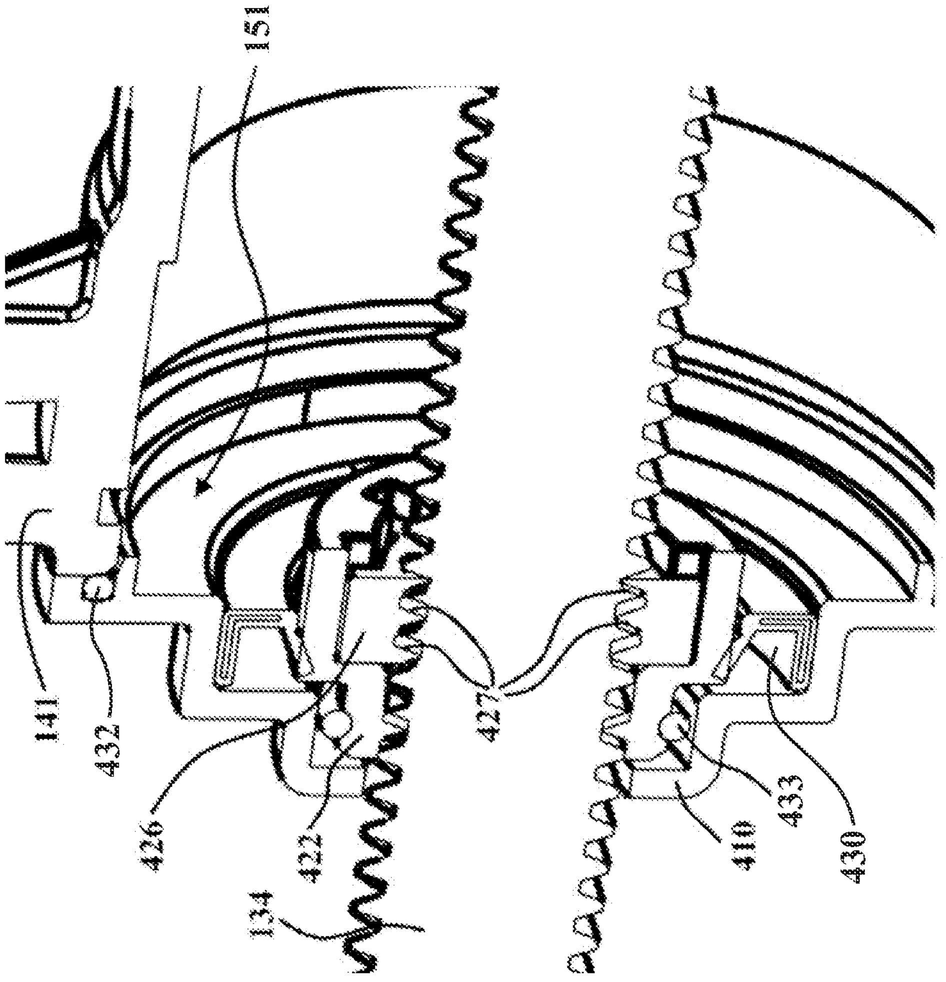
FIG. 31 is cut-away perspective view the showing the scraper in an assembled configuration with the gearbox housing and the scraper seal member in a sealing and/or scrapping engagement with the lead screw, according to aspects of the disclosure.
Figure 32:
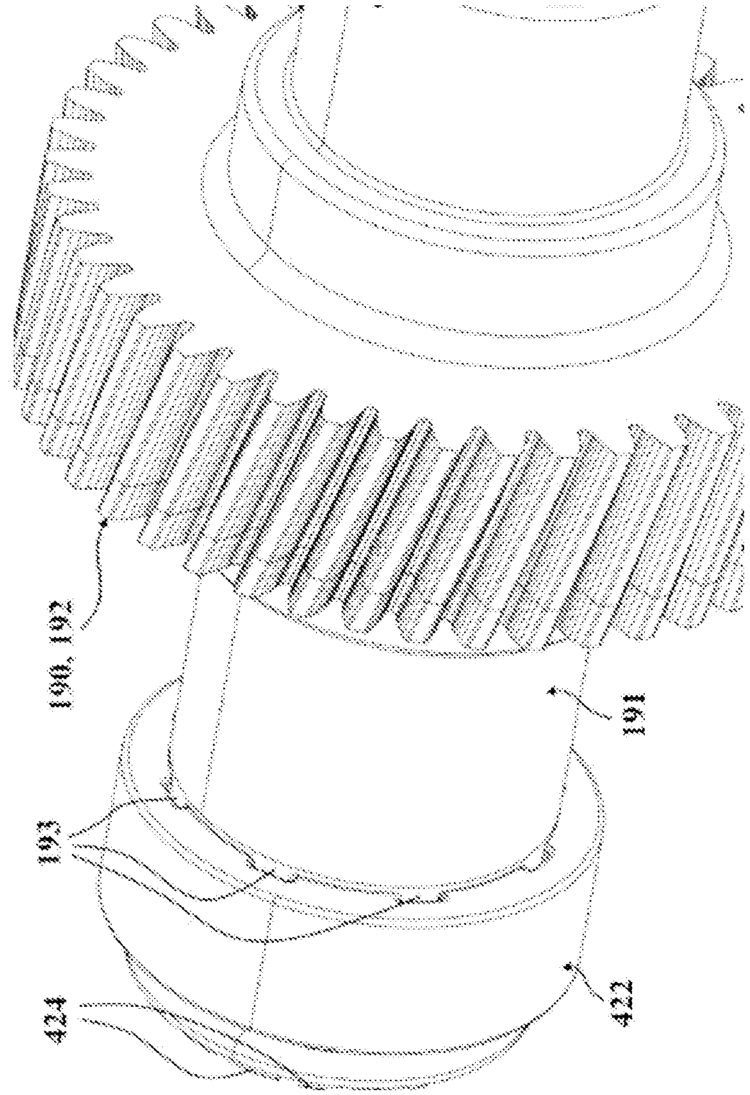
FIG. 32 is a perspective via of a coupling between the scraper assembly and a nut of the powered actuator, according to aspects of the disclosure.

In one aspect, a scraper assembly 420 is provided and disposed inside of the cover 410. The scraper assembly 420 may include a scraper housing 422. The scraper housing 422 may have a generally cylindrical shape and may be fixed for rotation with lead nut 190, for example via a hollow cylindrical coupling 191 for example connecting the scraper housing 422 with the lead nut 190 as seen in FIG. 32. Accordingly, as the lead nut 190 rotates, the scraper housing 422 also rotates. Rotation of the scraper housing 422 occurs while the extensible member 134 translates linearly, such that the threads of the lead screw 134 pass through the scraper housing 422, without the threads being caused to lock in engagement with the scraper housing 420 in a configuration where the scraper assembly 420 is not configured to rotate, either independently, or dependently such as by a coupling with the lead nut 190 as shown in FIG. 32. Coupling 191 may engage with the scraper housing 422 or lead nut 190 (not shown) via a series of teeth 193 received within apertures formed in the scraper housing 422 or nut 190. A scraper tooth 424 is fixed to the scraper housing 422. In one aspect, the scraper tooth may be integrally formed with the housing 422. The scraper tooth 424 is sized and arranged to fit within the thread profile of the extensible member 134, as shown in the cross-section of FIG. 31. As the leadscrew is drawn back into the actuator **122*i*, debris or other matter disposed within the grooves of the threads of the leadscrew will be blocked by the scraper tooth 424 such that the debris does not continue into the actuator 122*i* along with the extensible member 134**.

Figure 30:
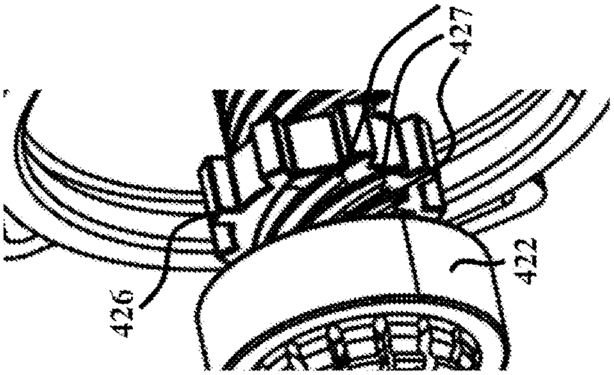
FIG. 30 is a close up partial view of the scraper assembly of FIG. 28 illustrative the grooved inner surface of the scraper seal member for mating in a sealing and/or scrapping engagement with the lead screw, according to aspects of the disclosure.
Figure 29:
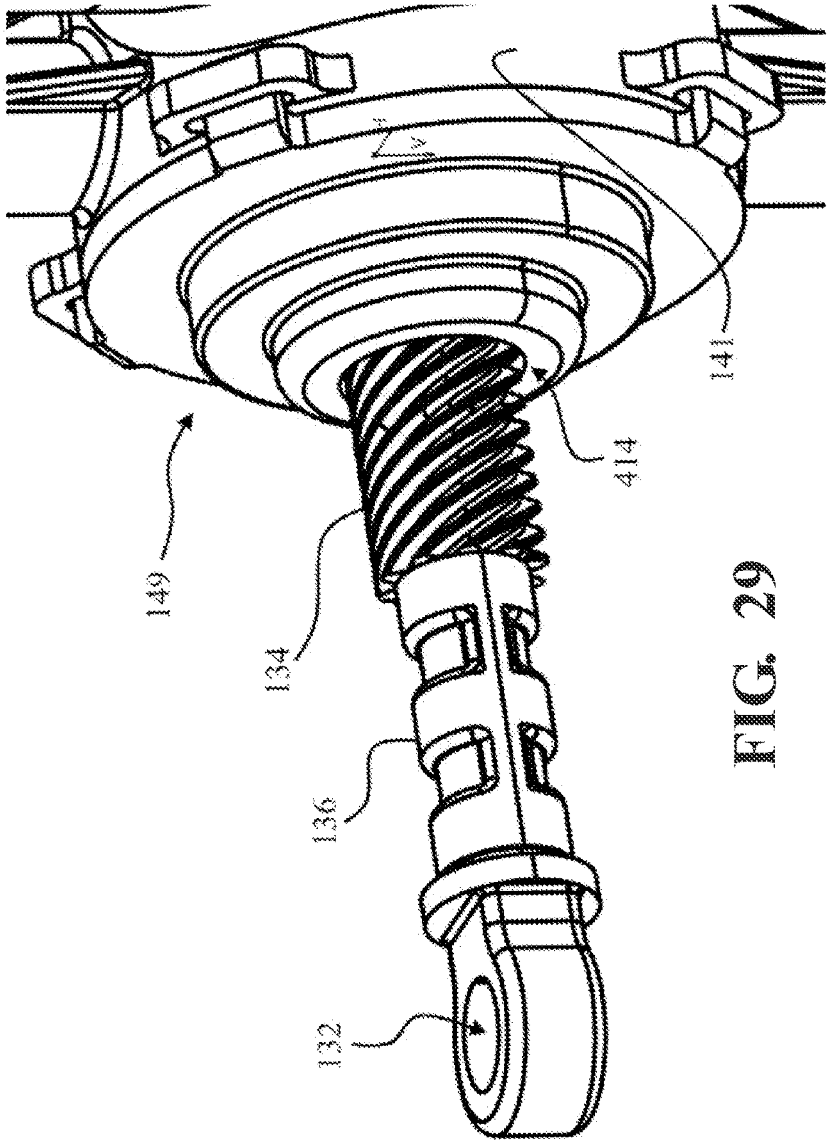
FIG. 29 is a partial perspective view showing the scraper assembly in an assembled configuration with the gearbox housing, according to aspects of the disclosure.

The scraper tooth 424 has a generally annular or ring-shape corresponding to the shape of the scraper housing 422. A scraper seal member 426 is disposed inside of the scraper housing 422. The seal member 426 has an annular shape and may be fixed for rotation with the scraper housing 422, such that it rotates with the scraper housing 422. Scraper seal member 426 includes a threaded inner surface 427 for mating with the threads of lead screw 134, as shown in more detail in FIG. 30 and FIG. 31.

A first compression ring 428, having a first diameter, is disposed adjacent the scraper assembly 420. A second compression ring 430, having a second diameter greater than the first diameter, is disposed radially between the cover 410 and the scraper assembly 420 (as shown in FIG. 31). An O-ring seal member 432, having a third diameter greater than the first and second diameter, is disposed axially between the cover 410 and the gearbox housing 141, as shown in FIG. 31. Another O-ring seal member 433 is disposed radially between the scraper housing 422 and the cover 410, as shown in FIG. 31.

As shown in FIG. 31, the cover 410 may have a stepped cross-sectional profile, and the scraper housing 422 (having scraper tooth 424) may have a similar stepped shape to fit within the cover 410. The O-ring 433 can fit radially between the respective stepped portions of the cover 410 and the scraper housing 422. The second compression ring 430 is shown in FIG. 31 and is disposed axially inward relative to the O-ring 433 and is disposed radially between the scraper housing 422 and another stepped portion of the cover 410.

Given the above O-rings and compression rings, and seal members, the scraper assembly 420 is therefore sealed against the cover 410. The cover 410 is sealed against gearbox housing 141. And the extensible member 134 is sealed against the scraper assembly 420. Accordingly, the extensible member 134 is sealed relative to the gearbox housing via the scraper assembly 420 and the cover 410.

Thus, when the cover 410 is secured to the adapter, the O-ring seal member 432 will be compressed therebetween to provide a sealing function. The cover 410 still includes hole or opening 414 for allowing the extensible member 134 to project outwardly therefrom. Accordingly, debris may enter the inside of the cover 410. However, when assembled, the scraper assembly 420 is disposed near the opening 414. Of course, when the extensible member 134 is extended and exposed outwardly from the cover 410, debris may accumulate on its surface. The debris is scraped and blocked during retraction of the leadscrew by the scraper assembly 420, which also seals the interior of the actuator **122*i*** as described above.

There is therefore illustratively shown herein a powered actuator for a closure of a vehicle including an electric motor 136 configured to rotate a driven shaft 166, an extensible member 134, such as a lead screw configured to be coupled to one of a body 14 or the closure 12 of the vehicle for opening or closing the closure 12, a gearbox 140 comprising a gearbox housing 141, the gearbox 140 configured to apply a force to the extensible member 134 for causing the extensible member 134 to move linearly in response to rotation of the driven shaft 166, and at least one sealing assembly 149 configured to seal the gear box housing 141 as the extensible member translates linearly.

The gearbox housing 141 may include at least one aperture for allowing the extensible member to pass through as the extensible member translates linearly. The at least one aperture may include a first aperture 151 facing the shut face 162 of the closure 12 and a second aperture 153 facing an inner cavity 39 of the closure 12 such that the extensible member 134 passes through both the first aperture 151 and the second aperture 153 as the extensible member 134 translates linearly within the housing 141. One of the at least one sealing assembly 149 may be associated with the first aperture 151 (see FIGS. 19 and 28 for example) and another one of the at least one sealing assembly is associated with the second aperture 153 (see FIG. 25A and FIG. 25B for example). The at least one sealing assembly 149 associated with the first aperture 151 may be configured to abut against the extensible member 134 to allow the extensible member to translate linearly through the at least one sealing assembly (see FIG. 28), while also provided a seal between the extensible member 134 and the housing 141. Therefore the extensible member 134 may leave the interior sealed space of the housing 141 such that part of the extensible member 134 may be exposed to the external environment upon extension of the extensible member 134, as shown in FIG. 24 for example. The at least one sealing assembly associated with the first aperture may be configured as the scraper assembly 420 configured to remove debris from the extensible member as the extensible member translates linearly from the extended position to the retracted position. Therefore any debris, dust, dirt and the like deposited on the part of the extensible member 134 exposed to the external environment when the extensible member 134 is in the extended position may be prevented from entering into the internal cavity of the housing 141 when the extensible member 134 is retracted. Because the extensible member 134 is configured for reciprocation relative to the gear box housing 141 as provided for by apertures 151, 153 disposed on opposite sides of the housing 141 such that portions of the extensible member 134 extending beyond the apertures 151, 153 would be exposed to the external environment (for example, the lead screw 134 is not completely encompassed by a housing, such as two overlapping tubes which remain in overlapping sealing configuration when extended or retracted relative to each other such that the lead screw never extends outside the encompassment of the tubes) but for either the least one sealing assembly 149 as a cover preventing the contact of debris, dirt, or like contaminating particles from entering into contact with the extensible member 134 when the extensible member 134 is extending beyond the apertures 151, 153, or the least one sealing assembly 149 as a wiper or scrapper configuration removing debris, dirt, or like contaminating particles by abutting contact (e.g. in abutment) having entered into contact with the extensible member 134. Scraper assembly 420 may also be associated with the second aperture 153 in a similar manner. The another one of the at least one sealing assembly associated with the second aperture 153 may be configured to extend and retract with the extensible member 134 as the extensible member 134 translates linearly through the second aperture 153. The another one of the at least one sealing assembly associated with the second aperture 153 may be configured as a cover 148, such as a boot, configured to encompass of fully expose the extensible member 134 as the extensible member translates linearly through the second aperture 153. The another one of the at least one sealing assembly associated with the second aperture 153 may be an expandable/collapsible cover 148 or boot configured to encompass the extensible member as the extensible member translates linearly through the second aperture 153, and the gearbox 140 may include a lead nut 190, 192 rotatable in response to rotation by the driven shaft 166, and the extensible member 134 may include a leadscrew configured to move axially in response to rotation of the lead nut 190. The powered actuator may further be configured with an adapter 142, 342 configured to mount the gearbox 140 to a shut face 162 of the closure 12. The powered actuator may further include a high-resolution position sensor 144 coupled to the driven shaft 166 and configured to detect a positon of the driven shaft 166 and transmit the position to a servo controller, such as actuator controller 50.

Figure 33:
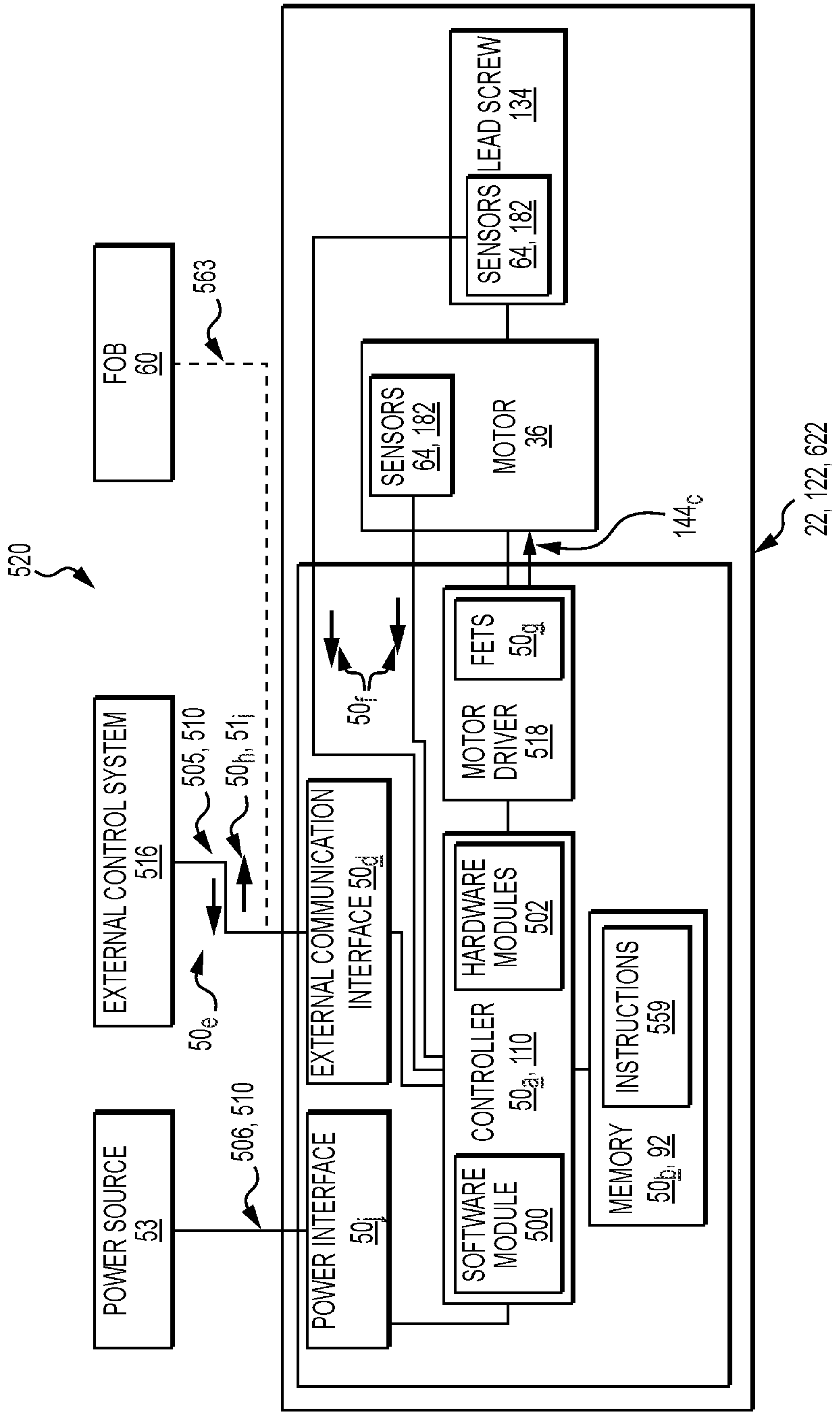
FIG. 33 is a block diagram of a controller circuit for an electronic motor assembly, according to aspects of the disclosure.

A power closure member actuation system or servo actuation system 520 shown in FIG. 33 includes the actuator controller 50 configured as a master controller and configured to issue one or more actuations signals $\mathbf{50}_c$ to actuate the motor 36 based on command control signals 508 (or also denoted as command signals $\mathbf{50}_e$) received via the electrical connection(s) 510 in order to move the closure member 12 between the open position and the closed position. As such, the electrical connection(s) 510 would be used to supply a generic indication of an open or close command 508, as an example, issued from a vehicle control system 516, such as the BCM 52 (e.g., inputs 54, 56), or directly from an open/close switch (e.g. the key fob 60 over wireless link 563, an exterior closure panel handle, an interior closure panel handle, a smart latch 83, a latch controller, etc.) for receipt by the actuator controller 50 acting as the master controller. The command 508, such as an open or close command, would not be directly transmitted by the actuator controller 50 to the motor 36, rather the actuator controller 50 would be responsible for processing the open/close command 508 and then generating additional actuation signals $\mathbf{50}_c$ for direct consumption by the motor 36. In terms of master controller functionality, the actuator controller 50 operating as the master controller would be responsible for implementing control logic stored in a physical memory $\mathbf{50}_b$, 92 for execution by a data processor, such as processor $\mathbf{50}_a$, to generate the actuation signals $\mathbf{50}_c$ (e.g. in the form of a pulse width modulated voltage for turning on and turning off motor 36 and controlling its direction and speed of output rotation of the lead screw 134, in accordance with an illustrative example) to power the motor 36 in order to control its operation. As illustrated in FIG. 33, the actuator controller 50 is electrically coupled a motor driver 518 including field-effect transistors (FETSs) $\mathbf{50}_g$ which are appropriately controlled (switched on/off) by the actuator controller 50 to generate the actuation signals $\mathbf{50}_c$. Circumstances surrounding the control of the motor 36 could include receiving sensor signals (via electronic components 64, 182 as sensors—e.g. position sensors, direction sensors, obstacle sensors, etc.) by the master controller as the actuator controller 50, processing those sensor signals, and adjusting operation of the motor 36 accordingly via new and/or modified actuation signals $\mathbf{50}_c$ (e.g. adjust the period of PWM based actuation signals $\mathbf{50}_c$ in the configuration where the motor 36 is responsive to supplied PWM signals). In this example, the sensor signals $\mathbf{50}_f$ of sensors 64, 182 and the actuation signals 50 care generated and processed internally in the actuator housing 141, 184, 188, 206, 408, 422 by the actuator controller 50, in conjunction with the motor 36 also mounted within the actuator housing 141, 184, 188, 206, 408, 422. As such, signals 508 could represent generic open/close signals, or other commands, coming from the handle(s), or other control system etc., while the actual actuation signals $\mathbf{50}_c$ received by and consumed (i.e. processed) by the motor 36 would be generated by the actuator controller 50.

Still referring to FIG. 33, the integrated actuator controller 50 of the powered actuator 22, 122 and its interconnection with the various electronic components $\mathbf{50}_g$, 64, 182 is schematically represented. The actuator controller 50 can include a processor $\mathbf{50}_a$, 110 (e.g., a software module 500 or hardware modules 502 which may include a coprocessor or memory according to one embodiment) and a set of instructions 559 stored in the physical memory $\mathbf{50}_b$, 92 for execution by the processor $\mathbf{50}_a$, 110 to determine the actuation signals $\mathbf{50}_c$ (for example, actuation signals in the form of a pulse width modulated voltage for turning on and turning off motor 36 and controlling its direction of output rotation) to power the motor 36 to control its operation in a desired manner. The memory $\mathbf{50}_b$, 92 may include a random access memory ("RAM"), read-only memory ("ROM"), flash memory, or the like for storing the set of instructions 559, and may be provided internal the processor $\mathbf{50}_a$, 110 or externally provided as a memory chip mounted to a printed circuit board (PCB), discussed in more detail below, or both. The memory $\mathbf{50}_b$, 92 may also store an operating system for general management of the actuator controller 50. As such, the electrical components $\mathbf{50}_g$, 64, 182 with the PCB(s) can be considered an embodiment of the control circuitry provided by the actuator controller 50 which operate together to form at least one computing device for processing data by a processor (e.g. processor $\mathbf{50}_a$, 110) such as communication signals, command signals $\mathbf{50}_e$, sensor signals $\mathbf{50}_f$, feedback signals $50_h$ and executing code or instructions stored in a memory (e.g. memory $50_b$, 92) and outputting motor 36 control signals and for processing other communication/control signals and algorithms and methods in a manner as illustratively described herein.

As shown in FIG. 33, the actuator controller 50 can have a communication interface $50_d$ to receive any power and/or data/command signal(s)), such as receive control command signals $50_e$ from the electrical connection(s) 510 (issued by the remote/external control system 16) and in turn to control the operation of the motor 36 in response. The actuator controller 50 may optionally have a dedicated power interface $50_j$ connected through electrical power signal line 506 to the power source or battery 53. Likewise, communication interface $50_d$ may be configured to supply power and/or data/command signal(s)), such as subcommand signals $50_i$ to the electrical connection(s) 510 (for transmission to external systems 516 from the powered actuator 22, 122, when operating as a slave device). The communication interface $50_d$ may include one or more network connections adapted for communicating with other data processing systems (e.g., BCM 52, smart latch 83 in communication) over a vehicle network or bus via, and in the illustrative embodiment over the electrical connection(s) 510 which may form part of such as bus. For example, the communication interface $50_d$ may be connected to a Local Interconnect Network (LIN) or CAN bus or the like network protocol, over which command signals issued by the control system 16 over the vehicle network may be received and/or transmitted. As such, the communication interface $50_d$ may include suitable transmitters and receivers. Thus, the actuator controller 50 may be linked to other data processing systems by a communication network, which electrical connection(s) 510 may form part of. The communication interface $50_d$ may also be of a wireless configuration capable of sensing and transmitting communication signals wirelessly, for example using RF frequencies or the like, over wireless link 563. The input/output arrangements of the communication interface $50_d$ can be built into an I/O arrangement on the PCB(s) of the actuator controller 50 for integration within the actuator housing 141, 184, 188, 206, 408, 422. Optionally, it may be integrated into the microprocessor $50_a$.

Command signals $50_e$ received by the communication interface $50_d$ may include data related a generic or high level command to open the closure member 12 to a certain position; to hold the closure member 12 at this position; to fully open the closure member 12; to fully close the closure member 12; as but a list of non-limiting examples of commands. For example, a generic "CLOSE" command received by the communication interface $50_d$ could result in the actuation signal $50_c$ to drive the motor 36 at certain speeds (e.g. the actuator controller 50 may control the switching frequency of FETS $50_g$ to adjust the power allowed to be conducted to the motor 36) over a defined path of movement from fully open, to a point/position before the fully close position where the actuation signal $50_c$ would be adjusted by the actuator controller 50 to reduce the speed of operation of the motor 36 (e.g. the actuator controller 50 may decrease the switching frequency of FETS $50_g$ to adjust the power allowed to be conducted to the motor 36) and stop movement of the closure member 12 (e.g. the actuator controller 50 may control the FETS $50_g$ to stop conducting power to the motor 36) at a predefined point/position of the closure member 12. For example, such a point may correspond to a position of the closure member 12 whereat the latch 83 engages a striker (not shown) provided on the vehicle body 14 where it is in an aligned position of with the striker to perform a cinching operation to thereby transition the closure member 12 to the fully closed position without an operation of the motor 36, the cinching operation involving the transitioning of the latch 83 from a secondary latched position to a primary latched position as is generally known in the art. As a result, the striker provided on the closure member 12 which is moved by the movement of the closure member 12 into a position where the striker engages the secondary position of the latch 83 to capture and maintain the striker in latched engagement with the latch 83. At such a position, the motor 36 may be deactivated so as not to interfere with the cinching operation of the latch 83. Sensors provided in the latch 83 or in another remote system 516 and in communication directly or indirectly with the actuator controller 50, (for example via electrical connection(s) 510) may assist the actuator controller 50 to determine locally the actuation signal $50_c$ required to stop the motor 36 at this position. Illustratively, such sensors may be an accelerometer (e.g., accelerometer 697, discussed below), and may generate sensor signals, also referred to as an accelerometer signal, to be communicated to the actuator controller 50 via the electrical connections 510. It is recognized that other command signals can be issued, such as to move the closure member 12 from the fully opened to a secondary latching position whereat the vehicle latch 83 is moved into the secondary latched position in position for a cinching operation to transition the latch 83 from the secondary position to the primary latched position, and for other closure member movement operations. The processor $50_a$, 110 can therefore be programmed to execute instructions as a function of the command signals $50_e$ transmitted and received by the communication interface $50_d$ as Local Interconnect Network protocol signals such as but not limited to commands for operating the powered actuator 22, 122 in a mode of operation including: a position request for motion mode, a push to close command mode, a push to open command mode, a time detected obstacle mode, a zone detected obstacle mode, a full open position detected mode, a learn mode, and/or an adjustable stop position mode.

Still referring to FIG. 33, the actuator controller 50 is configured to interpret the command signals $50_e$ received at the communication interface $50_d$ from the external or remote system 516 and in response activate the motor driver 518 including the FETS $50_g$ appropriately, for example based on a stored movement sequence or profile stored in memory $50_b$, 92 and referenced (e.g. looked up in memory $50_b$, 92) based upon, at least in part, the received command signals $50_e$. Such predefined stored movement sequences of the closure member 12 may be recorded in the memory $50_b$, 92. For example, the received command signals $50_e$ may be a digital message encoded according to a communication protocol (e.g. a serial binary message-based protocol), the actuator controller 50 capable of decoding the digital message to extract the command (e.g. converts the data stream received by the communication interface $50_d$ as serial bits (voltage) levels into data that the actuator controller 50 can process). In response, actuator controller 50 may issue FET control signals to control the operation of the FETs $50_g$ (e.g. control the FET gates) to supply current and/or voltage to the motor 36.

The actuator controller 50 can be further programmed by the execution of instructions 559 to operate the motor 36 based on different desired operating characteristics of the closure member 12. For example, the actuator controller 50 can be programmed to open or close the closure member 12 automatically (i.e. in the presence of a wireless transponder (such as a wireless key FOB 60) being in range of the communication interface $50_d$) when a user outside of the vehicle 10 initiates an open or close command of the closure member 12. Also, the actuator controller 50 can be programmed to process feedback signals $50_f$ from the electronic sensors 64, 182 supplied to the actuator controller 50 to help identify whether the closure member 12 is in an opened or closed position, or any positions in between. Further, the closure member 12 can be automatically controlled to close after a predefined time (e.g. 5 minutes) or remain open for a predefined time (e.g. 30 minutes) based on the instructions 559 stored in the physical memory $50_b$. For example, the high level generic command (e.g. $50_e$) may include a command labelled, for illustrative purposes only: "Open Profile A", which may be decoded by the actuator controller 50 to undertake operation of the powered actuator 22, 122 to move the closure member 12 in accordance with a sequence of operations as stored in memory $50_b$, 92 including three aspects such as moving the closure member 12 to fully open position, a hold open for a period of time (e.g., 3 minutes) after the closure member 12 has reached the fully opened position, and a fully closing operation after a second period of time (e.g., 5 minutes) after the closure member 12 has reached the fully opened position. For example, the high level generic command (e.g. $50_e$) may include a command labelled "Open Profile B", which may be decoded by the actuator controller 50 to undertake similar operations of "Open Profile A" except replacing the fully closing operation with an expected manual user movement of the closure member 12 as would be detected by the sensors 64, 182. Further, the processor $50_a$, 110 can be programmed to execute the instructions complementing and enhancing the functionality of the closure member 12 locally of received profile command, for example executing a sub-profile operating mode, based on received signals $50_f$ from the electric motor 36 representative of an electric motor 36 operation selected from operations such as but not limited to: an electric motor speed ramp up and ramp down operating profile, an obstacle detecting mode for detecting obstructions of the pivotal closure member between an open position and a closed position, a falling pivotal closure member detection mode, a current detection obstacle mode, a full open position mode, a learn completed mode, a motor motion mode, and/or an unpowered rapid motor motion mode.

As another illustrative example of locally controlled operation of the powered actuator 22, 122, a manual override function is described. As discussed above, one or more Hall-effect sensors 64, 182 may be provided and positioned within sensor housing 184, as illustrated in FIG. 12B, for example, and discussed in more detail below, the Hall-effect sensors 64, 182 are positioned on the PCB adjacent to the driven shaft 166, to send a signal, such as an analog voltage time varying signal depending of the change in magnetic field detected by the Hall-effect sensors 64, 182, representative of operation (e.g., rotation(s) of the driven shaft 166) of the electric motor 36 to actuator controller 50 that are indicative of rotational movement of motor 36 and indicative of the rotational speed of motor 36, e.g., based on counting signals from the Hall-effect sensor 64, 182 detecting a target (e.g., magnet wheel 180) on the driven shaft 166. In situations where the sensed motor 36 speed is greater than a prestored expected threshold speed, stored in memory $50_b$, 92 for example, and where a current sensor (in the case where ripple counting is employed to determine the operation of the motor 36, such as to determine the position of the motor 36) registers a significant change in a current draw, the actuator controller 50 may determine that a user is manually moving the closure member 12 while motor 36 is also operating to rotate the lead screw 134, thus moving the closure member 12 between its opened and closed positions. The actuator controller 50 may then send in response to such a determination the appropriate actuation signals $50_c$ (by cutting the power flow to the motor 36 for example) resulting in the motor 36 to stop to allow a manual override/control of the closure member 12 by the user 75. Conversely, and as an example of an object or obstacle detection functionality, when the actuator controller 50 is in a power open or power close mode and the Hall-effect sensors 64, 182 indicate that a speed of the motor 36 is less than a threshold speed (e.g., zero) and a current spike is detected (in the case where ripple counting is employed to determine the operation of the motor 36), the actuator controller 50 may determine that an obstacle or object is in the way of the closure member 12, in which case the actuator controller 50 may take any suitable action, such as sending an actuation signal $50_c$ to turn off the motor 36, or sending an actuation signal $50_c$ to reverse the motor 36. As such, the actuator controller 50 receives feedback from the Hall-effect sensors 64, 182, or from a current sensor (not shown) and renders control decisions locally for the powered actuator 22, 122 to ensure that a contact or impact with the obstacle and the closure member 12 has not occurred during movement of the closure member 12 from the closed position to the opened position, or vice versa. An anti-pinch functionality may also be performed in a similar manner to the obstacle detection functionality, to particularly detect an obstacle such as a limb or finger is present between the closure member 12 and the vehicle body 14 about the nearly fully closed position during the closure member 12 transition towards the fully closed position.

Figure 34:
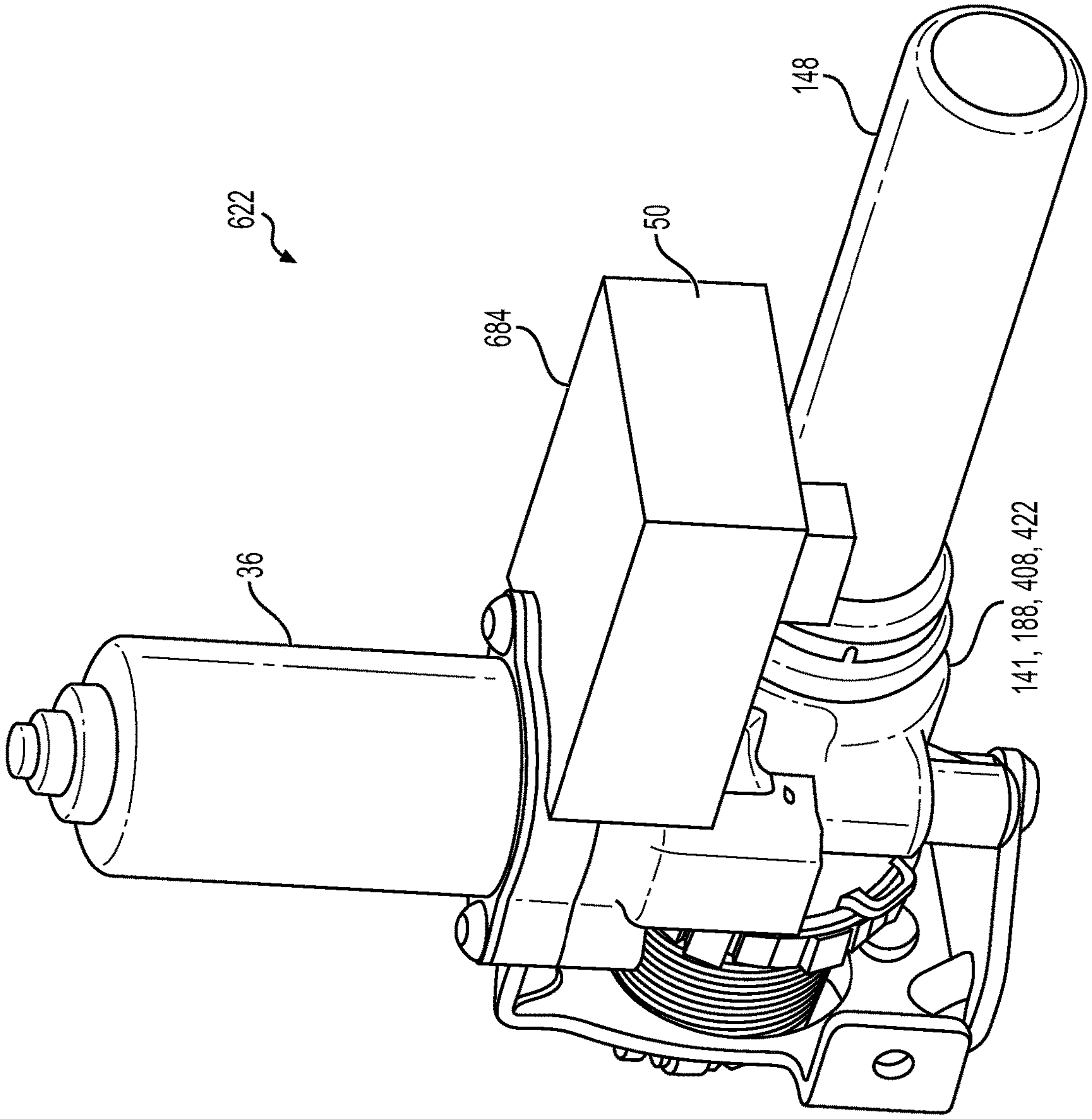
FIG. 34 shows an example actuator assembly for a closure member of the vehicle, according to aspects of the disclosure.

Referring to FIG. 34, an example actuator assembly 622 for a closure member (e.g., closure 12) of the vehicle 10 is shown. The actuator assembly 622 includes the actuator housing 141, 148, 184, 188, 206, 408, 422 including sensor housing 684 (e.g., formed of metal). Sensor housing 684 is similar to sensor housing 184 of FIG. 12B, but is larger in size. In addition, the actuator assembly includes the electric motor 36 disposed in the actuator housing 141, 148, 184, 188, 206, 408, 422. The electric motor 36 is configured to rotate the driven shaft 166 operably coupled to the extensible member 134, which is also coupled to one of the body 14 or the closure member 12 for opening or closing the closure member 12. The actuator assembly 622 also includes the actuator controller 50 disposed in the sensor housing 684 of the actuator housing 141, 148, 184, 188, 206, 408, 422, 684. The actuator controller 50 is coupled to electric motor 36. The actuator controller 50 is coupled to an accelerometer 697 configured to sense movement and/or inclination of the closure member 12. Signals from the accelerometer 697 are used to determine user intent by understanding the accelerations of the closure member 12. If the user pushes hard, the acceleration is high. If the person pushes door softly, the acceleration of the closure member 12 will be small. The actuator controller 50 is configured to detect the movement of the closure member 12 using the accelerometer 697. The actuator controller 50 is also configured to control the opening or closing of the closure member 12 based on the movement of the closure member 12 using the electric motor 36 (i.e., based on user intent). Following detection of movement by the accelerometer 697, obstacle detection can then be performed.

Figure 35:
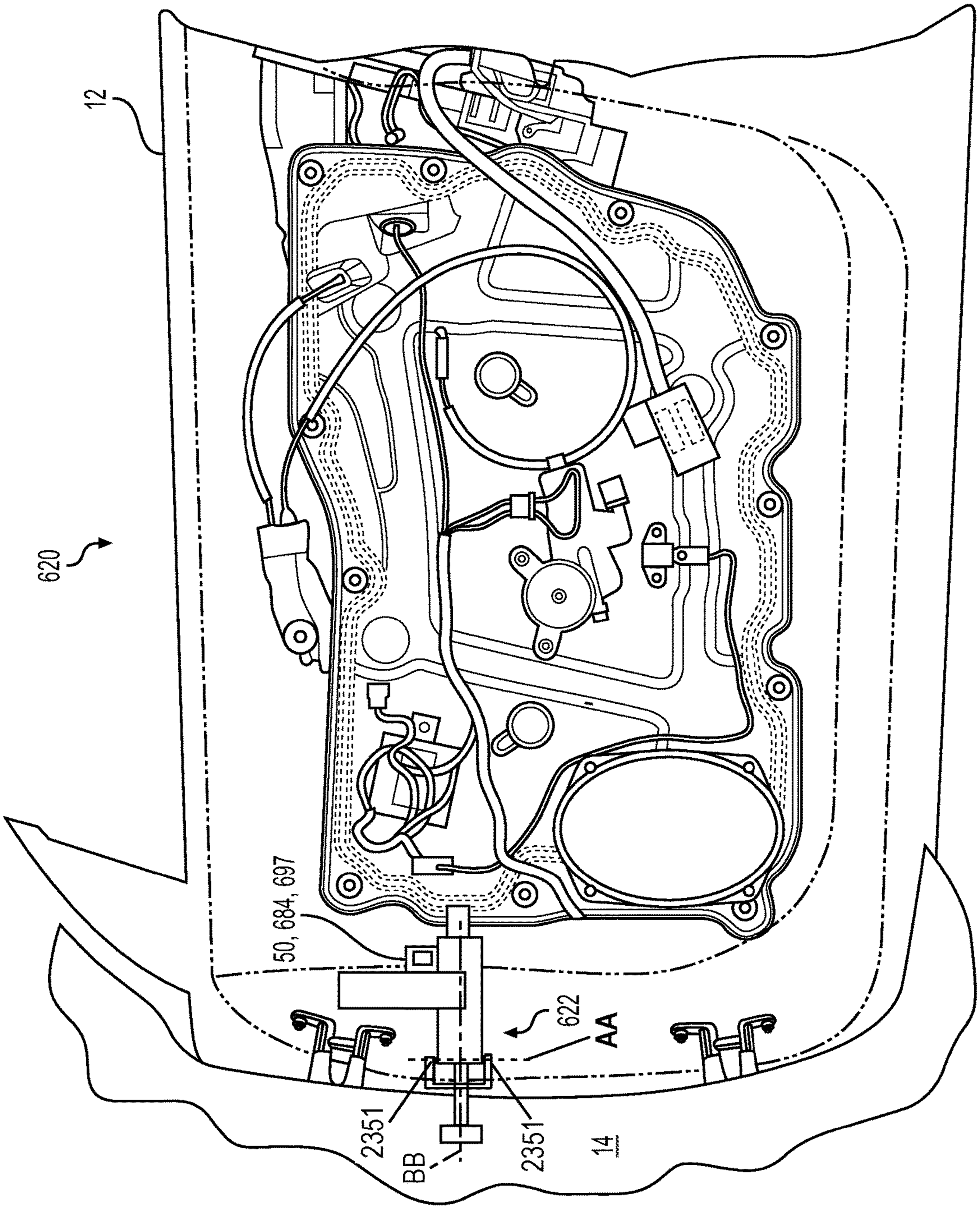
FIG. 35 shows a first example servo actuation system, according to aspects of the disclosure.

The actuator assembly 622 can be part of a first example servo actuation system 620 shown in FIG. 35. In the first example servo actuation system 620, the accelerometer 697 is part of the actuator assembly 622 itself. Specifically, the accelerometer 697 is disposed in the sensor housing 684 of the actuator housing 141, 148, 184, 188, 206, 408, 422, 684. So, in the first example servo actuation system 620, the actuator assembly 622 has the actuator controller 50 execute instructions or software to control itself.

Figure 36:
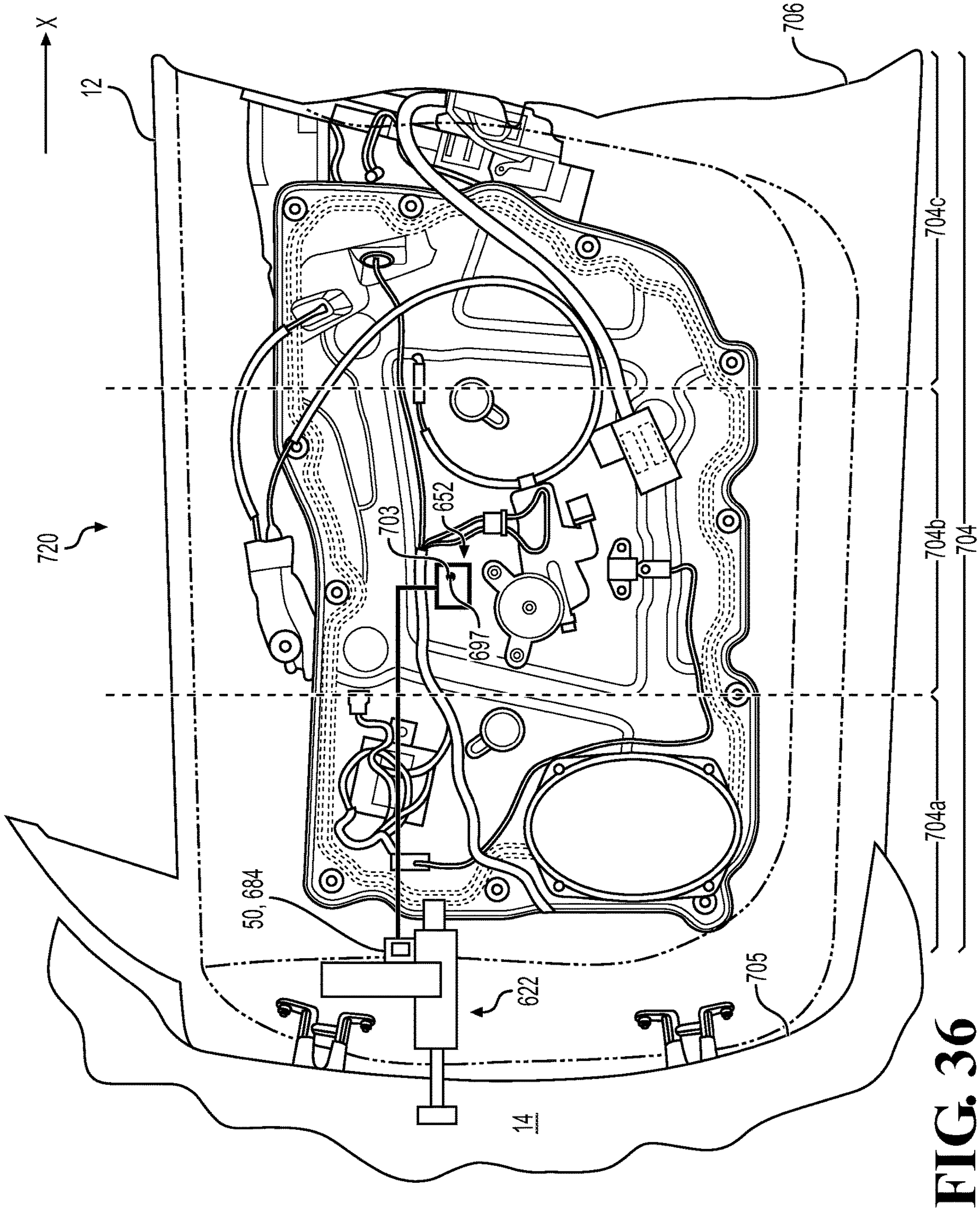
FIG. 36 shows a second example servo actuation system, according to aspects of the disclosure.

A second example servo actuation system 720 is shown in FIG. 36. As with the first example servo actuation system 620 shown in FIG. 35, the actuator assembly 622 includes the actuator housing 141, 148, 184, 188, 206, 408, 422, 684 and the actuator assembly 622 includes an electric motor 36 disposed in the actuator housing 141, 148, 184, 188, 206, 408, 422, 684 and configured to rotate a driven shaft 166 operably coupled to an extensible member 134, which is coupled to one of a body 14 or the closure member 12 for opening or closing the closure member 12. However, instead of the accelerometer 697 being disposed in the actuator housing 141, 148, 184, 188, 206, 408, 422, 684, the accelerometer 697 is disposed remotely from the actuator assembly 622 while still being configured to sense movement of the closure member 12.

At least one servo controller 50, 850, 1050 is coupled to the electric motor 36 and the accelerometer 697. The at least one servo controller 50, 850, 1050 is configured to detect the movement of the closure member 12 using the accelerometer 697. The at least one servo controller 50, 850, 1050 controls the opening or closing of the closure member 12 based on the movement of the closure member 12 using the electric motor 36. According to an aspect, and as shown in FIG. 36, the at least one servo controller 50, 850, 1050 includes the actuator controller 50 of the actuator assembly 622 disposed in the actuator housing 141, 148, 184, 188, 206, 408, 422, 684. The accelerometer 697 is disposed in a door node assembly 652 disposed remotely from the actuator assembly 622 on the closure member 12.

According to an aspect and still referring to FIG. 36, the accelerometer 697 is attached to the closure member 12 about a center of gravity 703 of the closure member 12. The accelerometer 697 attached at the center of gravity 703 may include the attachment exactly at the center of gravity 703 as well as substantially at or about the center of gravity 703. According to another aspect, the closure member 12 can have an overall closure member length 704 defined from a first closure member end 705 along a longitudinal direction x to a second closure member end 706. The overall closure member length 704, from the first closure member end 705 to the second closure member end 706, may comprise a front closure member length 704*a* being one third of the overall closure member length 704, a middle closure member length 704*b* being one third of the overall closure member length 704, and a back closure member length 704*c* being one third of the overall closure member length 704. According to another aspect, the accelerometer 697 is attached to the closure member 12 within the middle closure member length 704*b* of the closure member 12. Providing the accelerometer 697 at the center of gravity 703 of the closure member 12 facilitates calculations of force values such as target motor output control forces and/or torques, as well as assistive or compensation forces such as part of calculations related to inertia compensation and incline compensation as non-limiting examples and as illustratively described in more detail in the incorporated '601 PCT Application as the forces and/or torques calculated in such a motor control software, or algorithm, may be based on the detected acceleration acting on the mass located at the center of gravity of the vehicle door 12. In other words, the accelerometer measures the acceleration at a point on the door facilitating force calculations based upon such a location. Force control and/or compensation calculations may be thus simplified (e.g. inertia force may be determined as $Force_{inertia}$=mass×acceleration, where the mass of the door 12 is known and the acceleration is determined from a signal received from the accelerometer 697), and therefore door control response to acceleration may be more accurate and controllable as desired. In some configurations, the accelerometer 697 may be placed proximate the door hinges, however the signal generated by accelerometer 697 may be not a sufficiently strong signal. Providing the accelerometer 697 in the middle closure member length 704*b* may also allow the accelerometer 697 to provide a sufficiently strong signal for use by the motor control software or algorithm without the need for using controller gain compensation which may increase error in the accelerometer signal causing a decrease in door motion control performance. Also providing the accelerometer 697 in the middle closure member length 704*b* reduces signal noise as compared to when the accelerometer 697 is provided in back closure member length 704*c* without the need for implementing noise filtering of the accelerometer signal as may be required when an accelerometer 697 is provided in back closure member length 704*c*.

Figure 37:
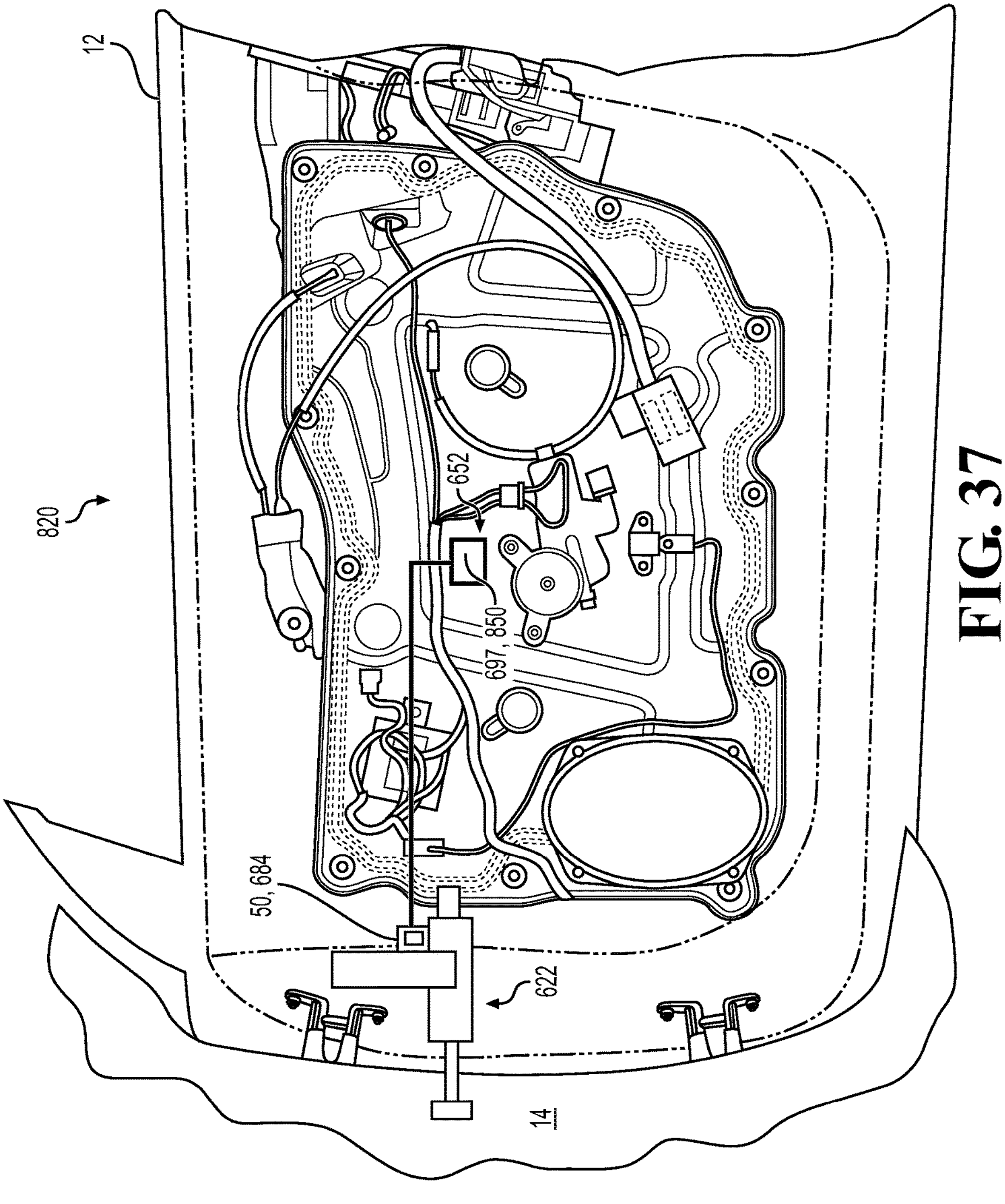
FIG. 37 shows a third example servo actuation system, according to aspects of the disclosure.

A third example servo actuation system 820 is shown in FIG. 37. Like the second example servo actuation system 720 shown in FIG. 36, the at least one servo controller 50, 850, 1050 of the third example servo actuation system 820 controls the opening or closing of the closure member 12 based on the movement of the closure member 12 using the electric motor 36; however, instead of the at least one servo controller 50, 850, 1050 only including the actuator controller 50, the at least one servo controller 50, 850, 1050 includes a door node controller 850 of the door node assembly 652 disposed remotely from the actuator assembly 622 on the closure member 12. In other words, the door node controller 850 is an example of remote system 516 of FIG. 33. Door node assembly 652 may be mounted to the door 12 as a module using separate fasteners or connectors than other components. The door node controller 850 is configured to command the actuator controller 50 to control the opening or closing of the closure member 12 based on the movement of the closure member 12 using the electric motor 36. As shown, the accelerometer 697 is disposed in the door node assembly 652.

Figure 38:
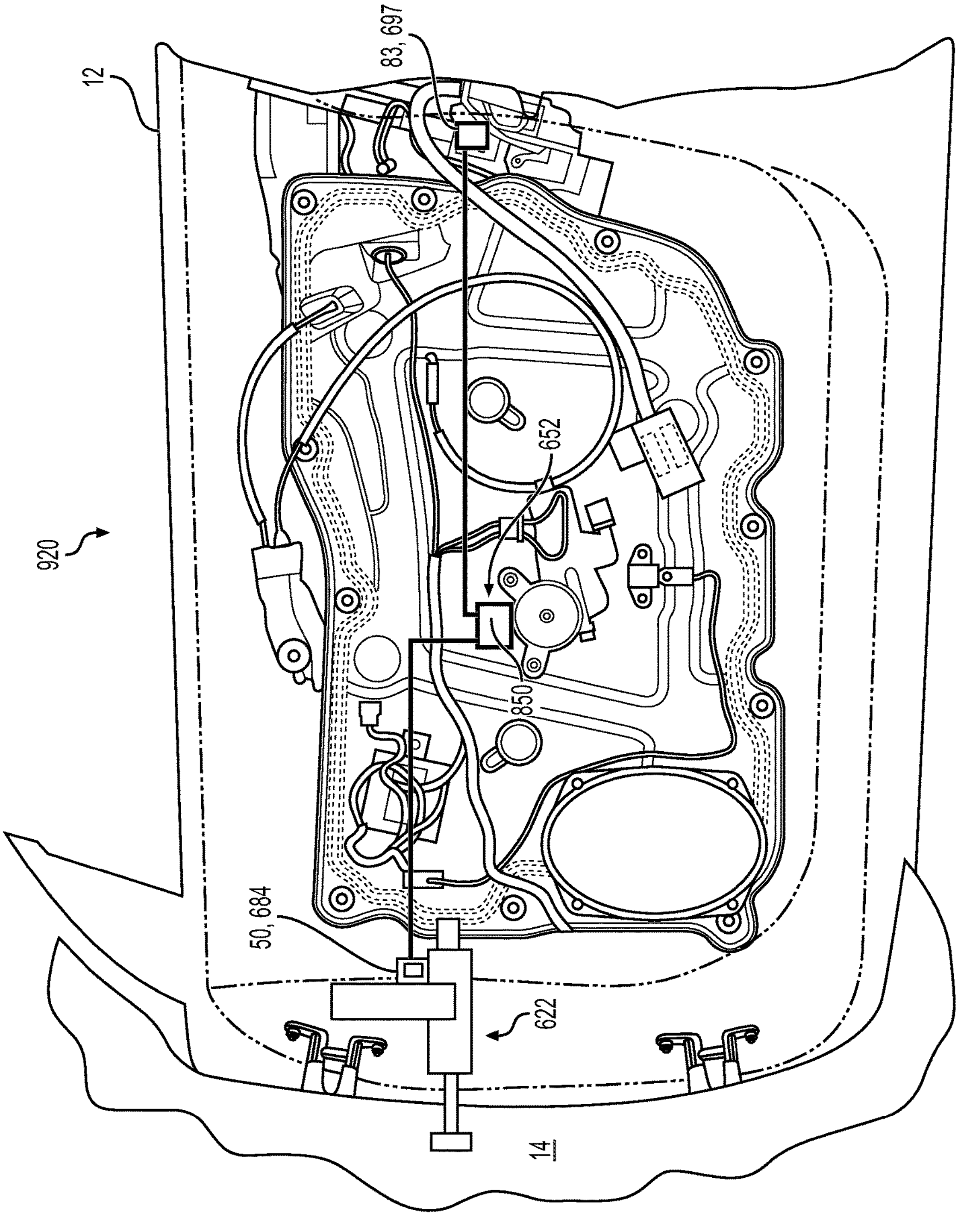
FIG. 38 shows a fourth example servo actuation system, according to aspects of the disclosure.

A fourth example servo actuation system 920 is shown in FIG. 38. Again, the door node controller 850 is configured to command the actuator controller 50 to control the opening or closing of the closure member 12 based on the movement of the closure member 12 using the electric motor 36. In the fourth example servo actuation system 920, the accelerometer 697 is disposed in the latch assembly 83 configured to selectively secure the closure member 12 to a vehicle body 14 of the vehicle 10. The latch assembly 83 is disposed remotely from the actuator assembly 622.

Figure 39:
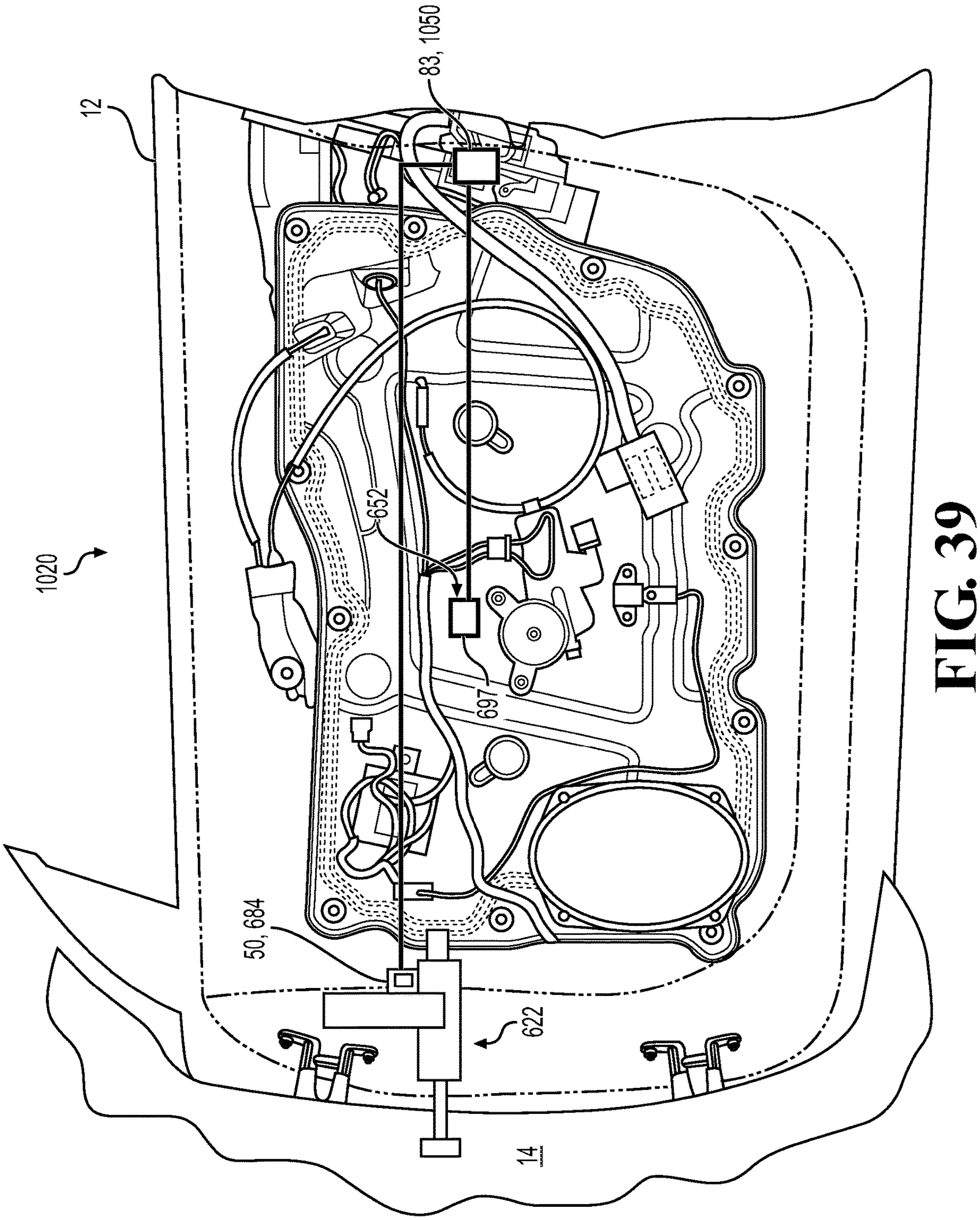
FIG. 39 shows a fifth example servo actuation system, according to aspects of the disclosure.

A fifth example servo actuation system 1020 is shown in FIG. 39. As discussed above, the actuator assembly 622 includes an actuator housing 141, 148, 184, 188, 206, 408, 422, 684 and an electric motor 36 disposed therein and configured to rotate a driven shaft 166 operably coupled to the extensible member 134. The actuator assembly 622 also includes the actuator controller 50 disposed in the actuator housing 141, 148, 184, 188, 206, 408, 422, 684 and coupled to electric motor 36. An accelerometer 697 is disposed remotely from the actuator assembly 622 and configured to detect movement of the closure member 12. As with the fourth example servo actuation system 920 shown in FIG. 38, the fifth example servo actuation system 1020 also includes the latch assembly 83 disposed remotely from the actuator assembly 622 and configured to selectively secure the closure member 12 to a vehicle body 14 of the vehicle 10. In addition, the latch assembly 83 includes a latch controller 1050 in communication with the accelerometer 697 and the actuator controller 50. The latch controller 1050 is configured to detect the movement of the closure member 12 using the accelerometer 697. The latch controller 1050 is additionally configured to command the actuator controller 50 to control the opening or closing of the closure member 12 based on the movement of the closure member 12 using the electric motor 36. So, the latch controller 1050 is another example of remote system 516 of FIG. 33. As shown in FIG. 39, the accelerometer 697 is disposed in the door node assembly 652 disposed remotely from the actuator assembly 622 and the latch assembly 83 on the closure member 12.

Figure 40:
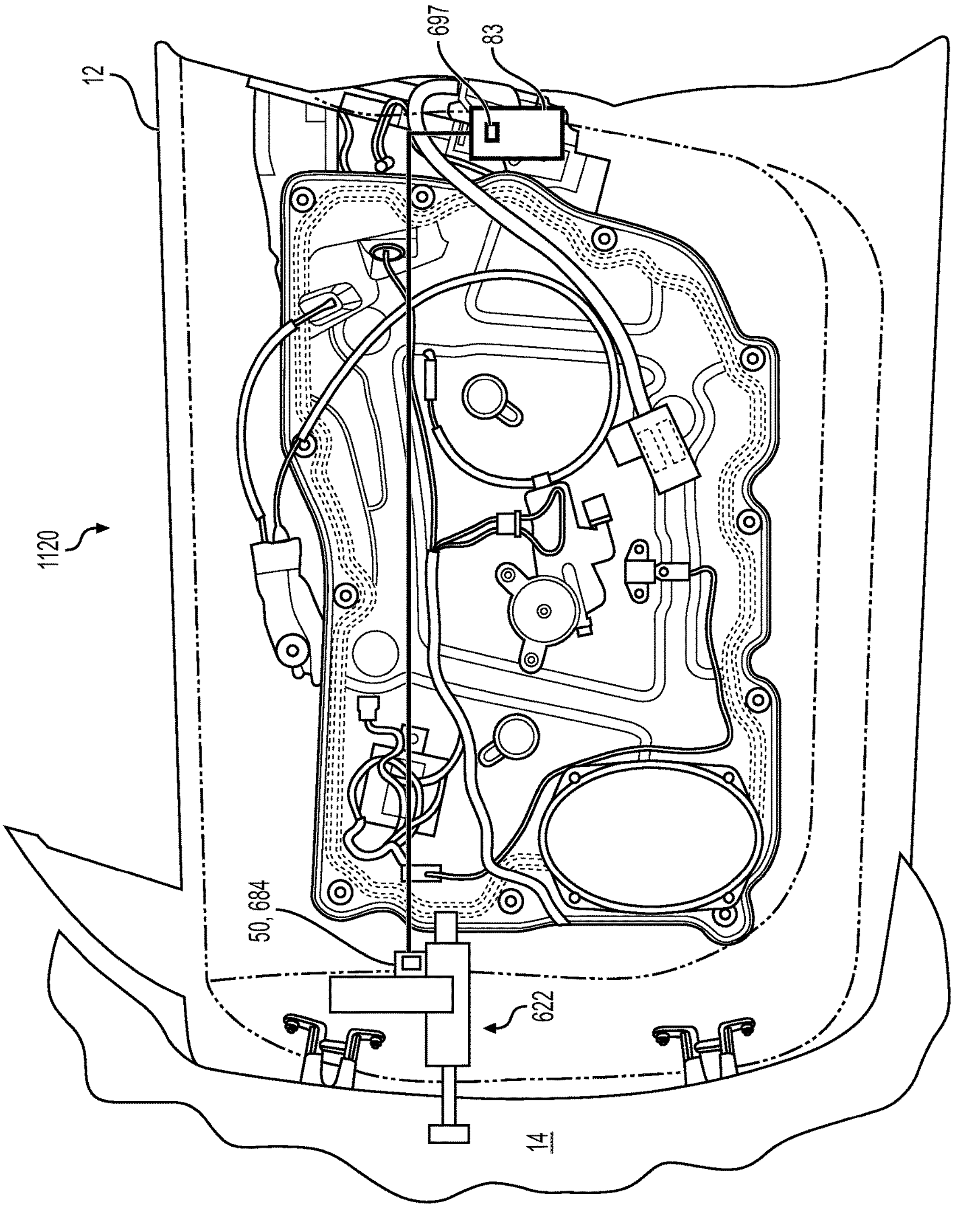
FIG. 40 shows a sixth example servo actuation system, according to aspects of the disclosure.

A sixth example servo actuation system 1120 is shown in FIG. 40. Like the fifth example servo actuation system 1020 is shown in FIG. 39, the sixth example servo actuation system 1120 includes the latch assembly 83 disposed remotely from the actuator assembly 622 and configured to selectively secure the closure member 12 to a vehicle body 14 of the vehicle 10. Yet, instead of the accelerometer 697 being disposed in the door node assembly 652, the accelerometer 697 is disposed in the latch assembly 83.

Figure 41:
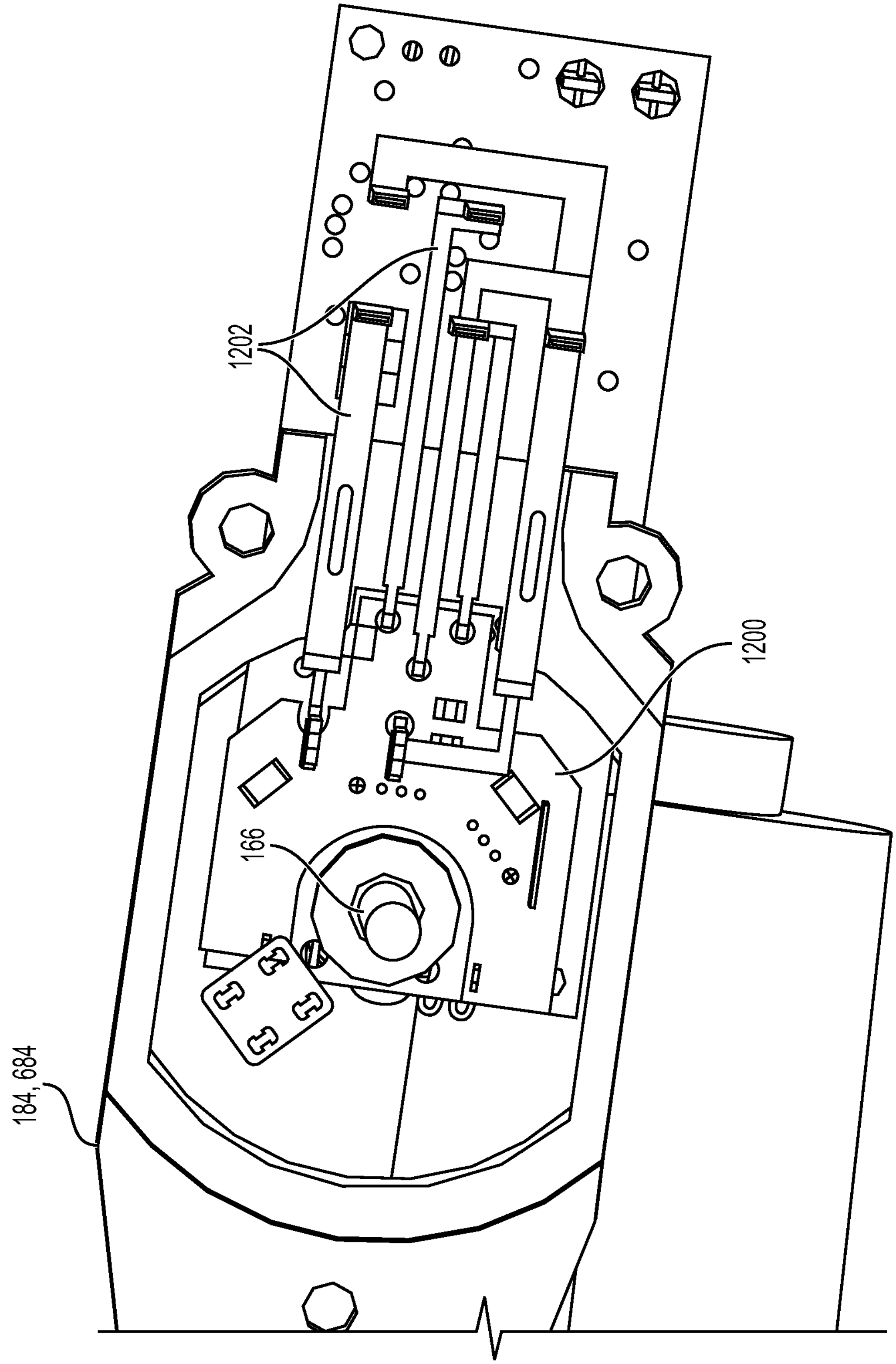
FIGS. 41-44 show an example of the sensor housing on a sensor printed circuit board and arrangements of Hall-effect sensors thereon, according to aspects of the disclosure.
Figure 42:
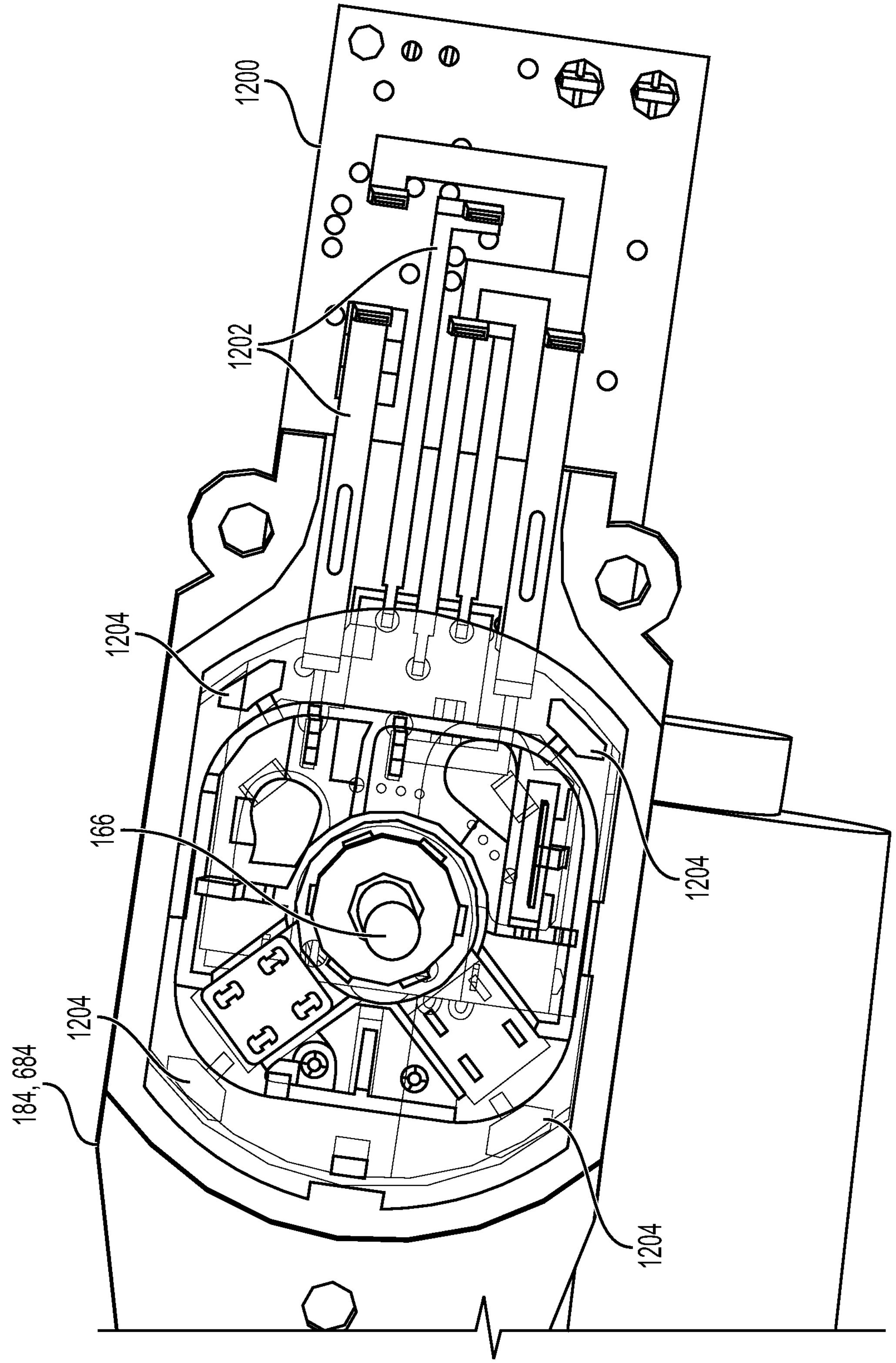
Figure 43:
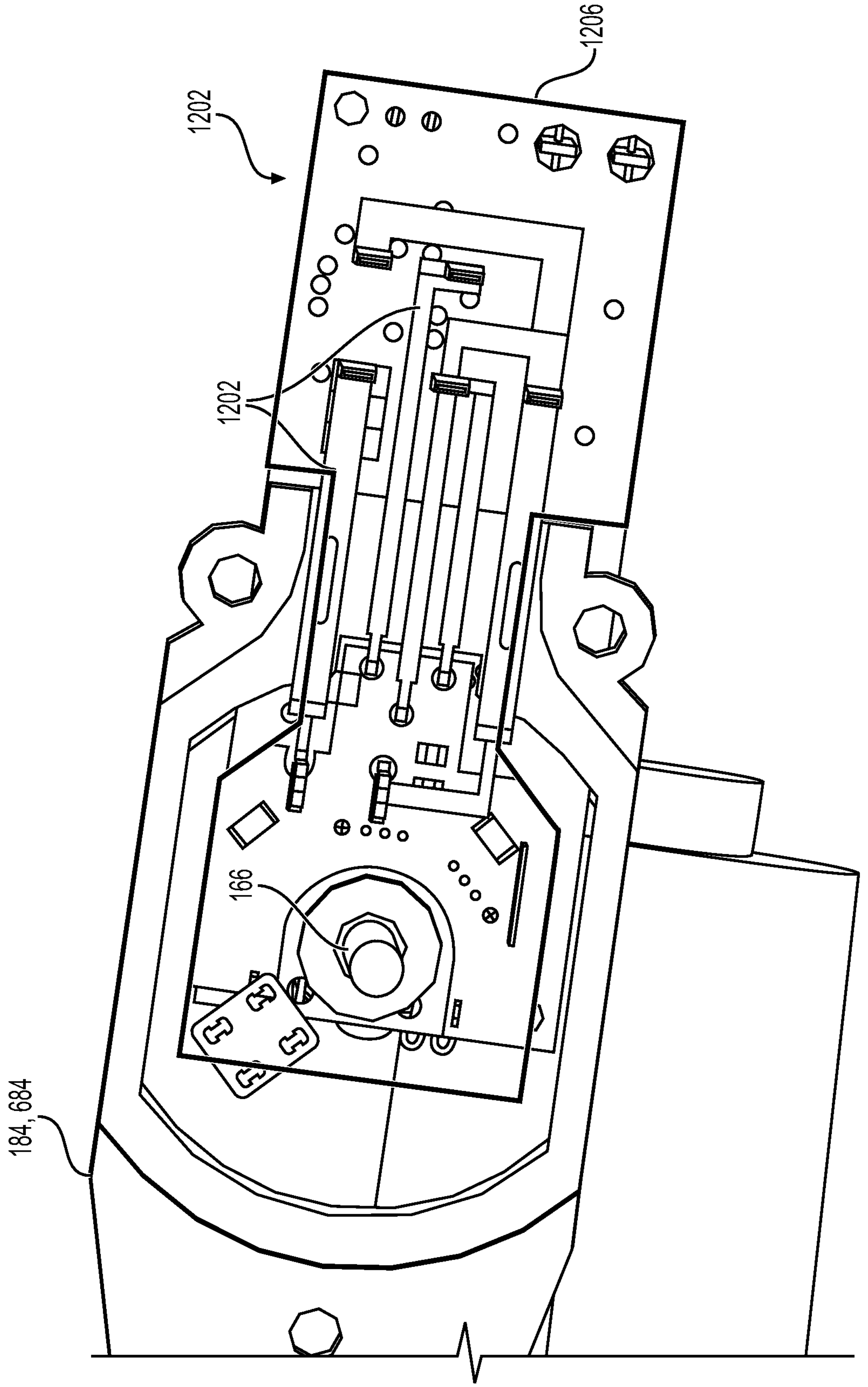
Figure 44:
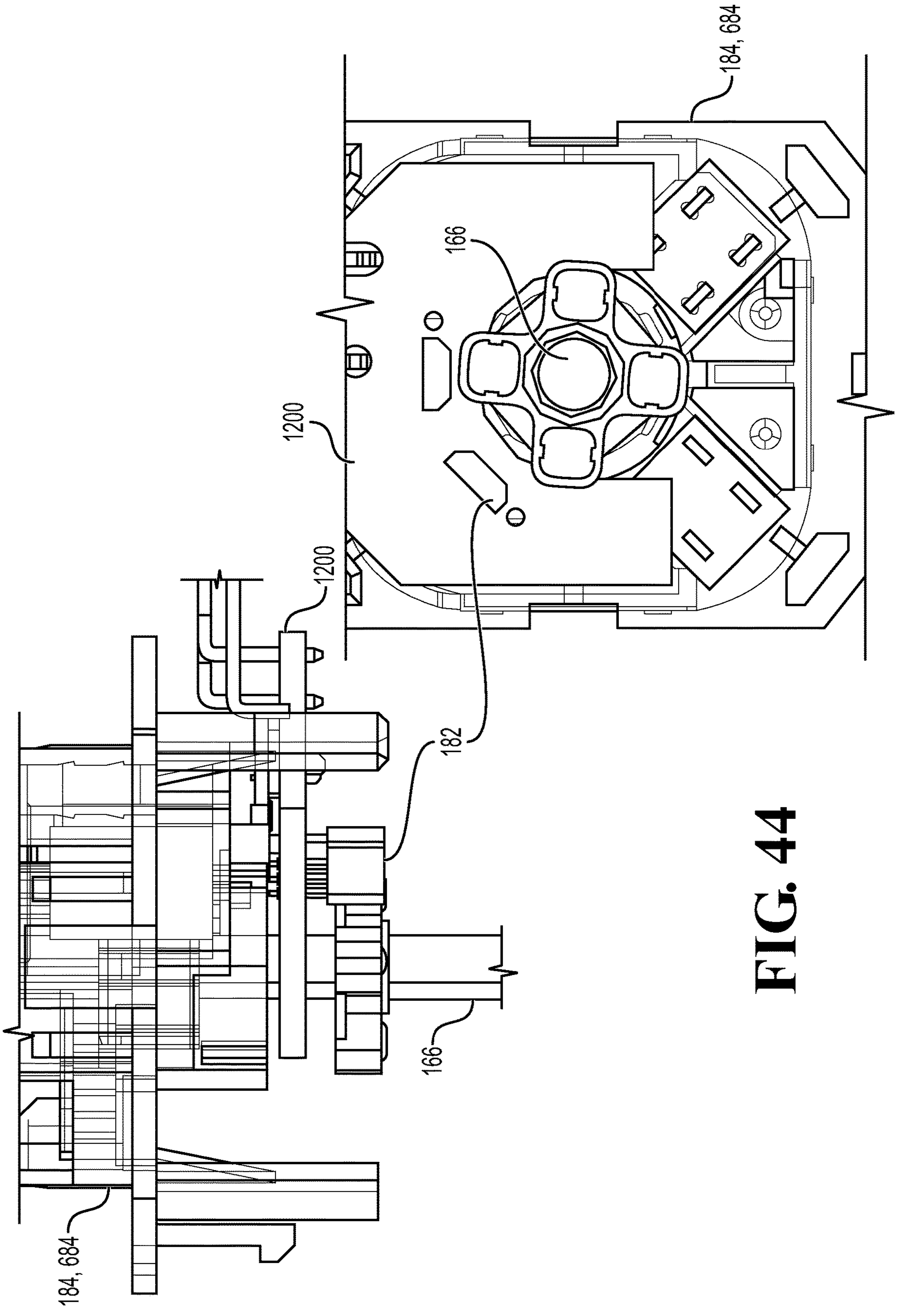

FIGS. 41-44 show an example of the sensor housing 184, 684 on a sensor printed circuit board 1200 and arrangements of the Hall-effect sensors 182 thereon. Specifically, FIG. 41 shows available real estate for the sensor printed circuit board 1200 to grow (e.g., to accommodate the actuator controller 50 and/or the accelerometer 697). So, the sensor printed circuit board 1200 with the Hall-effect sensors 182 and the actuator controller 50 and optionally the accelerometer 697 will be a rectangular board that will place the Hall-effect sensor 182 near the magnets. The Hall-effect sensor 182 interacts with the shaft 166 by being positioned in such a way that the shaft magnet will rotate above the Hall-effect sensor 182. A plurality of motor terminals 1202 are also shown. According to an aspect, the plurality of motor terminals 1202 may be symmetrical for left and right sides. FIG. 42 shows four mounting features 1204 used to locate the motor 36 in the gearbox (e.g., gearbox 141) to allow for the sensor printed circuit board 1200 to be cleared. FIG. 43 shows a perimeter 1206 of the sensor printed circuit board 1200 and how it can grow if required. FIG. 44 shows the arrangement of the Hall-effect sensors 182. There is illustratively shown an actuator 622 having an electric motor, such as motor 36, which is configured to be controlled by a controller 50, the motor 36 having a motor shaft 166 and motor terminals 2516 provided on one side of the motor 36 and adjacent to each other (shown illustratively in FIG. 67A and FIG. 67B), such that the controller 50 includes an interface, provided in one possible embodiment as daughter board 2392 described herein below, for providing motor signals to the motor terminals 2516, such as through mating terminals, such as for example terminals 1202, to engage with motor terminals 2516, and may also include a sensor arrangement for sensing the motor shaft 166. The actuator 622 may also include a housing having an access port or opening 2517, shown in one possible example with reference to gearbox housing board cavity 2512 described herein below, for allowing the controller interface to couple such as mechanically for example with the motor terminals 2516 and couple such as electrically or electromagnetically for example with motor shaft 166. Access port or opening 2517 such as gearbox housing board cavity 2512 may in one possible configuration be the single access point into the actuator 622 for electronics and wiring simplifying wiring and sealing of the actuator 622.

Referring back to FIG. 34, one concern with the location of the controller or sensor housing 684 of actuator 622 is that when the actuator 622 swings during opening/closing of the closure member 12, the sensor housing 684 may strike run channels or other components in internal door cavity 39 (described in more detail below).

Figure 45B:
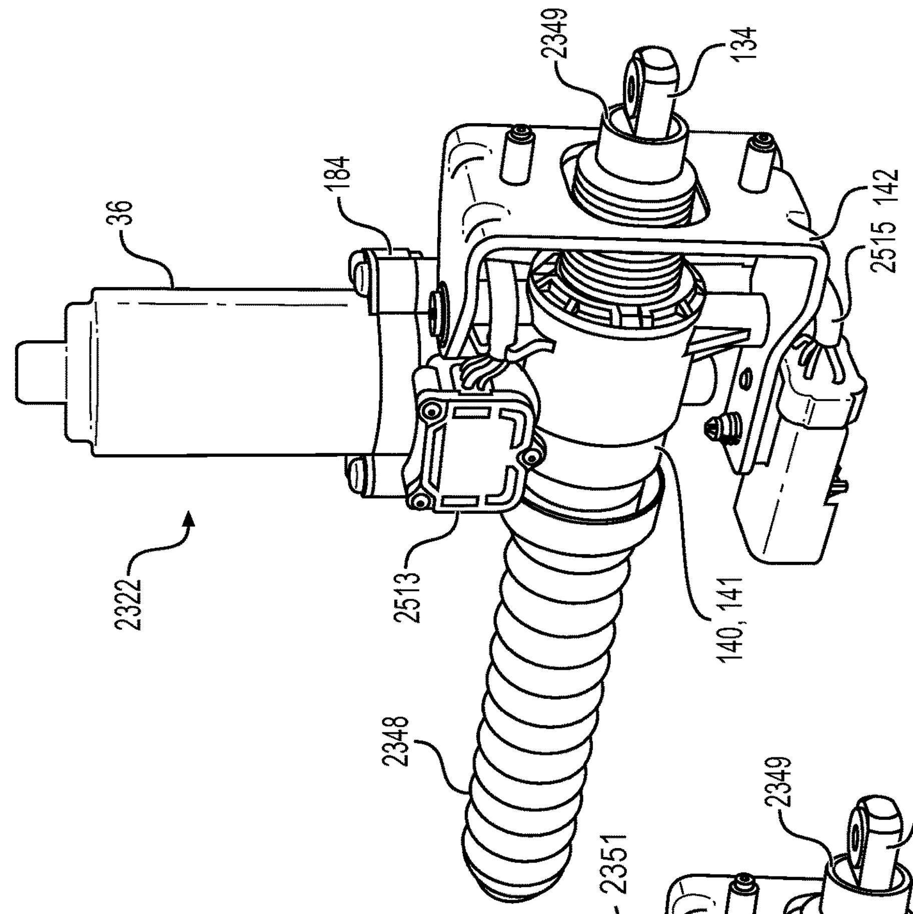
Figure 45A:
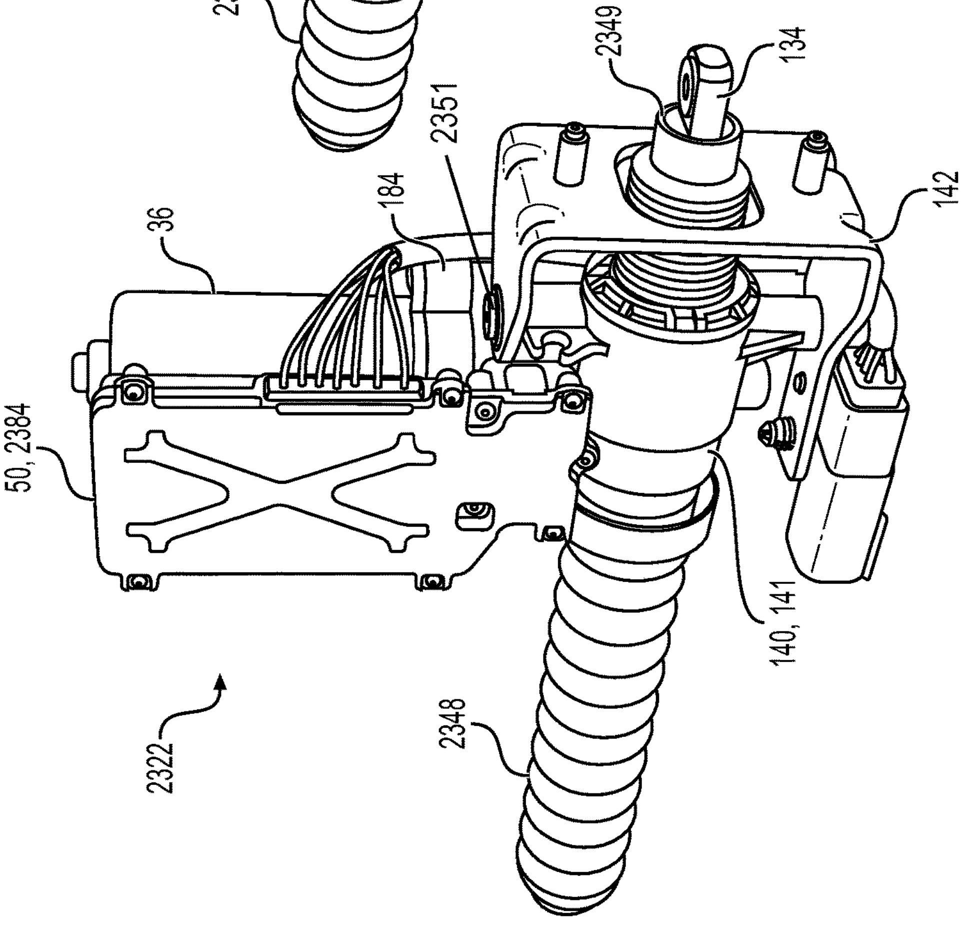
Figure 46:
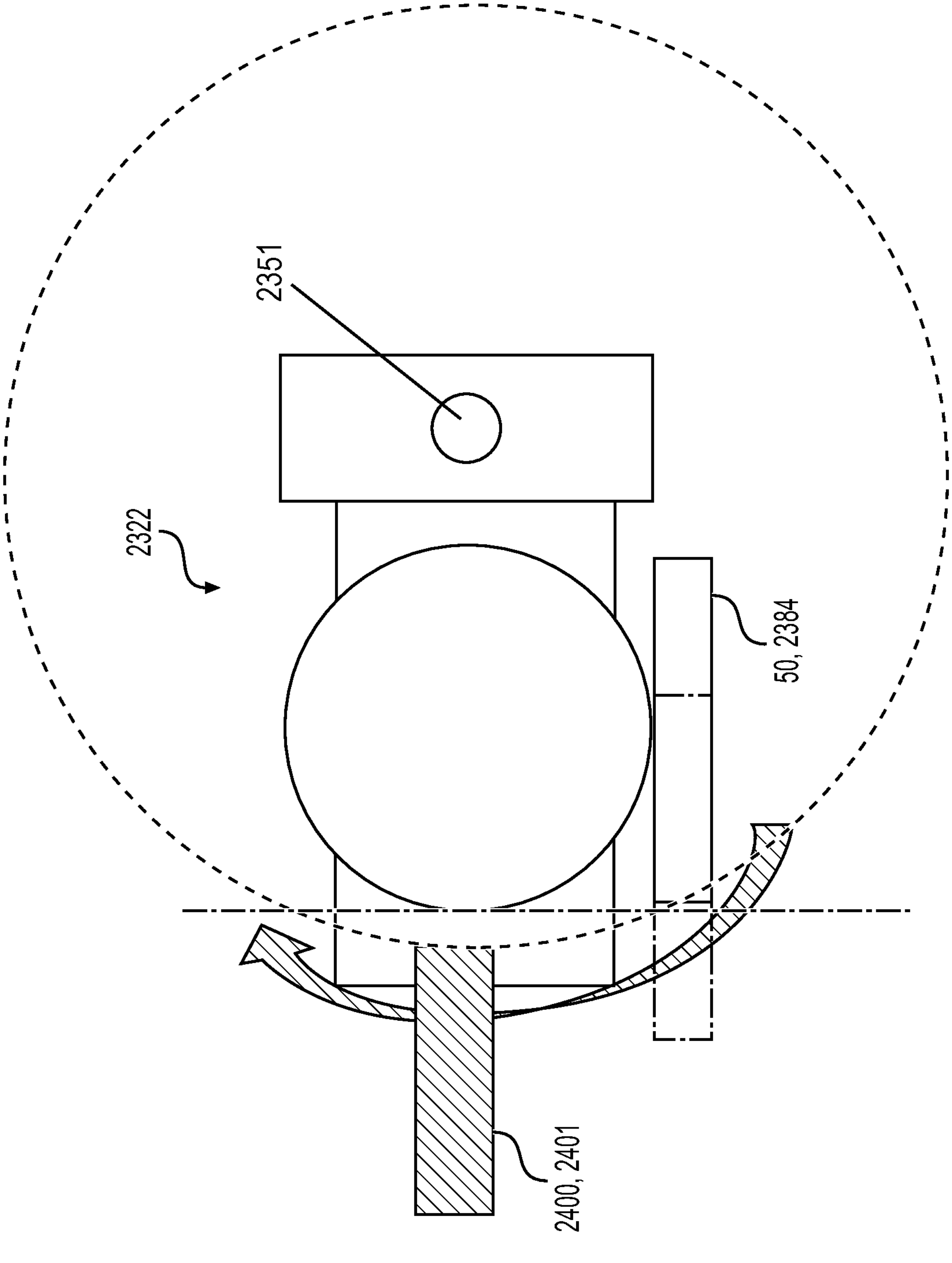
Figure 47B:
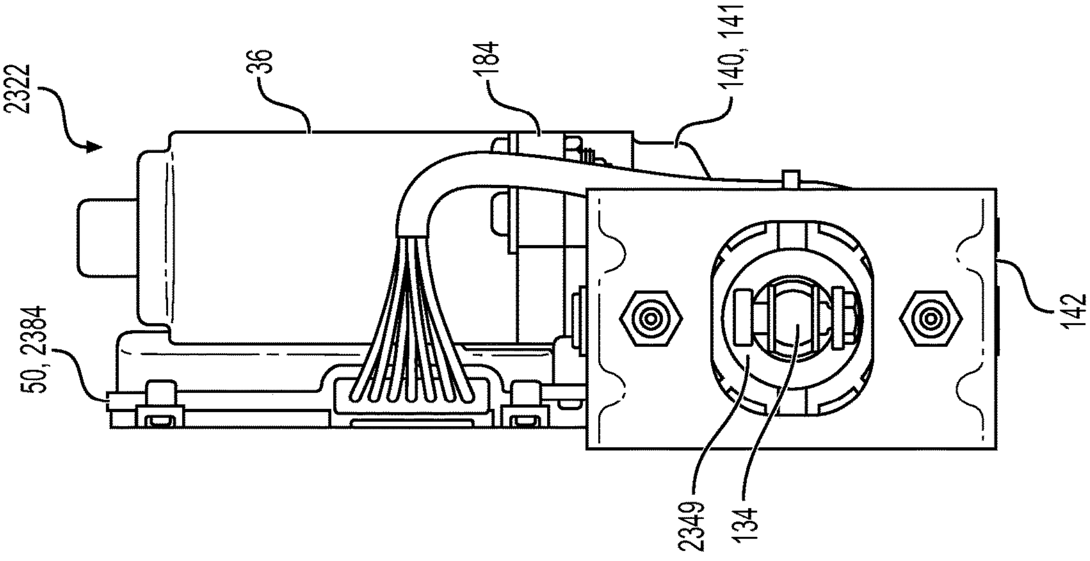
Figure 47A:
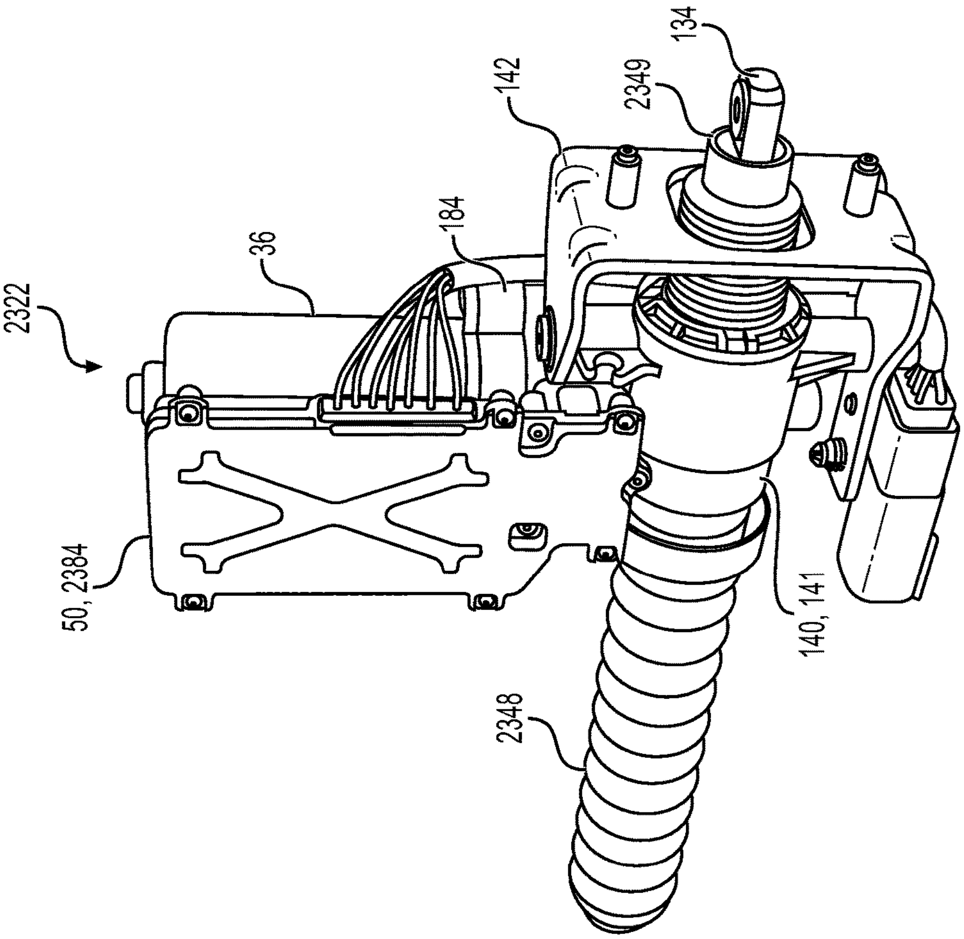
Figure 48B:
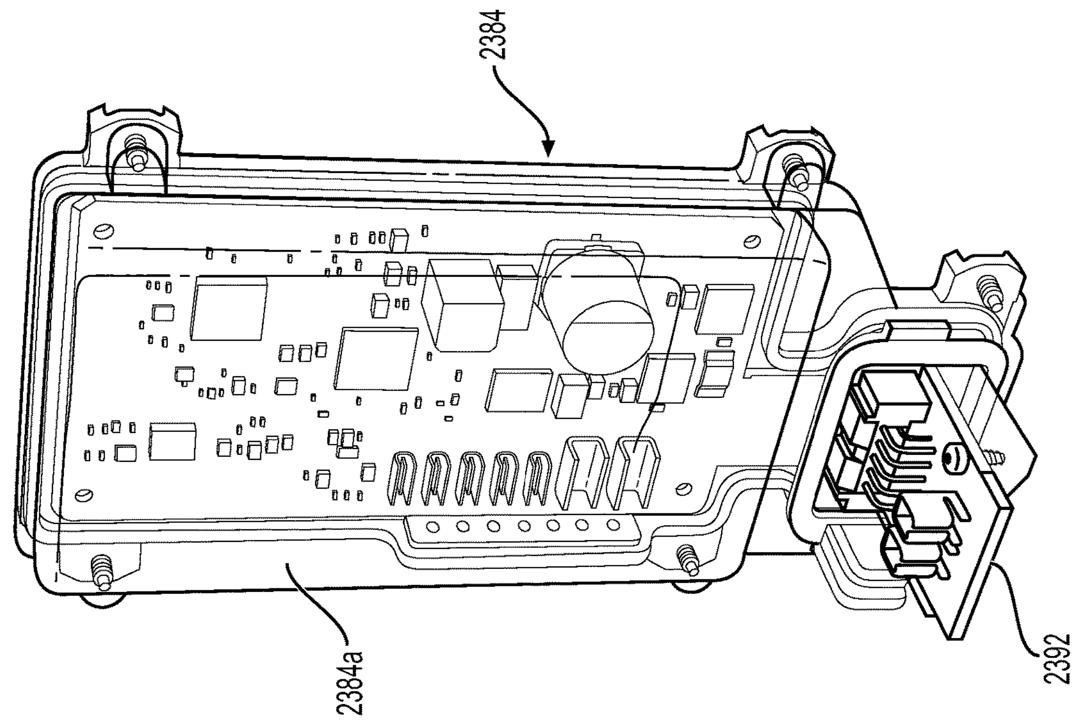
Figure 48A:
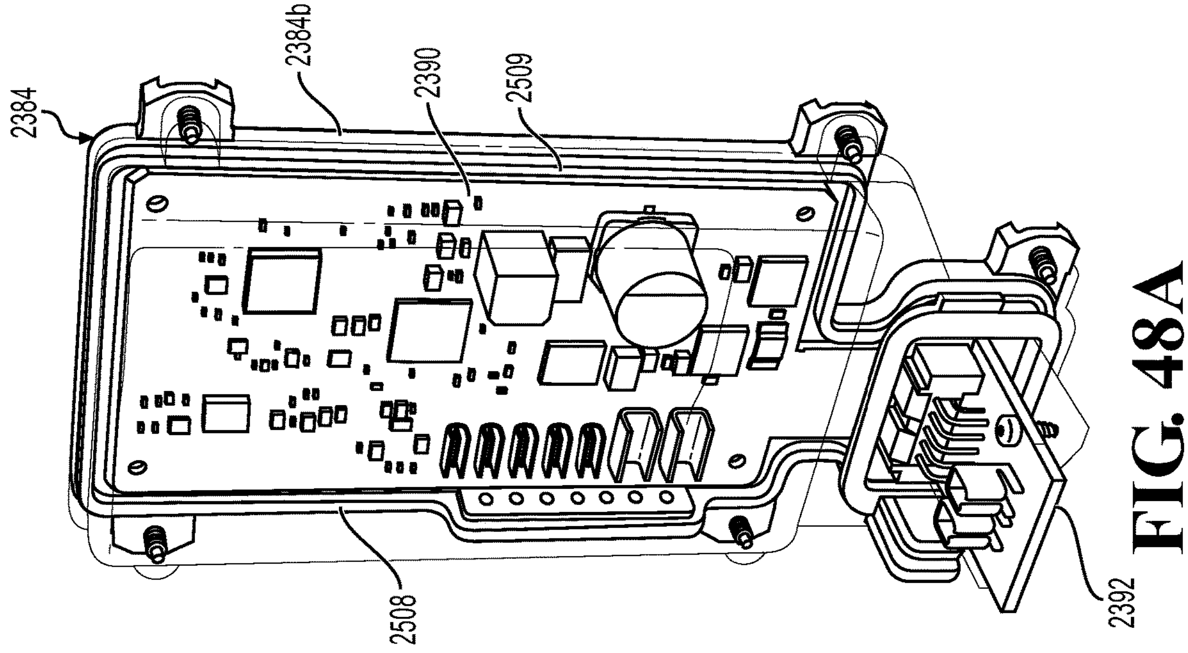

FIGS. 45A-B, 46, and 47A-B show another power actuator 2322 for the closure member 12 of the vehicle 10. According to an aspect, the power actuator 2322 includes the actuator housing 141, 142, 148, 184, 2348, 2349, 2384 including a controller housing 2384. An extensible member 134 is configured to be coupled to the body 14 of the vehicle 10. The power actuator 2322 includes a gearbox 140 disposed in the gearbox housing 141 of the actuator housing 141, 142, 148, 184, 2348, 2349, 2384 and configured to apply a force to the extensible member 134 for causing the extensible member 134 to move linearly. In addition, the power actuator 2322 includes the electric motor 36 disposed in the actuator housing 141, 142, 148, 184, 2348, 2349, 2384 and configured to rotate a driven shaft 166 operably coupled to the gearbox 140 for opening or closing the closure member 12. Additionally, the power actuator 2322 includes the actuator controller 50 coupled to the electric motor 36 and comprising at least one controller printed circuit board 2390, 2392 disposed in the controller housing 2384 and configured to control the electric motor 36. FIGS. 45A-B show two options for the power actuator 2322, one where the controller housing 2384 is attached to the gearbox housing 141 (i.e., an integrated controller) (FIG. 45A), and one in which the controller housing 2384 is separate and disposed remotely from the gearbox housing 141 (FIG. 45B). FIG. 46 shows the power actuator 2322 relative to glass run channel 2400 or window regulator rail 2401. The actuator housing 141, 142, 148, 184, 2348, 2349, 2384 is configured to be pivotally coupled to the closure member 12 about a pivot axis and swing during opening and closing of the closure member 12. So, no part of the actuator housing 141, 142, 148, 184, 2348, 2349, 2384 extends outside an outer swing path (dashed circle). If the controller housing 2384 extended too far, there may be contact with the glass run channel 2400 or window regulator rail 2401, for example. Power actuator 2322 is configured to pivot or swing about axis AA (see FIG. 35) at upper and lower pivotal connections 2351 coupling the actuator housing 141 as a gearbox housing to the actuator housing 142 as a connecting bracket for securing the power actuator 2322 to the vehicle door 12, such as to the inner shut face along the A-Pillar side of the door 12. Axis AA is illustratively shown as being parallel or substantially parallel to the axis of rotation of upper and lower hinges pivotally coupling the vehicle door 12 to the vehicle body 10. As best shown in FIG. 47A-B, the controller housing 2384 for the actuator controller 50 is disposed adjacent the electric motor 36 and does not extend further away from the pivot axis than does the electric motor 36.

Figure 49C:
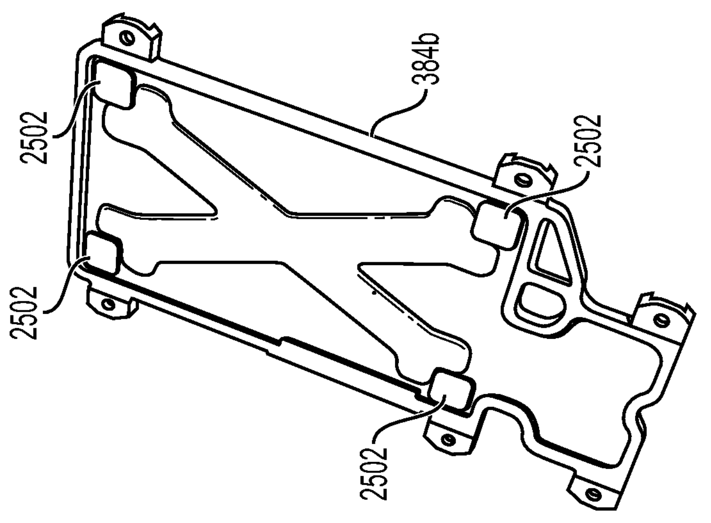
Figure 49B:
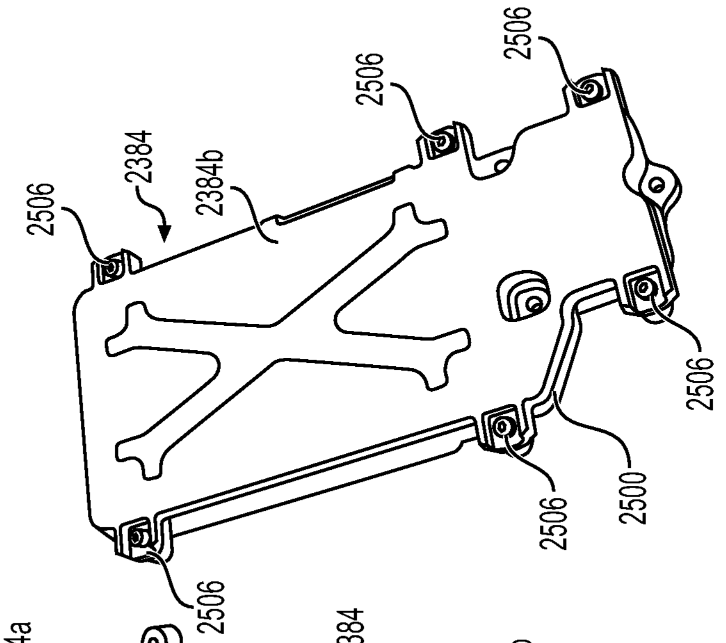
Figure 49A:
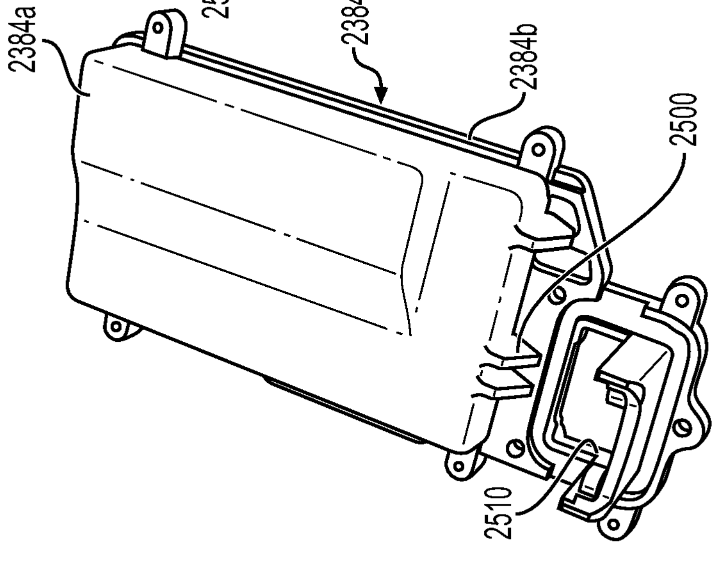
Figure 50B:
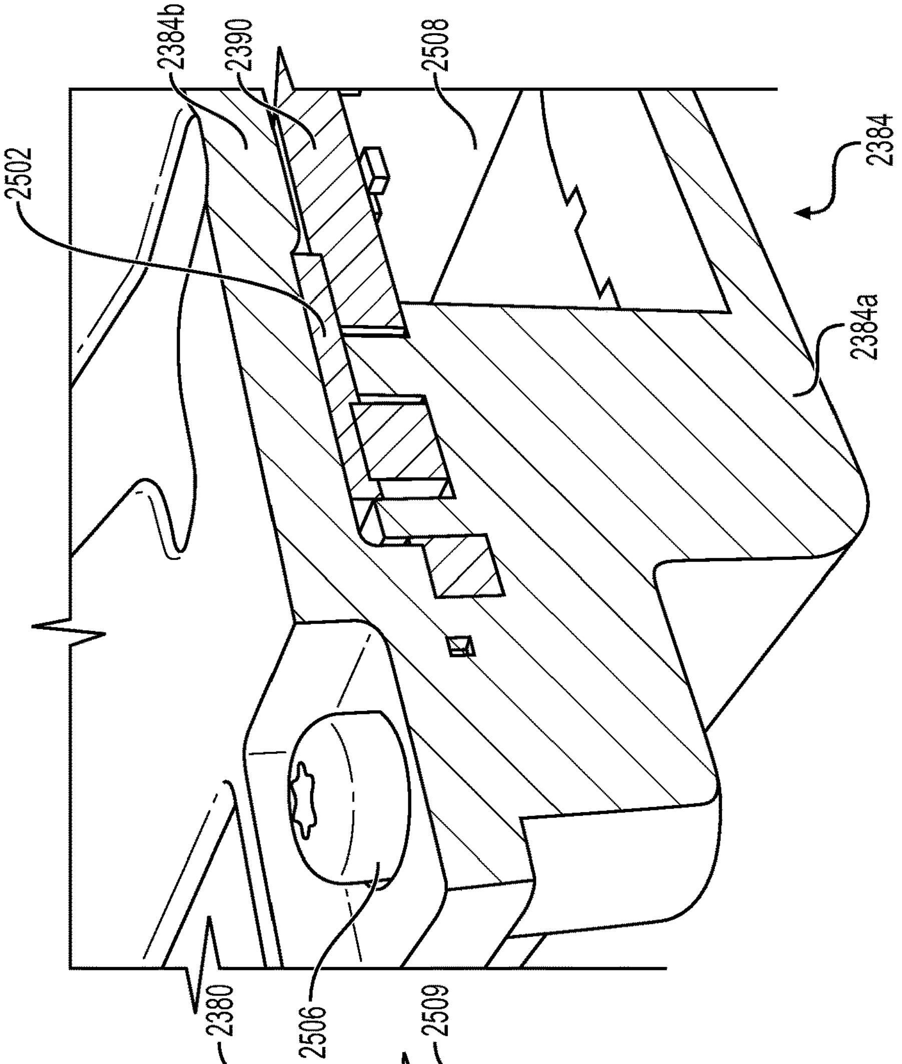
Figure 50A:
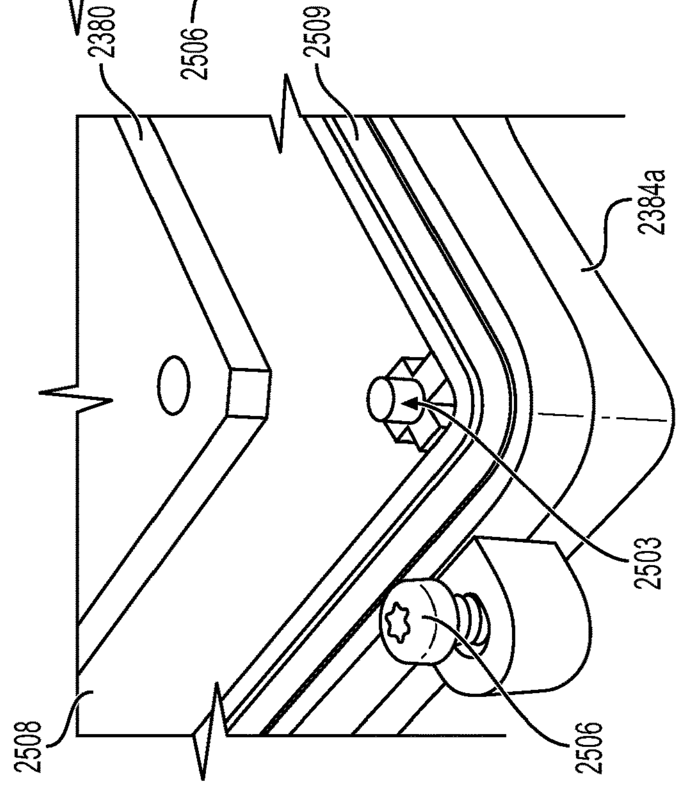

FIGS. 48A-B, 49A-C, and 50A-B show additional details of the controller housing 2384 of the power actuator 2322. Specifically, as best shown in FIGS. 49A-C, the controller housing 2384 includes at least one reinforcement rib 2500 formed therein for reinforcing the controller housing 2384. Also, as best shown in FIGS. 49A-C and 50A-B, the power actuator 2322 further includes a plurality of foam pads 2502 disposed in the controller housing 2384. The plurality of foam pads 2502 are configured to compress against the at least one controller printed circuit board 2390, 2392 and prevent the at least one controller printed circuit board 2390, 2392 from moving inside the controller housing 2384. A board locating pin 2503 is also provided for locating and securing the at least one controller printed circuit board 2390, 2392 in the controller housing 2384.

FIG. 51 shows an exploded view of the controller housing 2384 of the power actuator 2322. The at least one controller printed circuit board 2390, 2392 includes a main controller board 2390 disposed in the controller housing 2384 and a daughter board 2392 configured to be coupled to the main controller board 2390. The controller housing 2384 includes a controller housing box 2384*a* defining a controller peripheral channel 2504 extending around a periphery of the controller housing box 2384*a*. The controller housing 2384 also includes a controller housing cover 2384*b* configured to engage the controller housing box 2384*a*. The controller housing box 2384*a* and the controller housing cover 384*b* are held in abutment by a plurality of controller housing fasteners 2506 (e.g., screws). The controller housing box 2384*a* and the controller housing cover 2384*b* define a controller housing cavity 2508 therebetween. The main controller board 390 is disposed in the controller housing cavity 2508 and sealed therein by a controller housing grommet 2509 disposed in the controller peripheral channel 2504 sealingly engaging the controller housing box 2384*a* and the controller housing cover 2384*b*. Still referring to FIG. 51 and also referring to FIGS. 52, 53, 54A-B, 55, 56A-B, and 57A-B, which show details of the main controller board 2390 and the daughter board 2392 of the actuator controller 50. The controller housing 2384 includes an opening 2510 (FIG. 51) and the daughter board 2392 electrically connects to the main controller board 2390 in the controller housing 2384 and extends through the opening 2510 to be partially disposed in a gearbox housing board cavity 2512 of the gearbox housing 141, 142 and sealed in place with a controller box to gearbox grommet 2514. Specifically, in FIGS. 57A-B, a holder or daughter board cover 2513 is shown that secures the daughter board 2392 in gearbox housing 141. Accordingly, FIGS. 58A-B show a proposed change to the gearbox housing 141 and FIGS. 59A-D show a modified bracket or adapter 142 for the integrated controller option that can reduce an amount of steel used, for example.

According to an aspect, the actuator controller 50 is coupled to electric motor 36 and comprises the at least one controller printed circuit board 2390, 2392. The at least one controller printed circuit board 2390, 2392 includes a main controller board 2390 disposed in a controller housing 2384 and the daughter board 2392 configured to be coupled to the main controller board 2390. Again, the actuator controller 50 is configured to control the electric motor 36, however, instead of the main controller board 2390 and controller housing 2384 being attached to the actuator housing 141, 142, 148, 184, 2348, 2349, the main controller board 390 and controller housing 2384 can be disposed remotely from the actuator housing 141, 142, 148, 184, 2348, 2349. FIGS. 60A-B show that the main controller board 2390 and controller housing 2384 can be disposed remotely from the actuator housing 141, 142, 148, 184, 348, 349 (i.e., a remote ECU configuration) as an alternative to the main controller board 2390 and controller housing 2384 being attached to the actuator housing 141, 142, 148, 184, 2348, 2349. The daughter board 2392 includes a plurality of power supply connections 2600 for the electric motor 36 and at least one closure member feedback sensor 64, 144 for detecting a position of the electric motor 36. In more detail and as shown, the daughter board 2392 is at least partially disposed in a gearbox housing board cavity 2512 of a gearbox housing 141, 142 of the gearbox 140. A daughter board cover 2513 secures the daughter board 2392 in gearbox housing board cavity 2512 along with a controller box to gearbox grommet 2514, and the main controller board 2390 is disposed remotely from the daughter board 2392 and the daughter board 2392 electrically couples to the main controller board 2390 through a main to daughter wiring harness 2515.

Figure 63B:
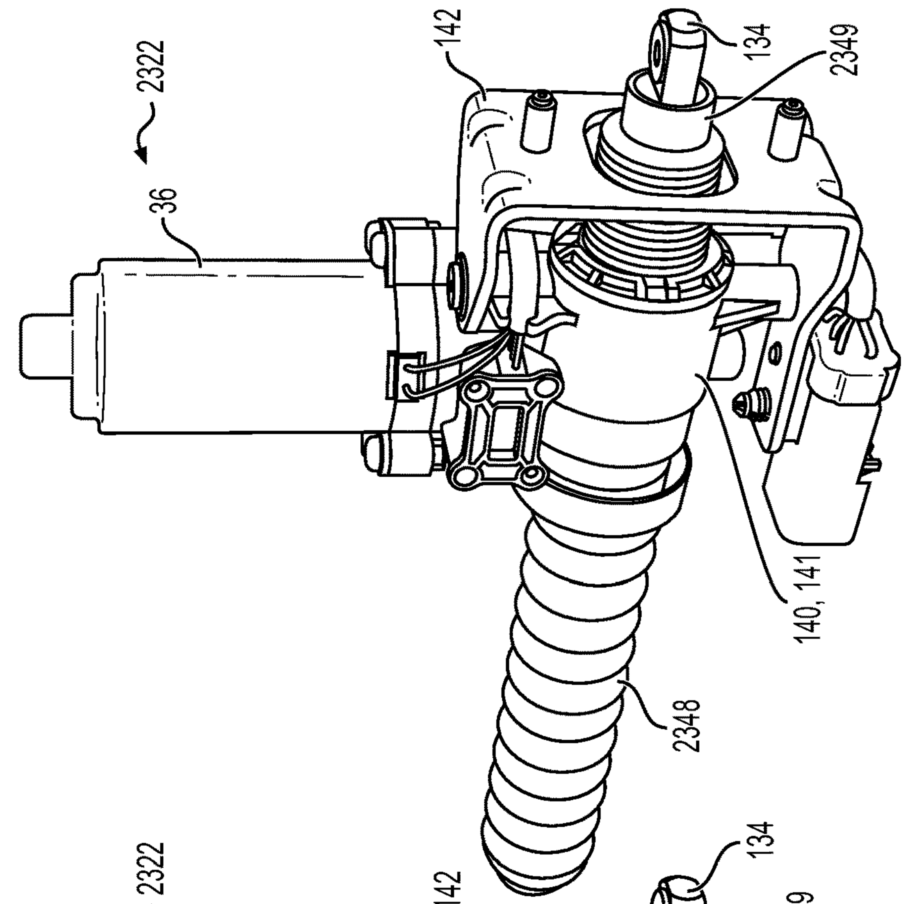
Figure 63A:
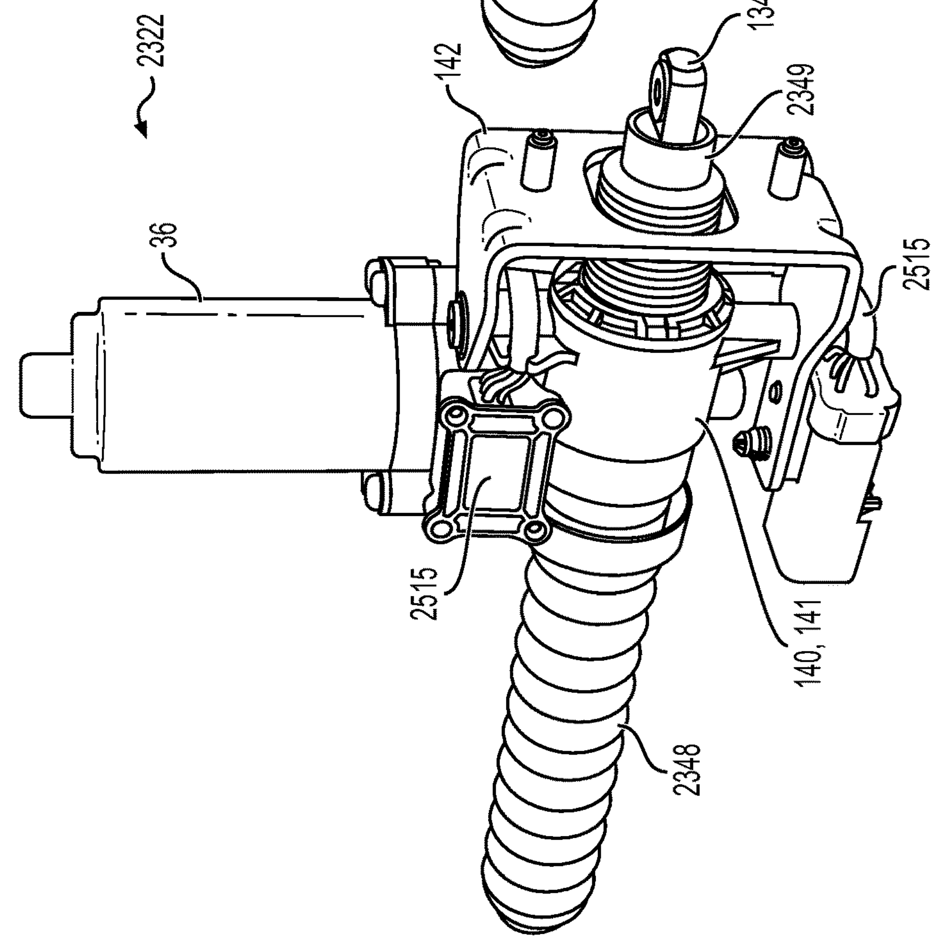
Figure 64B:
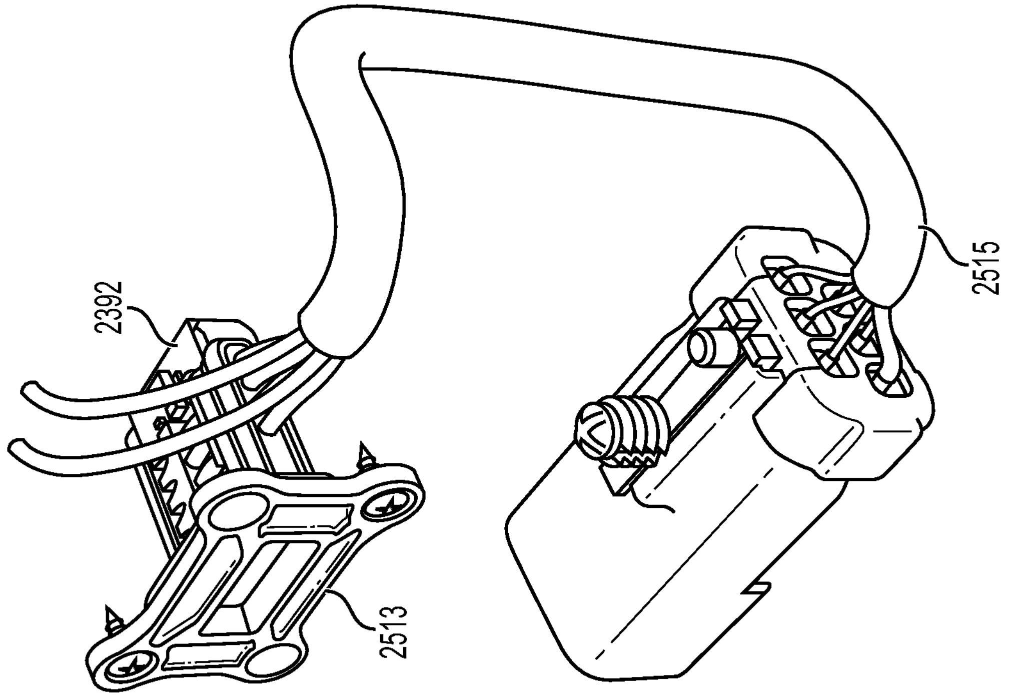
Figure 64A:
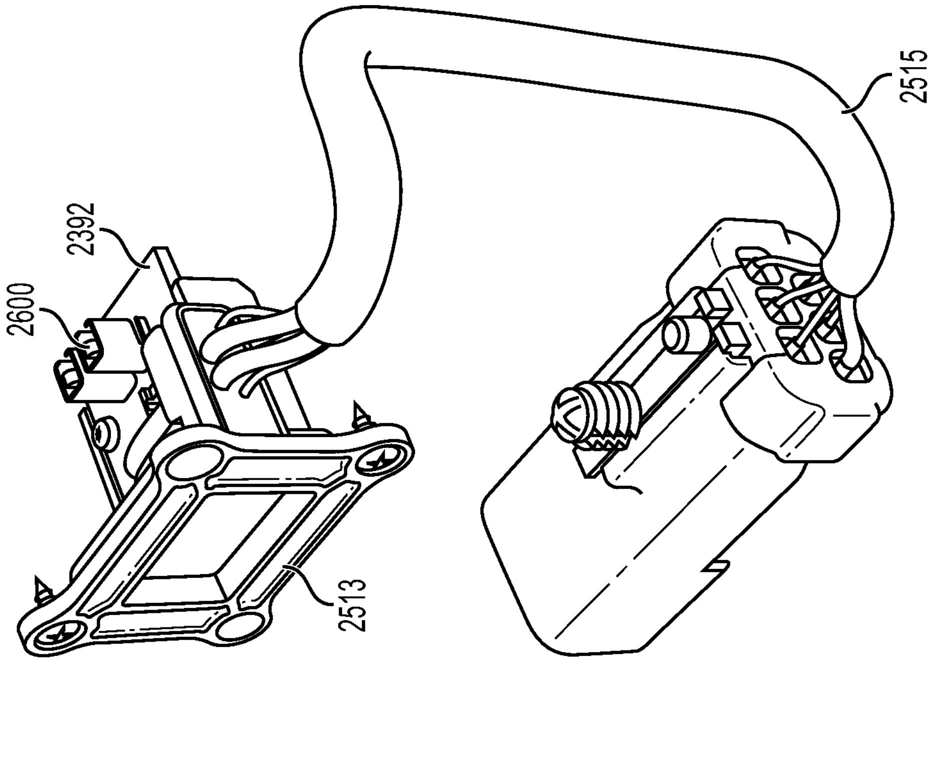
Figure 65:
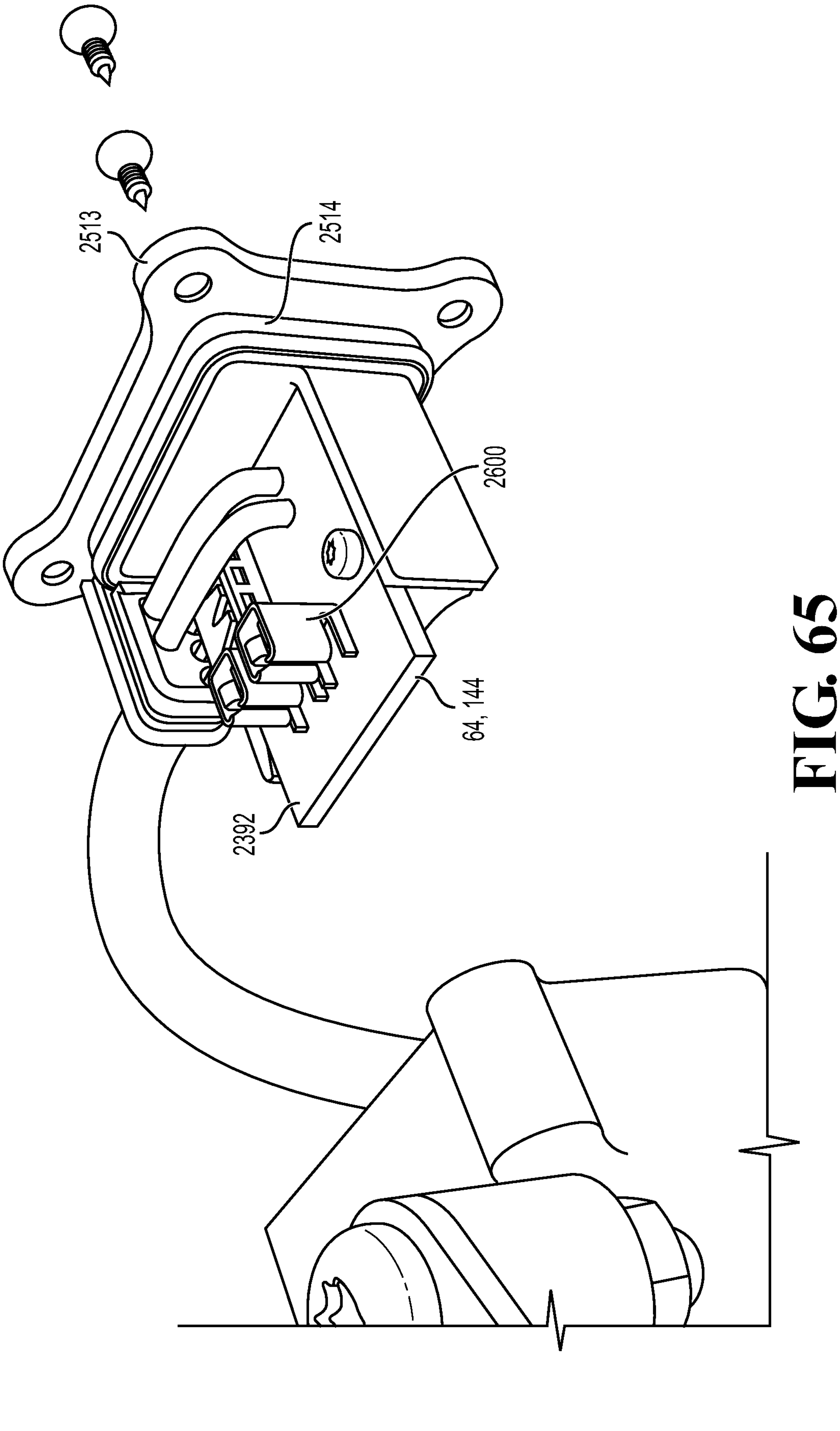
Figure 66A:
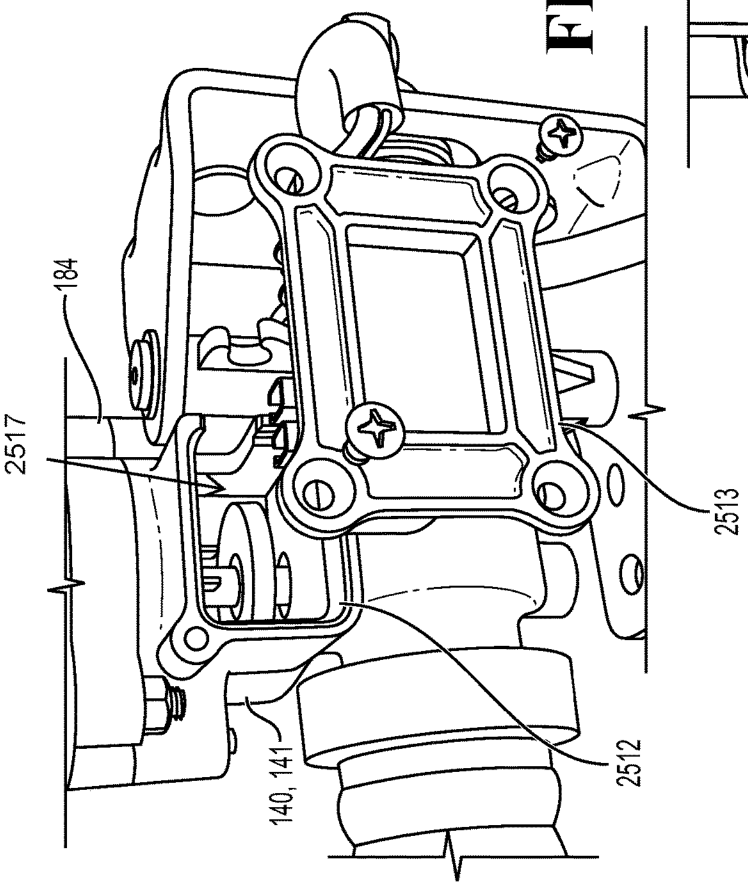
Figure 66B:
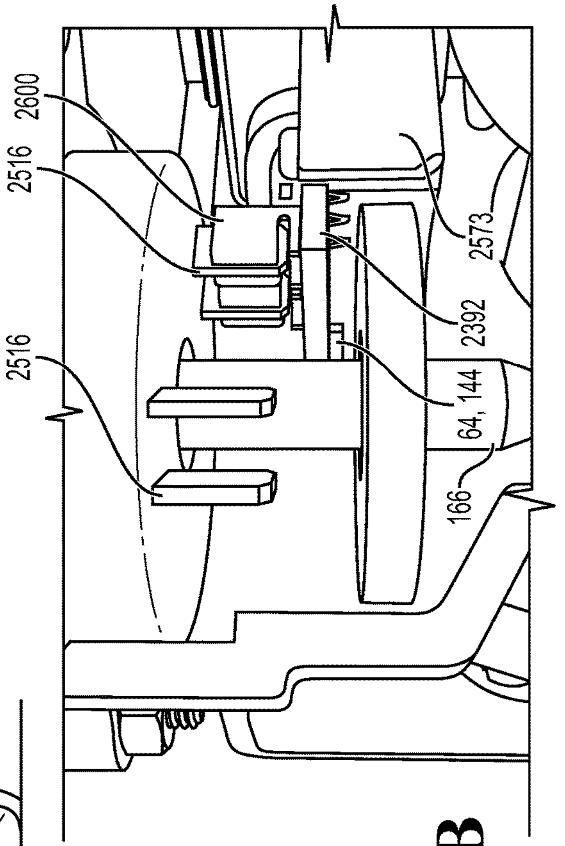
Figure 67B:
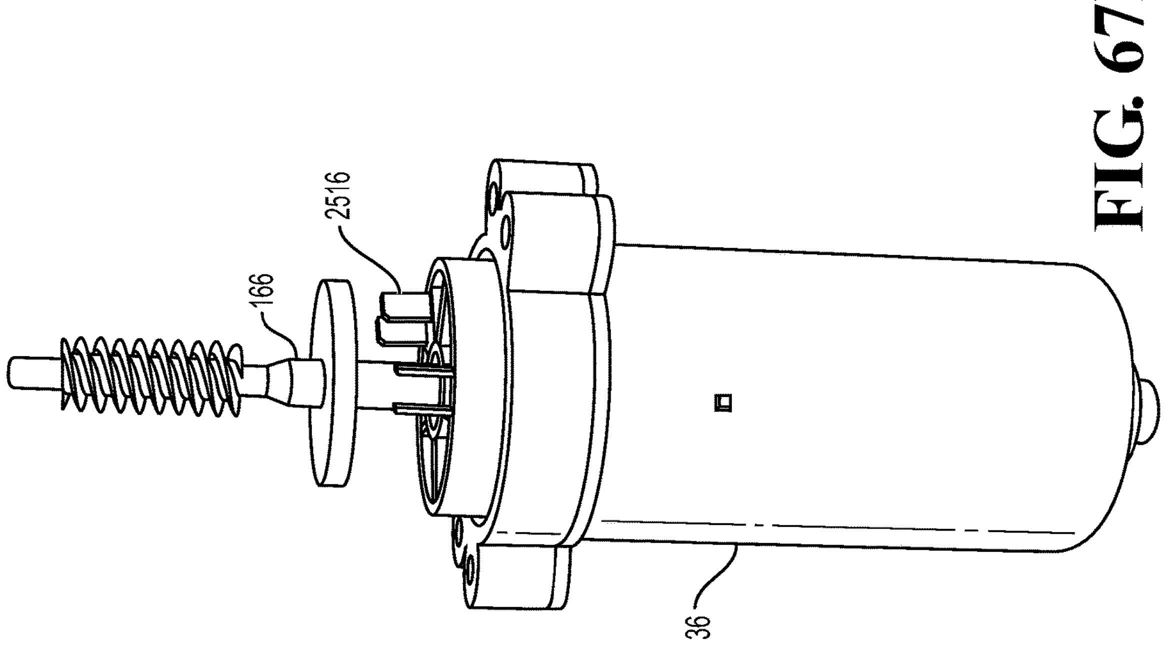
Figure 67A:
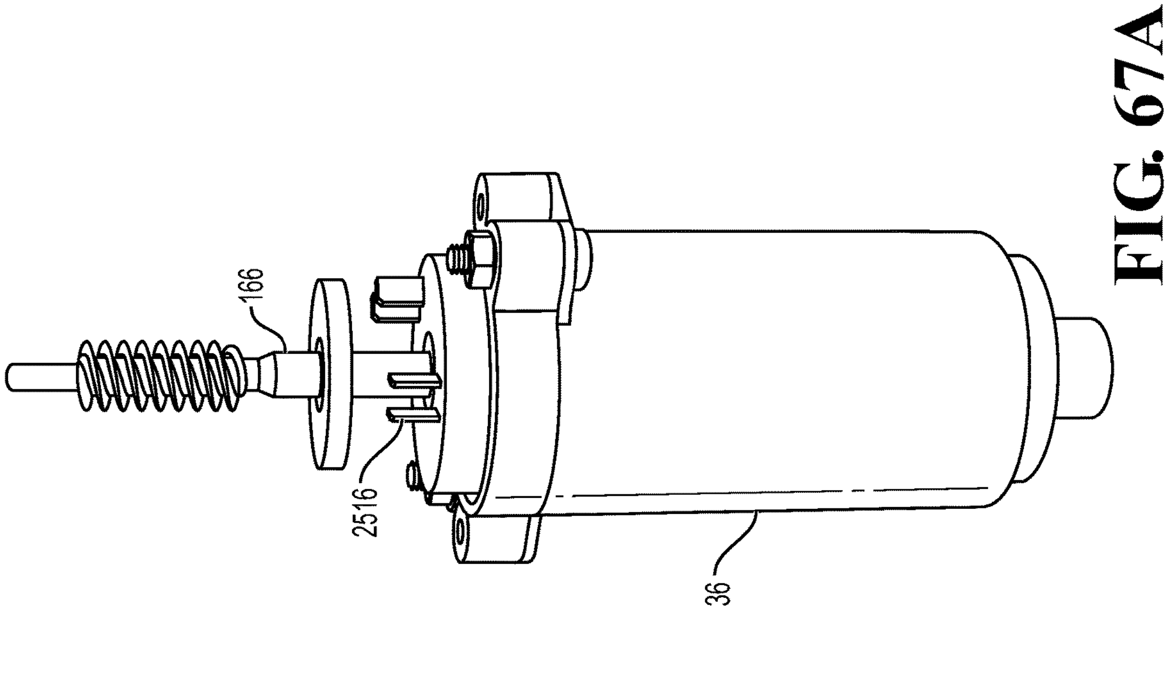
Figures 68A, 68B, 68C:
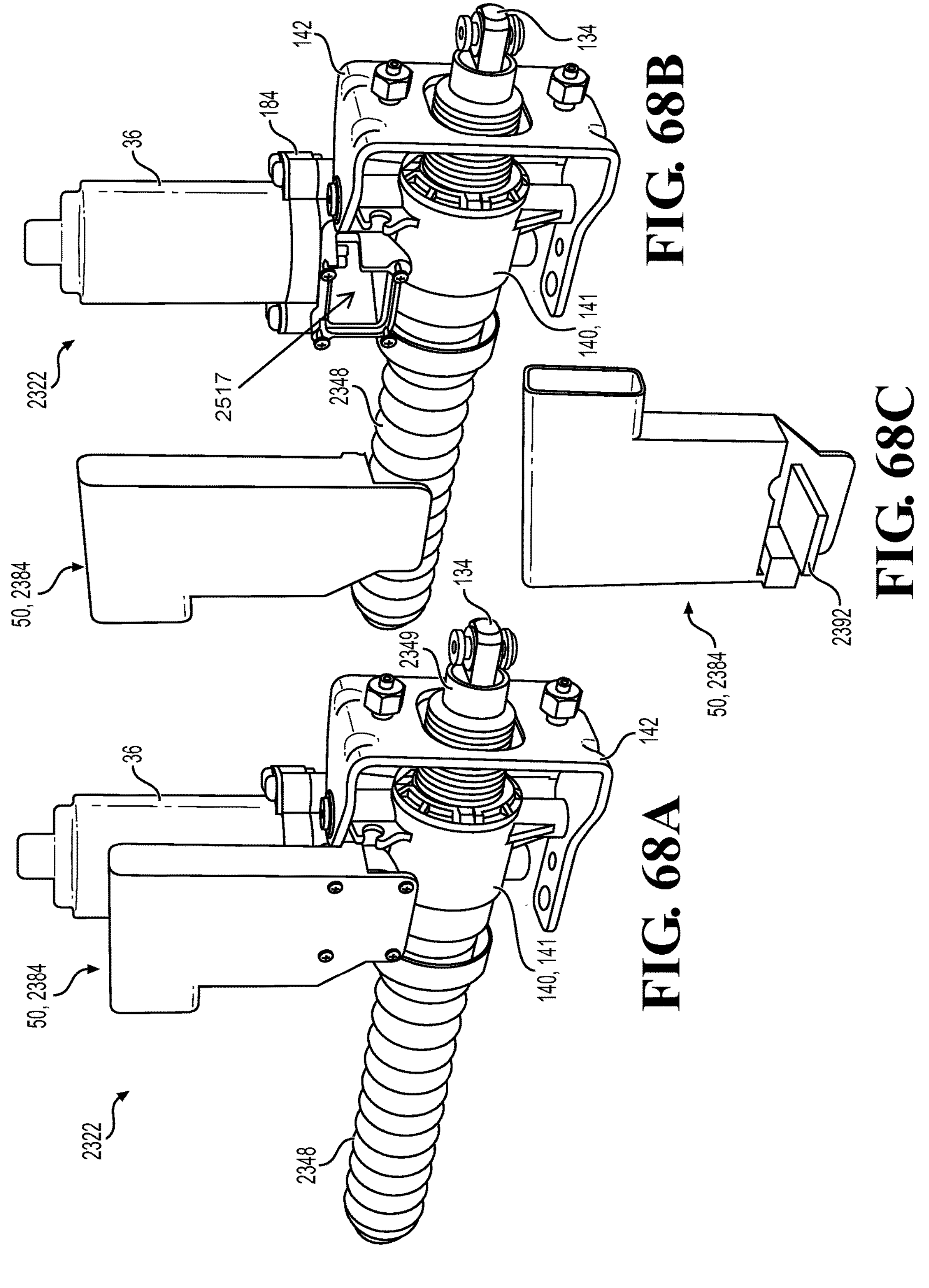
Figure 69:
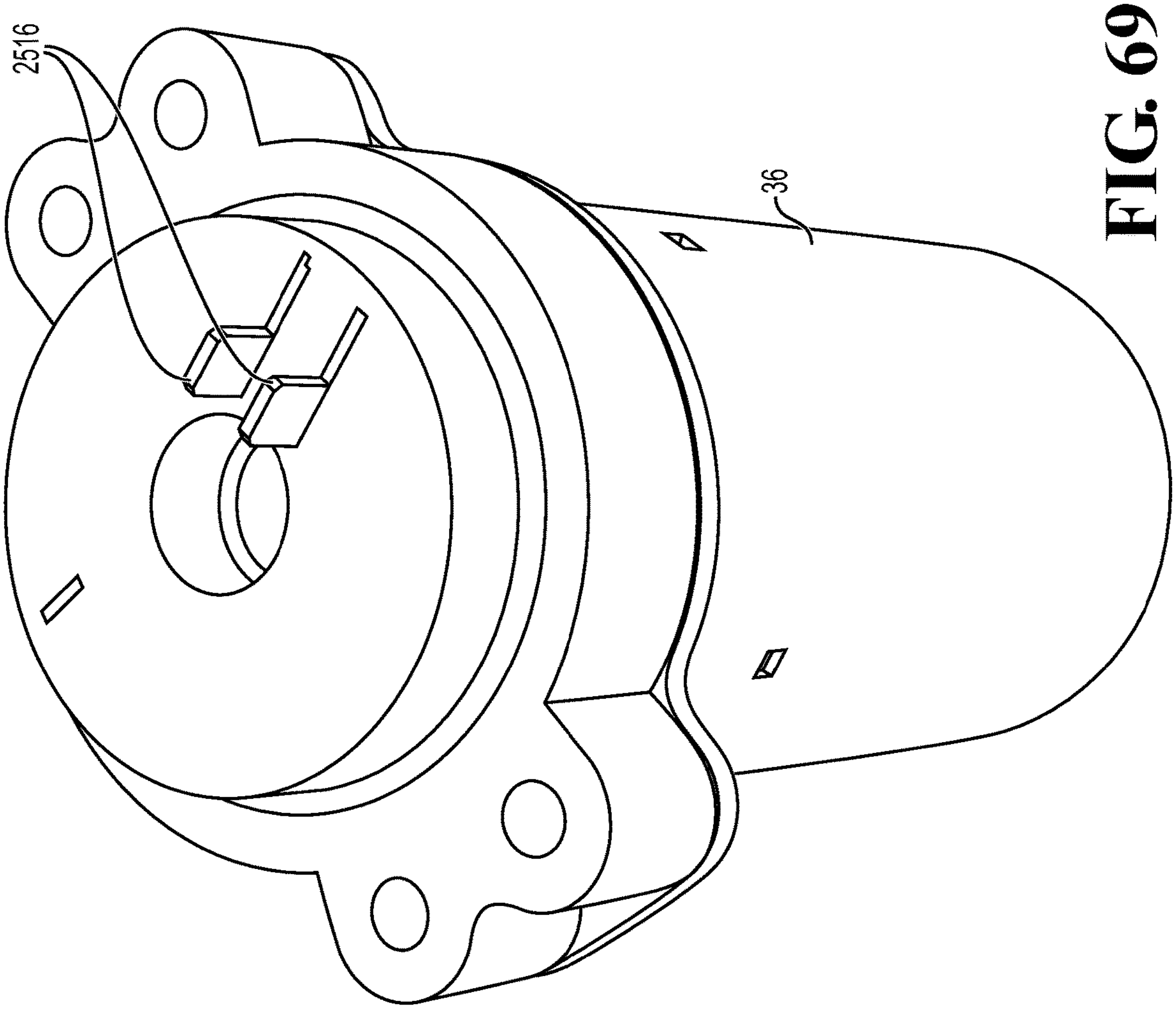
Figure 70:
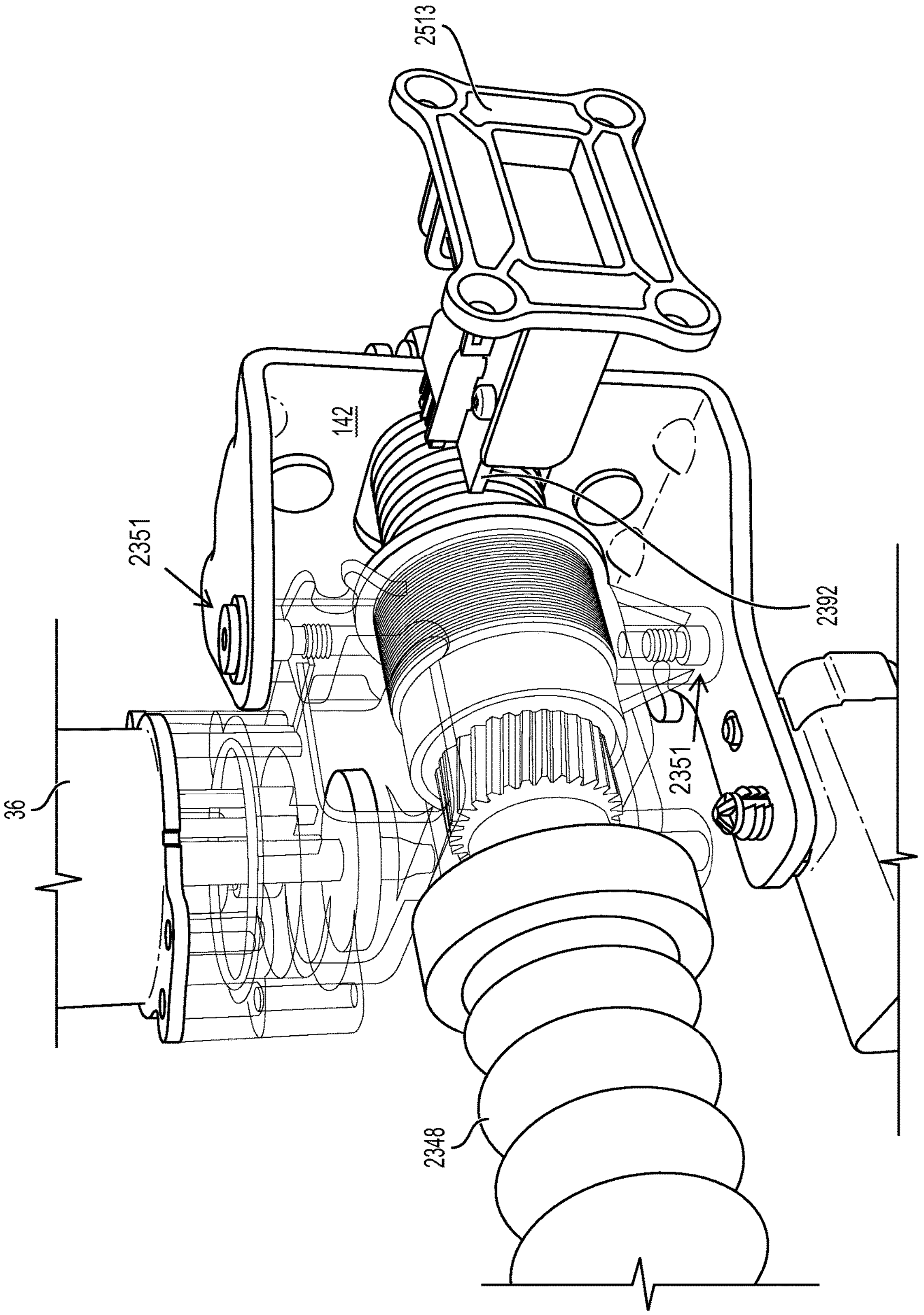
Figure 71:
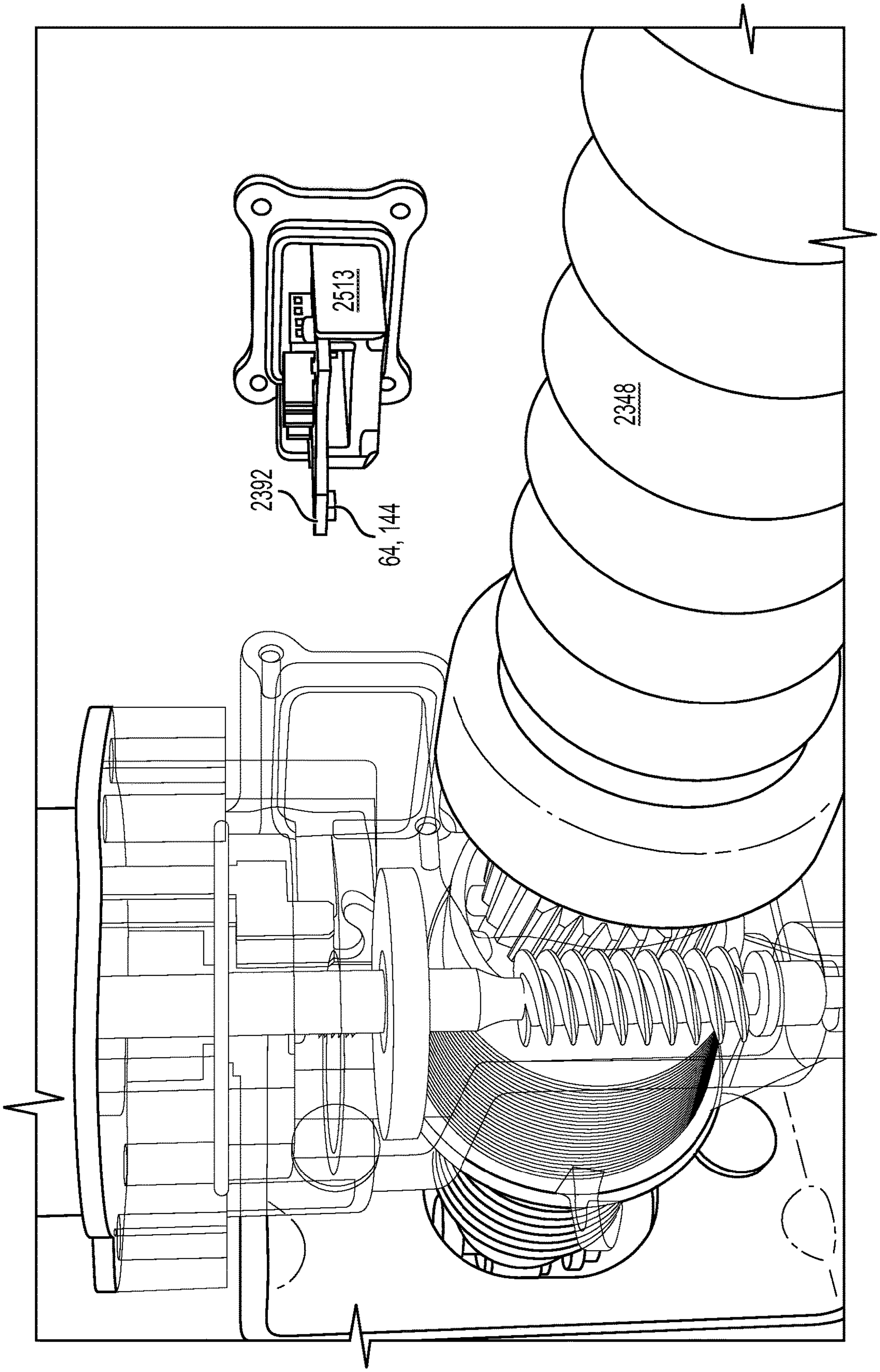
Figure 72:
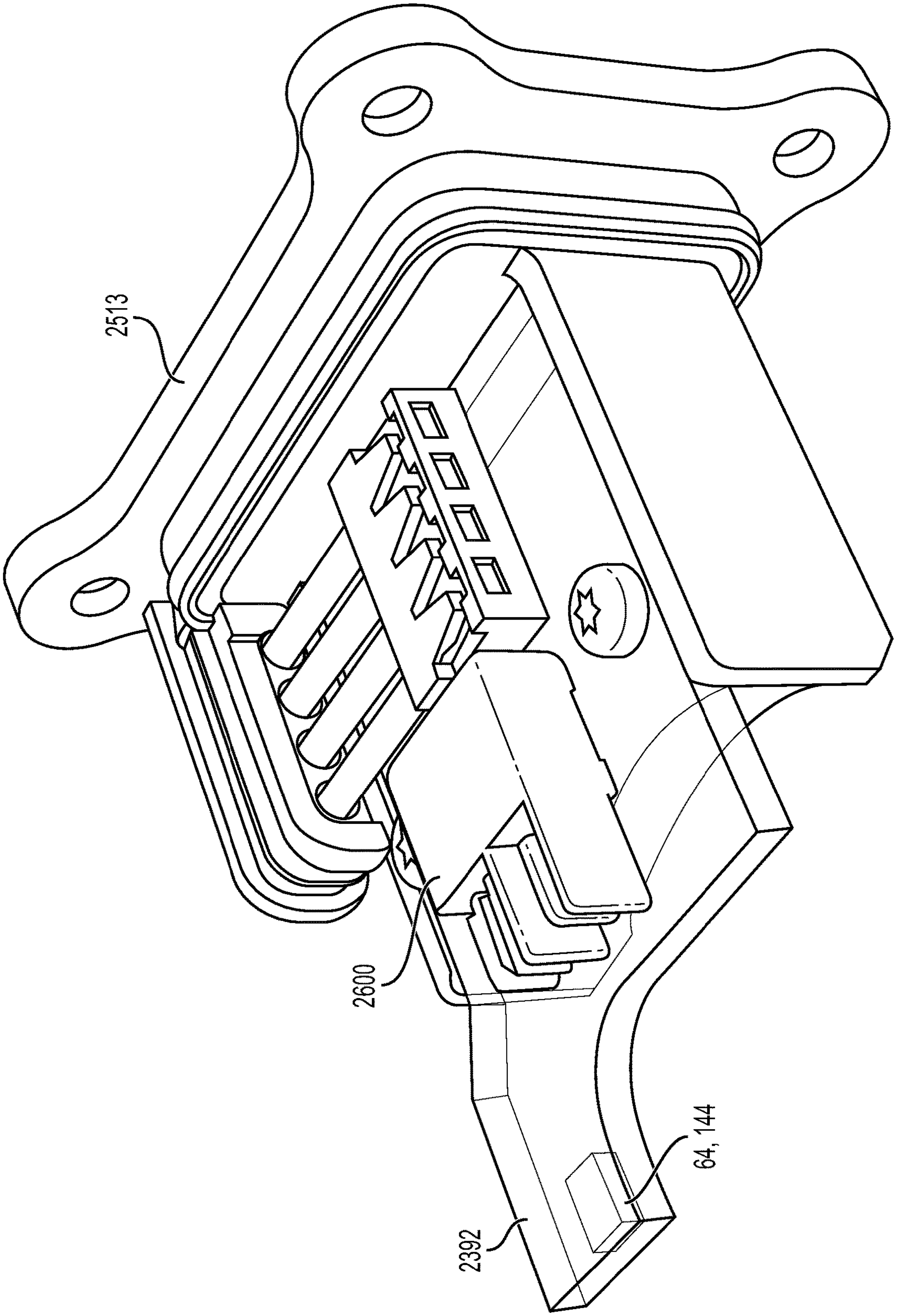
Figure 73:
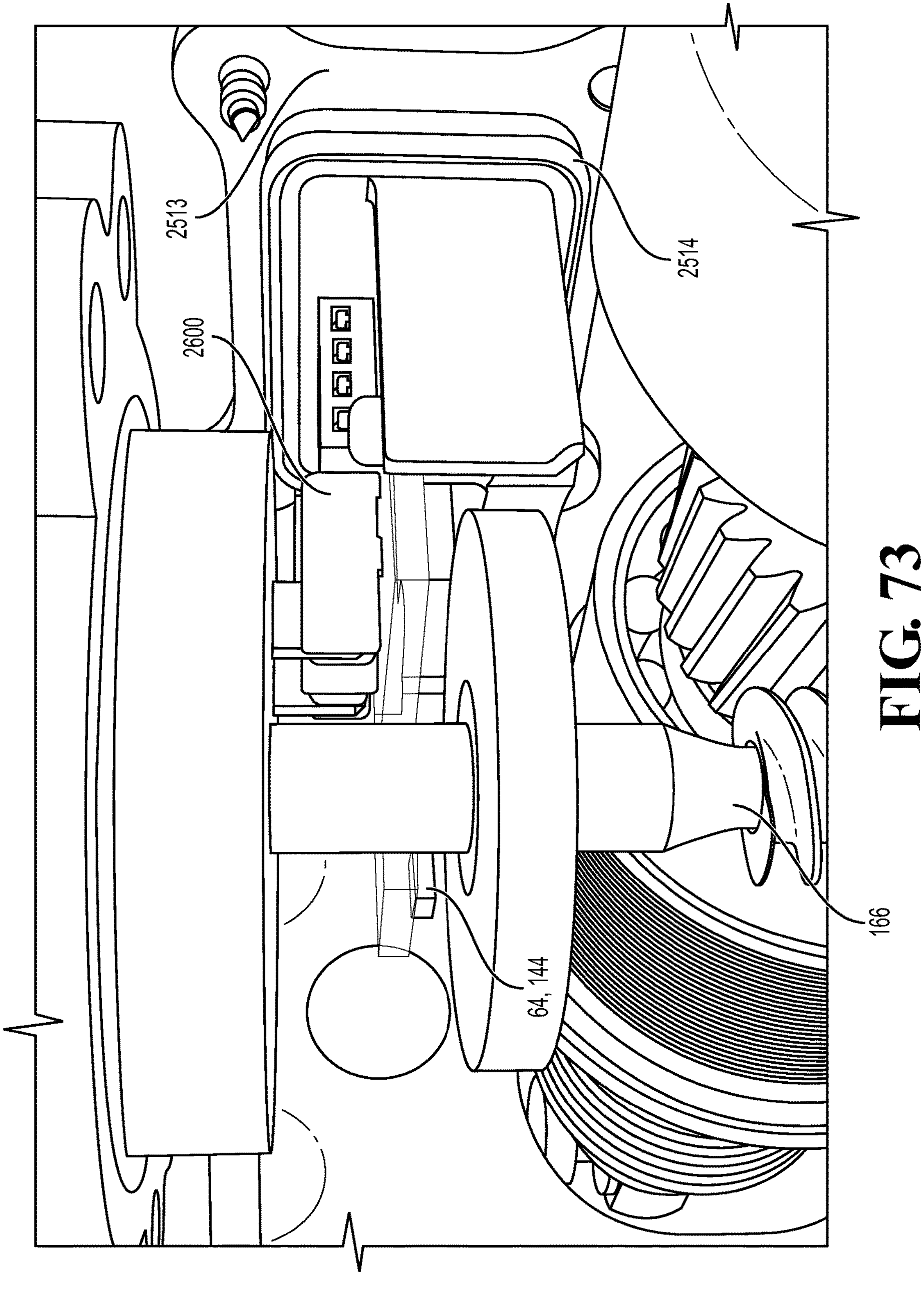

FIGS. 61A-B show a bracket extension of the adapter 142 that may be utilized when the main controller board 2390 and controller housing 2384 are disposed remotely from the actuator housing 141, 142, 148, 184, 2348, 2349 along with the controller box to gearbox grommet 2514 with wiring extending therethrough for the remote ECU configuration. FIGS. 62A-B show that both the remote ECU configuration and configuration in which the controller housing 2384 is attached to the actuator housing 141, 142, 148, 184, 2348, 2349 are within a cross car width requirement. FIGS. 63A-B, 64A-B, and 65 show details of the daughter board 2392 and wiring for the remote ECU configuration. So, for example, in FIG. 63B, two power lines and a grommet used for the two power lines can be eliminated. Rubber wire seals may also enlarged to accommodate different wire gauges, as shown in FIG. 63A. Similarly, FIG. 63A also shows that the daughter board cover 2513 is enlarged to accommodate different wire gauges. As shown in FIGS. 64A-B, the daughter board cover 2513 is common between left hand and right hand configurations.

Figure 74B:
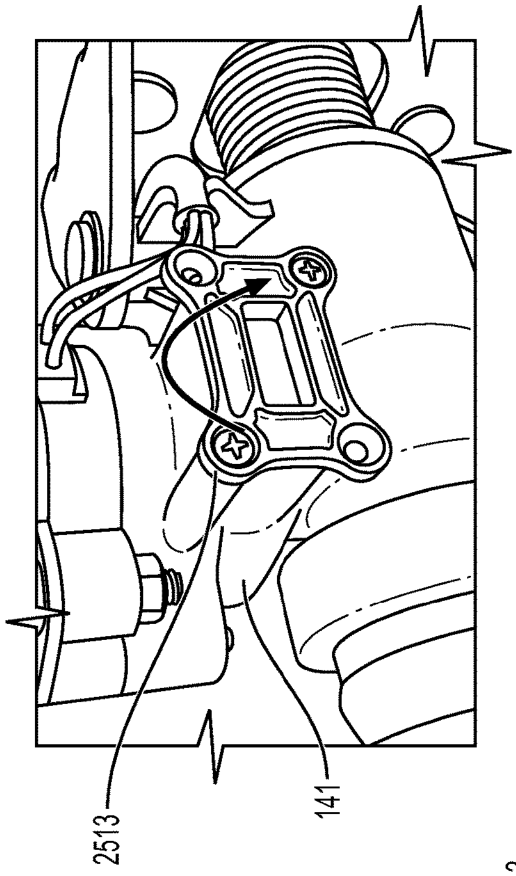
Figure 74C:
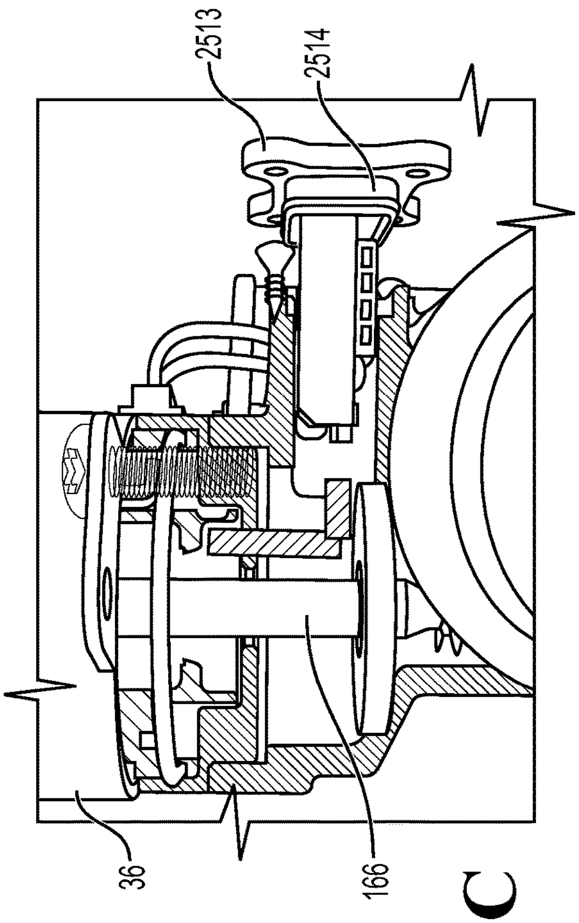
Figure 74A:
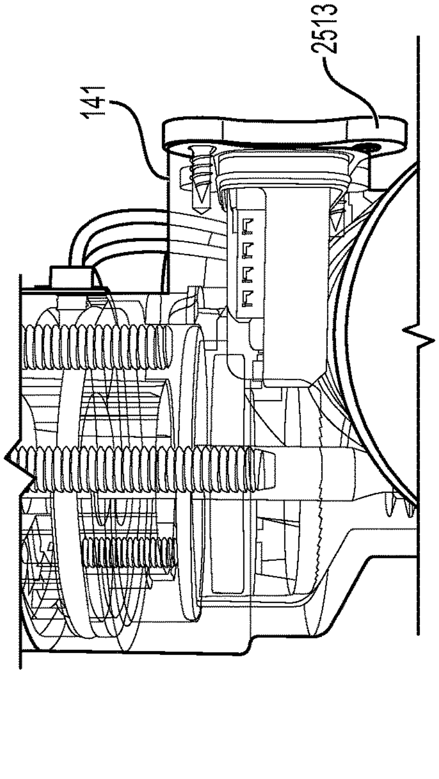
Figure 75:
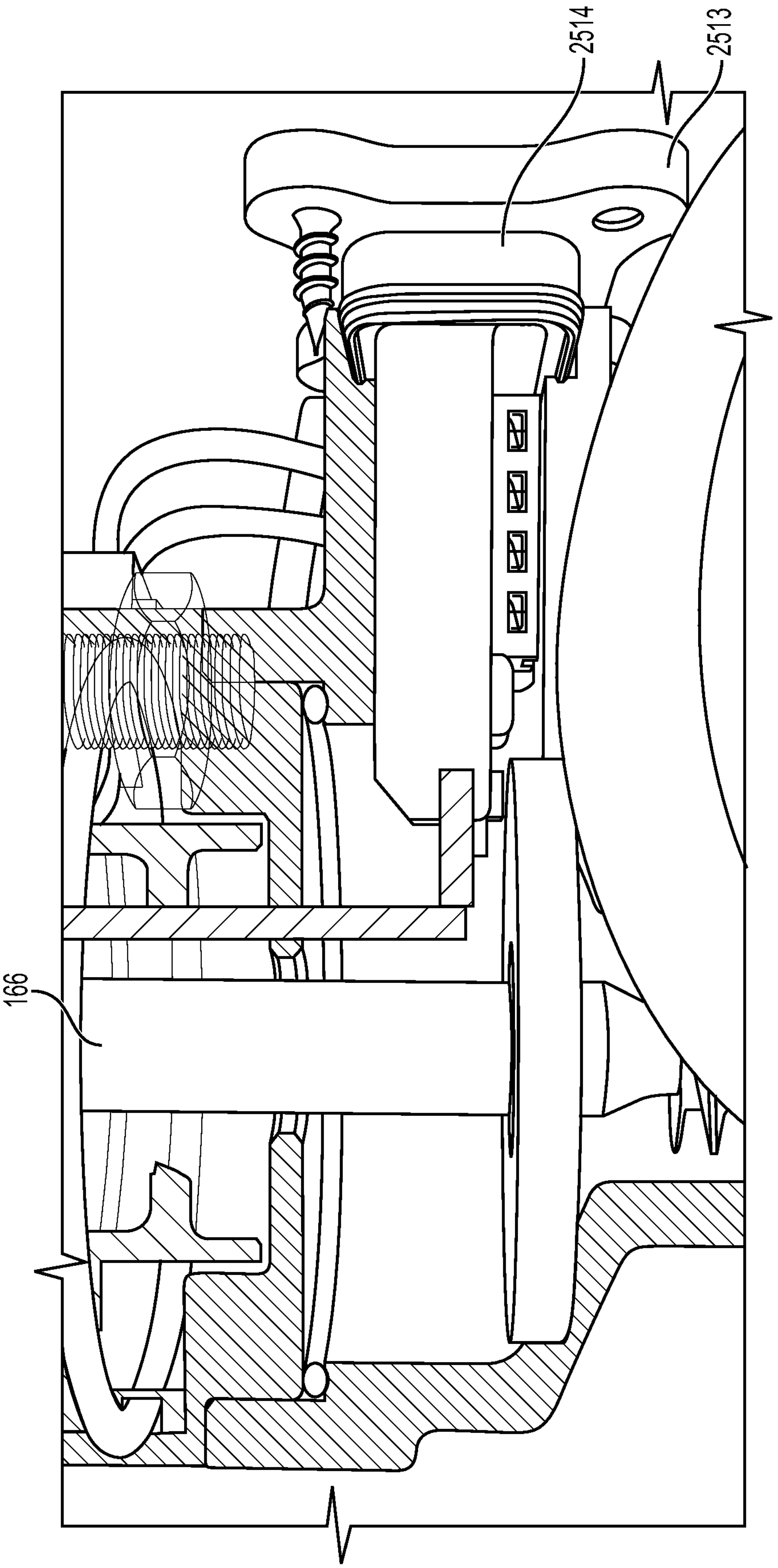
Figure 76B:
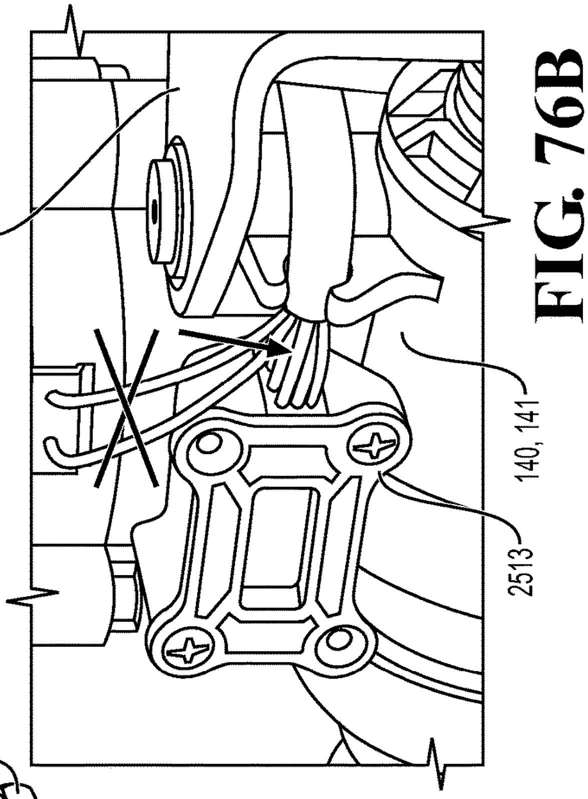
Figure 76A:
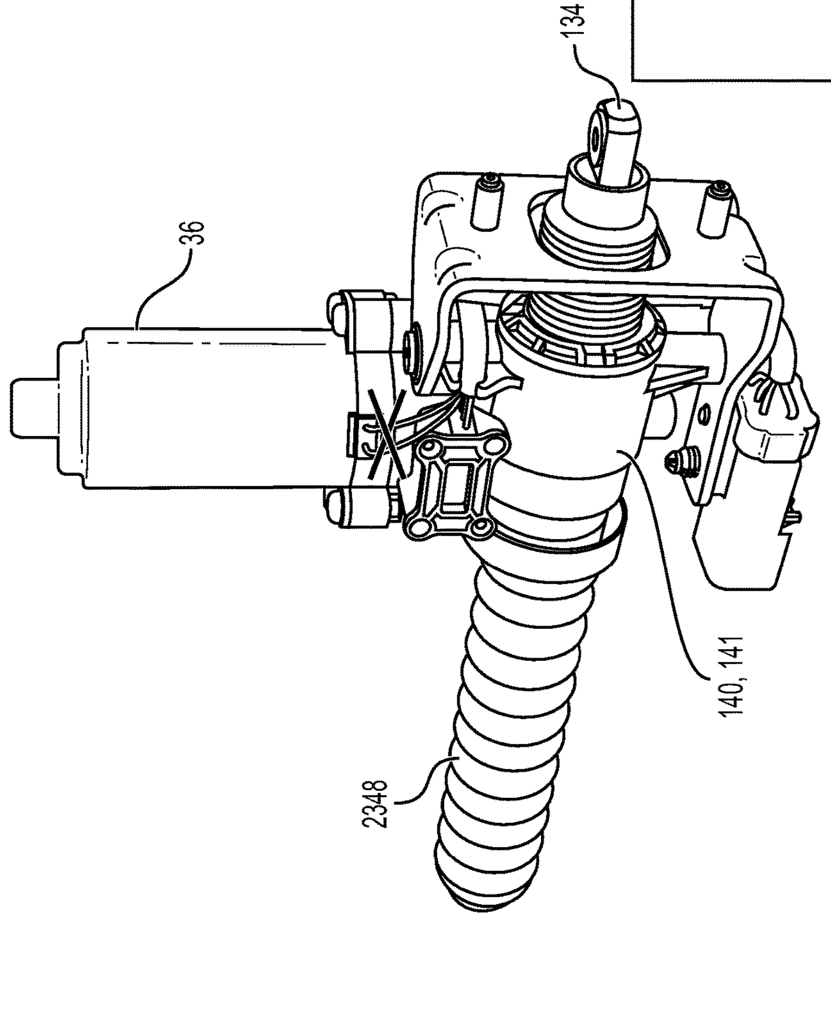
Figure 77:
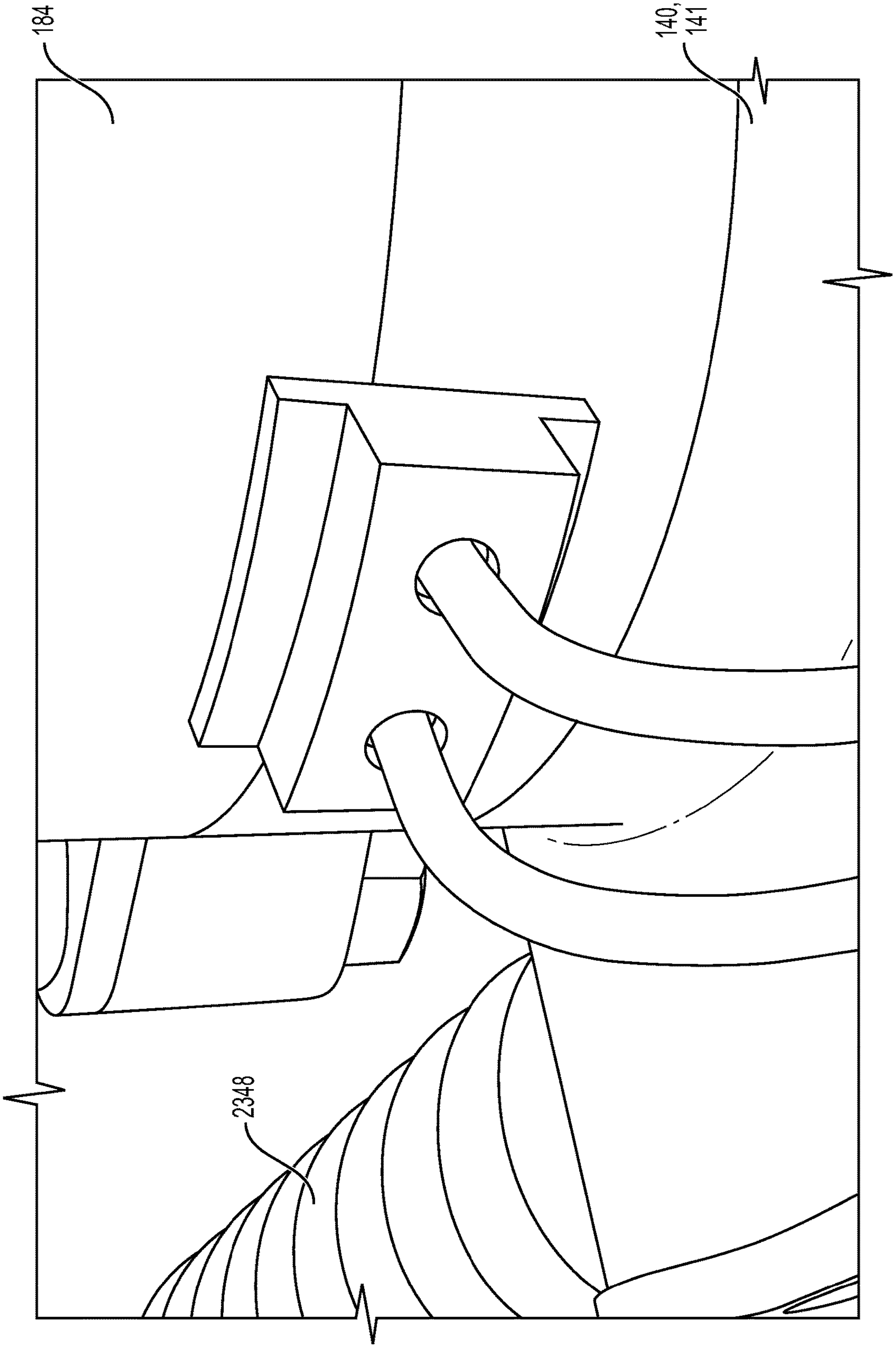
Figure 78B:
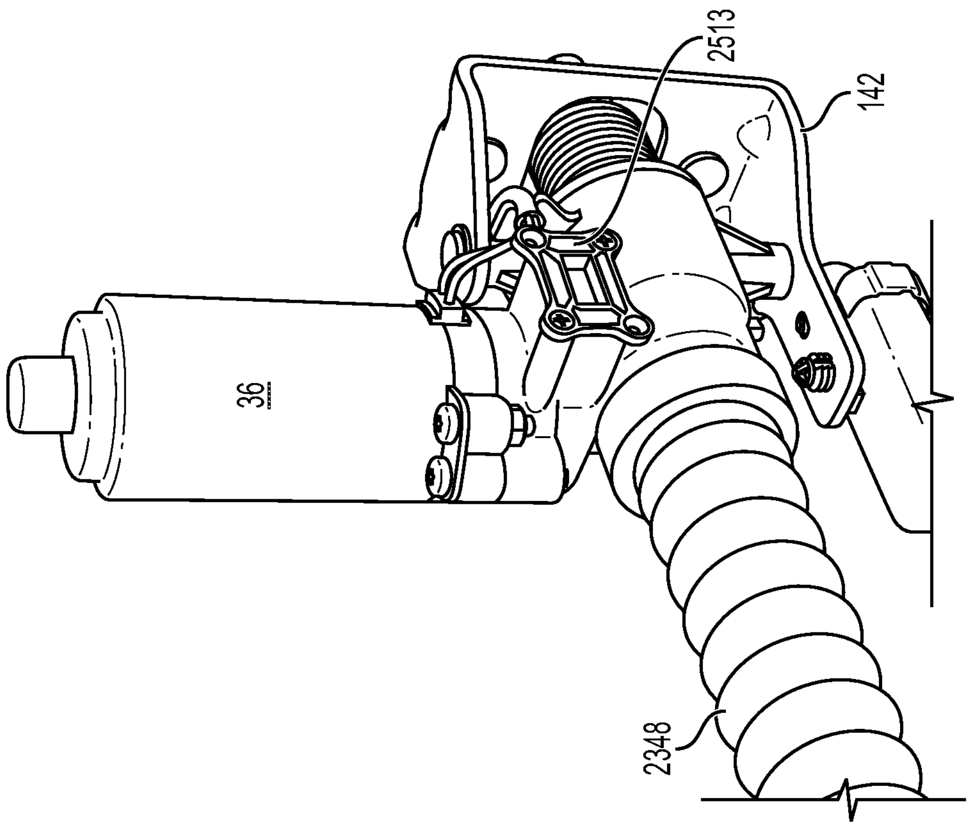
Figure 78A:
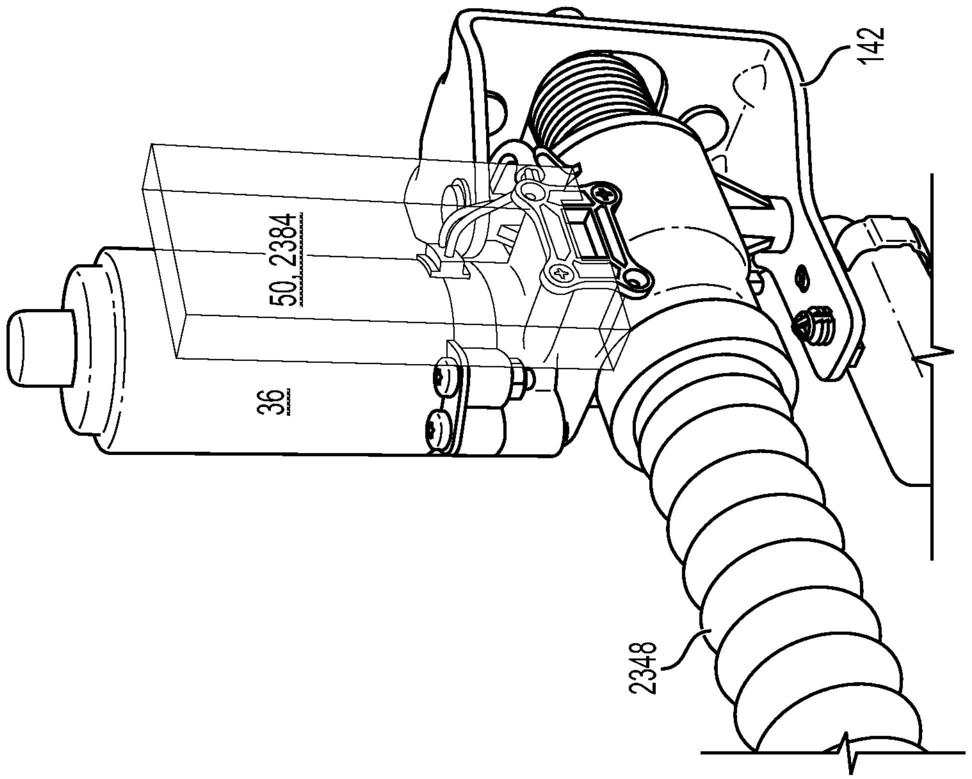

FIGS. 66A-B, 67A-B, 68A-C, 69, 70, 71, and 72 illustrate details of a gearbox housing 141, 142, and a sensor housing 184 of the power actuator 2322. As shown, the actuator housing 141, 142, 148, 184, 2348, 2349, 2384 includes the sensor housing 184 attached to the electric motor 36 and disposed between the electric motor 36 and the gearbox housing 141, 142. The sensor housing 184 includes a plurality of blade terminals 2516 connected to a motor brush card of the electric motor 36 and extending into the gearbox housing board cavity 2512. The blade terminals to keep one part number for the left hand and a right hand motor 36. The daughter board 2392 includes a plurality of power supply connections 2600 on a first side of the daughter board 2392 and at least one closure member feedback sensor 64, 144 for detecting a position of the electric motor 36 on a second side of the daughter board 2392. FIGS. 73, 74A-C, 75, 76A-B, 77, and 78A-B show an interface between the electric motor 36 and the daughter board 2392. Specifically, FIG. 74A, shows a current arrangement with a magnet above the Hall sensor, while FIG. 74B shows the magnet moved down and the daughter board 2392 flipped over so that the Hall sensor is facing down. In FIG. 76A, a change is necessary to prevent a power wire for the motor would going thru the motor 36 to merge with other wires coming from the daughter board cover 2513, and FIG. 76B shows wires would need to come from the daughter board cover 2513. FIG. 77 provides further details regarding the removal of the two power wires to the motor 36 and associated grommet. FIGS. 79 and 80A-B show various design options usable for both the remote ECU configuration and when the controller housing 2384 is attached to the actuator housing 141, 142, 148, 184, 2348, 2349. For example, in FIG. 79, half of the ECU housing 2384 may be integrated to the motor 36. A connection between the motor 36 and the controller 50 could be done inside of the motor 36 with an ECU board sliding into a circular board. An ultrasonically or laser welding process could be applied to seal two half of the controller housing 2384. This would mean two different part numbers for the motor 36 (integrated controller 50 and controller 50 as a separate part). Another option is to provide such design of the housing 2384 that the controller 50 could be plugged in but, at the same time replaced with smaller plug that in case the controller 50 will not be an integral part. In that case motor 36 would be still the same (for both options) as well as the gearbox housing 141. The motor 36 would be connected to the controller 50 internally and no wires would be coming outside of the motor 36 to connect those two together.

Figure 86:
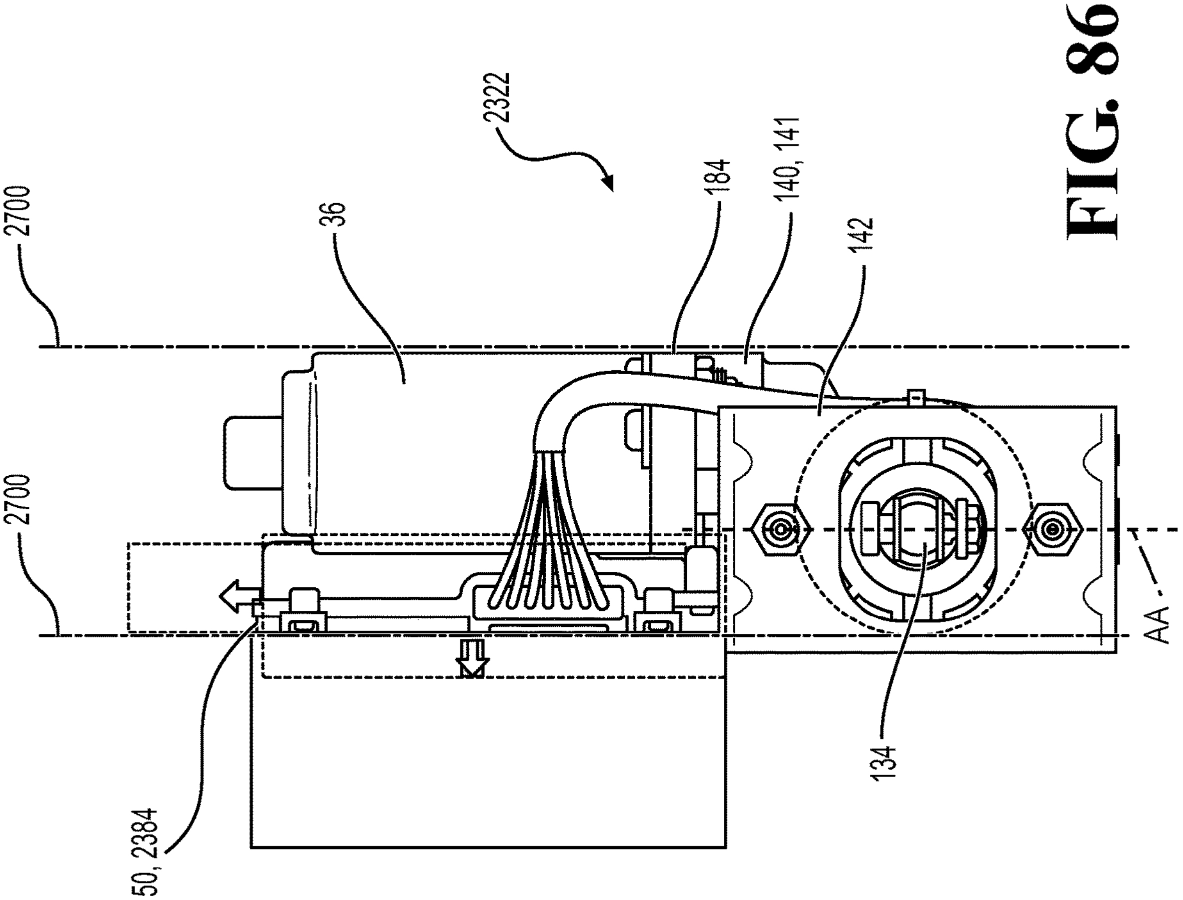
Figure 87:
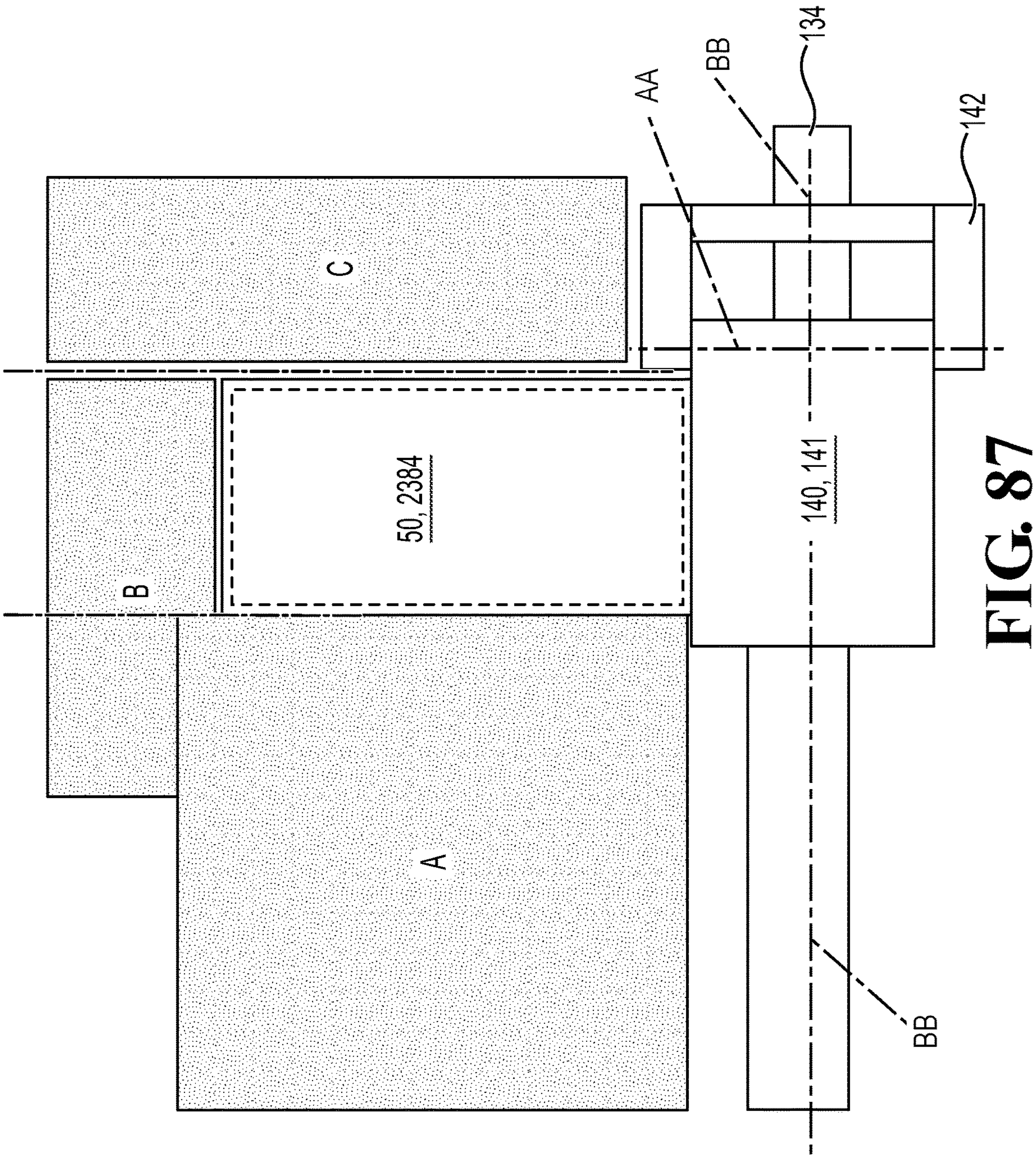
Figure 88B:
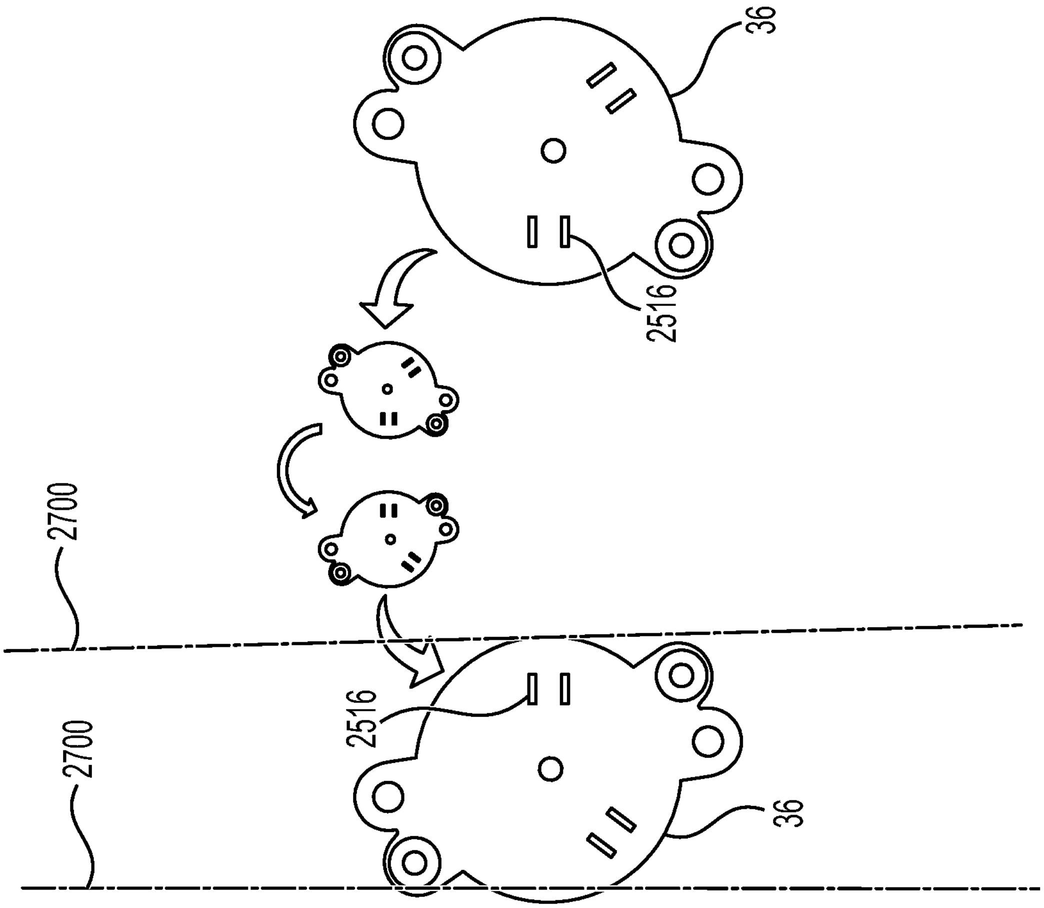
Figure 88A:
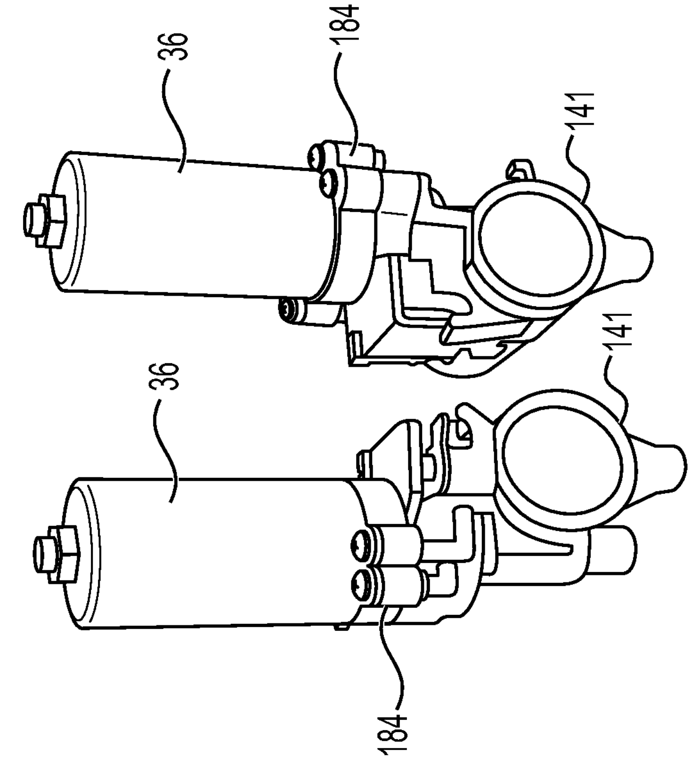
Figure 89B:
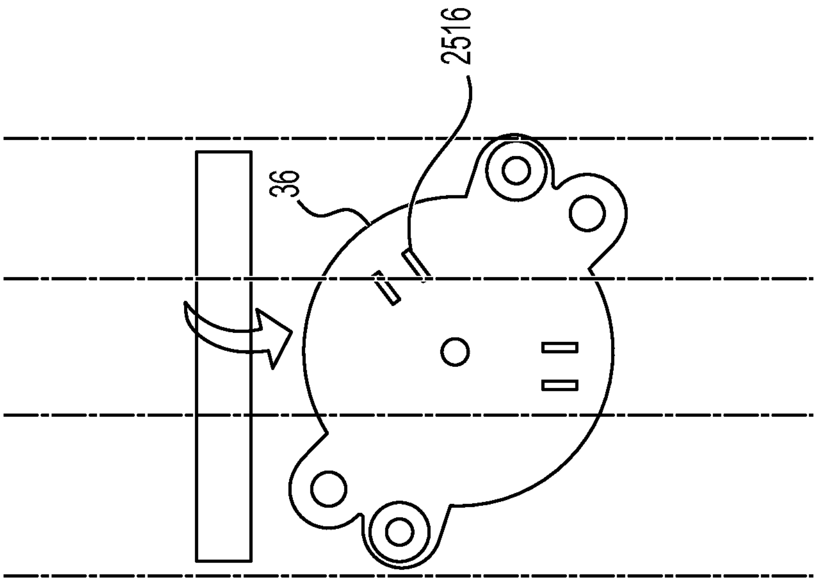
Figure 89A:
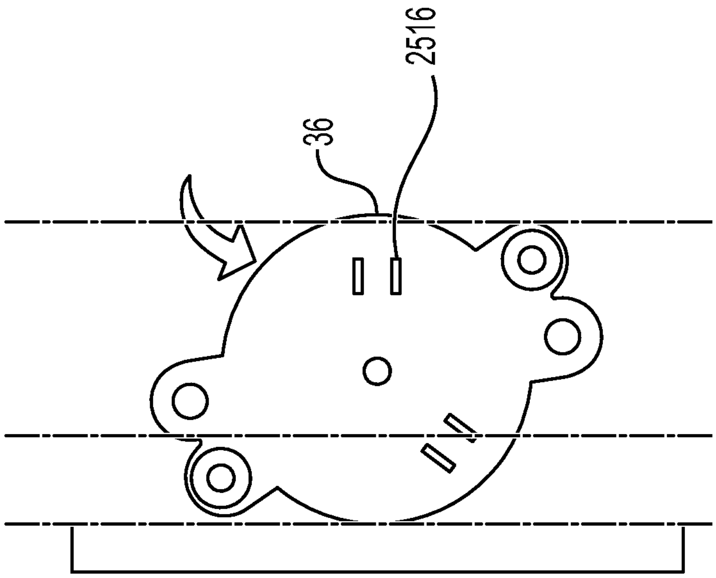
Figure 90B:
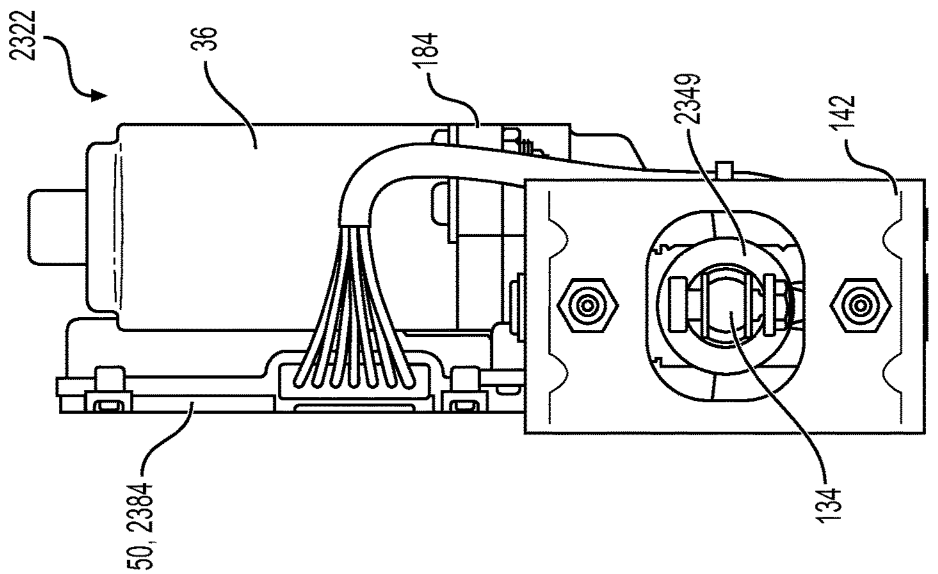
Figure 90A:
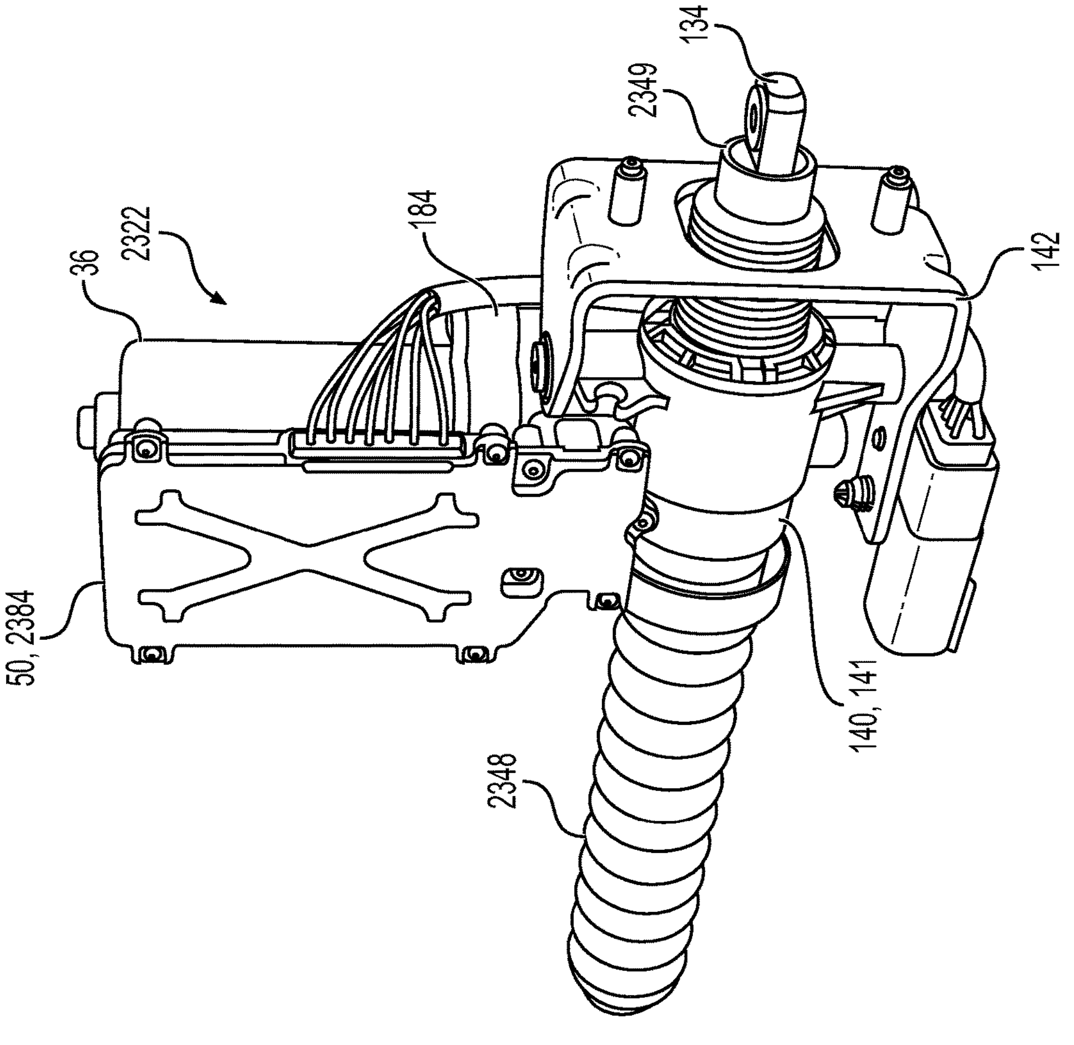
Figure 91:
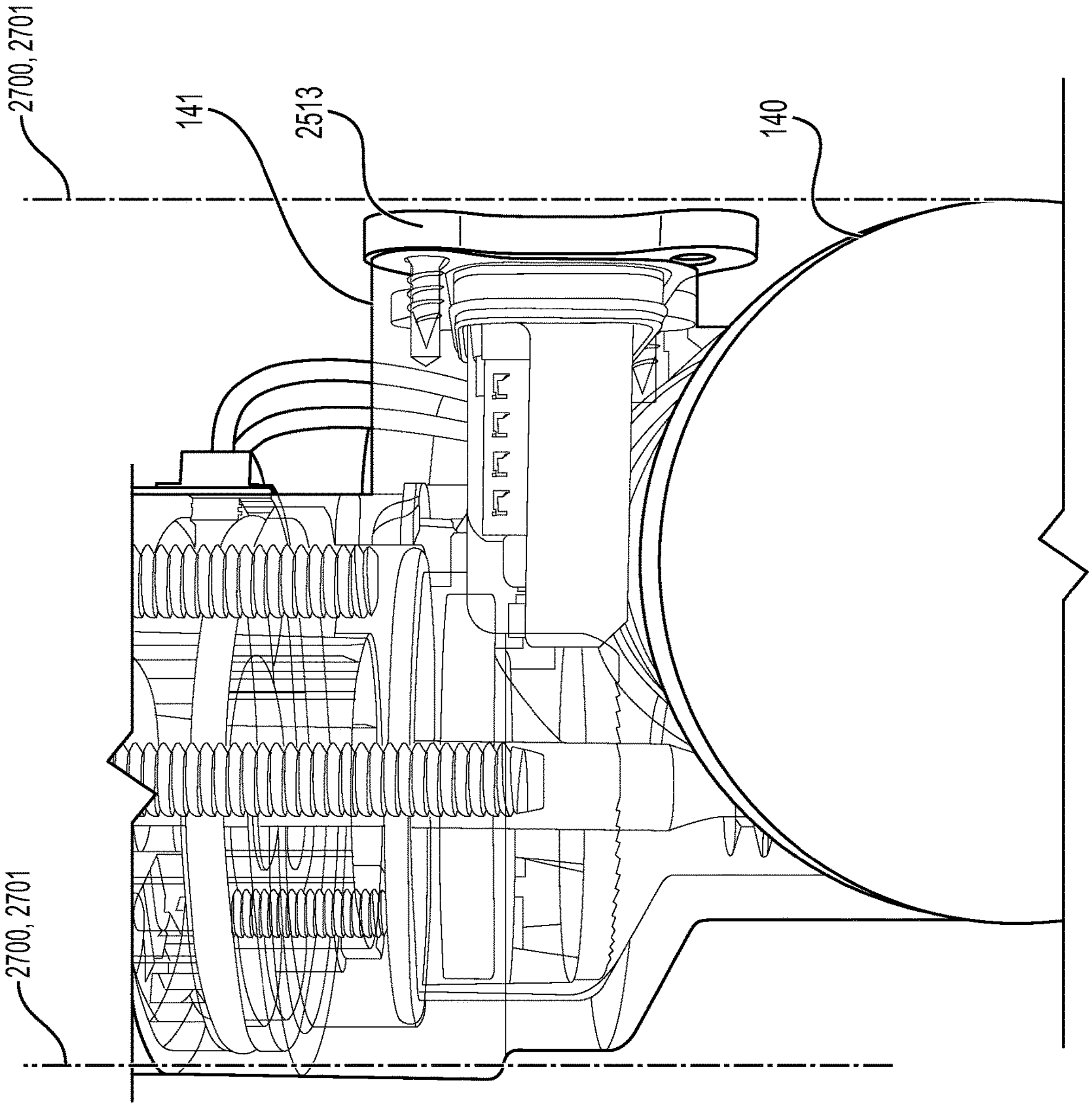

FIGS. 81, 82, 83, 84, 85, 86, 87, 88A-B, 89A-B, 90A-B, and 91 show a location of the controller housing 2384 relative to other components within the cavity 39 of the door 12 within an outer door sheet metal panel 12*a* and an inner sheet metal panel 12*b* (e.g., window pane 2397, speaker 2399, glass run channels 2400 and/or or window regulator rails 2401). Again, the actuator controller 50 is coupled to electric motor 36 and comprises at least one controller printed circuit board 2390, 2392 disposed in the controller housing 2384 and configured to control the electric motor 36. The actuator housing 141, 142, 148, 184, 2348, 2349, 2384 is configured to be pivotally coupled to the closure member 12 about a pivot axis and swing during opening and closing of the closure member 12. According to an aspect, and as best shown in FIG. 86, the controller housing 2384 for the actuator controller 50 is disposed adjacent the electric motor 36 and does not extend further beyond outer extents 2700 of at least one of the electric motor 36 and the gearbox 140. In more detail, the outer extents 2700 includes a lateral extent of the power actuator 22, 122, 222, 2322 viewed from a front of the power actuator 22, 122, 222, 322 in line with an axis 704 of the extensible member 134. As best shown in FIG. 91, the outer extents 2700 additionally includes a depth extent of the power actuator 22, 122, 222, 2322 (shown as lines 2701) viewed from a side of the power actuator 22, 122, 222, 2322.

FIGS. 92, 93, 94, 95A-D, and 96A-B illustrate pressure regulation in the actuator housing 141, 142, 148, 184, 2348, 2349, 2384. According to an aspect, the extensible member 134 extends between a first extensible end configured to be coupled to the body 14 of the vehicle 10 through a link bar 130 and a second extensible end. The actuator housing 141, 142, 148, 184, 2348, 2349, 2384 includes a rear extensible bellows 2348 of a polymeric material being cup-shaped and attached to the gearbox housing 141, 142 and disposed over and extending along the extensible member 134 to the second extensible end of the extensible member 134. The rear extensible bellows 2348 is configured to expand linearly along the extensible member 134 in response to the extensible member 134 retracting from the body 14 of the vehicle 10. The rear extensible bellows 348 is also configured to contract linearly along the extensible member 134 in response to the extensible member 134 extending toward the body 14 of the vehicle 10.

Figure 92:
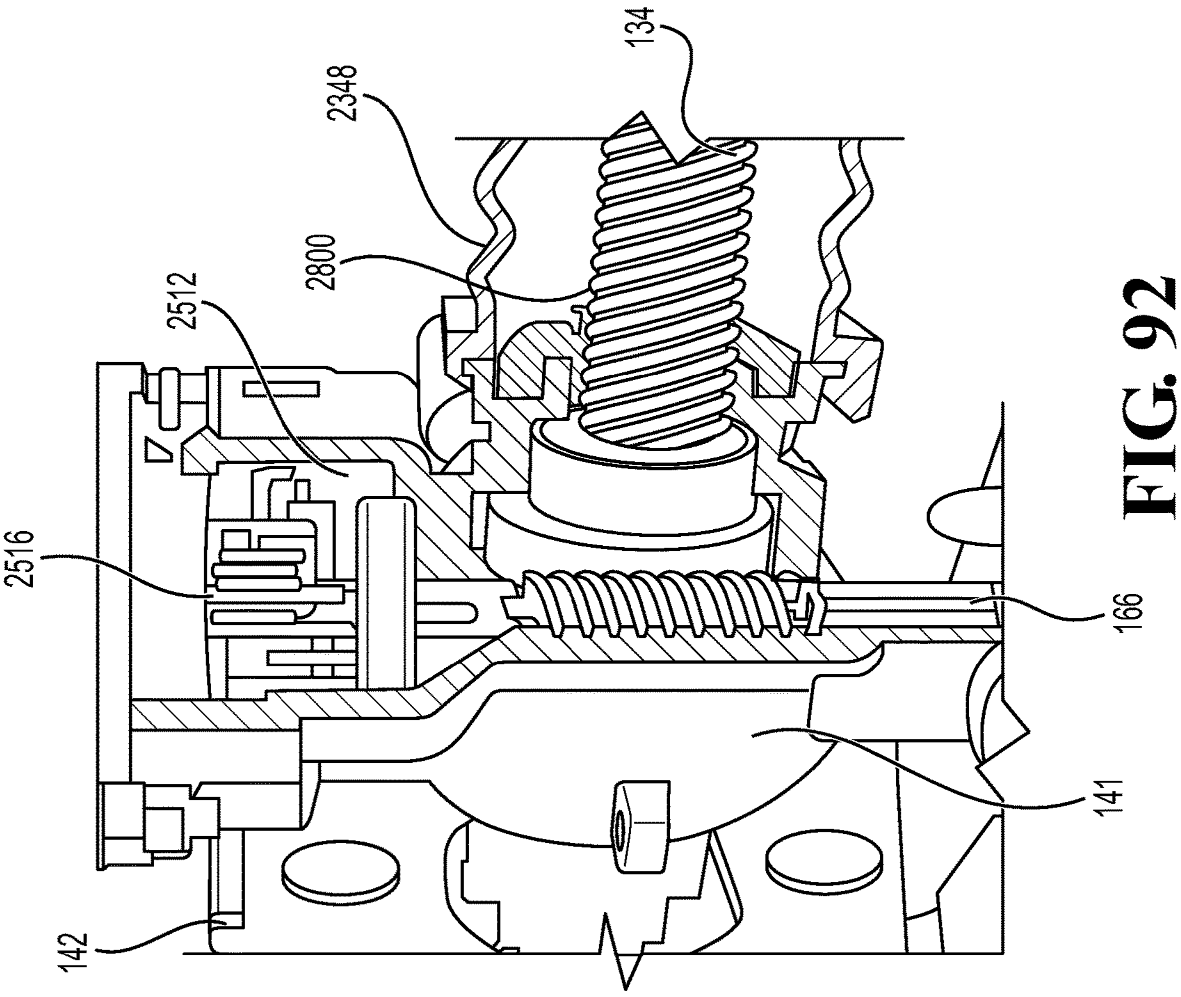

As best shown in FIG. 92 and according to an aspect, the actuator housing 141, 142, 148, 184, 2348, 2349, 2384 defines no passage from the rear extensible bellows 2348 into the actuator housing 141, 142, 148, 184, 2348, 2349, 2384. Thus, air from the rear extensible bellows 2348 remains trapped in the rear extensible bellows 2348 in response to the extensible member 134 moving within the rear extensible bellows 2348.

Figure 93:
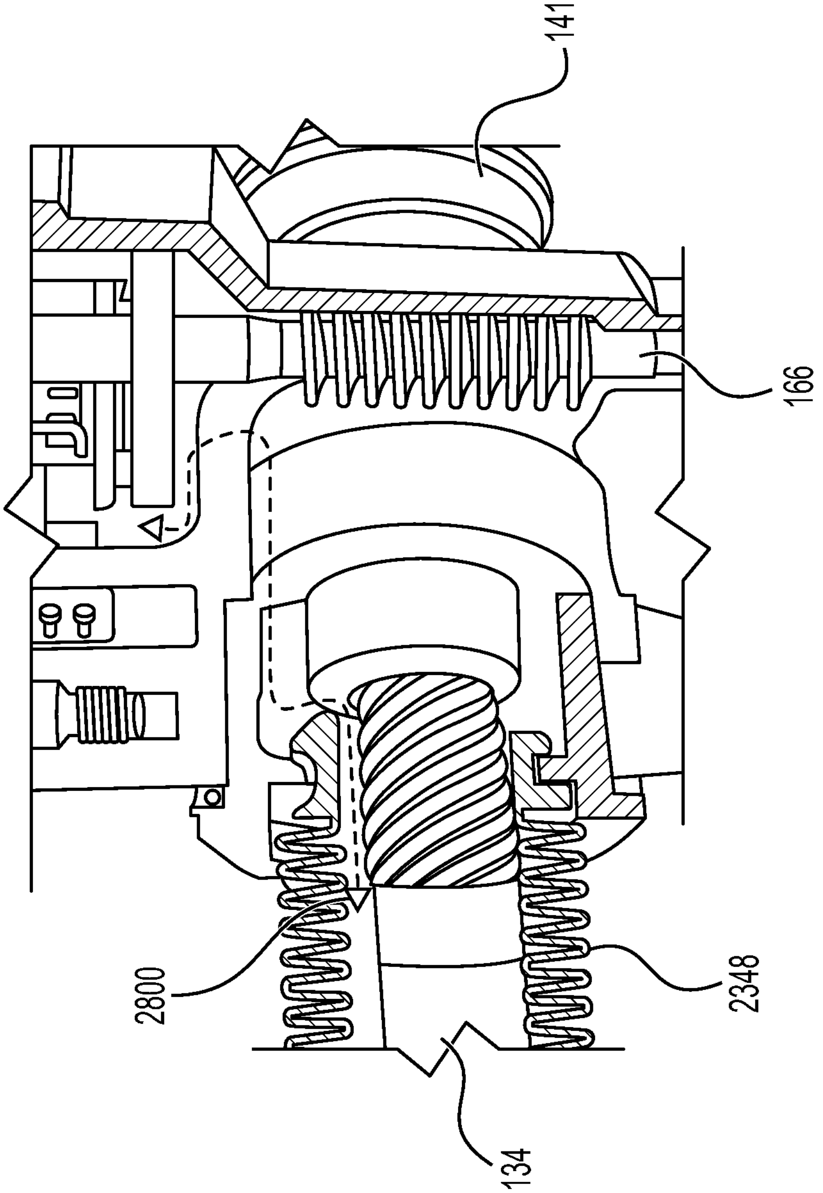
Figure 94:
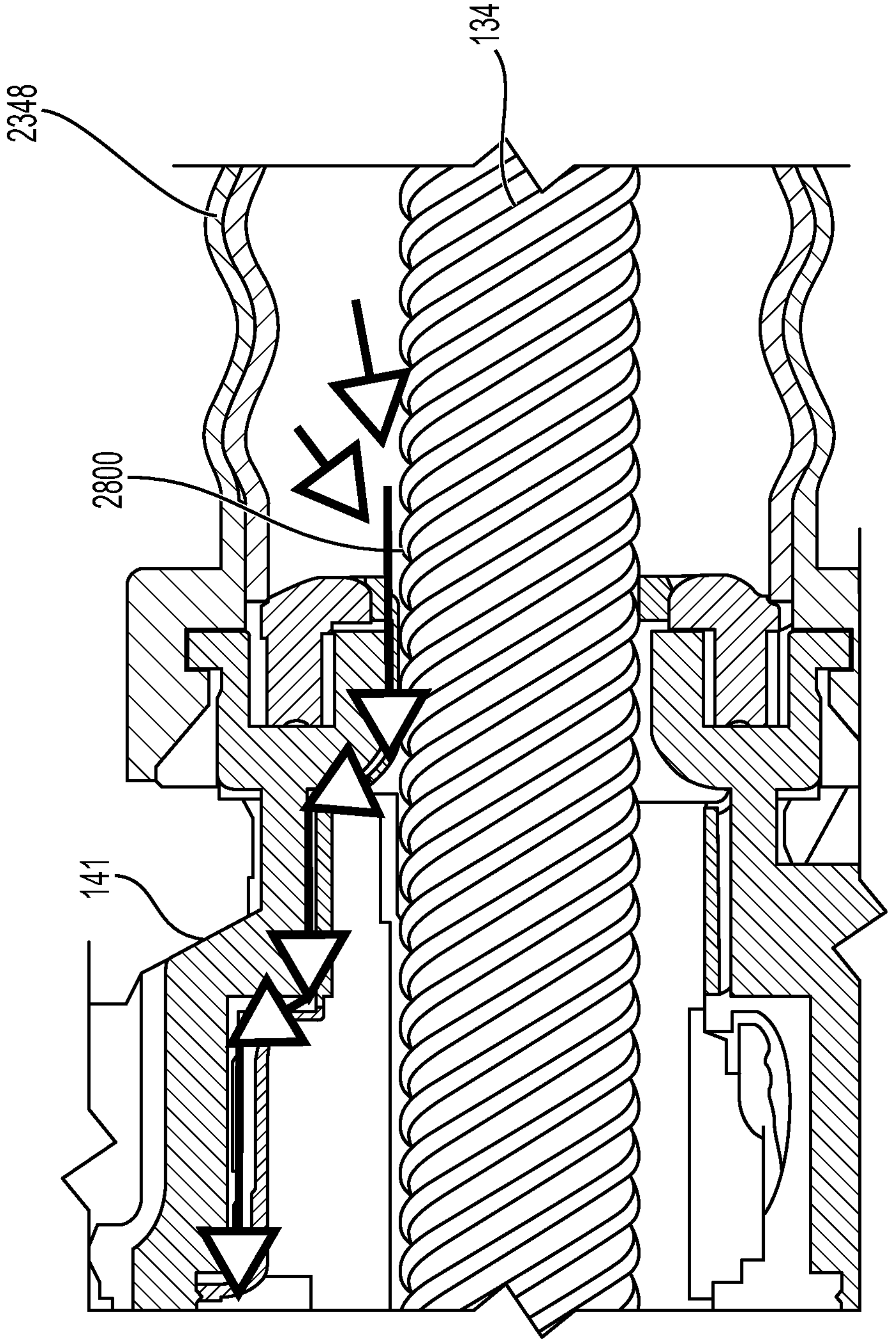
Figure 95A:
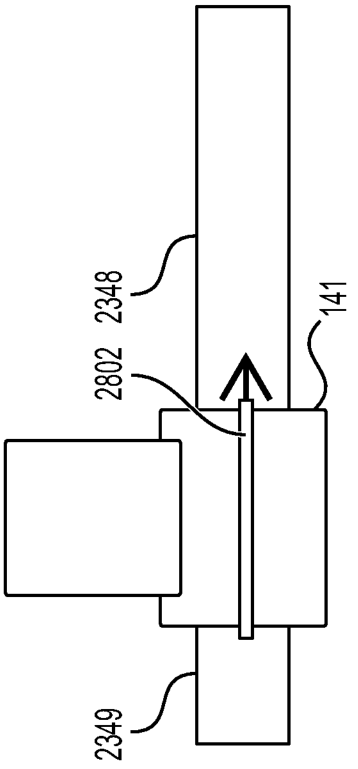
Figure 95B:
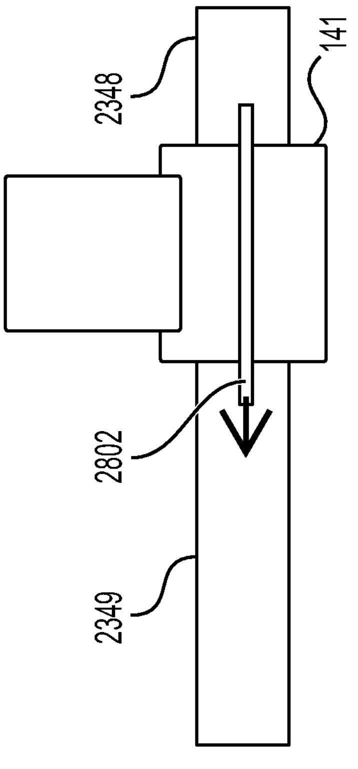
Figure 95C:
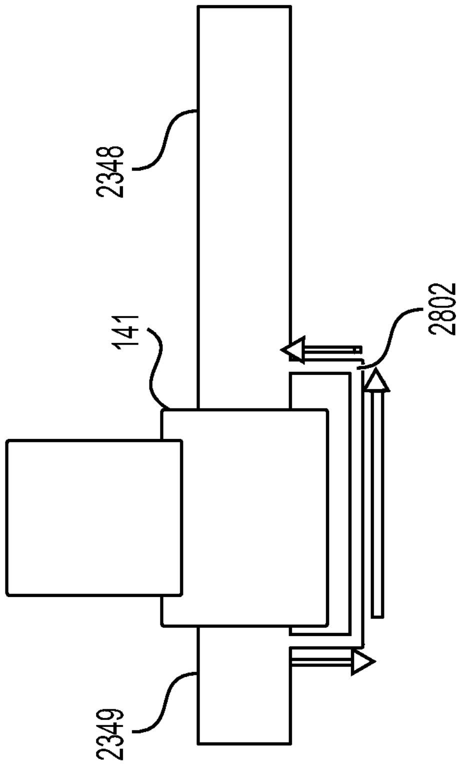
Figure 95D:
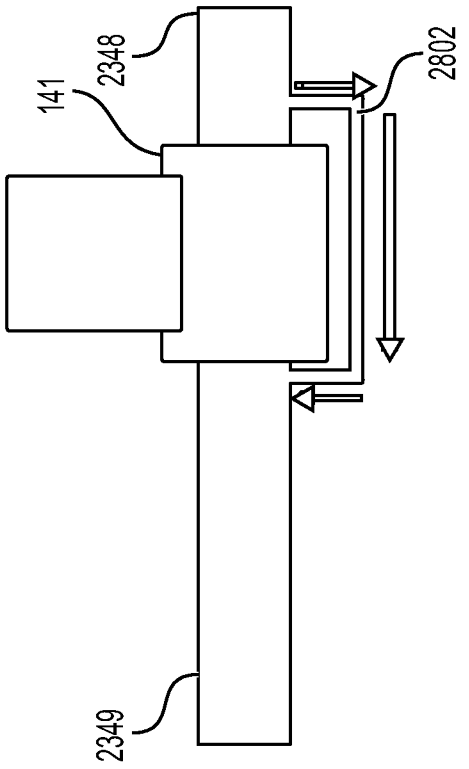
Figure 96B:
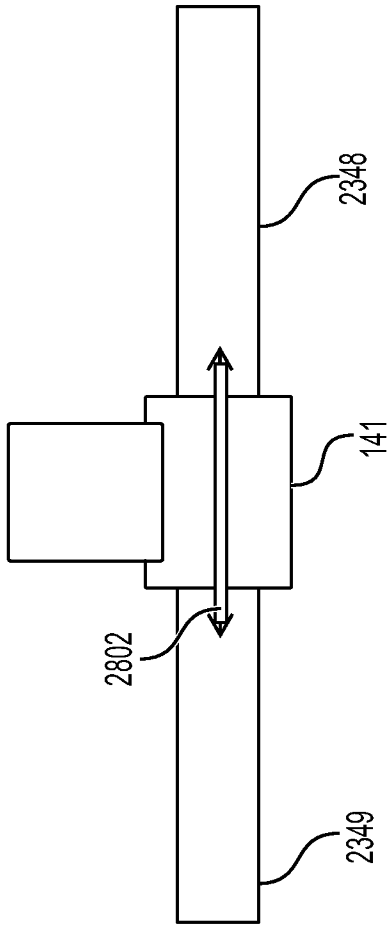
Figure 96A:
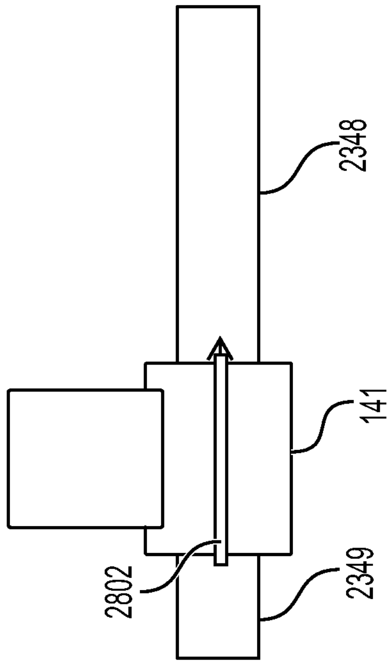

In contrast, as best shown in FIGS. 93-94, according to another aspect, the actuator housing 141, 142, 148, 184, 2348, 2349, 2384 defines at least one air passage 2800 from the rear extensible bellows 2348 into the actuator housing 141, 142, 148, 184, 2348, 2349, 2384. Consequently, air from the rear extensible bellows 2348 moves in and out of the rear extensible bellows 2348 and through the at least one air passage 2800 in response to the extensible member 134 moving within the rear extensible bellows 2348.

Now referring to FIGS. 95A-D and 96A-B, the actuator housing 141, 142, 148, 184, 2348, 2349, 2384 also includes a front extensible bellows 2349 of a polymeric material and attached to the gearbox housing 141, 142 and disposed over and extending along the extensible member 134 to the first extensible end of the extensible member 134. The front extensible bellows 2349 is configured to expand linearly along the extensible member 134 in response to the extensible member 134 extending toward the body 14 of the vehicle 10. The front extensible bellows 2349 is configured to contract linearly along the extensible member 134 in response to the extensible member 134 retracting from the body 14 of the vehicle 10. In addition, the power actuator 2322 further includes a bellows air conduit 2802 extending between the front extensible bellows 2349 and the rear extensible bellows 2348. As a result, air from the rear extensible bellows 2348 moves in and out of the rear extensible bellows 2348 through the bellows air conduit 2802 and into and out of the front extensible bellows 2349 in response to the extensible member 134 moving within the rear extensible bellows 2348.

Now referring to FIG. 97, in addition to FIGS. 1 to 96, there is shown a method of controlling an electric motor coupled to a closure member for the opening or closing of the closure member 3000, the method including the steps of receiving, from an accelerometer positioned on the closure member substantially at a center of gravity of the closure, a signal indicative of at least one of an inclination and a movement of the closure member 3002, calculating, using the signal, a force command for controlling the electric motor output force 3004, and supplying the force command to the electric motor for the opening or closing of the closure member 3006. The step of calculating, using the signal, a force command for controlling the electric motor output force 3004 may include calculating at least one of a force relating to inclination of the closure member using the signal and a force relating to inertia of the closure member using the signal 3008.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A servo actuation system (20, 520, 620, 720, 820, 920, 1020, 1120) for a closure member (12) of a vehicle (10) comprising:

an actuator assembly (622) having an actuator housing (141, 148, 184, 188, 206, 408, 422, 684);

the actuator assembly including an electric motor (36) disposed in the actuator housing and configured to rotate a driven shaft (166) operably coupled to an extensible member (134) coupled to one of a body (14) or the closure member for opening or closing the closure member; and an accelerometer (697) configured to sense movement of the closure member by a user manually moving the closure member while the electric motor (36) is moving the closure member (12);

at least one servo controller (50, 850, 1050) coupled to the electric motor (36) and to the accelerometer (697) and configured to determine whether to open or close the closure member (12) using the sensed movement of the closure member (12) by the user, and control the electric motor (36) to move the closure member (12) based on the sensed movement and an inclination of the closure member (12) sensed using the accelerometer (697).

2. The servo actuation system as set forth in claim 1, wherein the accelerometer is attached to the closure member substantially at a center of gravity (703) of the closure member.

3. The servo actuation system as set forth in claim 1, wherein the closure member has an overall closure member length (704) defined from a first closure member end (705) along a longitudinal direction to a second closure member end (706), the overall closure member length comprising, from the first closure member end to the second closure member end, a front closure member length (704*a*) being one third of the overall closure member length, a middle closure member length (704*b*) being one third of the overall closure member length, and a back closure member length (704*c*) being one third of the overall closure member length, and the accelerometer is attached to the closure member within the middle closure member length of the closure member.

4. The servo actuation system as set forth in claim 1, wherein the at least one servo controller is an actuator controller of the actuator assembly disposed in the actuator housing.

5. The servo actuation system as set forth in claim 4, further comprising a printed circuit board (1200), wherein the actuator controller (50) and accelerometer are mounted on the printed circuit board.

6. The servo actuation system as set forth in claim 1, wherein the at least one servo controller is configured to use an accelerometer signal received from the accelerometer (697) and determine at least one of the inclination of the closure member and an inertia of the closure member, and generate a force command (88) to compensate for at least one of the inclination of the closure member and the inertia of the closure member using the electric motor.

7. The servo actuation system as set forth in claim 6, wherein the accelerometer is attached to the closure member substantially at a center of gravity of the closure member.

8. The servo actuation system as set forth in claim 1, wherein the at least one servo controller is an actuator controller (50) of the actuator assembly disposed in a door node assembly (652) attached to the closure member at another position that is remote from the actuator assembly.

9. The servo actuation system as set forth in claim 8, wherein the accelerometer is disposed in the door node assembly.

10. The servo actuation system as set forth in claim 8, wherein the at least one servo controller includes a door node controller (850) of the door node assembly disposed remotely from the actuator assembly on the closure member, the door node controller is configured to command the actuator controller to control the opening or closing of the closure member based on the sensed movement and inclination of the closure member of the closure member using the electric motor.

11. The servo actuation system as set forth in claim 10, wherein the door node controller is further configured to control a latch assembly (83) to selectively secure the closure member to a vehicle body (14) of the vehicle.

12. The servo actuation system as set forth in claim 11, wherein the accelerometer is disposed in the latch assembly disposed remotely from the actuator assembly and configured to selectively secure the closure member to the vehicle body of the vehicle.

13. A servo actuation system (20, 520, 620, 720, 820, 920, 1020, 1120) for a closure member (12) of a vehicle (10) comprising:

an actuator assembly (622) including an actuator housing (141, 148, 184, 188, 206, 408, 422, 684);

the actuator assembly including an electric motor (36) disposed in the actuator housing and configured to rotate a driven shaft (166);

an actuator controller (50) coupled to the electric motor and disposed within the actuator housing; and an accelerometer (697) disposed remotely from the actuator assembly and configured to detect movement of the closure member by a user manually moving the closure member and inclination of the closure member while the electric motor (36) is moving the closure member (12);

wherein the actuator controller is configured to determine whether to open or close the closure member (12) using the detected movement of the closure member (12) by the user and control the electric motor to move the closure member based on one of the movement and an inclination of the closure member (12) of the closure member (12) sensed using the accelerometer (697).

14. The servo actuation system as set forth in claim 13, wherein the accelerometer is disposed in a door node assembly (652) disposed remotely from the actuator assembly.

15. The servo actuation system as set forth in claim 14, wherein the accelerometer is positioned within a middle closure member length (704*b*) of the closure member.

16. The servo actuation system as set forth in claim 15, wherein the accelerometer is positioned at substantially the center of gravity (697) of the closure member.

17. The servo actuation system as set forth in claim 15, wherein the actuator controller is configured to use a signal from the accelerometer to calculate a force value using the accelerometer signal.

18. A method of controlling an electric motor coupled to a closure member for opening or closing of the closure member (3000), the method comprising:

receiving, from an accelerometer positioned on the closure member substantially at a center of gravity of the closure member, a signal indicative of a movement of the closure member (3002) by a user manually moving the closure member (3002) while the electric motor is moving the closure member (3002);

determining whether to open or close the closure member using the signal;

calculating, using at least one of the signal and an inclination of the closure member (3002) sensed using the accelerometer, a force command for controlling an output force (3004) of the electric motor; and supplying the force command to the electric motor for the opening or closing of the closure member (3006).

19. The method of claim 18, wherein calculating the force command (3004) includes calculating at least one of a force relating to inclination of the closure member using the signal and a force relating to an inertia of the closure member using the signal (3008).

* * * * *